(12) United States Patent
Wahlbin

(10) Patent No.: US 7,895,064 B2
(45) Date of Patent: Feb. 22, 2011

(54) GRAPHICAL INPUT DISPLAY IN AN INSURANCE PROCESSING SYSTEM

(75) Inventor: Stefan Wahlbin, Austin, TX (US)

(73) Assignee: Computer Sciences Corporation, El Segundo, CA (US)

( * ) Notice: Subject to any disclaimer, the term of this patent is extended or adjusted under 35 U.S.C. 154(b) by 1815 days.

(21) Appl. No.: 10/422,632

(22) Filed: Sep. 2, 2003

(65) Prior Publication Data

US 2005/0060184 A1 Mar. 17, 2005

(51) Int. Cl.
G06Q 40/00 (2006.01)
G06Q 50/00 (2006.01)
(52) U.S. Cl. .............................................. 705/4; 705/2
(58) Field of Classification Search .................. 705/2–4
See application file for complete search history.

(56) References Cited

U.S. PATENT DOCUMENTS

| | | | |
|---|---|---|---|
| 4,525,780 A | 6/1985 | Bratt et al. | |
| 4,553,206 A | 11/1985 | Smutek et al. | |
| 4,648,062 A | 3/1987 | Johnson et al. | |
| 4,812,966 A | 3/1989 | Takagi et al. | |
| 4,831,526 A | 5/1989 | Luchs et al. | |
| 4,837,693 A | 6/1989 | Schotz | |
| 4,839,822 A | 6/1989 | Dormond et al. | |
| 4,878,167 A | 10/1989 | Kapulka et al. | |
| 4,945,474 A | 7/1990 | Elliott et al. | |
| 4,964,077 A | 10/1990 | Eisen et al. | |
| 4,975,840 A | 12/1990 | DeTore et al. | |
| 4,987,538 A | 1/1991 | Johnson et al. | |
| 4,992,972 A | 2/1991 | Brooks et al. | |
| 5,008,853 A | 4/1991 | Bly et al. | |
| 5,093,911 A | 3/1992 | Parks et al. | |
| 5,099,422 A | 3/1992 | Foresman et al. | |
| 5,155,806 A | 10/1992 | Hoeber et al. | |
| 5,157,768 A | 10/1992 | Hoeber et al. | |
| 5,170,464 A | 12/1992 | Hayes et al. | |
| 5,191,522 A | 3/1993 | Bosco et al. | |
| 5,201,044 A | 4/1993 | Frey, Jr. et al. | |

(Continued)

FOREIGN PATENT DOCUMENTS

EP 0 280 773 9/1988

(Continued)

OTHER PUBLICATIONS

Insightful Corporation, "S-Plus 6 for Windows User's Guide", Jul. 2001.*

(Continued)

Primary Examiner—Gerald J. O'Connor
Assistant Examiner—Robert Sorey
(74) Attorney, Agent, or Firm—Meyertons, Hood, Kivlin, Kowert & Goetzel, P.C.; Eric B. Meyertons

(57) ABSTRACT

A graphical display in an insurance processing system is disclosed. The graphical display may include a representation of a human body. The representation of the human body may provide information to a user that is helpful in specifying insurance claim information. For example, the representation may provide information regarding body parts, information regarding injury codes, information regarding common injuries, information regarding common treatments and/or information regarding treatment codes. The representation may also be used to provide input into the insurance processing system.

62 Claims, 80 Drawing Sheets

U.S. PATENT DOCUMENTS

| | | | |
|---|---|---|---|
| 5,225,976 A | 7/1993 | Tawil | |
| 5,233,513 A | 8/1993 | Doyle | |
| 5,241,671 A | 8/1993 | Reed et al. | |
| 5,287,448 A | 2/1994 | Nicol et al. | |
| 5,307,262 A | 4/1994 | Ertel | |
| 5,307,265 A | 4/1994 | Winans | |
| 5,359,509 A | 10/1994 | Little et al. | |
| 5,359,660 A | 10/1994 | Clark et al. | |
| 5,386,566 A | 1/1995 | Hamanaka et al. | |
| 5,388,251 A | 2/1995 | Makino et al. | |
| 5,394,555 A | 2/1995 | Hunter et al. | |
| 5,410,648 A | 4/1995 | Pazel | |
| 5,432,904 A | 7/1995 | Wong | |
| 5,434,994 A | 7/1995 | Shaheen et al. | |
| 5,446,653 A | 8/1995 | Miller et al. | |
| 5,455,947 A | 10/1995 | Suzuki et al. | |
| 5,471,575 A | 11/1995 | Giansante | |
| 5,481,667 A | 1/1996 | Bieniek et al. | |
| 5,483,632 A | 1/1996 | Kuwamoto et al. | |
| 5,499,330 A | 3/1996 | Lucas et al. | |
| 5,504,674 A | 4/1996 | Chen et al. | |
| 5,504,675 A | 4/1996 | Cragun et al. | |
| 5,517,405 A | 5/1996 | McAndrew et al. | |
| 5,523,942 A | 6/1996 | Tyler et al. | |
| 5,535,323 A | 7/1996 | Miller et al. | |
| 5,537,315 A | 7/1996 | Mitcham | |
| 5,550,734 A | 8/1996 | Tarter et al. | |
| 5,550,976 A | 8/1996 | Henderson et al. | |
| 5,557,515 A | 9/1996 | Abbruzzese et al. | |
| 5,581,677 A | 12/1996 | Myers et al. | |
| 5,586,310 A | 12/1996 | Sharman | |
| 5,613,072 A | 3/1997 | Hammond et al. | |
| 5,627,886 A | 5/1997 | Bowman | |
| 5,630,127 A | 5/1997 | Moore et al. | |
| 5,638,508 A | 6/1997 | Kanai et al. | |
| 5,644,778 A | 7/1997 | Burks et al. | |
| 5,652,842 A | 7/1997 | Siegrist, Jr. et al. | |
| 5,655,085 A | 8/1997 | Ryan et al. | |
| 5,673,402 A | 9/1997 | Ryan et al. | |
| 5,689,706 A | 11/1997 | Rao et al. | |
| 5,704,044 A | 12/1997 | Tarter et al. | |
| 5,712,984 A * | 1/1998 | Hammond et al. | 705/4 |
| 5,717,913 A | 2/1998 | Driscoll | |
| 5,732,221 A | 3/1998 | Feldon et al. | |
| 5,732,397 A | 3/1998 | DeTore et al. | |
| 5,745,901 A | 4/1998 | Entner et al. | |
| 5,748,953 A | 5/1998 | Mizutani et al. | |
| 5,768,505 A | 6/1998 | Gilchrist et al. | |
| 5,768,506 A | 6/1998 | Randell | |
| 5,768,578 A | 6/1998 | Kirk et al. | |
| 5,797,134 A | 8/1998 | McMillan et al. | |
| 5,806,078 A | 9/1998 | Hug et al. | |
| 5,809,478 A | 9/1998 | Greco et al. | |
| 5,809,496 A | 9/1998 | Byrd et al. | |
| 5,832,481 A | 11/1998 | Sheffield | |
| 5,832,508 A | 11/1998 | Sherman et al. | |
| 5,832,530 A | 11/1998 | Paknad et al. | |
| 5,835,897 A | 11/1998 | Dang | |
| 5,835,914 A | 11/1998 | Brim | |
| 5,850,442 A | 12/1998 | Muftic | |
| 5,862,325 A | 1/1999 | Reed et al. | |
| 5,870,711 A | 2/1999 | Huffman | |
| 5,873,066 A | 2/1999 | Underwood et al. | |
| 5,877,757 A | 3/1999 | Baldwin et al. | |
| 5,884,274 A | 3/1999 | Walker et al. | |
| 5,895,461 A | 4/1999 | De La Huerga et al. | |
| 5,899,998 A | 5/1999 | McGauley et al. | |
| 5,903,873 A | 5/1999 | Peterson et al. | |
| 5,907,705 A | 5/1999 | Carter | |
| 5,907,848 A | 5/1999 | Zaiken et al. | |
| 5,909,683 A | 6/1999 | Miginiac et al. | |
| 5,913,198 A | 6/1999 | Banks | |
| 5,914,714 A | 6/1999 | Brown | |
| 5,915,241 A | 6/1999 | Giannini | |
| 5,918,208 A | 6/1999 | Javitt | |
| 5,930,759 A | 7/1999 | Moore et al. | |
| 5,933,816 A | 8/1999 | Zeanah et al. | |
| 5,937,189 A | 8/1999 | Branson et al. | |
| 5,950,169 A | 9/1999 | Borghesi et al. | |
| 5,950,196 A | 9/1999 | Pyreddy et al. | |
| 5,953,526 A | 9/1999 | Day et al. | |
| 5,956,687 A | 9/1999 | Wamsley et al. | |
| 5,956,691 A | 9/1999 | Powers | |
| 5,963,952 A | 10/1999 | Smith | |
| 5,970,464 A | 10/1999 | Apte et al. | |
| 5,982,369 A | 11/1999 | Sciammarella et al. | |
| 5,987,430 A | 11/1999 | Van Horne et al. | |
| 5,987,434 A | 11/1999 | Libman | |
| 5,987,440 A | 11/1999 | O'Neil et al. | |
| 5,991,733 A | 11/1999 | Aleia et al. | |
| 5,991,756 A | 11/1999 | Wu | |
| 5,995,947 A | 11/1999 | Fraser et al. | |
| 5,999,940 A | 12/1999 | Ranger | |
| 6,012,053 A | 1/2000 | Pant et al. | |
| 6,016,477 A | 1/2000 | Ehnebuske et al. | |
| 6,016,504 A | 1/2000 | Arnold et al. | |
| 6,029,150 A | 2/2000 | Kravitz | |
| 6,029,195 A | 2/2000 | Herz | |
| 6,038,393 A | 3/2000 | Iyengar et al. | |
| 6,038,668 A | 3/2000 | Chipman et al. | |
| 6,049,665 A | 4/2000 | Branson et al. | |
| 6,061,657 A | 5/2000 | Whiting-O'Keefe | |
| 6,064,983 A | 5/2000 | Koehler | |
| 6,065,000 A | 5/2000 | Jensen | |
| 6,065,047 A | 5/2000 | Carpenter et al. | |
| 6,073,104 A | 6/2000 | Field | |
| 6,081,832 A | 6/2000 | Gilchrist et al. | |
| 6,088,702 A | 7/2000 | Plantz et al. | |
| 6,088,710 A | 7/2000 | Dreyer et al. | |
| 6,092,049 A | 7/2000 | Chislenko et al. | |
| 6,098,070 A | 8/2000 | Maxwell | |
| 6,105,007 A | 8/2000 | Norris | |
| 6,112,986 A | 9/2000 | Berger et al. | |
| 6,115,690 A | 9/2000 | Wong | |
| 6,119,093 A | 9/2000 | Walker et al. | |
| 6,128,598 A | 10/2000 | Walker et al. | |
| 6,134,582 A | 10/2000 | Kennedy | |
| 6,148,297 A | 11/2000 | Swor et al. | |
| 6,163,770 A | 12/2000 | Gamble et al. | |
| 6,185,540 B1 | 2/2001 | Schreitmueller et al. | |
| 6,202,054 B1 | 3/2001 | Lawlor et al. | |
| 6,208,973 B1 | 3/2001 | Boyer et al. | |
| 6,226,623 B1 | 5/2001 | Schein et al. | |
| 6,236,972 B1 | 5/2001 | Shkedy | |
| 6,236,975 B1 | 5/2001 | Boe et al. | |
| 6,237,035 B1 | 5/2001 | Himmel et al. | |
| 6,239,798 B1 | 5/2001 | Ludolph et al. | |
| 6,240,408 B1 | 5/2001 | Kaufman | |
| 6,249,905 B1 | 6/2001 | Yoshida et al. | |
| 6,253,203 B1 | 6/2001 | O'Flaherty et al. | |
| 6,259,434 B1 * | 7/2001 | Tsai | 345/168 |
| 6,266,645 B1 | 7/2001 | Simpson | |
| 6,272,471 B1 | 8/2001 | Segal | |
| 6,272,472 B1 | 8/2001 | Danneels | |
| 6,272,482 B1 | 8/2001 | McKee et al. | |
| 6,272,528 B1 | 8/2001 | Cullen et al. | |
| 6,301,621 B1 | 10/2001 | Haverstock et al. | |
| 6,314,415 B1 | 11/2001 | Mukherjee | |
| 6,314,419 B1 | 11/2001 | Faisal | |
| 6,330,551 B1 | 12/2001 | Burchetta et al. | |
| 6,336,096 B1 | 1/2002 | Jernberg | |
| 6,341,265 B1 | 1/2002 | Provost et al. | |
| 6,343,271 B1 | 1/2002 | Peterson et al. | |
| 6,370,511 B1 | 4/2002 | Dang | |

| | | | |
|---|---|---|---|
| 6,389,588 B1 | 5/2002 | Wadhwa et al. | |
| 6,401,079 B1 | 6/2002 | Kahn et al. | |
| 6,449,652 B1 | 9/2002 | Blumenau et al. | |
| 6,452,607 B1 | 9/2002 | Livingston | |
| 6,456,303 B1 | 9/2002 | Walden et al. | |
| 6,467,081 B2 | 10/2002 | Vaidyanathan et al. | |
| 6,473,748 B1 | 10/2002 | Archer | |
| 6,473,794 B1 | 10/2002 | Guheen et al. | |
| 6,477,533 B2 | 11/2002 | Schiff et al. | |
| 6,480,956 B1 | 11/2002 | DiRienzo | |
| 6,484,178 B1 | 11/2002 | Bence, Jr. et al. | |
| 6,505,176 B2 | 1/2003 | DeFrancesco et al. | |
| 6,513,019 B2 | 1/2003 | Lewis | |
| 6,523,172 B1 | 2/2003 | Martinez-Guerra et al. | |
| 6,560,592 B1 | 5/2003 | Reid et al. | |
| 6,584,467 B1 | 6/2003 | Haught et al. | |
| 6,594,697 B1 | 7/2003 | Praitis et al. | |
| 6,609,200 B2 | 8/2003 | Anderson et al. | |
| 6,633,316 B1 | 10/2003 | Maddalozzo, Jr. et al. | |
| 6,636,242 B2 | 10/2003 | Bowman-Amuah | |
| 6,643,652 B2 | 11/2003 | Helgeson et al. | |
| 6,658,568 B1 | 12/2003 | Ginter et al. | |
| 6,681,380 B1 | 1/2004 | Britton et al. | |
| 6,684,388 B1 | 1/2004 | Gupta et al. | |
| 6,728,769 B1 | 4/2004 | Hoffmann | |
| 6,751,657 B1 | 6/2004 | Zothner | |
| 6,775,658 B1 | 8/2004 | Zothner | |
| 6,810,382 B1 | 10/2004 | Wamsley et al. | |
| 6,850,922 B1 | 2/2005 | Wason | |
| 6,868,413 B1 | 2/2005 | Grindrod et al. | |
| 7,024,418 B1 | 4/2006 | Childress | |
| 7,072,841 B1* | 7/2006 | Pednault | 705/4 |
| 7,095,426 B1* | 8/2006 | Childress | 715/794 |
| 7,328,212 B2 | 2/2008 | Voss et al. | |
| 7,343,307 B1* | 3/2008 | Childress | 705/4 |
| 7,398,219 B1 | 7/2008 | Wolfe | |
| 7,418,400 B1 | 8/2008 | Lorenz | |
| 7,424,715 B1 | 9/2008 | Dutton | |
| 7,430,514 B1 | 9/2008 | Childress et al. | |
| 7,430,515 B1 | 9/2008 | Wolfe et al. | |
| 7,451,148 B2 | 11/2008 | Childress et al. | |
| 2001/0009033 A1 | 7/2001 | Morisaki et al. | |
| 2001/0037224 A1 | 11/2001 | Eldridge et al. | |
| 2001/0041992 A1 | 11/2001 | Lewis et al. | |
| 2001/0041993 A1 | 11/2001 | Campbell | |
| 2002/0002475 A1 | 1/2002 | Freedman et al. | |
| 2002/0004729 A1* | 1/2002 | Zak et al. | 705/3 |
| 2002/0022976 A1 | 2/2002 | Hartigan | |
| 2002/0035488 A1 | 3/2002 | Aquila et al. | |
| 2002/0035491 A1 | 3/2002 | Dombroski | |
| 2002/0091818 A1 | 7/2002 | Cascio et al. | |
| 2002/0116228 A1 | 8/2002 | Bauer et al. | |
| 2002/0120473 A1 | 8/2002 | Wiggins | |
| 2002/0120917 A1 | 8/2002 | Abrari et al. | |
| 2002/0138449 A1 | 9/2002 | Kendall et al. | |
| 2002/0147617 A1 | 10/2002 | Schoenbaum et al. | |
| 2002/0194023 A1 | 12/2002 | Turley et al. | |
| 2002/0198753 A1 | 12/2002 | Feldman et al. | |
| 2003/0033292 A1 | 2/2003 | Meisel et al. | |
| 2003/0074353 A1 | 4/2003 | Berkan et al. | |
| 2003/0093302 A1 | 5/2003 | Quido et al. | |
| 2003/0120477 A1 | 6/2003 | Kruk et al. | |
| 2003/0120917 A1 | 6/2003 | Itonaga et al. | |
| 2003/0158759 A1 | 8/2003 | Kannenberg | |
| 2003/0200123 A1* | 10/2003 | Burge et al. | 705/4 |
| 2003/0211518 A1* | 11/2003 | Slotman | 435/6 |
| 2003/0221184 A1 | 11/2003 | Gunjal et al. | |
| 2004/0030421 A1 | 2/2004 | Haley | |
| 2004/0215494 A1* | 10/2004 | Wahlbin et al. | 705/4 |

FOREIGN PATENT DOCUMENTS

| | | | |
|---|---|---|---|
| EP | 0 465 018 | 1/1992 | |
| EP | 0 926 608 | 6/1999 | |
| JP | 2002-14950 | 1/2002 | |

OTHER PUBLICATIONS

Rutledge, et al. "The End of the Injury Severity Score (ISS) and this Trauma and Injury Severity Score (TRISS)", Journal of Trauma Nursing, Jan.-Mar. 1999, vol. 6, No. 1, p. 19.*
Klugman, et al. "Bodily Injury Claim Payments as a Function of Automobile Liability Inusrance Limits", The Journal of Risk and Insurance, Sep. 1984, vol. 51, No. 3, p. 412-432.*
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.

Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
Connections, Computer Sciences Corporation, Mar./ Apr. 2001, 58 pages.
Connections, Computer Sciences Corporation, Jun. 2001, 44 pages.
Connections, Computer Sciences Corporation, Oct. 2001, 39 pages.
Connections, Computer Sciences Corporation, Dec. 2001, 39 pages.
Connections, Computer Sciences Corporation, Apr. 2002, 35 pages.
CSC's Property and Casualty Claims Solutions, Computer Sciences Corporation, Nov. 2002, 2 pages.
Straight Through Processing, Computer Sciences Corporation, Feb. 2003, 6 pages.
CSC's Property and Casualty Solutions, Computer Sciences Corporation, Aug. 2003, 2 pages.
"The Continuum Company Announces Colossus™ Licenses," Continuum Financial News Release, The Continuum Company, Inc., Apr. 7, 1995, 1 page.
"The Continuum Company Announces Colossus License," Continuum Financial News Release, The Continuum Company, Inc., Jul. 13, 1995, 1 page.
"The Continuum Company Announces Colossus License," Continuum Financial News Release, The Continuum Company, Inc., Jul. 17, 1995, 1 page.
"The Continuum Company Announces Colossus™ Sale," Continuum Financial News Release, The Continuum Company, Inc., Oct. 9, 1995, 1 page.
"The Continuum Company Announces Colossus™ Sale To General Accident," Continuum Financial News Release, The Continuum Company, Inc., Nov. 7, 1995, 1 page.
"The Continuum Company Announces Second European Colossus Sale," Continuum Financial News Release, The Continuum Company, Inc., Jan. 5, 1996, 1 page.
"The Continuum Company Announces Colossus™ Sale," Continuum Financial News Release, The Continuum Company, Inc., Mar. 7, 1996, 1 page.
"The Continuum Company Announces Colossus License," Continuum Financial News Release, The Continuum Company, Inc., May 9, 1996, 2 pages.
"The Continuum Company Announces Colossus Sale," Continuum Financial News Release, The Continuum Company, Inc., Jun. 12, 1996, 2 pages.
"The Continuum Company Announces Colossus Sale," Continuum Financial News Release, The Continuum Company, Inc., Jul. 3, 1996, 1 page.
"CSC Continuum Announces Colossus Sale," News Release, Computer Sciences Corporation, Sep. 17, 1996, 2 pages.
"CSC Continuum Announces Colossus License," News Release, Computer Sciences Corporation, Sep. 17, 1996, 2 pages.
"CSC Continuum Announces COLOSSUS™ License," News Release, CSC Continuum, Nov. 21, 1996, 2 pages.
"USAA Licenses Colossus™," News Release, CSC Continuum, Feb. 10, 1997, 2 pages.
"20th Century Industries Licenses Colossus™," News Release, CSC Continuum, Feb. 10, 1997, 2 pages.
"Arrow Claims Management Licenses COLOSSUS™," News Release, Computer Sciences Corporation, Aug. 6, 1997, 2 pages.
"American Family Insurance Renews COLOSSUS™ License," News Release, Computer Sciences Corporation, Dec. 8, 1997, 2 pages.
"Explorer Insurance Company Licenses COLOSSUS™," News Release, Computer Sciences Corporation, Dec. 8, 1997, 2 pages.
Greenleaf, Graham, A Colossus come to judgement: GIO's expert system on general damages, University of New South Wales (published in the Law & Information Technology column, Australian Law Journal) Nov. 26, 1992, 6 pages.
Beinat, Paul, Artificial intelligence helps boost Australian profits, Property-Casualty Insurance Edition Apr. 97, vol. 97, Issue 12, p. 22, 2/3 p.
Attrino, Tony, Software helps bolster claims assessment, National Underwriter/ Property & Casualty Risk & Benefits, May 4, 1998, vol. 102, Issue 18, p. 14, 2p.
COLOSSUS'—A claims management system, creates standard for measuring pain/ sufering claims, Insurance Advocate, May 8, 1999, vol. 110, Issue 19, p. 25, 1/4 p.
Schwartz, Susana, CSC wraps traditional insurance solutions into a neat new package, Insurance and Technology, Sep. 1998, vol. 23, Issue 9, p. 61, 2p.
Bremer, Christine, and Lance Trollop, Colossus: What Colossus is and what it does, accessed at http://www.watl.org. Verdict%20articles/colossus.htm on May 6, 2004.
Scopus and Entrust: Call Center Sales Helper is Unveiled, Nov. 10, 1997; vol. 162, Issue 217, p. 19.
International search report application No. PCT/US 01/ 20030, mailed Nov. 1, 2001, 5 pages.
"@ Fault A Commitment to Consistency," Computer Sciences Corporation, Copyright 2000, pp. 1-2.
Banking Flows Onto Net, Two Austin Software Companies Poised for Boom in Online Service; Ladendorf, Kirk; Dec. 14, 1998; pp. 1-5; Austin American Statesman.
"High-Performance Communication Networks"; Jean Walrand and Pravin Varaiya; 1996; pp. 361-369; Morgan Kaufmann Publishers.
"InsWeb Teams Up with Online Resources; Deal brings online insurance Marketplace to hundreds of financial institutions"; Dec. 2, 1998; pp. 1-3; Business Wire.
"Reliance Group providing On-Line Access to Workers' Comp, Auto, Surety, Professional Liability Coverages; E-Commerce to Exceed $100 Million in 1999"; Dec. 7, 1998; pp. 1-3; Business Wire.
"Time and Billing Gets Webbed"; Antoinette, Alexander; Jun. 1, 2000; pp. 46-50; Accounting Technology, vol. 16 No. 5.
"Will your Business Model Float?"; Baatz, E.B.; Webmaster Magazine; Oct. 1996; http://www.cio.com/archive/webbusiness/100196_float_content.html.
Borland, Russel; "Running Microsoft Outlook 97," Microsoft Press, 1997.
Howarth, "Outsourcing: Technology on Tap," Business Review Weekly, Dec. 1999, pp. 1-5.
"The OTC Revolution"; Juhl, Randy; Mar. 3, 1997; Drug Topics 141 (5).
Mead, Jay, "Measuring the Value Added by Technical Documentation" Technical Communication Online, Aug. 1998, V. 45, N. 3.
Medisoft Insurance Claims Software Website. May 10, 2000. [Retrieved on Jan. 10, 2003] Retrieved from Interne URL: <http://web.archive.org/web/20000510094549/http://www.medisoft.com/>.
Merlin, Jr., William F., "Collision Course With the Colossus Program: How To Deal With It," The Merlin Law Group, May 2000, Tampa, FL, pp. 1-17.
Merlin, Jr., William F., "Overcoming Allstate's Trade Secrets and Work-Product Objections," The Merlin Law Group, May 2000, Tampa, FL, pp. 1-31.
Microsoft Corporation, "Holding State in Objects with Microsoft Transaction Server," Jun. 1997, pp. 1-3.

Microsoft Corporation, "Microsoft Component Services, Server Operating System, A Technology Overview," Aug. 15, 1998, pp. 1-7.

Microsoft Press Computer Dictionary Second Edition, Microsoft Press, 1994, pp. 26-27, 117, 277, 335, 338, 353, 366-367, and 383.

Scopus and Entrust Technologies to Deliver World's First Secure Customer Care Solution for the Financial Service Market; PR Newswire dated Nov. 5, 1997.

Utzschneider, "Microsoft Transaction Server and Internet Information Server: Technology for the Web," Feb. 6, 1998, pp. 1-6.

Merlin, Jr., William F., "Colossus: What We Know Today," The Merlin Law Group, Aug. 2000, Tampa, FL, pp. 1-8.

https://www.foremost.com/secure/fm_claims.htm 1996.

Summary of Colossus Functionality as of Dec. 1999.

"Connections," Computer Science Corporation, May 31, 2002, (40 pages).

Allstate Creates New Customer Care Center Internet Service, Apr. 13, 1999, accessed at www.allstate.com/media/newsheadlines.

Allstate Announces Online Claim Reporting Capabillities, Sep. 13, 1999, accessed at www.allstate.com/media/newsheadlines.

Investigations into database management system support for expert system shells (vols. I and II) by Johnson, Verlyn Mark, Ph. D, University of Minnesota, 1993, Abstract (Q2).

Australian application—Examiner's report on patent aplication 2001268693, Apr. 21, 2006 (Q1).

http://web.archive.org/web/20000605062238/http://www.wawanesa.com/insure_claims_process.htm, (Wawanesa Insurance) Jun. 5, 2000 (Q3).

U.S. Patent and Trademark Office, "Communication" for U.S. Appl. No. 10/285,292 mailed Apr. 19, 2007.

U.S. Patent and Trademark Office, "Communication" for U.S. Appl. No. 10/285,292 mailed Sep. 26, 2007.

U.S. Patent and Trademark Office, "Communication" for U.S. Appl. No. 10/285,292 mailed Mar. 18, 2008.

U.S. Patent and Trademark Office, "Communication" for U.S. Appl. No. 10/285,289 mailed Apr. 4, 2008.

U.S. Patent and Trademark Office, "Communication" for U.S. Appl. No. 10/285,339 mailed Apr. 28, 2005.

U.S. Patent and Trademark Office, "Communication" for U.S. Appl. No. 10/285,339 mailed Oct. 20, 2005.

U.S. Patent and Trademark Office, "Communication" for U.S. Appl. No. 10/285,339 mailed Mar. 20, 2006.

U.S. Patent and Trademark Office, "Communication" for U.S. Appl. No. 10/285,339 mailed Sep. 7, 2006.

U.S. Patent and Trademark Office, "Communication" for U.S. Appl. No. 10/285,339 mailed Aug. 10, 2007.

U.S. Patent and Trademark Office, "Communication" for U.S. Appl. No. 10/285,339 mailed Feb. 19, 2008.

U.S. Patent and Trademark Office, "Communication" for U.S. Appl. No. 10/285,339 mailed Jul. 1, 2008.

U.S. Patent and Trademark Office, "Communication" for U.S. Appl. No. 10/285,375 mailed Jun. 21, 2007.

U.S. Patent and Trademark Office, "Communication" for U.S. Appl. No. 10/285,375 mailed Oct. 18, 2007.

U.S. Patent and Trademark Office, "Communication" for U.S. Appl. No. 10/285,375 mailed Apr. 16, 2008.

U.S. Patent and Trademark Office, "Communication" for U.S. Appl. No. 10/285,338 mailed Jul. 3, 2007.

U.S. Patent and Trademark Office, "Communication" for U.S. Appl. No. 10/285,338 mailed Jan. 23, 2008.

U.S. Patent and Trademark Office, "Communication" for U.S. Appl. No. 10/285,338 mailed Jul. 25, 2008.

U.S. Patent and Trademark Office, "Communication" for U.S. Appl. No. 10/285,293 mailed Feb. 7, 2006.

U.S. Patent and Trademark Office, "Communication" for U.S. Appl. No. 10/285,293 mailed Aug. 9, 2006.

U.S. Patent and Trademark Office, "Communication" for U.S. Appl. No. 10/285,293 mailed Sep. 5, 2007.

U.S. Patent and Trademark Office, "Communication" for U.S. Appl. No. 10/422,450 mailed Feb. 5, 2008.

U.S. Patent and Trademark Office, "Communication" for U.S. Appl. No. 10/422,450 mailed Aug. 20, 2008.

U.S. Patent and Trademark Office, "Communication" for U.S. Appl. No. 10/285,292 mailed Oct. 17, 2008.

U.S. Patent and Trademark Office, "Communication" for U.S. Appl. No. 10/285,289 mailed Oct. 29, 2008.

U.S. Patent and Trademark Office, "Communication" for U.S. Appl. No. 10/285,375 mailed Sep. 29, 2008.

U.S. Patent and Trademark Office, "Notice of Allowance" for U.S. Appl. No. 10/285,292 mailed Sep. 4, 2009.

U.S. Patent and Trademark Office, "Office Action" for U.S. Appl. No. 10/285,375 mailed Sep. 30, 2009.

U.S. Patent and Trademark Office, "Notice of Allowance" for U.S. Appl. No. 10/285,338 mailed Sep. 4, 2009.

U.S. Patent and Trademark Office, "Decision on Appeal" for U.S. Appl. No. 10/285,293 mailed Sep. 3, 2009.

U.S. Patent and Trademark Office, "Communication" for U.S. Appl. No. 09/602,687 mailed Mar. 6, 2009.

U.S. Patent and Trademark Office, "Communication" for U.S. Appl. No. 09/603,130 mailed Dec. 29, 2008.

U.S. Patent and Trademark Office, "Communication" for U.S. Appl. No. 10/285,292 mailed Feb. 19, 2009.

U.S. Patent and Trademark Office, "Communication" for U.S. Appl. No. 10/285,289 mailed Feb. 19, 2009.

U.S. Patent and Trademark Office, "Communication" for U.S. Appl. No. 10/285,289 mailed Jul. 22, 2009.

U.S. Patent and Trademark Office, "Communication" for U.S. Appl. No. 10/285,338 mailed Feb. 4, 2009.

U.S. Patent and Trademark Office, "Communication" for U.S. Appl. No. 10/422,632 mailed Jan. 30, 2009.

U.S. Patent and Trademark Office, "Communication" for U.S. Appl. No. 10/422,450 mailed Mar. 2, 2009.

U.S. Patent and Trademark Office, "Office Action" for U.S. Appl. No. 10/285,289 mailed May 10, 2010.

U.S. Patent and Trademark Office, "Final Office Action" for U.S. Appl. No. 10/422,450 mailed Oct. 27, 2009.

\* cited by examiner

Header Table

Text Table

| Injury or Treatment Code (330C) | Contributing Factor Value (350C) |
|---|---|
| CF001 | 500 |
| CF002 | 750 |
|  |  |
| CFNNN | 1200 |

*FIG. 3C*

| FormulaID (300D) | SequenceNo (310D) | Operation (320D) | Value (330D) |
|---|---|---|---|
| FID000 | 1 | * | 100 |
| FID000 | 2 | > | 500 |
| FID000 | 3 | - | 1200 |
| FID001 | 1 | + | 50 |
| FIDNNN | 1 | * | 5 |
| FIDNNN | 2 | => | 1000 |

*FIG. 3D*

| Injury_Code ⌐300E | Adj_Amount ⌐310E | Rule_Name ⌐320E | Rule_style ⌐330E |
|---|---|---|---|
| IC000 | 100 | RN000 | RS000 |
| IC001 | 50000 | RN001 | RS001 |
| ICNNN | 15000 | RNNNN | RSNNN |

*FIG. 3aE*

| Statename ⌐350E | Rule_Name ⌐320E | Rule_style ⌐330E | Line_textID ⌐360E |
|---|---|---|---|
| LOC000 | RN000 | RS000 | LT000 |
| LOC001 | RN001 | RS001 | LT001 |
| LOCNNN | RNNNN | RSNNN | LTNNN |

*FIG. 3bE*

| Line_textID ⌐360E | Line_text ⌐370E | Rule_style ⌐330E | Statename ⌐350E |
|---|---|---|---|
| LT000 | Code = '20' | RS000 | LOC000 |
| LTNNN | Registry(1) | RSNNN | LOCNNN |

*FIG. 3cE*

| Message Section | Message Code | Message Text |
|---|---|---|
| AA | A01 | 'Birthdate (mm/dd/yy):' |
| AB | A02 | 'ERROR - Integer value must be between 0 and 9.' |
|  |  |  |
|  |  |  |
|  |  |  |
| ZZ | Z99 | 'Select colour:' |

*FIG. 4F*

| OBJECT ID | WORD | SOUNDEX | POSITION | TOTAL WORDS | WORD COUNT | RELEVANCE |
|---|---|---|---|---|---|---|
| 10101000000001 | System | S235 | 5 | 54 | 0 | 0.31 |
| 10101000000001 | System | S235 | 9 | 54 | 0 | 0.28 |
| 10101000000002 | Anatomy | A535 | 15 | 86 | 0 | 0.28 |
| 10101000000002 | Body | 0000 | 22 | 86 | 0 | 0.25 |
| 10101000000002 | Consultation | C524 | 51 | 86 | 0 | 0.14 |
| 10101000000000 | Consultation | C524 | 1 | 1 | 1 | 1.0 |
| 10102000000000 | Anatomy | A535 | 3 | 3 | 1 | 0.55 |
| 10103000000000 | Anatomy | A535 | 2 | 5 | 1 | 0.58 |
| 10101010000000 | <Code 1> | 0000 | 2 | 3 | 1 | 0.62 |
| 10103000000000 | <Code 2> | 0000 | 1 | 5 | 1 | 0.62 |
| 10101000000001 | <Code 3> | 0000 | 1 | 54 | 0 | 0.33 |
| 10101000000002 | <Code 4> | 0000 | 86 | 86 | 0 | 0.01 |
| ... | ... | ... | ... | ... | ... | ... |

Index Table

*FIG. 5*

COLOSSUS     Table Of Contents

WRK 3498 LDO - 001

Save   Report   Comments   Date Calc   Help   Exit

- Claim Data
- Economic Region
- Define/Modify Injuries
- Pre-Existing Conditions Aggravated?
- Injury Stabilization
- Hospital Data
- Identify Initial Treatment
- Identify Subsequent Treatment
- Follow-up To Subsequent Treatment
  - right Leg - Hip Spica Time
  - right Leg - Traction
  - Medication usage
  - History of therapy
- Specify Injury Complications
- Identify Future Treatment Use these navigation buttons, not the Forward and Back Buttons on your browser.

Back   Next   Unknown   Reset

Trauma cases

| Case | Trauma severity | Dollar amount |
|---|---|---|
| 1 | 100 | $2,500 |
| 2 | 1,648 | $5,000 |
| 3 | 2,911 | $12,000 |
| 4 | 6,235 | $25,000 |
| 5 | 7,323 | $42,000 |
| 6 | 11,595 | $60,000 |
| 7 | 14,954 | $120,000 |
| 8 | 21,998 | $200,000 |
| 9 | 43,565 | $455,000 |

Impairment cases

| Case | Whole Person Impairment % | Dollar amount |
|---|---|---|
| 1 | 1 | $350 |
| 2 | 4 | $1,000 |
| 3 | 6 | $6,000 |
| 4 | 9 | $15,000 |
| 5 | 15 | $27,000 |
| 6 | 20 | $45,000 |
| 7 | 30 | $125,000 |
| 8 | 36 | $250,000 |

○ New Region  ○ Existing Region (Old Tuning)  ○ Existing Region (New Tuning)

1) Enter the dollar amount for each trauma and impairment case.

2) Click the "Use for initial" button (below) to establish the initial trauma line and the initial impairment line.

Use for initial

3) Select "Export..." from the File menu to insert the trauma and impairment values into the database for use during the closed claim study.

| Aggregate Benefit Percent Aggregate Payment Rate | | Calculated Fields | | | | | | | | |
|---|---|---|---|---|---|---|---|---|---|---|
| Claim Number | Previous Impairment % | Date of Loss | Total Specials | Actual Trauma Dollars | Recommended Trauma Dollars | Actual General Damages | Actual Settlement - Recommended High | Benefit Percent | Benefit Percent Change | Payment Rate |
| 1 | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |
| 11 | | | | | | | | | | |
| 12 | | | | | | | | | | |
| 13 | | | | | | | | | | |
| 14 | | | | | | | | | | |
| 15 | | | | | | | | | | |
| 16 | | | | | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | | | | | | | | | | |
| 23 | | | | | | | | | | |
| 24 | | | | | | | | | | |
| 25 | | | | | | | | | | |
| 26 | | | | | | | | | | |
| 27 | | | | | | | | | | |

Use the "Export points..." option on the File menu to activate these values for this region.

| Point # | Trauma severity | Dollar amount |
|---|---|---|
| 1 | | |
| 2 | | |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |
| 21 | | |
| 22 | | |
| 23 | | |
| 24 | | |
| 25 | | |

4302

| Point # | Whole Person Impairment % | Dollar amount |
|---|---|---|
| 1 | | |
| 2 | | |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |

GRAPHICAL INPUT DISPLAY IN AN INSURANCE PROCESSING SYSTEM

BACKGROUND OF THE INVENTION

1. Field of the Invention

Embodiments presented herein generally relate to insurance claim processing. More particularly, embodiments relate to a system and method for providing input to an insurance claim processing system using a graphical user interface. Additional embodiments relate to a system and method of tuning an insurance claim processing system.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

Several factors can affect the estimated amount of the claim associated with a bodily injury. Every accident is different and every injury is unique. Arriving at a customized evaluation of a bodily injury claim, which is unique for a specific accident, injury, etc. is desirable. Applying across-the-board standards may tend to result in an inequitable solution for one or more parties involved. External environmental factors, such as the experience level of a claims adjuster, record of accomplishment of the legal professionals, post-injury quality of life for the injured party, etc., all may affect the valuation of a claim.

During the past several years, many insurance companies have been using computer-based and knowledge-based claim-processing systems to process, evaluate, analyze and estimate thousands of claims in what is believed to be a fair and consistent manner. A knowledge-based claim-processing system may include an expert system which utilizes and builds a knowledge base to assist the user in decision making. Such a system may allow the insurance companies to define new business rules and/or use previously defined rules, in real-time. The business rules are generally written by industry experts to evaluate legal, medical, insurance conditions before arriving at a valuation of a claim.

An insurance claim processing system may determine valuation of a claim by first determining the severity of the claim. Several measures of severity of a claim may include, but are not limited to trauma severity values and bodily impairment values. Claim severity may be associated with a monetary amount. In some instances, different zones or geographic regions (e.g., different states within the United States) may have different monetary values associated with claims of the same severity (e.g., claims having the same bodily impairment, trauma severity values, etc.).

SUMMARY OF THE INVENTION

Embodiments presented herein generally relate to insurance claim processing. More specifically embodiments relate to methods of providing input to an insurance claim processing system via a graphical interface. Additionally, methods presented herein relate to methods of specifying a relationship between two or more claim variables in an insurance claim processing system.

In an embodiment, a method of specifying a relationship between insurance claim information (e.g., trauma severity values and/or bodily impairment amounts) and monetary amounts may include providing a plurality of data points relating trauma severity values and monetary amounts. For example, such data points may be derived from the opinion of one or more expert claim adjusters. In such a case, one or more expert claim adjusters may be provided with a number of real or prepared insurance claims. One or more relationships between trauma severity values and monetary amounts may be determined based on the expert claim adjusters' analysis of the insurance claims. In another example, the data points may be determined based on a number of closed claims. In either case, the monetary amounts may represent monetary amounts related to trauma only, or to monetary amounts associated with the entire insurance claim (e.g., both trauma and bodily impairment).

Two or more of the data points may be used to form a graphical display. The graphical display may include a tuning line. For example, the tuning line may be a function relating trauma severity values and monetary amounts. In an embodiment, the tuning line may be a line fit through two or more of the data points using a line fitting technique. In an embodiment, the tuning line may include one or more substantially straight line segments. Such line segments may join two or more of the data points.

The method may include receiving input via the graphical display which modifies the tuning line. At least one new data point relating at least one trauma severity value and at least one monetary amount may be determined based on modifications to the tuning line in the graphical display. Additionally, the display may include one or more data fields with information describing the relationship between trauma severity values and monetary amounts. The display may also include a baseline tuning line, which is not affected by modifying the tuning line.

In certain embodiments, the method may also include providing a plurality of impairment data points relating bodily impairment amounts to monetary amounts. In such embodiments, a graphical display of an impairment tuning line may be provided. The impairment tuning line may relate bodily impairment amounts and monetary amounts based on at least two of the impairment data points. As with the tuning line graphical display, the bodily impairment tuning line graphical display may be modified. At least one new impairment data point may be determined based on modifications to the impairment tuning line in the graphical display.

After at least one new data point (e.g., at least one new tuning line data point and/or at least one new impairment tuning line data point) has been determined, a plurality of data points may be sent to an insurance claim processing system. The data points may include at least one new data point. The data points may be usable by the insurance claim processing system to relate one or more trauma severity values to one or more monetary amounts. Alternately, data describing the modified tuning line may be sent to the insurance claim processing system. In such a case, the data describing the tuning line may be usable by the insurance claim processing-system to relate one or more trauma severity values to one or more monetary amounts. If the data sent to the insurance claim processing system includes at least one new impairment data point, the data may be useable by the insurance claim processing system to relate one or more bodily impairment amounts to one or more monetary amounts. The method may further include determining a monetary amount associated with an insurance claim. For example, the method may include estimating a trauma severity value and/or a bodily impairment amount associated with an insurance claim. The estimated trauma severity value and/or a bodily impairment amount may then be used in conjunction with the modified tuning line and/or modified impairment tuning line (as appropriate) to estimate a monetary amount. For example, an interpolation or extrapolation method may be used to determine a monetary amount associated with a trauma severity value or bodily impairment value not explicitly represented by a data point. If extrapolation is used, a user may receive a warning indicating that a value outside the range of data used to determine the relationship between trauma severity or bodily impairment and monetary amounts is being used.

In another embodiment, a method may include providing a graphical display comprising a tuning line, wherein the tuning line represents a plurality of data points relating trauma severity values to monetary amounts. Input modifying at least a portion of the tuning line may be received via the graphical display. A monetary amount associated with a trauma severity value may be determined based on the modified tuning line.

In an embodiment, a method of receiving input in an insurance claim processing system may include providing a graphical display including at least one representation of a human body. A body part may be selected on at least one representation of the human body. Selecting a body part may cause input selection information related to the selected body part to be displayed. An input selection may be received via the displayed input selection information.

The input selection may include an injury code and/or a selection of a body part. In response to receiving input, information may be displayed in the graphical display identifying at least one selected body part. Information may also be displayed identifying common injuries associated with at least one selected body part.

In various embodiments, a representation of a human body may include, but is not limited to: a representation of a human skeletal system, a representation of human musculature, a representation of a human nervous system, and/or a representation of a human circulatory system. The representation may include one or more layers. A layer may include an anatomical system of the human body and organs associated with the anatomical system. Additional information may also be displayed in the graphical display. For example, a photograph of a selected body part may be displayed. In another example, a more detailed view of a body part may be displayed. In yet another example, the input selection may include at least one injury code associated with at least one injury type. In such a case, the method may provide a graphical display of a selected injury type. Alternately, the input selection may include at least one injury type and at least one injured area. In such a case, the method may provide a graphical display of an injury of at least one selected injury type to at least one selected injured area. In other examples, the input selection information may include a menu including a selection of subparts of the selected body part and/or a selection of treatment types associated with the selected body parts. In such cases, the method may further include displaying at least one graphical display associated with the input selection information (e.g., a graphical display depicting a treatment of a selected treatment type to a selected treated area).

In another embodiment, a method of receiving input in an insurance claim processing system may include providing a graphical display including at least one representation of a human body (e.g., as described above) and at least one input field. Input may be received via an input field. For example, the input may be related to one or more body parts, as previously described. The method may include highlighting one or more body parts in the graphical display in response to the input received. For example, the method may include receiving input related to at least one body part and an anatomical system. In such a case, highlighting at least one body part may include displaying a layer comprising the anatomical system.

Additional embodiments may include a computer memory medium or computer system configured to implement methods as described above. Additional embodiments may include implementing methods as described above on two or more computers connected by a network. For example, the network may include the Internet.

BRIEF DESCRIPTION OF THE DRAWINGS

Other objects and advantages of the invention will become apparent upon reading the following detailed description and upon reference to the accompanying drawings in which:

FIG. 5 illustrates an index table including terms and codes and cross-references to other tables according to one embodiment of an insurance claim processing system;

FIG. 6A illustrates an example of a browser-based user interface for the insurance claims processing system according to one embodiment;

FIG. 7A is a flowchart illustrating a method of developing a web-based insurance claims processing system according to one embodiment;

FIG. 2B illustrates a flow chart to generate a table of contents for processing an insurance claim according to one embodiment;

FIG. 3B illustrates detail of step 150B in FIG. 2B;

FIG. 5Ba illustrates a screen shot of a table of contents display screen according to a second embodiment;

FIG. 6B illustrates exemplary properties and methods associated with a display screen object according to a first embodiment;

FIG. 6Ba illustrates exemplary properties and methods associated with a display screen object according to a second embodiment

FIG. 3C illustrates a table for storing injury codes, treatment codes and contributing factor values according to one embodiment;

FIG. 3D illustrates data elements of a formula table according to one embodiment;

FIG. 3aE illustrates data elements of a rules data table according to one embodiment;

FIG. 3bE illustrates data elements of a template table according to one embodiment;

FIG. 3cE illustrates data elements of a line text table according to one embodiment;

FIG. 4F is an exemplary diagram of a messages table in a database according to one embodiment;

FIG. 28 depicts an embodiment of a graphical display in an insurance transaction processing program including a second representation of the human body;

FIG. 30 depicts an embodiment of a graphical display in an insurance transaction processing program including a fourth representation of the human body;

FIG. 35A depicts a first embodiment of an initial tuning screen of a tuning application;

FIGS. 36A-36D depict an embodiment of a closed claim screen of a tuning application;

FIG. 37 depicts an embodiment of a removed/excluded claims screen of a tuning application;

FIG. 43 depicts an embodiment of a final values screen of a tuning application.

Figure 1A:
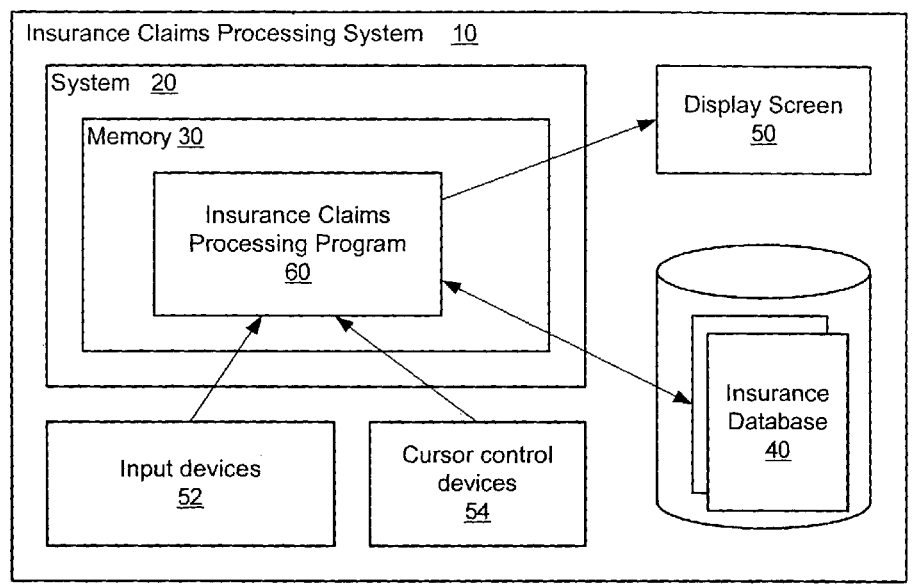
FIG. 1a is a block diagram illustrating the architecture of one embodiment of an insurance claims processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

In FIG. 1a, an embodiment of an insurance claims processing system 10 may include a computer system 20. The term "computer system" as used herein generally includes the hardware and software components that in combination may execute one or more computer programs. The term is used broadly to encompass any device or series of interconnected devices having at least one processor which executes instructions from at least one memory medium. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (PDA), television system or other device.

The memory medium preferably stores a software program or programs for processing insurance claims as described herein. The software program(s) may be implemented in any of various ways, including procedure-based techniques, component-based techniques, and/or object-oriented techniques, among others. For example, the software programs may be implemented using a rule-based development tool such as PLATINUM Aion™ available from Computer Associates International, Inc. In one embodiment, PLATINUM Aion™ may combine business rule and object-oriented technologies to create and maintain complex, knowledge-intensive applications. Software developed with PLATINUM Aion™ may employ an Aion™ programming language for automation of processes which may use hundreds or thousands of business rules from a knowledge base. An Aion™ inference engine may automatically determine which rules to execute, when, and in what order. In various other embodiments, the software program may be implemented using other technologies, languages, or methodologies, as desired. A central processing unit (CPU) executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

The insurance claims processing system 10 may further include a display screen 50 connected to the computer system 20 and an insurance database 40 residing on an internal or external storage. The database may also be referred to as a repository. As used herein, a "database" may include a collection of information from which a computer program may select a desired piece of data. As used herein, an "insurance database" is used as a synonym for a "database" when included in or coupled to an insurance claims processing system 10. System 20 includes memory 30 configured to store computer programs for execution on system 20, and a CPU (not shown) configured to execute instructions of computer programs residing on system 20. Claims processing program 60, also referred to as application program software 60, may be stored in memory 30. As used herein, an "insurance claims processing program" 60 may include a software program which is configured to conduct transactions regarding insurance claims, such as by estimating the value of the insurance claims, for example.

The insurance claims processing system 10 may be used by an Insurance Company for various embodiments of a system and method for processing insurance claims using a Table of Contents (TOC). As used herein, an "Insurance Company" (IC) includes a business organization that provides insurance products and/or services to customers. More particularly, the insurance products may pertain to providing insurance coverage for accidents and the trauma-induced bodily injuries that may result due to the accident. Examples of trauma-induced bodily injuries may include, but are not limited to: loss of limb(s); bone fractures; head, neck and/or spinal injury, etc.

In one embodiment, on receiving a trauma-induced bodily injury, a customer may file an insurance claim with his/her insurance organization to cover medical and other accident-related expenses. An IC may utilize a computer-based insurance claim processing system to process insurance claims. In one embodiment, the processing may include estimating a value associated with the filed insurance claim.

As used herein, an "IC business transaction" may be defined as a service of an IC. Examples of business transactions include, but are not limited to: insurance transactions such as filing of claims, payment of claims, application for insurance coverage, and customized benefits, etc. Business transactions may also include services related to customers, insurance providers, employers, insurance agents, investigators, etc.

As used herein, an "IC insurance claim processing system" includes a series of instructions executed by a computer system for processing an IC's business transactions. A claim processing system may include one or more processing tasks. A processing task may include a sequence of one or more processing steps or an ordered list or a structured list of one or more processing steps, associated with the business transaction to be processed by the claim processing system. In one embodiment, the sequence of steps may be fixed. In another embodiment the sequence of steps may be established dynamically, in real-time. In one embodiment, the sequence of one or more steps may include an initial step, a final step, one or more intermediary steps, etc. In one embodiment, an IC user may select steps to process an insurance claim in a sequential manner. In another embodiment, the IC user may select steps to process an insurance claim in a random or arbitrary manner. Examples of processing steps may include, but are not limited to: receiving an input from a user of the IC insurance claim processing system, reading a value from a database, updating a field in a database, displaying the results of a business transaction on a computer screen, etc.

In one embodiment, the insurance claim processing system utilizes object-oriented technology to process insurance claims. In another embodiment, processing of insurance claims may utilize traditional programming languages and databases to achieve the same result. Insurance objects may be defined to represent or model real-world business features of insurance products and services. Examples of insurance objects may include, but are not limited to, objects representing the following: an insurance claim; an accident report; a settlement; an estimated claim; IC service facilities, customers, and employees; business processes such as a new insurance application and calculation of a premium; interfaces to external insurance organizations; work tasks such as calculations, decisions, and assignments; temporal objects such as calendars, schedulers, and timers; and elemental data necessary to accomplish work tasks such as medical costs, risk factors, etc.

An insurance object may be represented on the computer screen by a graphical icon or by a display listing the properties of the insurance object in graphic and alphanumeric format. An insurance claim object may be configured to gather and evaluate data for processing a filed insurance claim and to automatically make decisions about the insurance claim. The one or more processing steps associated with the processing of an insurance claim may also be configured as one or more processing step objects. In one embodiment, a display screen may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing insurance claims. In one embodiment, the starting point for processing insurance claims may include acquiring an insurance claim identification number from an IC system user.

In one embodiment, during the processing of an insurance claim, a business rule and/or an IC system user input may determine that the insurance claim processing needs the execution of additional steps or tasks to continue the processing of the claim. The IC system user may provide inputs to the insurance claims processing program 60 at any display screen associated with a step included in the Table of Contents (see FIG. 2B for a discussion of the generation of the Table of Contents according to one embodiment). The insurance claim processing software may dynamically modify the number of steps and/or the sequence of their execution to complete the claim processing transaction. An IC system user working at a client system may then iterate through the claim processing steps and arrive at an estimated value for the insurance claim.

In one embodiment, upon startup, the program 60 may provide a graphical user interface to display claims processing related information on display screen 50. It may collect user inputs, entered by using user input devices 52, and associated with insurance claims. It may process the user inputs, access an insurance database 40, use the contents of the insurance database 40 to estimate the insurance claim, and store it in memory 30 and/or insurance database 40. The program 60 may display a value of the estimated insurance claim on display screen 50. A user may view the display of the estimated insurance claim on display screen 50, and may interactively make modifications, additions, and deletions to the estimated insurance claim.

System 20 may also include one or more user input devices 52, such as a keyboard, for entering data and commands into the insurance claim program 60. It may also include one or more cursor control devices 54 such as a mouse for using a cursor to modify an insurance claim viewed on display screen 50. In response to the updating of the estimated insurance claim, the insurance claim program 60 may store the updated insurance claim in the insurance database 40.

Figure 1B:
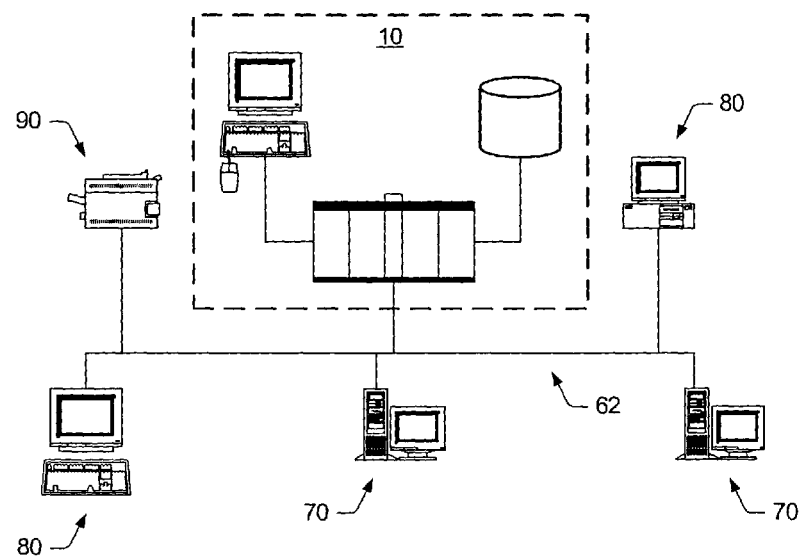
FIG. 1b illustrates one embodiment of a networked insurance claim processing system.

FIG. 1b illustrates one embodiment of a networked system, configured for processing insurance claims. In this embodiment, the system is shown as a client/server system with the server systems and client systems connected by a network 62. Network 62 may be a local area network or wide area network, and may include communications links including, but not limited to: Ethernet, token ring, internet, satellite, and modem. Insurance claims processing system 10 as illustrated in FIG. 1a may be connected to network 62. The insurance claim processing system software and insurance database 40 may be distributed among the one or more servers 70 to provide a distributed processing system for insurance claim transactions. In other words, an insurance claim processing transaction being processed by the insurance claim processing system may be routed to any server based upon the workload distribution among servers 70 at the time of the transaction. Insurance claim processing system servers 70 may be located on a local area network or may be geographically dispersed in a wide area network.

One or more client systems 80 may also be connected to network 62. Client systems 80 may reside at one or more claim processing units within the insurance company. In a wide area network, client systems 80 may be geographically dispersed. Client systems 80 may be used to access insurance claim processing system servers 70 and insurance database 40. An insurance claim-processing employee may use a client system 80 to access the insurance claim processing system and execute insurance transactions. An employee may also use a client system 80 to enter insurance claim inputs into the insurance claim processing system. One or more printers 90 may also be connected to network 62 for printing documents associated with insurance claim transactions.

Figure 1C:
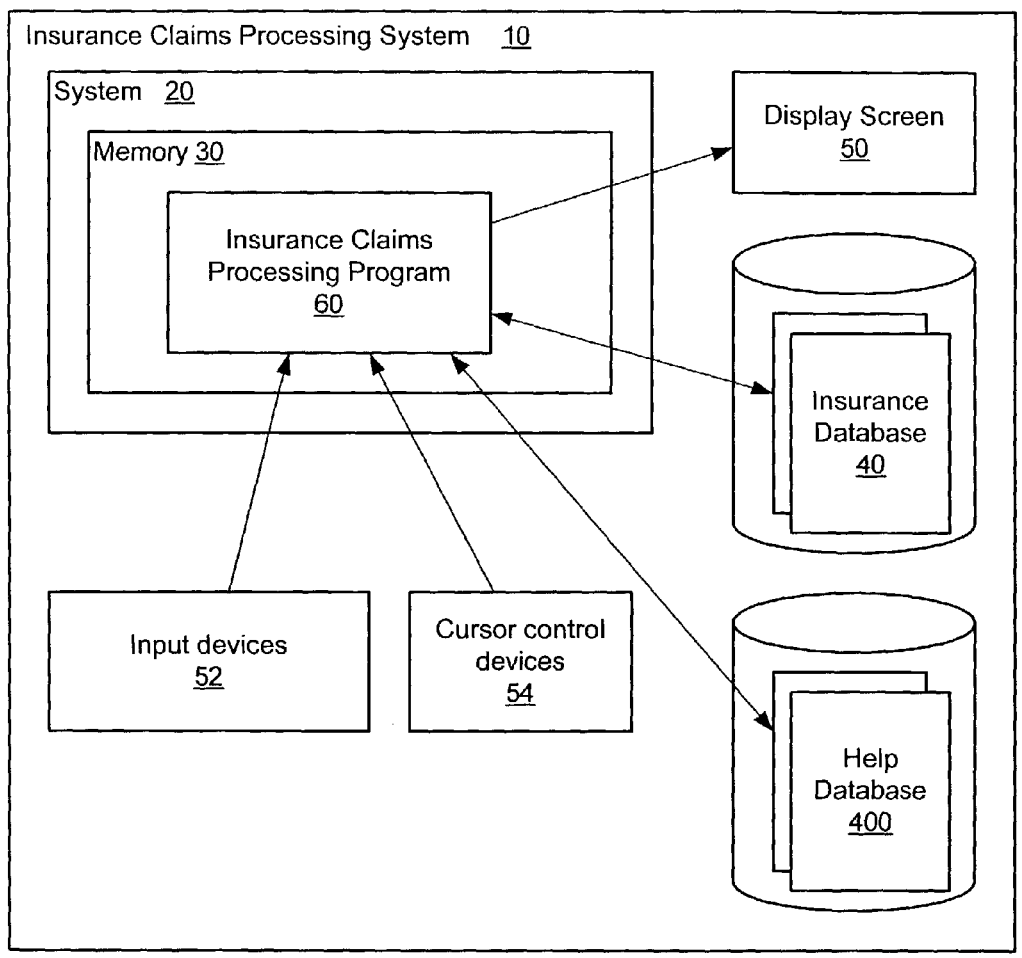
FIG. 1c is a block diagram illustrating the architecture of one embodiment of an insurance claims processing system.

In FIG. 1c, an embodiment of an insurance claims processing system 10 may include a computer system 20. In one embodiment, the insurance claims processing system may provide context-sensitive help for the processing steps. In one embodiment, the context-sensitive help for a step may be automatically invoked and displayed on display screen 50 when entering the step. In one embodiment, the user may interactively invoke context-sensitive help for the step by selecting one or more interface items on the display screen 50 with a cursor control device 54 such as a mouse. In one embodiment, the user may interactively invoke context-sensitive help for the step by using an input device 52. For example, the user may select one or more keys or a combination of keys on a keyboard to activate context-sensitive help. The context-sensitive help for each processing step may be unique, although content may appear in the context-sensitive help for two or more processing steps.

In one embodiment, information for the context sensitive help may be accessed from help database 400. Help database 400 may include one or more documents including information that may be useful to a user in performing the various processing steps associated with insurance claims processing. Help database 400 may also include one or more tables that provide access to the information in the documents. Each table may include a plurality of records or entries that may be used to locate help information about processing steps and/or the elements in processing steps in the one or more documents in the help database 400.

In one embodiment, a search interface may be provided in the insurance claims processing system. A user may enter in the search interface one or more terms to be searched for in help database 400 for the insurance claims processing system. The user may then initiate the search for the one or more terms. The insurance claims processing system may then search the help database 400 for entries including at least one of the one or more terms. The insurance claims processing system may locate one or more entries in the help database 400 that include at least one of the one or more terms. The insurance claims processing system may then display information on display screen 50 from the located help database 400 entries.

Figure 2:
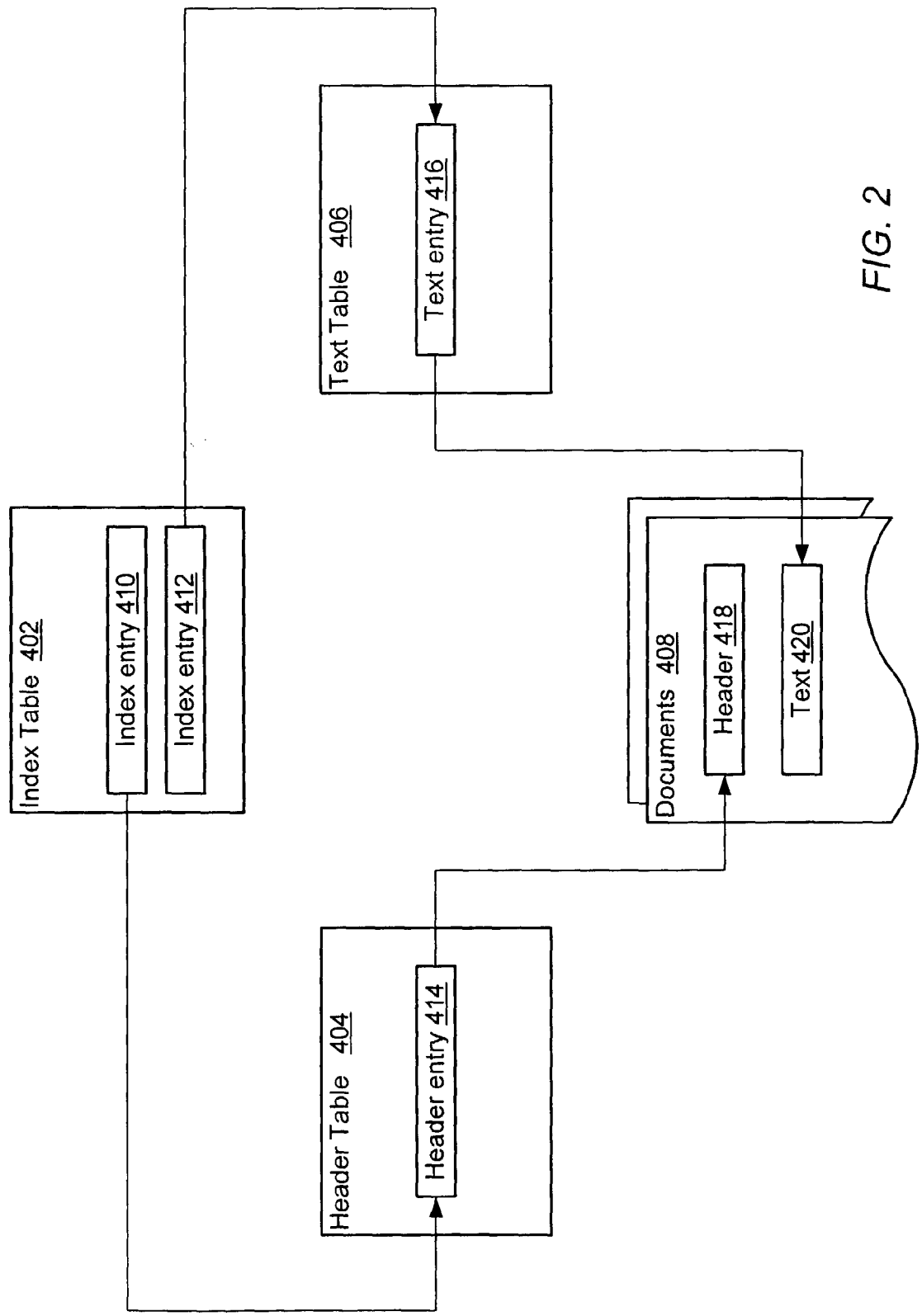
FIG. 2 illustrates a structure for an insurance claims processing help database that may be used for context sensitive help and for searching for terms according to one embodiment of an insurance claim processing system.

FIG. 2 illustrates one embodiment of an insurance claims processing help database 400 that may be used for context sensitive help and for searching for terms in an insurance claim processing system. Help database may include one or more index tables 402, one or more header tables 404, one or more text tables 406, and one or more documents 408. One embodiment may include one index table 402, one header table 404, and one text table 406. In another embodiment, the header table 404 and text table 406 may be combined into one master table comprising entries for header portions and text portions of the one or more documents 408.

Index tables 402, header tables 404, and text tables 406 may each include one or more records or entries. The entries in index tables 402 may each include a field comprising one or more terms or codes that may be used as keys for locating entries in header tables 404 and/or text tables 406. The entries in index tables 402 may each also include information for locating an entry in one of the one or more header tables 404 or text tables 406. In one embodiment, an identification number may be used to identify each entry in the one or more header tables 404 and text tables 406. The identification number may be referred to herein as an object ID. In one embodiment, each entry in the index tables 402 may include an object ID that identifies, and that may be used to locate, one entry in one of the header tables 404 or text tables 406. In one embodiment, index tables 402 may include two or more entries that include the same object ID. In other words, two or more index table 402 entries may indicate, or point to, the same entry in a header table 404 or text table 406. Each entry in index tables 402 may be referred to as an occurrence of the term or code included in the index table 402 entry in the help database 400.

In one embodiment, each entry in the header tables 404 and text tables 406 may include a unique object ID that may be used to locate the entry. In one embodiment, each entry in the header tables 404 may include a field containing a header or a portion of a header from one of the one or more documents 408. Alternatively, each entry in the header tables 404 may include information that may be used to locate a header or a portion of a header in one of the one or more documents 408. In one embodiment, each entry in the text tables 404 may include a field containing a text section or a portion of a text section from one of the one or more documents 408. Alternatively, each entry in the text tables 406 may include information that may be used to locate a text section or a portion of a text section in one of the one or more documents 408.

An example of locating headers and text in documents 408 using index tables 402, header tables 404 and text tables 406 follows. Index table may include index entries 410 and 412. Index entry 410 may include a term or code included in a header of one of the documents 408. Index entry 410 may include an object ID that may be used to locate header entry 414 in one of the header tables 404. Header entry 414 may include a portion or all of header 418 from one of the one or more documents 408. Alternatively, header entry 414 may include information that may be used to locate header 418 in one of the one or more documents 408. If index entry 410 includes a term, then the term may appear one or more times in header 418 and/or in the portion of header 418 included in header entry 414. If index entry 410 includes a code, then the code may indicate that the index table entry 410 refers to a particular header or portion of a header in its entirety (i.e., this is not an occurrence of a term). In one embodiment, codes may be used to identify headers or sections of text in documents 408. In one embodiment, codes may be included as "hidden" text in one or more sections of documents 408, and may be used in constructing header tables 404 and text tables 406.

Index entry 412 may include a term or code included in a text section of one of the documents 408. Index entry 412 may include an object ID that may be used to locate text entry 416 in one of the text tables 406. Text entry 416 may include a portion or all of text section 420 from one of the one or more documents 408. Alternatively, text entry 416 may include information that may be used to locate text 420 in one of the one or more documents 408. If index entry 412 includes a term, then the term may appear one or more times in text section 420 and/or in the portion of text section 420 included in text entry 416. If index entry 412 includes a code, then the code may indicate that the index table entry 412 refers to a particular text section or portion of a text section (i.e., this is not an occurrence of a term).

Figure 3:
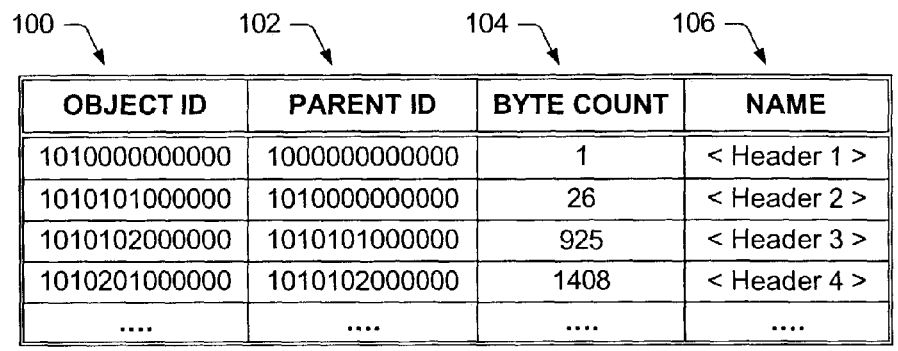
FIG. 3 illustrates a table including document header information according to one embodiment of an insurance claim processing system.
Figure 4:
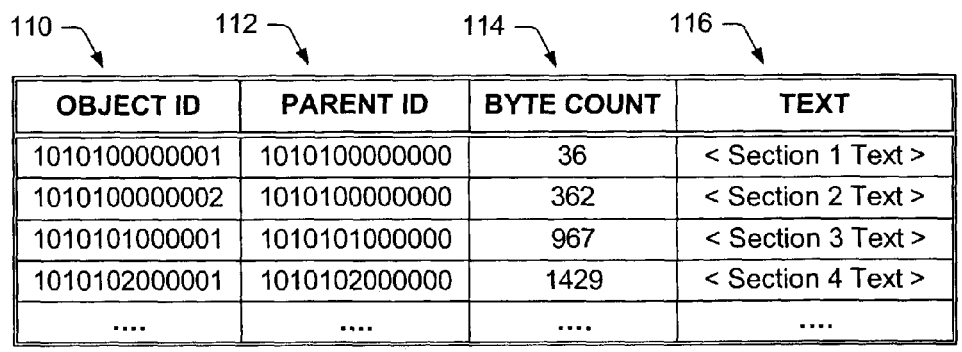
FIG. 4 illustrates a table including document text information according to one embodiment of an insurance claim processing system.

Embodiments of index tables 402, header tables 404 and text tables 406 are further described in FIGS. 3, 4, and 5, respectively.

FIG. 3 illustrates one embodiment of a table including header information from one or more documents 408 related to insurance claims processing. The header table 404 may include a plurality of records, also referred to as entries, with one entry for each header element from the one or more documents 408 to be included in a help database 400 for the insurance claims processing system. Each entry may comprise a plurality of fields, which also may be referred to as elements of the entry.

An entry may include an object identifier (object ID) 100 for the entry. In one embodiment, the object ID 100 for the entry may be unique in the help database 400. In one embodiment, the object ID 100 may include information that may be used to identify the document that includes the header, and the location in the document of the header. For example, the object ID 100 of the first entry in the header table 404 of FIG. 3 may indicate that the entry is for the header of the first chapter of a first document included in the help database 400, the object ID 100 of the second entry may indicate that the entry is for the header of the first section of the first chapter of the first document, and so on.

An entry may also include the object identifier of a parent entry (parent ID 102) for the entry. For example, the parent ID 102 of the entries for the headers of several sections in the first chapter of a document may be the object ID 100 of the entry for the header of the chapter.

An entry in the header table 404 may also include information on the location in the document of the header. For example, byte count 104 may represent the byte (character) location in the document of the start of the header. For example, the header of the first entry in the header table 404 illustrated in FIG. 3 may start at the first byte of the document; the header of the second entry may start at the 26$^{th}$ byte of the document, etc.

In one embodiment, an entry in the header table 404 may also include the alphanumeric text of the header from the document in name field 106. When the entry is located during context sensitive help or a search, the header text in name 106 may be read from the header table and displayed on the display screen for the user to view. In another embodiment, the entry may not store the actual text for the header, but may instead include information for locating the text for the header in the document. In this embodiment, when the entry is located, the actual text of the header may be read from the document itself and displayed for the user.

The order of the columns and rows in the header table 404 as illustrated in FIG. 3 is exemplary and is not intended to be limiting.

FIG. 4 illustrates one embodiment of a table including text information from one or more documents 408 related to insurance claims processing. The text table 406 may include a plurality of entries, with one entry for each text section from the one or more documents 408 to be included in the help database 400 for the insurance claims processing system. Each entry may comprise a plurality of fields, which also may be referred to as elements of the entry. In one embodiment, the fields may be substantially similar to the fields in embodiments of the header table 404 as illustrated in FIG. 3.

An entry may include an object identifier 110 (object ID), for the entry. In one embodiment, the object ID 110 for the entry may be unique in the help database 400. In one embodiment, the object ID 110 may include information that may be used to identify the document including the text section and the location in the document of the text section. Object ID 110 may also include information to distinguish a text table 406 entry from a header table 404 entry. For example, a non-zero last digit in the object ID 110 may indicate that the entry is a text table 406 entry and not a header table 404 entry. The entry may also include the object identifier of a parent entry (parent ID 112) for the entry. The parent ID 112 may point to an entry in the text table 406 as the parent of the entry. The entry may also include a text field 116 that may include some or all of the text from a section of one of the one or more documents 408 in the help database 400. When the entry is located during context sensitive help or a search, the text in text field 116 may be read from the text table and displayed on the display screen for the user to view. Alternatively, the entry may not store the actual text, but may instead include information for locating the text in the document. In this case, when the entry is located, the actual text may be read from the document itself and displayed for the user.

The order of the columns and rows in the text table illustrated in FIG. 4 is exemplary and is not intended to be limiting.

FIG. 5 illustrates one embodiment of an index table 402 for locating terms and/or codes for context-sensitive help and for interactively searching for terms in the help database 400. Each entry in the index table 402 may represent an occurrence of a term or code in the one or more documents 408 included in the help database 400 for the insurance claims processing system. Examples of documents that may be included in the help database 400 for the insurance claims processing system include, but are not limited to: medical journals, textbooks and/or manuals, insurance claims processing manuals or guidebooks, medical glossaries and/or dictionaries, and documents including context sensitive help entries for the insurance claims processing steps, and elements of the steps, in the insurance claims processing system.

An entry in the index table 402 may include an object ID 140. The object ID 140 may indicate a unique entry in a help information table in the help database. In one embodiment, the help database may include one or more header tables 404 as illustrated in FIG. 3 and one or more text tables 406 as illustrated in FIG. 4.

An entry in the index table may also include a term field 142. In one embodiment, term field 142 may include one or more terms located in the one or more documents 408 in the help database 400. In one embodiment, term field 142 may include a code representing a step or page in the insurance claims processing system or an element in a step in the insurance claims processing system. The codes may be used in invoking context-sensitive help in the insurance claims processing system. One embodiment may include one or more entries with one or more terms in term field 142 and one or more entries with codes in term field 142.

An entry in the index table 402 may also include a Soundex field 144. Soundex is a commonly used algorithm for encoding words so that similar sounding words encode the same. In one embodiment, the first letter of a word to be converted to a Soundex equivalent may be copied unchanged, and then subsequent letters may be encoded as follows:

b,f,p,v –>"1"
c,g,j,k,q,s,x,z,ç –>"2"
d,t –>"3"
l –>"4"
m,n,ñ –>"5"
r –>"6"

Other characters may be ignored and repeated characters may be encoded as though they were a single character. Encoding may stop when the resulting string is four characters long, adding trailing "0"s if it is shorter. As an example, "SMITH" or "SMYTHE" may both be encoded as "S530". The Soundex equivalent may be used for locating entries in index table when a user mistypes or misspells a word when initiating a search. In one embodiment, codes for steps and step elements are not given a Soundex equivalent, as a Soundex equivalent of a code is not generally useful.

Columns 146, 148, and 150 may be used during calculation of the relevance of an entry. For each entry in the index table 402, column 146 may indicate the position of the term or code in the text section or header in which this occurrence of the term or code appears. Column 148 may indicate the total count of words in the text section or header. For example, in the first entry of the index table 402 as illustrated in FIG. 5, the position column 146 indicates that the term "System" appears as the fifth word of the 54 words (from the total words column 148) in the text section indicated by the object ID column 140. Examining the second entry, the term "System" appears again as the ninth word of the same text section.

In one embodiment, the word count column 150 may be used with entries for headers in calculating the relevance value 152. Different information and methods may be used for calculating the relevance of occurrences of terms and codes appearing in headers than the information and methods used to calculate the relevance for terms and codes appearing in text sections. In calculating the relevance for headers, the percent of the total word count indicated in column 150 may be used as part of the calculation. The word count 150 indicates how many words make up the one or more words (or words represented by a code) as represented in column 142. For example, in the header entry in the seventh row of the index table as illustrated in FIG. 5, the term "Anatomy" is in the third position (as indicated by column 146) of three words (as indicated by column 148) and includes one word. Thus, when calculating the relevance, "Anatomy" is approximately 33% of the header.

The last column of the index table 402 illustrated in FIG. 5 may hold a calculated relevance 152 for the occurrence. The relevance may be calculated in advance for all occurrences. Alternatively, the relevance for occurrences may not be calculated in advance and stored in the index table 402, but instead may be calculated dynamically as needed. In one embodiment, columns 146, 148, and 150 may not be stored in the index table 402. Instead, the information may be used to calculate the relevance and then discarded. One embodiment of the index table 402 may include only an object ID 140, a term 142, and a relevance value 152. Another embodiment of an index table 402 may only include an object ID 140 and a term 142, and the relevance may be calculated dynamically.

In one embodiment, occurrences in headers may be considered of higher relevance than occurrences in text sections. Therefore, different methods may be applied to calculate the relevance of occurrences in headers than are applied to calculate the relevance of occurrences in text sections. In one embodiment, relevance values may be scaled to be between 0.0 and 1.0, with 1.0 being the highest relevance. In one embodiment, the relevance may be calculated so that a relevance value of 0.0 does not occur. Note that any scale may be used for the relevance calculation, as it may be the ordering of the relevance values that is useful, and not necessarily the scale on which the relevance values are calculated.

In one embodiment, a maximum relevance value may be provided for occurrences in text sections. This maximum value may be applied as a weight or scaling factor during the relevance calculation. In one embodiment, the maximum relevance value for occurrences in text sections may also serve as the minimum value for occurrences in headers. In this embodiment, header occurrences may always have at least as high a relevance value as the highest relevance text occurrences. In another embodiment, header occurrences may always have a higher relevance value than the highest relevance text occurrences.

The following is an example of using the tables in FIGS. 3, 4 and 5 for context-sensitive help in an insurance claims processing system. A user of the insurance claims processing system may begin processing of an insurance claim. The system may enter the first step in the processing of the claim. The first step may be displayed in a "page" on the display screen for the user. Information about the first step and the display page for the first step may be stored in the computer executing the insurance claims processing system. In this information, a code for the step, which may also be viewed as a code for the page, may be stored. When the step is entered, the code may be read from the information, and the context-sensitive help system may search the index table 402 for one or more entries with a code in term field 142 matching the code for the step. Upon locating the one or more entries in the index table 402, the context-sensitive help system may locate one or more entries in the header tables 404 and/or text tables 406 in the help database 400 corresponding to the object IDs 140 in the entries in the index table 402. The header and text from the located one or more entries in the header tables 404 and/or text tables 406 may then be displayed as help information items on the display screen for the user. There may be one help information item displayed for each located entry in the index table 402. In one embodiment, the help information items may be displayed in an order of relevance using the relevance values 152 for the located entries in the index table 402.

Elements within a step may also be given a code, and the code may be included in one or more entries in the index table 402. When a step in insurance claims processing is entered, one or more codes for one or elements of the step may also be read from stored information about the step. Occurrences of help information for the one or more codes may be searched for, ranked by relevance, and displayed similarly to, and along with, the code for the step as described above.

The order of the columns and rows in the index table 402 illustrated in FIG. 5 is exemplary and is not intended to be limiting.

Figure 6B:
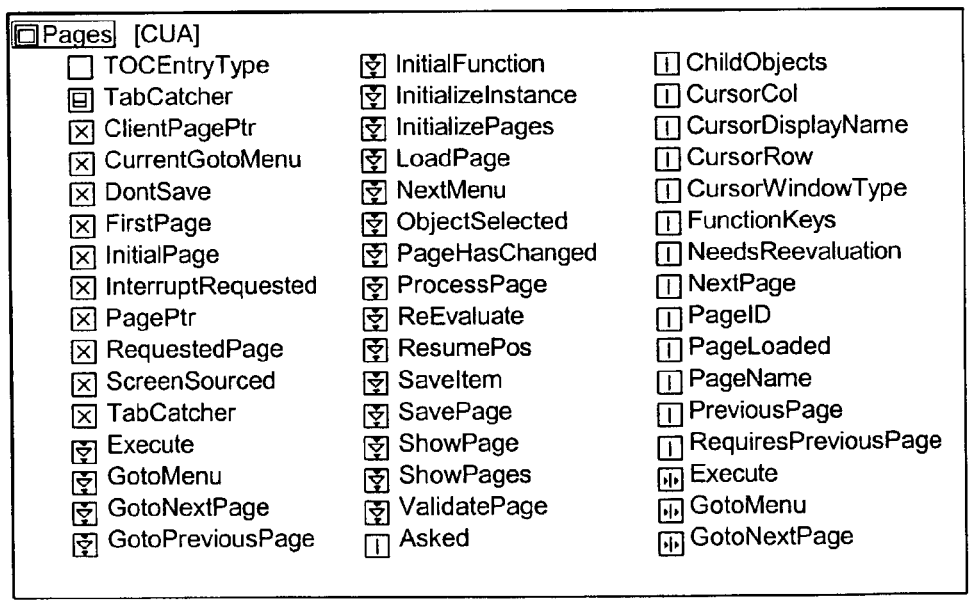
FIGS. 6b through 6h are flow diagrams illustrating a mechanism for generating relevance values for occurrences in an insurance claims processing help database according to one embodiment of an insurance claims processing system.
Figure 6A:
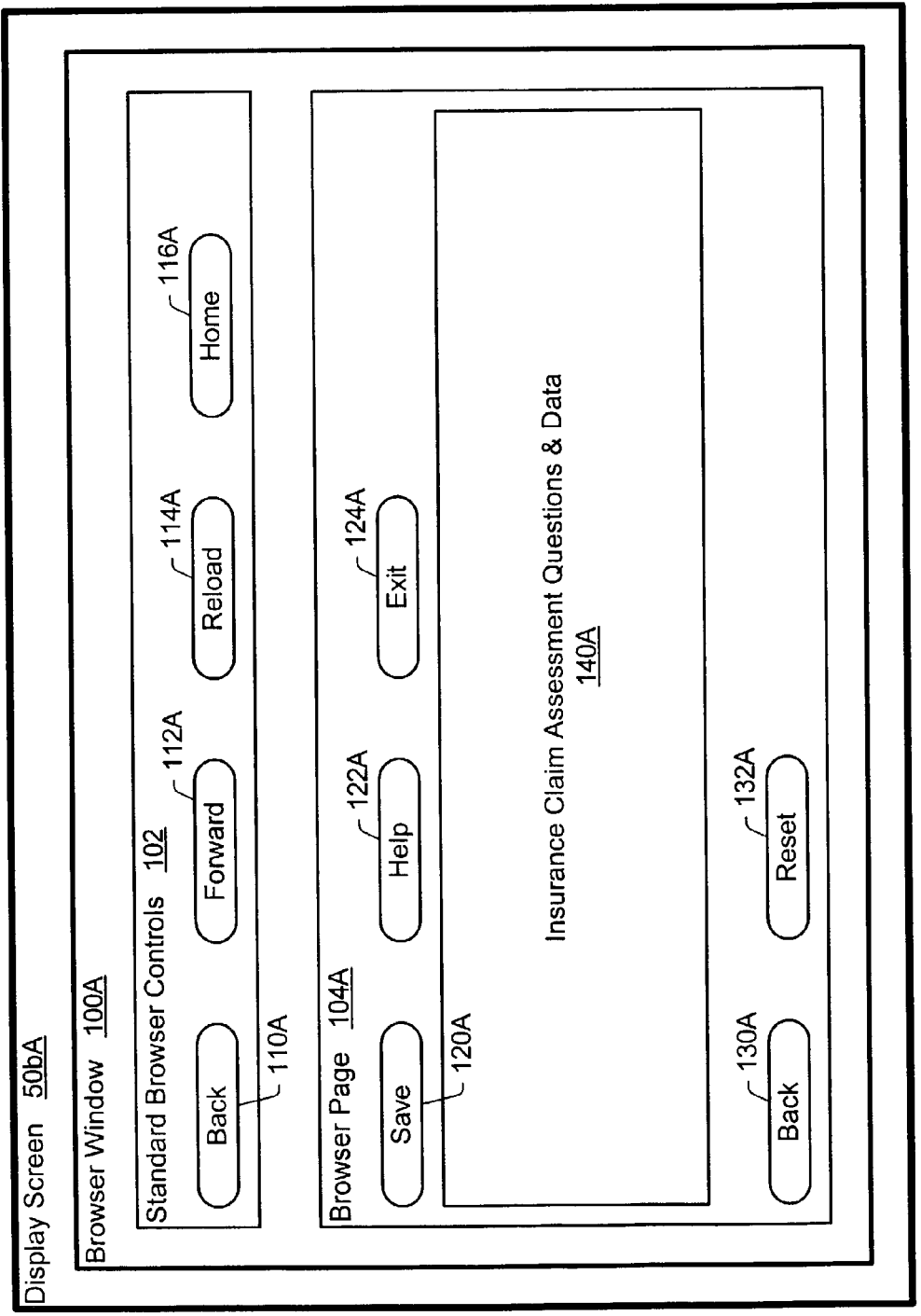
FIG. 6a is a flow diagrams illustrating a method for generating the various tables in an insurance claims processing help database according to one embodiment of an insurance claim processing system.
Figure 6A:
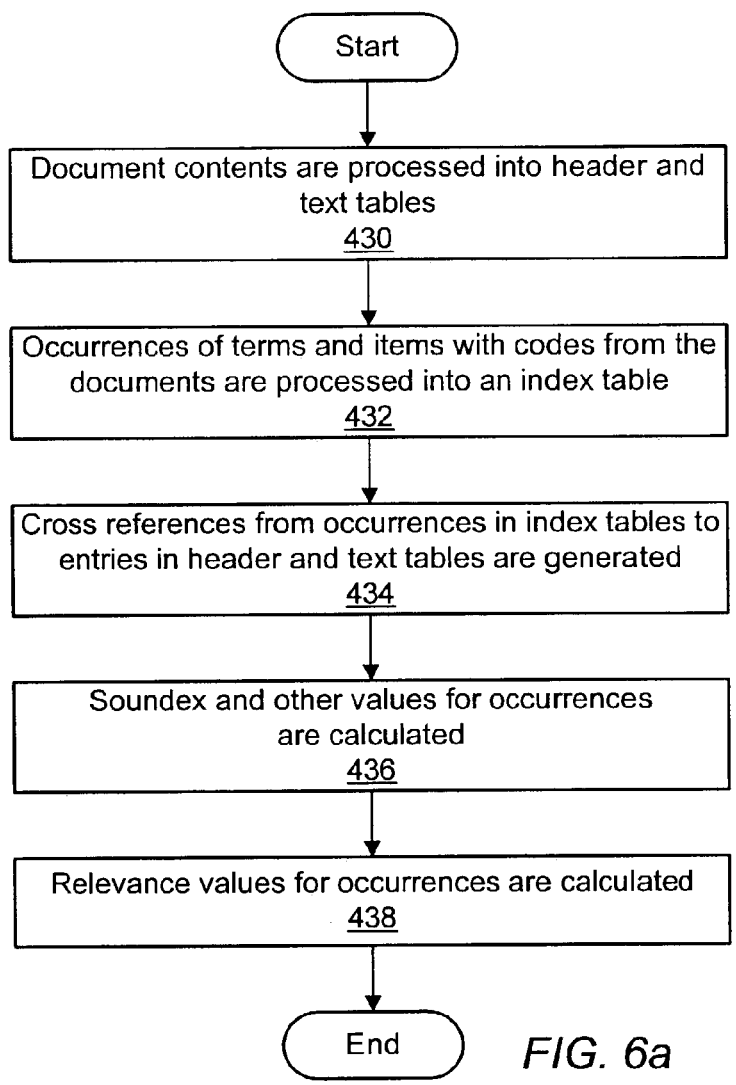
Figure 6B:
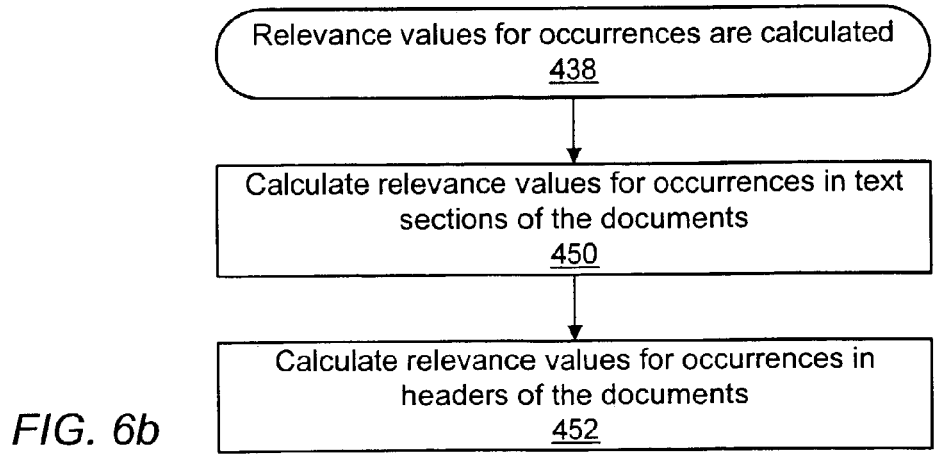
Figure 6B:
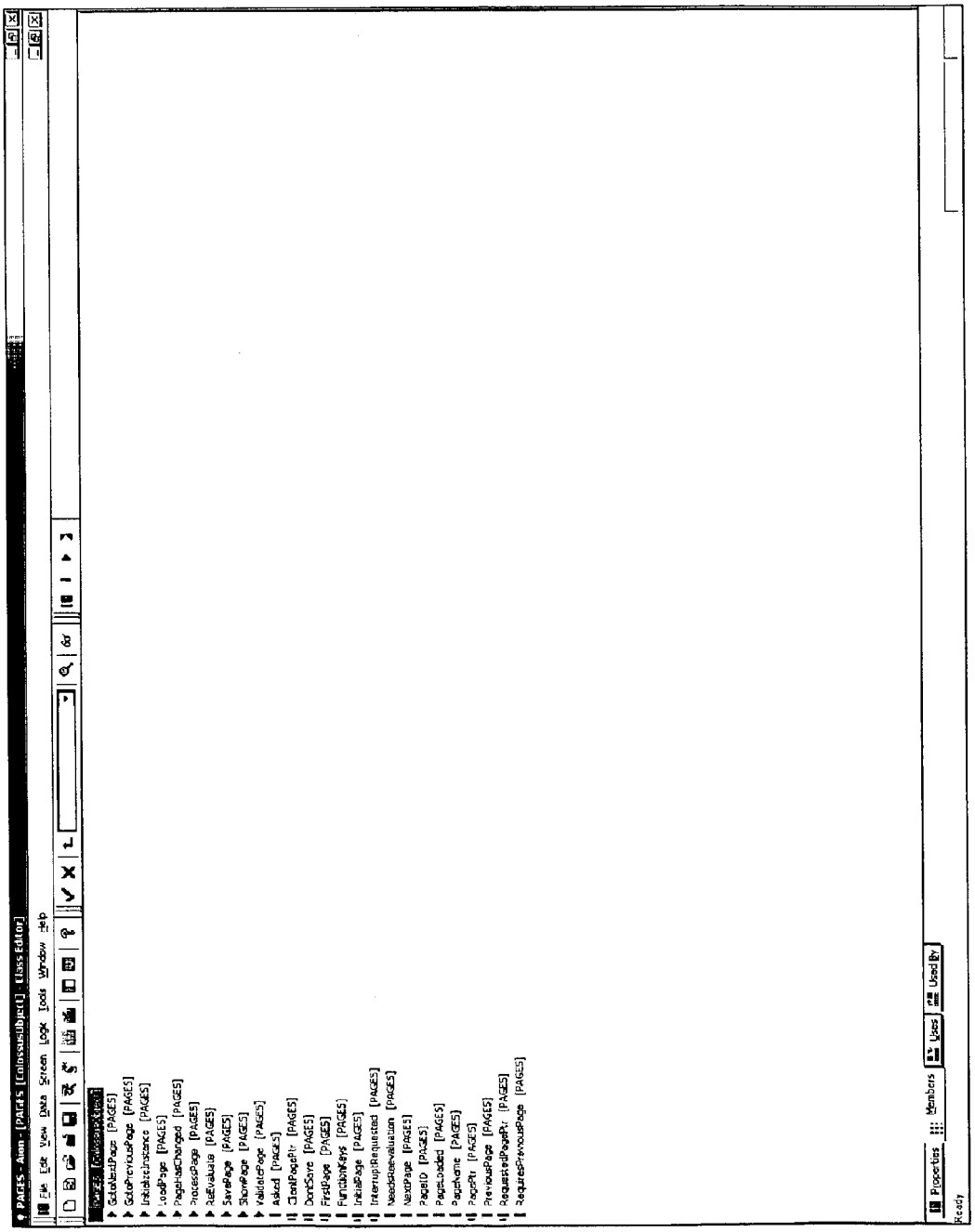

FIG. 6a is a flow diagram illustrating one embodiment of a mechanism for generating an insurance claims processing help database 400. In step 430, one or more documents may be processed into header tables 404 and text tables 406. In one embodiment, one entry is added to a header table 404 for each header in the one or more documents 408 in the help database 400. In one embodiment, one entry may be added to a text table 406 for each text section in the one or more documents 408 in the help database 400. An object ID may be assigned to each entry added to a header table 404 or text table 406. A parent ID of each entry may also be identified. The number of bytes in the section of text or header for the entry may also be determined. In one embodiment, the entry for each occurrence may include the object ID, parent ID, byte count and text section for text table 406 entries or header text for header table 404 entries.

In step 432, one or more index tables 402 may be generated. In one embodiment, a plurality of terms may be searched for in the header text of the entries in the one or more header tables 404 and in the text section of the entries in the one or more text tables 406. Each located occurrence of each term may be recorded as an entry in an index table 402. In one embodiment, one or more codes may be associated with headers and/or text sections in the one or more documents, and the one or more codes may be searched for in the header tables 404 and text tables 406. Each located occurrence of each code may be recorded as an entry in an index table 402. In one embodiment, a code may be used to identify a particular section of text or header in the one or more documents 408. For example, a code may be used to identify a section of text that may be displayed as the context sensitive help for a step in the insurance claims processing step. In one embodiment, an entry may be added to the index table for each occurrence of a term or code located in the name field 106 of an entry in a header table 404 or in the text field 116 of an entry in a text table 406. In step 434, the object ID of the header table 404 entry or text table 406 entry where each occurrence was located may be inserted in the object ID field 140 of the index table 402 entry for the occurrence.

In step 436, one or more other fields may be added to the entries in the index table 402. In one embodiment, a Soundex equivalent 144 may be added to entries that include a term in the term field 142. In one embodiment, a Soundex equivalent 144 may not be added for entries with a code in the term field 142. In one embodiment, for each entry in the index table 402, the position of the term or code in the text section or header in which this occurrence of the term or code appears may be entered in a position field 146. In one embodiment, the total count of words in the text section or header may be entered in a total words field 148. In one embodiment, for each header table 404 entry in the index table 402, a word count 150 may be entered that indicates the number of words in the term 142 for this occurrence. In one embodiment, for occurrences in text tables 406, a word count of zero may be entered.

In step 438, the relevance value 152 for each occurrence may be calculated and entered in index table 402. In one embodiment, the relevance value 152 for each occurrence may be calculated up front, when the help database tables are generated. In another embodiment, the relevance value 152 for an occurrence may be calculated dynamically when the occurrence is located for display in the insurance claims processing system. In this embodiment, the index table 402 may not include a relevance value 152 for each occurrence.

FIGS. 6b through 6h expand on step 438 of FIG. 6a and further describe several embodiments of a mechanism for calculating the relevance values 152 of occurrences in the help database. In FIG. 6b, the relevance values 152 for occurrences in text sections of the one or more documents may be calculated in step 450. In step 452, the relevance values 152 for occurrences in headers of the one or more documents may be calculated. In one embodiment, a different mechanism may be used to calculate the relevance values 152 for occurrences in headers than the mechanism used to calculate the relevance values 152 for occurrences in text sections.

Figure 6C:
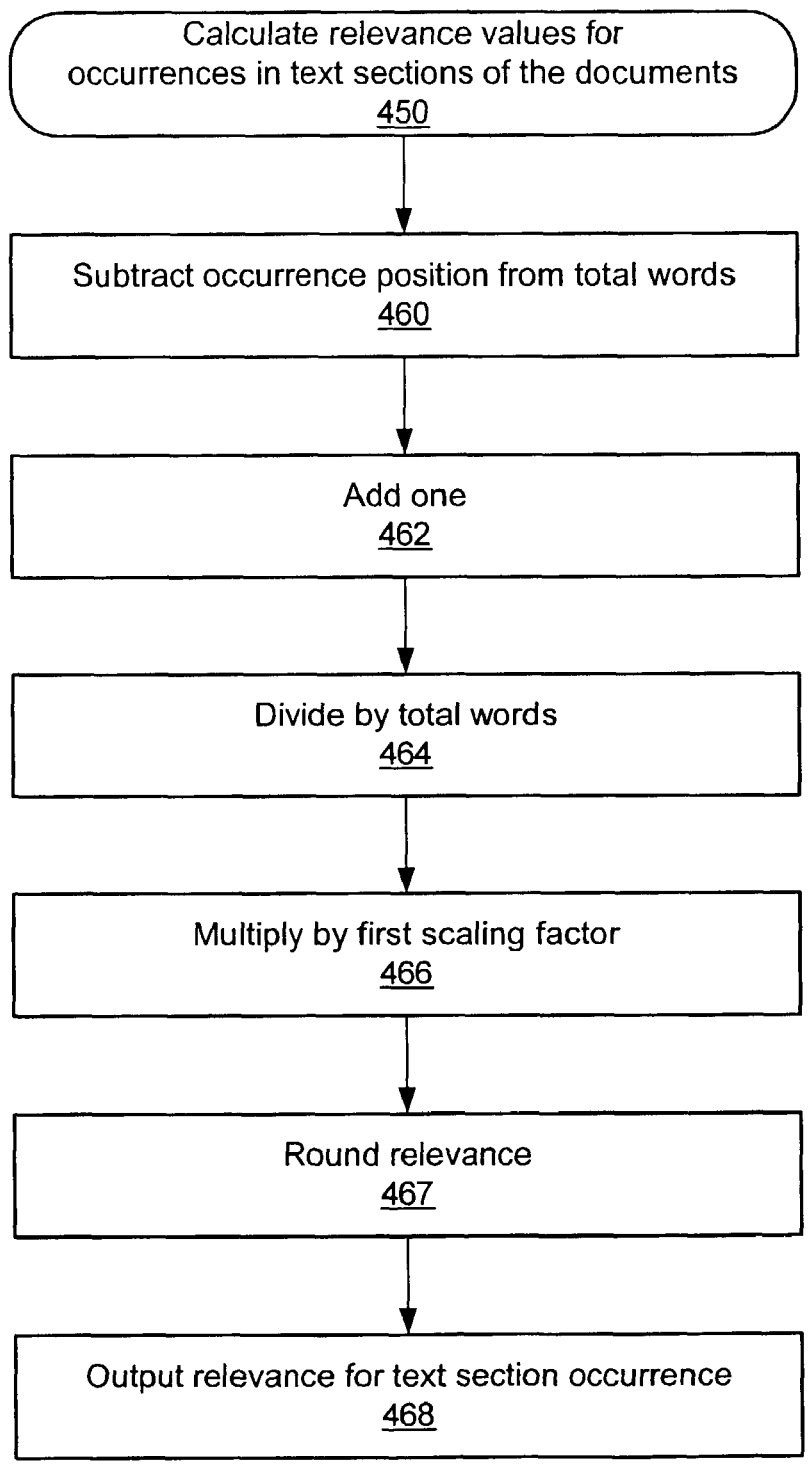

FIG. 6c expands on step 450 of FIG. 6b and further describes one embodiment of a mechanism for calculating relevance values 152 for occurrences in text sections of the one or more documents in the help database. In step 460, the position 146 of the occurrence in the text section may be subtracted from the total words 148 for the text section. In one embodiment, the words in the text section may be numbered in a sequence from a first word to a last word. In one embodiment, the first word may be numbered as word 0, and the last word as word (N−1), where N is the total number of words in the text section. In another embodiment, the first word may be numbered as word 1, and the last word as word N, where N is the total number of words in the text section. In this embodiment, in step 462, the results of step 460 may be incremented by one, which may be effective to prevent the relevance value from being zero. For example, applying step 460 to word 10 in a section with 10 words produces (10−10)=0. Incrementing by one thus may assure that a relevance of zero is not produced. One skilled in the art will recognize that there may be various other methods for assuring that a relevance of zero is not produced. In yet another embodiment, the words may be numbered in reverse order, with the first word in the text section being numbered as word N, and the last word as word 1. In this embodiment, steps 460 and 462 may not be performed.

In step 464, the results of step 462, or the results of step 460 in embodiments in which step 462 is not performed, may be divided by the total words 148 for the text section to produce a ratio R1 that may represent the relevance value 152 for the text occurrence. In embodiments where steps 460 and 462 are not performed, in step 464, the word number of the term in the text section may be divided by the total words 148 to produce the ratio R1. In one embodiment, the ratio R1 may be in the range (0<R1<=1.0). In one embodiment, occurrences in headers may be considered more relevant than occurrences in text sections. In this embodiment, in step 466, R1 may be multiplied by a first scaling factor S1 to lower the relevance values of text section occurrences in relation to occurrences in headers. For example, a scaling factor S1 of 0.33 may be applied to R1. Thus, in on embodiment, after step 466, R may be in the range (0<R1<=S1).

In one embodiment, in step 467, the output of step 466, or the output of step 464 in embodiments where step 466 is not performed, may be rounded to a number of significant digits. Various rounding methods may be used including rounding up, rounding down, and rounding to the nearest value. For example, if two significant digits are desired, the results may be rounded to produce results in the range (0.01-1.00) inclusive. In step 468, the results are output as the relevance value 152 for the occurrence in the text section. In one embodiment, the output relevance value 152 may be written to the index table 142.

The following is an example of applying one embodiment of a mechanism for calculating the relevance value for a text occurrence and is not intended to be limiting in any way. The first row of the index table 402 as illustrated in FIG. 5 shows that the term "System" appears as the fifth of 54 words in a text section. A first scaling factor S1 of 0.33 is to be applied and the results rounded to two significant digits. Applying the steps of FIG. 6c:

Step 460: 54−5=49
Step 462: 49+1=50
Step 464: 50/54=@0.925925
Step 466: 0.925925*0.33=0.30555525
Step 467: Round(0.30555525)=0.31

Figure 6D:
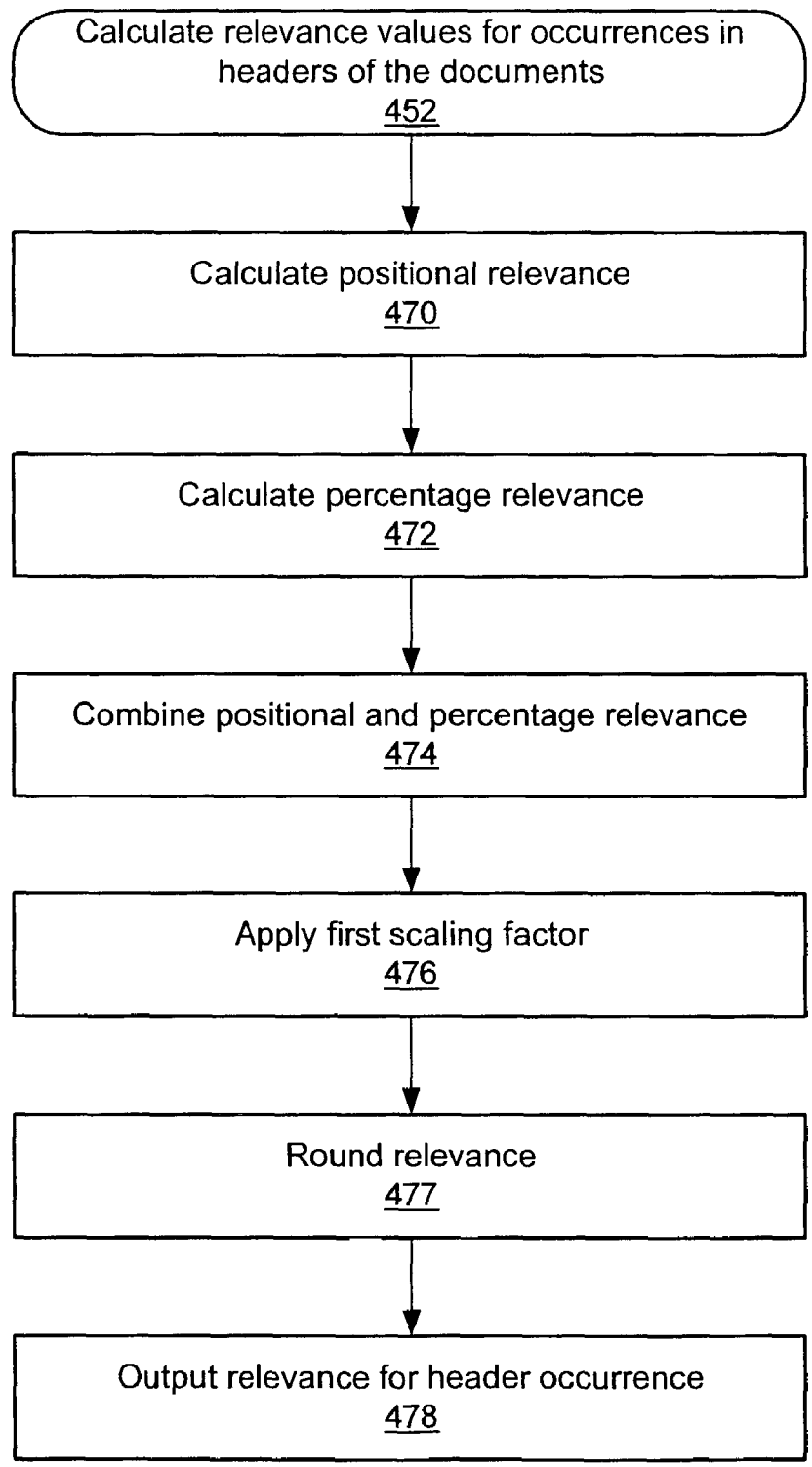

FIG. 6d expands on step 452 of FIG. 6b and further describes one embodiment of a mechanism for calculating relevance values 152 for occurrences in headers of the one or more documents in the help database. In step 470, a first relevance value based on the position of the term in the header may be calculated. In step 472, a second relevance value based on the percentage of the header the term occupies may be calculated. In step 474, the positional and percentage relevance values may be combined. In one embodiment, occurrences in headers may be considered more relevant than occurrences in text sections. In this embodiment, in step 476, the relevance value may be adjusted using a first scaling factor to adjust the relevance value in relation to the relevance values of occurrences in text sections. In one embodiment, in step 477, the output of step 476, or the output of step 474 in embodiments where step 476 is not performed, may be rounded to a number of significant digits substantially similarly to the rounding method used in step 467 of FIG. 6c. In step 478, the results may be output as the relevance value 152 for the occurrence in the header. In one embodiment, the output relevance value 152 may be written to the index table 142.

Figure 6E:
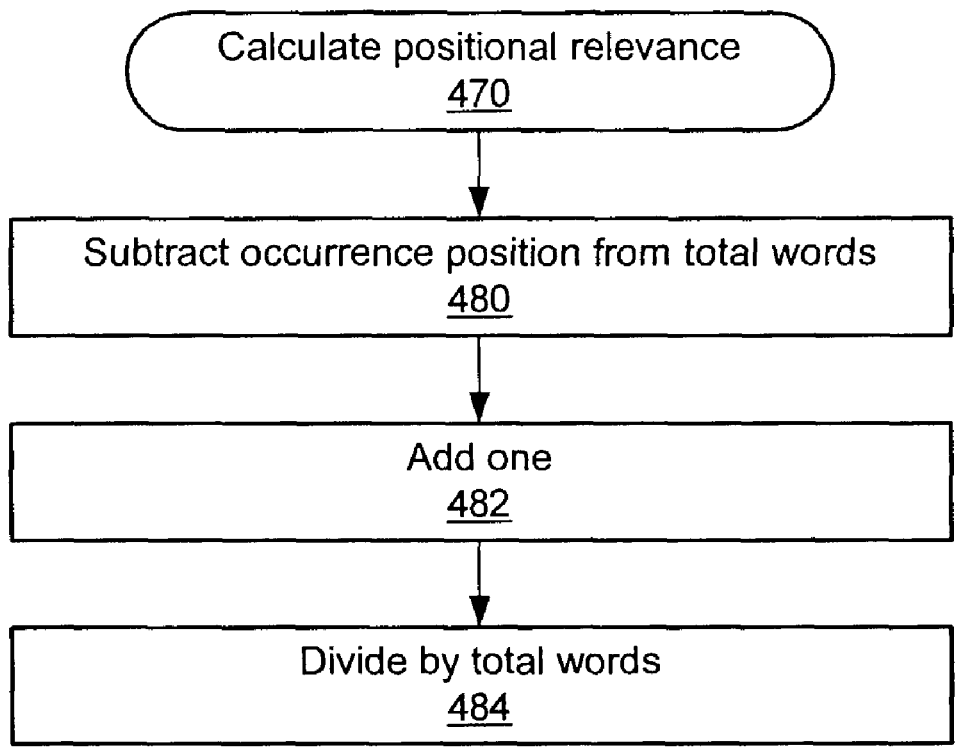

FIG. 6e expands on step 470 of FIG. 6d, illustrating one embodiment of a mechanism for calculating the positional relevance of an occurrence in a header. In one embodiment, this mechanism may be substantially similar to the mechanism described in steps 460 to 464 of FIG. 6c. In step 480 of FIG. 6e, the position 146 of the occurrence in the header may be subtracted from the total words 148 for the occurrence. In one embodiment, in step 482, the results of step 480 may be incremented by one, which may be effective to prevent the relevance value from being zero. One skilled in the art will recognize that there may be various other methods for assuring that a relevance of zero is not produced. In step 484, the results of step 482, or the results of step 480 in embodiments in which step 482 is not performed, may be divided by the total words 148 for the occurrence to produce a ratio R2 that may represent the relevance value 152 for the header occurrence. The ratio R2 may be in the range (0<R2<=1).

Figure 6F:
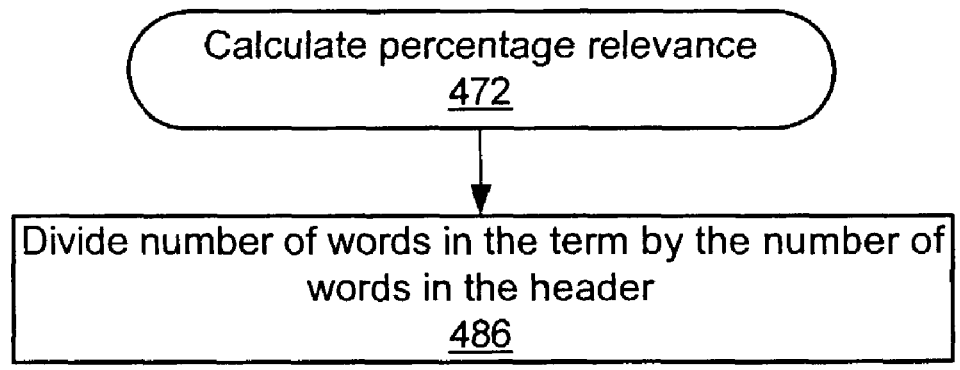

FIG. 6f expands on step 472 of FIG. 6d, illustrating one embodiment of a mechanism for calculating the percentage relevance of an occurrence in a header. In one embodiment, a term may include one or more words. In step 486, the number of words 150 in the term, 142 may be divided by the total number of words 148 in the header to produce the percentage of the header occupied by the term. For example, if a term comprises two words, and a header where an occurrence of the term is found comprises three words, then the percentage relevance may be calculated as 2/3=0.667.

Figure 6G:
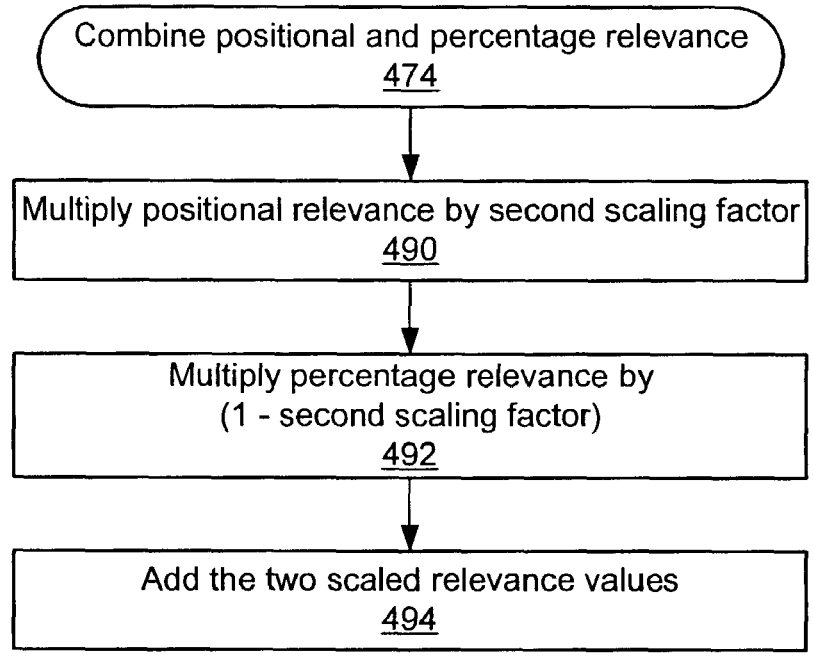

FIG. 6g expands on step 474 of FIG. 6d and illustrates one embodiment of a mechanism for combining the positional relevance as calculated in FIG. 6e and the percentage relevance as calculated in FIG. 6f for an occurrence in a header. In one embodiment, the positional relevance may be multiplied by a second scaling factor S2 in step 490. In step 492, the percentage relevance may be multiplied by (1−S2). In one embodiment, the percentage relevance may be considered more important than the positional relevance, and thus the percentage relevance may be given a larger weight than the positional relevance. For example, S2 may be assigned a value of 0.33, and the positional relevance multiplied by S2. The percentage relevance may then be multiplied by (1−S2) =0.67. In step 494, the scaled position and percentage relevance values may be added to produce the relevance value for the occurrence in the header.

Figure 6H:
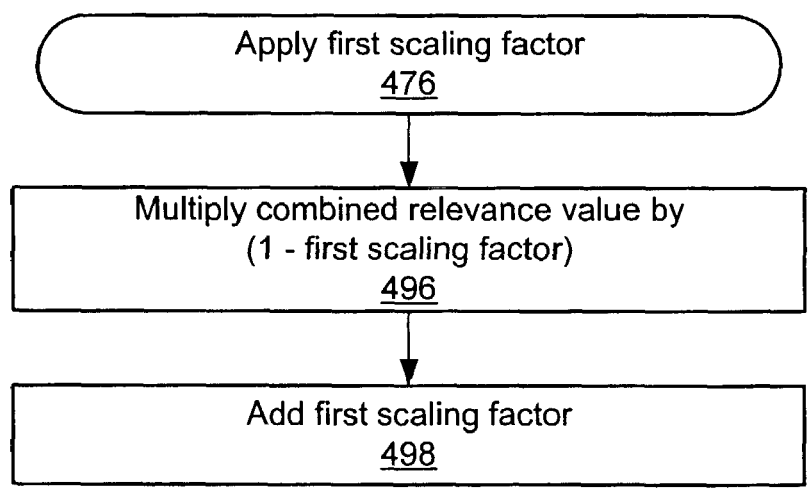

In one embodiment, occurrences in headers may be considered more relevant than occurrences in text sections. FIG. 6h expands on step 476 of FIG. 6d and illustrates one embodiment of a mechanism for adjusting the header relevance value in relation to the relevance values of occurrences in text sections. In step 496, the header relevance value results of step 494 may be multiplied by (1−S1), where S1 is the first scaling factor as described in step 466 of FIG. 6c. For example, if S1=0.33, then the combined relevance value may be multiplied by (1−0.33)=0.67. In one embodiment, the scaled header relevance value may then be adjusted by adding the first scaling factor S1 to the header relevance value, so that the minimum header relevance value is higher than the maximum text section relevance value. For example, if S1=0.33, then the maximum text section relevance value may be 0.33. By applying step 498, the minimum header relevance value may be 0.34. In one embodiment, after performing steps 496 and 498, a header relevance value R3 may be within the range ((S1+1)<=R<=1.0).

The following is an example of applying one embodiment of a mechanism for calculating the relevance value for a header occurrence and is not intended to be limiting in any way. The eighth row of the index table 402 as illustrated in FIG. 5 shows that the term "Anatomy" appears as the second of five words in a header. A first scaling factor S1=0.33 and a second scaling factor S2=0.3 are to be used, and the results rounded to two significant digits. Applying the steps of FIG. 6d-6h:

Step 470 (FIG. 6e):
   Step 480: 5−2=3
   Step 482: 3+1=4
   Step 484: 4/5=0.8
Step 472 (FIG. 6f):
   Step 486: 1/5=0.2
Step 474 (FIG. 6g):
   Step 490: 0.8*0.3=0.24
   Step 492: 0.2*(1.0−0.3)=0.14
   Step 494: 0.24+0.14=0.38
Step 476:
   Step 496: 0.38*(1.0−0.33)=0.2546
   Step 498: 0.2546+0.33=0.5846
Step 477:
   Round(0.5846)=0.58

Figure 7A:
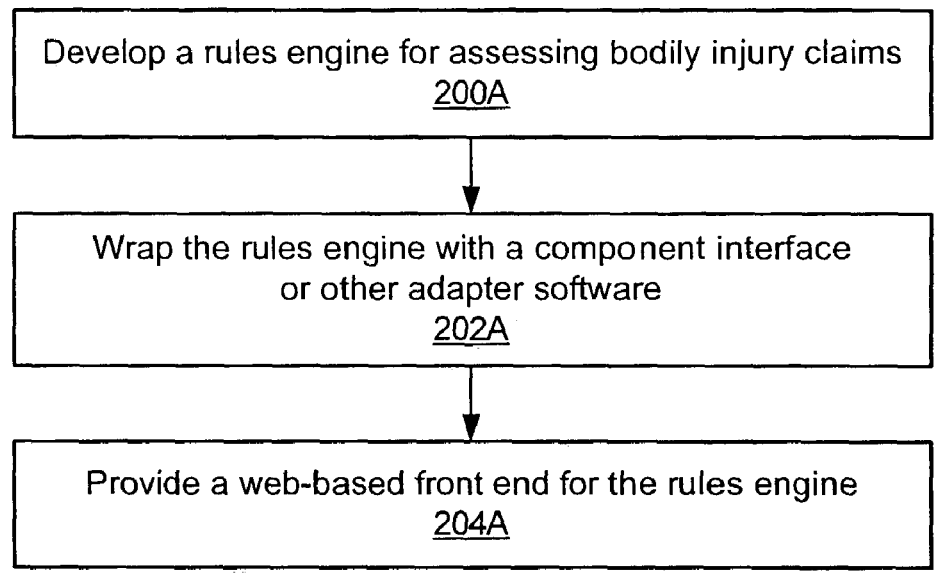
FIGS. 7a-7c are flow diagrams illustrating a mechanism for providing context-sensitive help according to one embodiment of an insurance claim processing system.
Figure 7A:
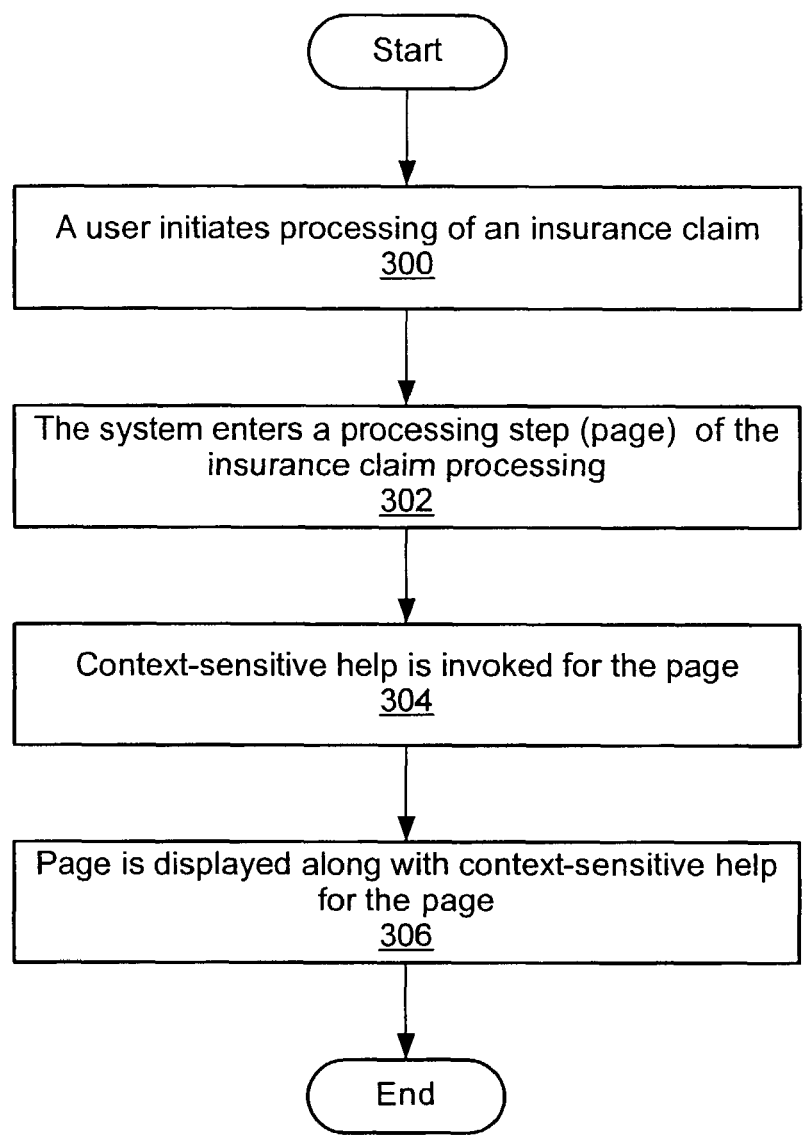
Figure 7B:
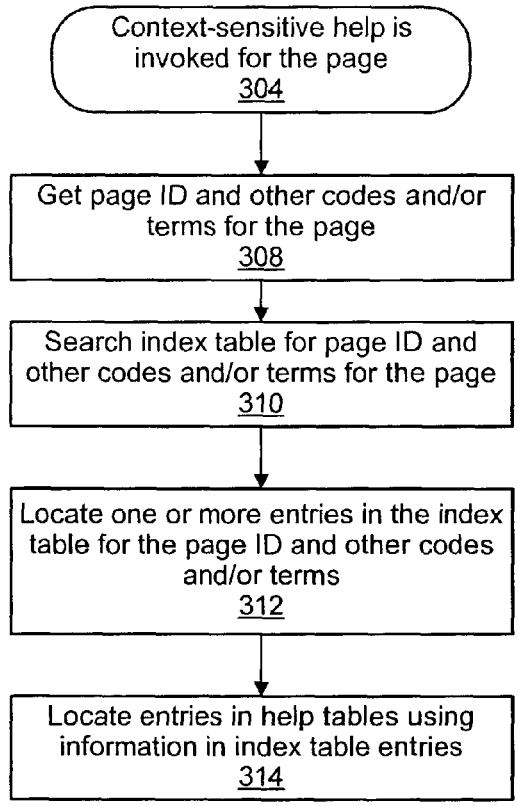
Figure 7C:
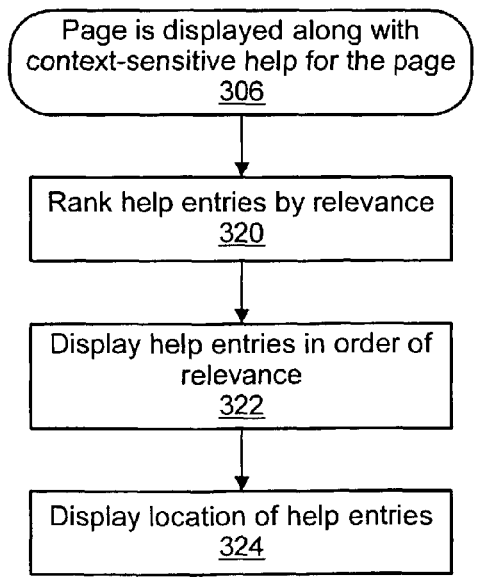

FIGS. 7a through 7c are flow diagrams describing embodiments of a mechanism for providing context-sensitive help in an insurance claims processing system. FIG. 7a illustrates a high-level view of the entire process, while FIGS. 7b and 7c give more detail of various steps of FIG. 7a.

In FIG. 7a, a user may initiate processing of an insurance claim in the insurance claims processing system in step 300. The insurance claims processing may begin at a first processing step, and may continue through a number of processing steps until the insurance claim has been processed. A next processing step may be determined by the user input at a current processing step. Each processing step may be displayed to the user in one or more pages on a computer display screen.

In step 302, the claims processing system may enter a processing step and display a page for the processing step. In step 304, the context-sensitive help for the page may be invoked. Context-sensitive help for each processing step may be unique, although content may appear in the context-sensitive help for two or more processing steps. Context-sensitive help may also be unique for each of the one or more pages within a processing step. In step 306, the page for the processing step may be displayed along with the context-sensitive help for the page. In one embodiment, the context-sensitive help for the page may instead replace the display of the page for the processing step. In one embodiment, the displayed page may occupy substantially the entire display screen on the display device. In another embodiment that supports windows, the page may be displayed in a window on the display screen. In one embodiment, the page may be divided into two or more panes, the context-sensitive help may be displayed in one or more panes on the page, and the processing step contents may appear in one or more panes on the page.

FIG. 7b illustrates step 304 of FIG. 7a in more detail. In step 304 of FIG. 7a, the context-sensitive help for the page is invoked. In step 308, items to be searched for in the context-sensitive help system may be determined. In one embodiment, each page in the insurance claims processing system may have a unique code, which may be referred to as a page ID. The page ID for the invoked page may be read. In one embodiment, the page ID may be stored with information describing the page that is read by the claims processing system prior to displaying the page. The information may describe the format and contents of the page. Alternatively, the page ID may be "hardcoded" into the code of the claims processing system.

The page may include one or more elements that have associated codes. The codes for the one or more elements on the page may also be read. In one embodiment, the elements on the page may be system-supplied "answers" to questions posed to the user during the claims processing. In one embodiment, the answers may be classifications for injuries, anatomical regions, etc. used during injury claims processing. In another embodiment, instead of reading codes for the elements, the text of the elements may be read.

In step 310, the insurance claims processing system may search one or more index tables as illustrated in FIG. 6 for entries including the page ID that may be used to locate help entries for the page in one or more help tables as illustrated in FIGS. 4 and 5. The index table may also be searched for entries for the elements of the page. In one embodiment, a code for an element is used to search the one or more index tables for entries. In another embodiment, the text of the elements is used to search the one or more index tables for entries.

In step 312, one or more entries may be located in the one or more index tables. In one embodiment, there will be at least one entry located for the page ID in the one or more index tables. In one embodiment, if elements of the page have an associated code, there will be at least one entry located for each code in the one or more index tables. In one embodiment, each entry in the one or more index tables may indicate an occurrence in the one or more documents included in the help database for the insurance claims processing system of the page ID, code, or term included in the index table entry.

In step 314, entries may be located in one or more help tables using information from the entries located in the one or more index tables for the page ID and any elements of the page. The help tables may be substantially similar to the tables illustrated in FIGS. 4 and 5. In one embodiment, each entry in an index table includes an object ID. The one or more help tables may be searched for occurrences of the object ID in each located entry. In one embodiment, the object ID may include information used to determine which help table the object ID is found in. For example, the last two digits of the object ID may indicate if the object ID is an entry for a header table similar to the one illustrated in FIG. 4 or for a text table similar to the one illustrated in FIG. 5. In one embodiment, there may be one entry in the help tables for each object ID. In one embodiment, a particular object ID may be included in one or more entries in an index table.

FIG. 7c illustrates step 306 of FIG. 7a in more detail. In step 306 of FIG. 7a, the context-sensitive help for the page may be displayed. In step 320 of FIG. 7c, the located help table entries may be ranked by relevance. In one embodiment, the entries in the index table may include a relevance value. The located help table entries may be ranked from highest relevance to lowest relevance. Entries with the same relevance may be ranked by any of several methods, including, but not limited to: alphabetic ranking and order of appearance in the index table. In one embodiment, the located help table entries may be listed without ranking for relevance. In one embodiment, any entries found for the page code may be displayed at the top of the list regardless of the relevance ranking of the entry. Entries for other codes in the page may then be ranked below the page code entry or entries in order of relevance. In one embodiment, when there is more than one term being searched for, located entries may be first ranked on the number of search terms the entries include. A header or text section of a document may include one or more occurrences of the page ID, codes, or terms being searched for. Entries that include more search terms may be ranked higher than entries with fewer search terms. The entries within the ranking categories may then be ranked by relevance within the category. Thus, entries with lower relevance, but more search terms, may appear higher in the overall ranking than entries with higher relevance, but fewer search terms.

In step 322, information from the located help table entries may be displayed. In one embodiment, the entries may be displayed in the order of relevance as determined in step 320. The help table entries may include portions of text from one or more documents related to insurance claims processing. Some help table entries may include section headers from the one or more documents. Some help table entries may include text from the bodies of sections of the one or more documents. Some help entries may include glossary information from the one or more documents. Other entries may include text from other portions of the one or more documents. In one embodiment, the relevance value may also be displayed.

In step 324, information describing the location of the displayed portions of text in the one or more documents may be displayed. This information may allow the user to look up (electronically or manually) located occurrences in the one or more documents. The location information may include, but is not limited to: document title, chapter title, and/or number, chapter or section header, section number and/or title, page number, number of occurrences in the section, etc.

In one embodiment, the page display may be split into sections, or panes. In one embodiment, the information from the located help table entries may be displayed in a first pane; the information describing the location in the one or more documents of displayed portions of text may be displayed in a second pane; and the step information may be displayed in a third pane. In one embodiment, separate windows may be used to display the information from the located help table entries, the locations in the one or more documents, and the step information.

Figure 8A:
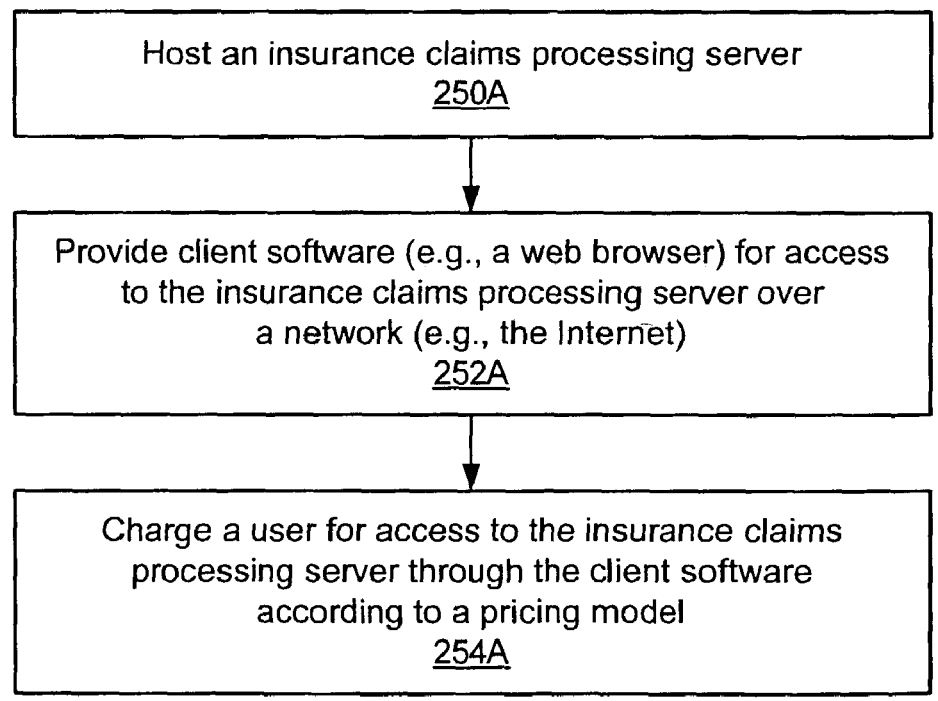
FIG. 8A is a flowchart illustrating a method of hosting a web-based insurance claims processing server with various pricing models according to one embodiment.
Figure 8:
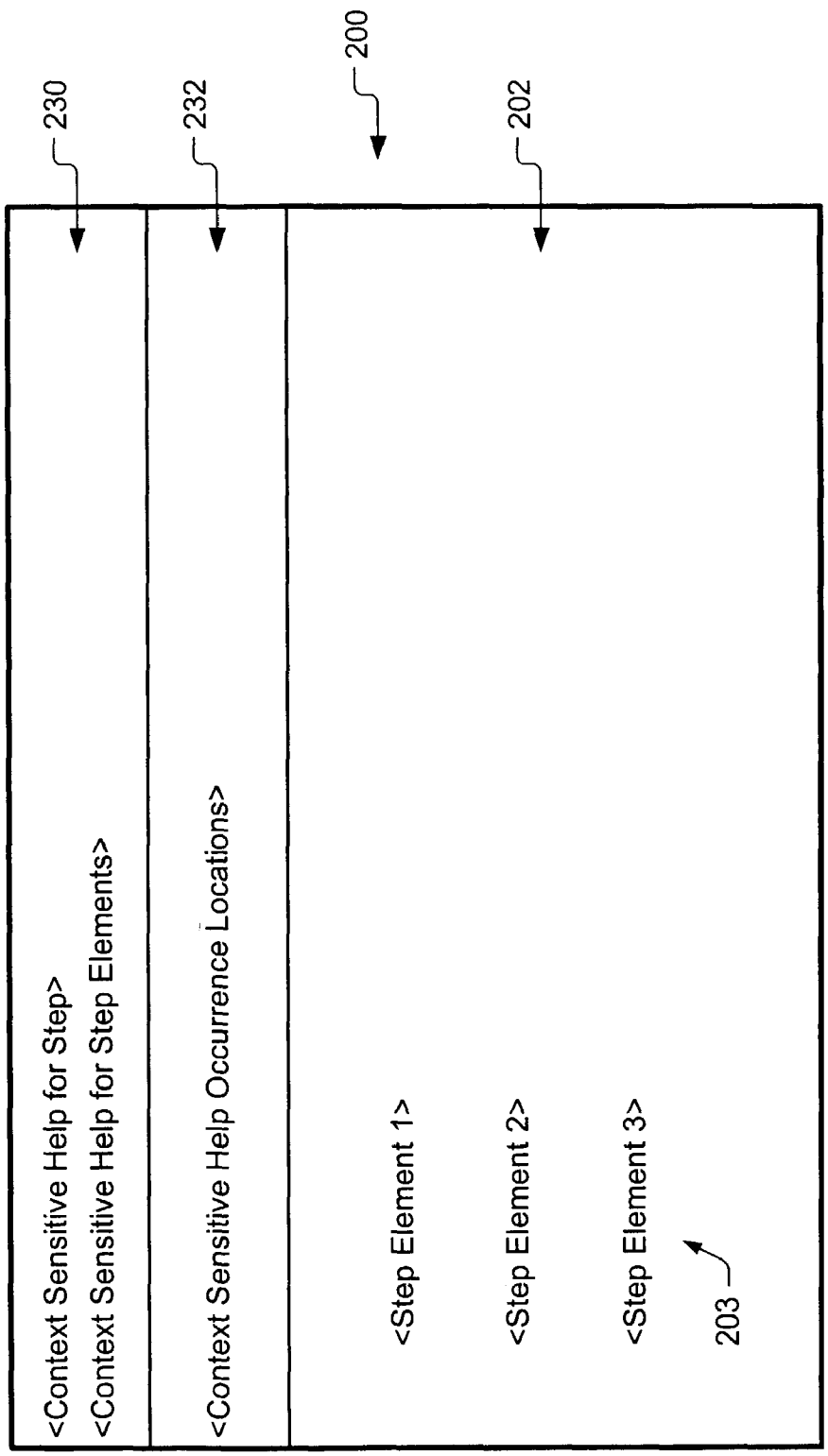
FIG. 8 illustrates a display screen showing multiple panes, wherein two of the panes comprise context sensitive help information, according to one embodiment of an insurance claim processing system.

FIG. 8 illustrates one embodiment of a display screen 200 showing multiple panes, wherein two of the panes comprise context sensitive help information for a step and the elements of the step. In this embodiment, pane 202 may display a step in the processing of an insurance claim. One or more step elements 203 may be displayed in pane 202. One or more context sensitive help occurrences for the step may be displayed in pane 230. One or more context sensitive help occurrences for the elements in the step may also be displayed in pane 230. Locations for the context sensitive help occurrences displayed in pane 230 may be displayed in pane 232. In one embodiment, a location may be displayed as a chapter hierarchy of the document in which the occurrence is found.

Figure 9:
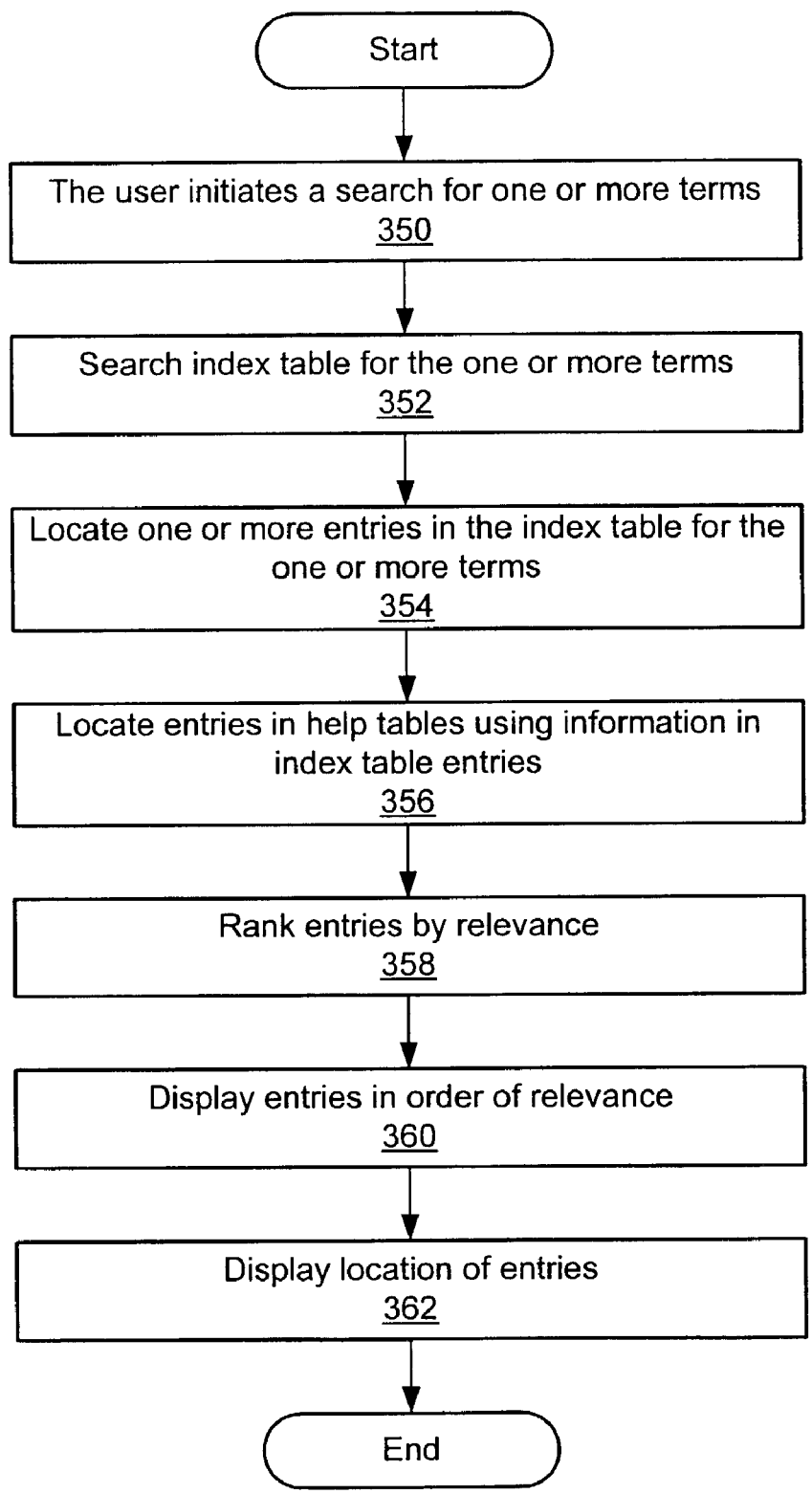
FIG. 9 is a flow diagram illustrating a mechanism for searching for insurance claims processing terms according to one embodiment of an insurance claim processing system.

FIG. 9 is a flow diagram illustrating one embodiment of a mechanism for searching for insurance claims processing terms. In one embodiment, the search mechanism may use the same one or more index tables and one or more help tables as are used in the mechanism for providing context sensitive help as described in FIGS. 7a-7c.

A user may first initiate processing of an insurance claim in the insurance claims processing system. The insurance claims processing may begin at a first processing step, and may continue through a number of processing steps until the insurance claim has been processed. A next processing step may be determined by the user input at a current processing step. Each processing step may be displayed to the user in one or more pages on a computer display screen. The claims processing system may enter a processing step and display a page for the processing step.

A search interface may be presented to the user on the display screen. In one embodiment, the search interface may be displayed in response to user action. For example, the user may activate a button or menu item to cause the system to display the search interface. The search interface may be presented in any of various forms. For example, a text entry box may be displayed that accepts one or more terms or phrases to be searched for, and a button may be displayed that initiates a search when activated by the user. The text entry box may also accept special characters, for example, quotation marks around a group of terms that are to be searched for as a phrase. The text entry box may also accept logical operators; for example, an AND operator may be entered between two terms to indicate that help table entries are to be searched for that include both terms.

In step 350, the user may enter in the search interface one or more terms to be searched for in the help database for the insurance claims processing system. The user may then initiate the search for the one or more terms. In step 352, the insurance claims processing system may search the one or more index tables for entries including at least one of the one or more terms.

In step 354, one or more entries may be found in the one or more index tables that include at least one of the one or more terms. In step 356, the located entries in the index table may be used to locate help entries in the one or more help tables that include at least one of the one or more terms. In one embodiment, each entry in an index table includes an object ID. The one or more help tables may be searched for occurrences of the object ID from each of the located entries.

In step 358, the located help table entries may be ranked by relevance. In one embodiment, the entries in the index table may include a relevance value. The located help table entries may be ranked from highest relevance to lowest relevance. Entries with the same relevance may be ranked by any of several methods, including, but not limited to: alphabetic ranking and order of appearance in the index table.

In one embodiment, more than one term may be searched for, and located entries may be first ranked on the number of search terms the entries include. Entries that include more search terms may be ranked higher than entries with fewer search terms. For example, if the user enters three terms to be searched for, entries that include all three of the search terms may be ranked first, then entries that include two of the search terms, and finally entries that include just one of the search terms. The entries within the ranking categories may then be ranked by relevance within the category. Thus, entries with lower relevance, but more search terms, may appear higher in the overall ranking than entries with higher relevance, but fewer search terms.

In one embodiment, if there is more than one term being searched for, occurrences including more than one of the search terms may be listed once, rather than listing the occurrence for each search term included in the occurrence. A relevance value of occurrences including more than one search term may be calculated from the relevance value of each of the terms included in the occurrence. For example, if a search is initiated for the terms "Anatomy" and "Body," and the index table 402 illustrated in FIG. 5 is searched, the term "Anatomy" will be located in the third entry in the table, and the term "Body" in the fourth entry. The third and fourth entries have the same object ID 140, indicating that these occurrences are from the same text section. In one embodiment, only one occurrence may be displayed on the display screen for the text section entry in text table 406 indicated by the object ID 140 of entries two and three in index table 402. In one embodiment, the relevance value for an occurrence including more than one term may be calculated using the following method:

Relevance Value=Sum of Occurrence Relevance Values/Number of Occurrences

Applying this method to the relevance values 152 of the third and fourth entries in index table 402:

(0.28+0.25)/2=0.265

In one embodiment, the calculated relevance value for the occurrence including the two search terms (0.265) may then be rounded to 0.27. In one embodiment, the calculated relevance value may then be used in ranking the occurrence including two terms against other occurrences including two terms.

In step 360, information from the located help table entries may be displayed. In one embodiment, the entries may be displayed in the order of relevance as determined in step 358. The help table entries may include portions of text from one or more documents related to insurance claims processing that include one or more of the one or more search terms. Some help table entries may include section headers from the one or more documents. Some help table entries may include text from the bodies of sections of the one or more documents. Some help entries may include glossary information from the one or more documents. Other entries may include text from other portions of the one or more documents. In one embodiment, the relevance value may also be displayed.

In step 362, information describing the location of the displayed portions of text in the one or more documents may be displayed. This information may allow the user to look up (electronically or manually) located occurrences in the one or more documents. The location information may include, but is not limited to: document title, chapter title, and/or number, chapter or section header, section number and/or title, page number, number of occurrences in the section, etc.

In one embodiment, the page display may be split into sections, or panes. In one embodiment, the information from the located help table entries may be displayed in a first pane; the information describing the location in the one or more documents of displayed portions of text may be displayed in a second pane; and the step information may be displayed in a third pane. In one embodiment, separate windows may be used to display the information from the located help table entries, the locations in the one or more documents, and the step information.

Figure 10:
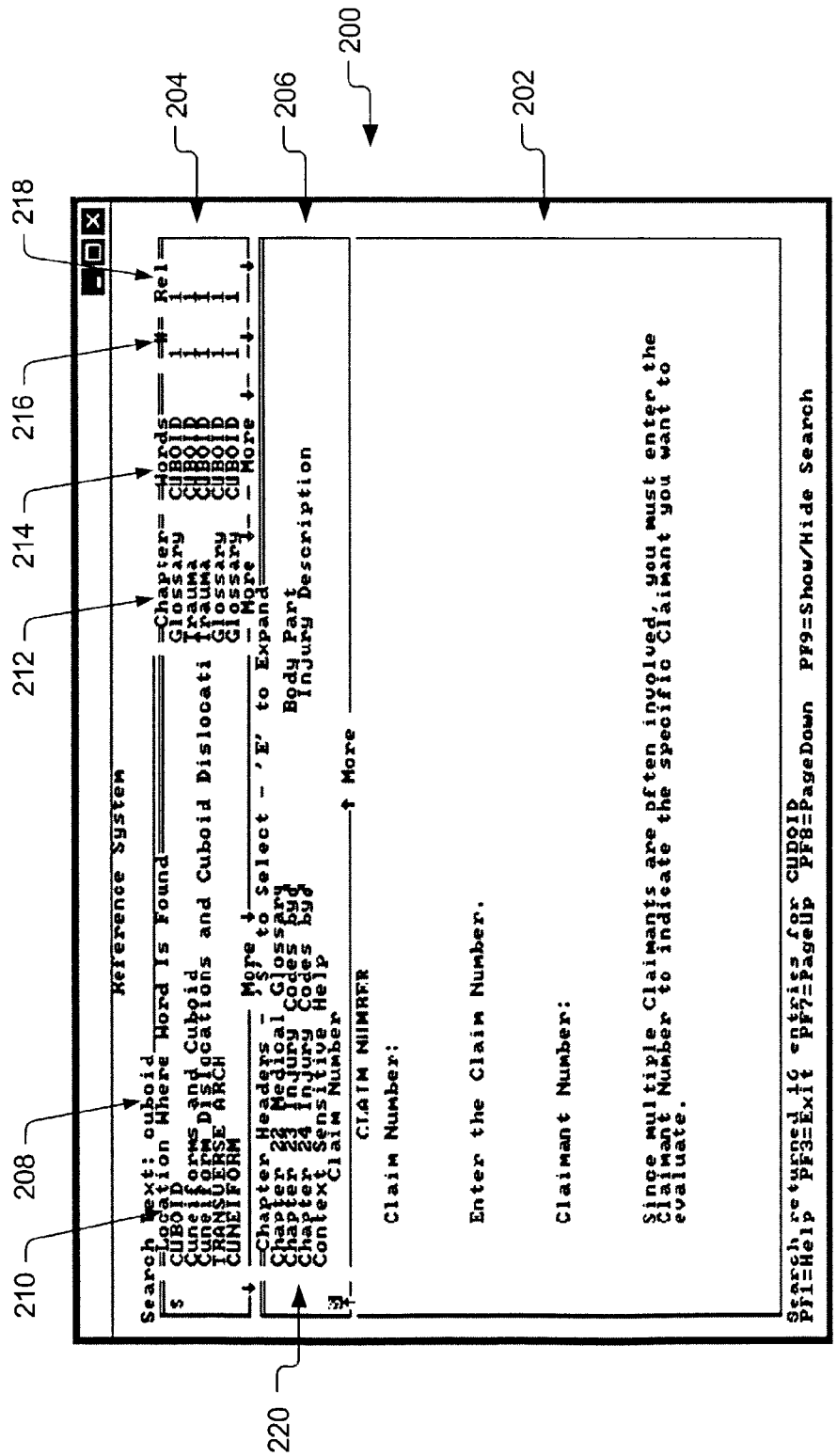
FIG. 10 illustrates a display screen showing multiple panes, wherein two of the panes comprise search results information, according to one embodiment of an insurance claim processing system.
Figure 10A:
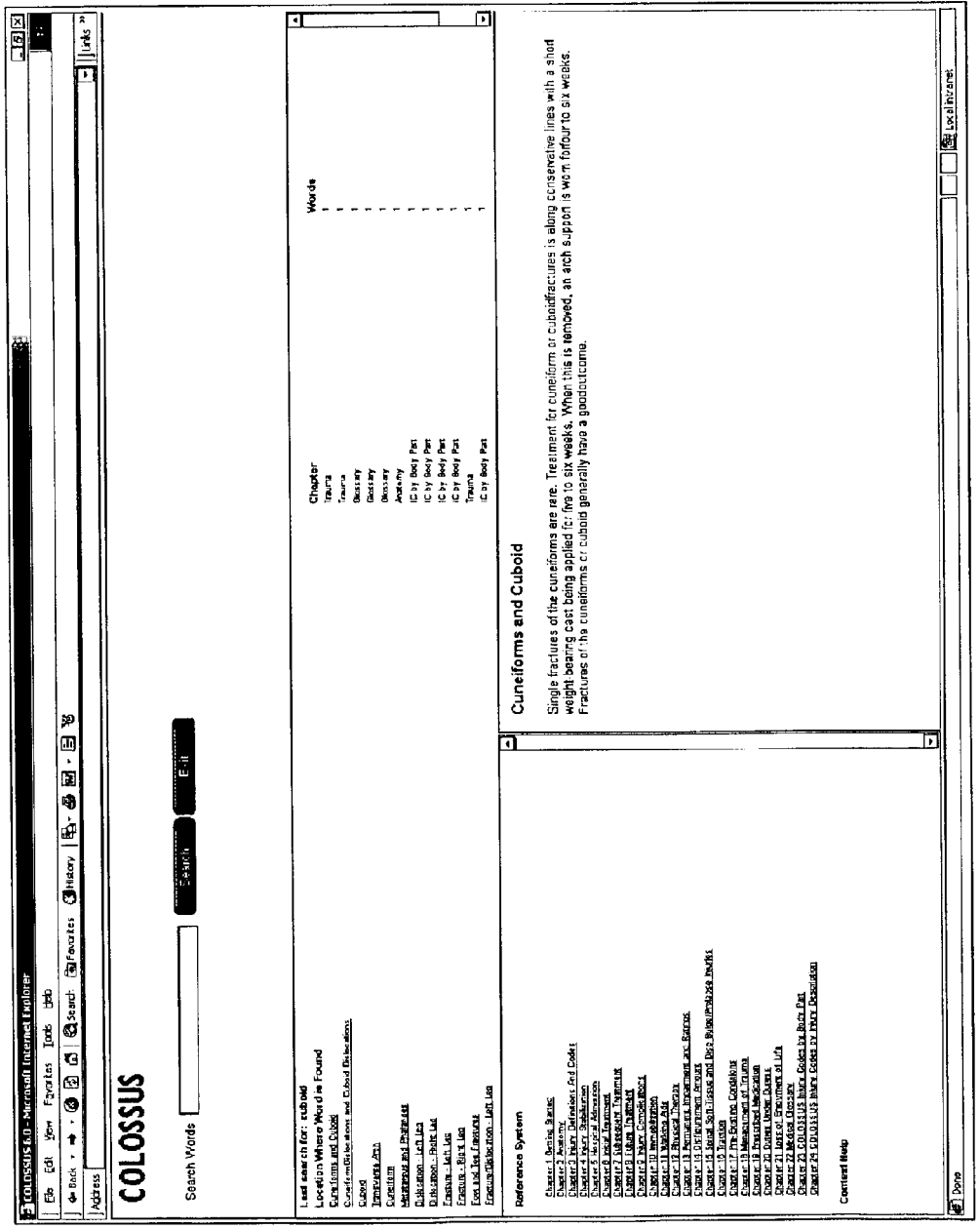
FIG. 10a illustrates an alternate embodiment of a display screen showing multiple panes, wherein two or more of the panes comprise search results information.

FIGS. 10 and 10a illustrates embodiments of a display screen 200 showing multiple panes, wherein two or more of the panes comprise search results information. Referring to FIG. 10 for a description of display screen 200, pane 202 may display a page for a step in the processing of an insurance claim. The search term "cuboid" 208 has been previously entered by the user, and a search was initiated and completed.

In pane 204, occurrences of the search terms (located entries in the one or more help tables) may be displayed. Column 210 of pane 204 may display a location where the term is found. In one embodiment, a portion or all of a text section or a portion or all of a header from a document may be displayed in column 210. Column 212 may display a portion or all of a chapter or section title of the document where the occurrence is located. Column 214 may list the search term(s) that appear in the occurrence. In this example, only one term 208 was entered. If multiple search terms are entered, then all search terms that appear in a listed occurrence may be listed in column 214. Column 216 may display the number of search terms found in the occurrence. Column 218 may display the relevance value for the entries. In this example, all displayed entries have the same relevance value (1). Other embodiments may include more or fewer columns displaying the same or other information about the occurrences. In one embodiment, not all located entries may be displayed in pane 204. An interface item or items may be provided to the user to display other located entries. Interface items may be items displayed graphically on the screen (for example, icons) and selectable using input/output devices such as a mouse, joystick, or arrow keys on a keyboard. Interface items may also be keyboard selections such as function keys or key combinations. For example, a button may be provided that allows the user to scroll down the list of located entries in pane 204.

In pane 206, information about the location of the occurrences in pane 204 may be displayed. Column 220 may display chapter numbers and/or chapter headers from the one or more documents in the help database that include one or more of the located occurrences displayed in pane 204. In one embodiment, there may be one entry in pane 206 for each entry in pane 204. Alternatively, there may be one entry in pane 206 for each chapter that includes at least one of the occurrences displayed in pane 204. An interface item or items may be provided to allow the user to display entries not currently displayed in pane 206.

Figure 11:
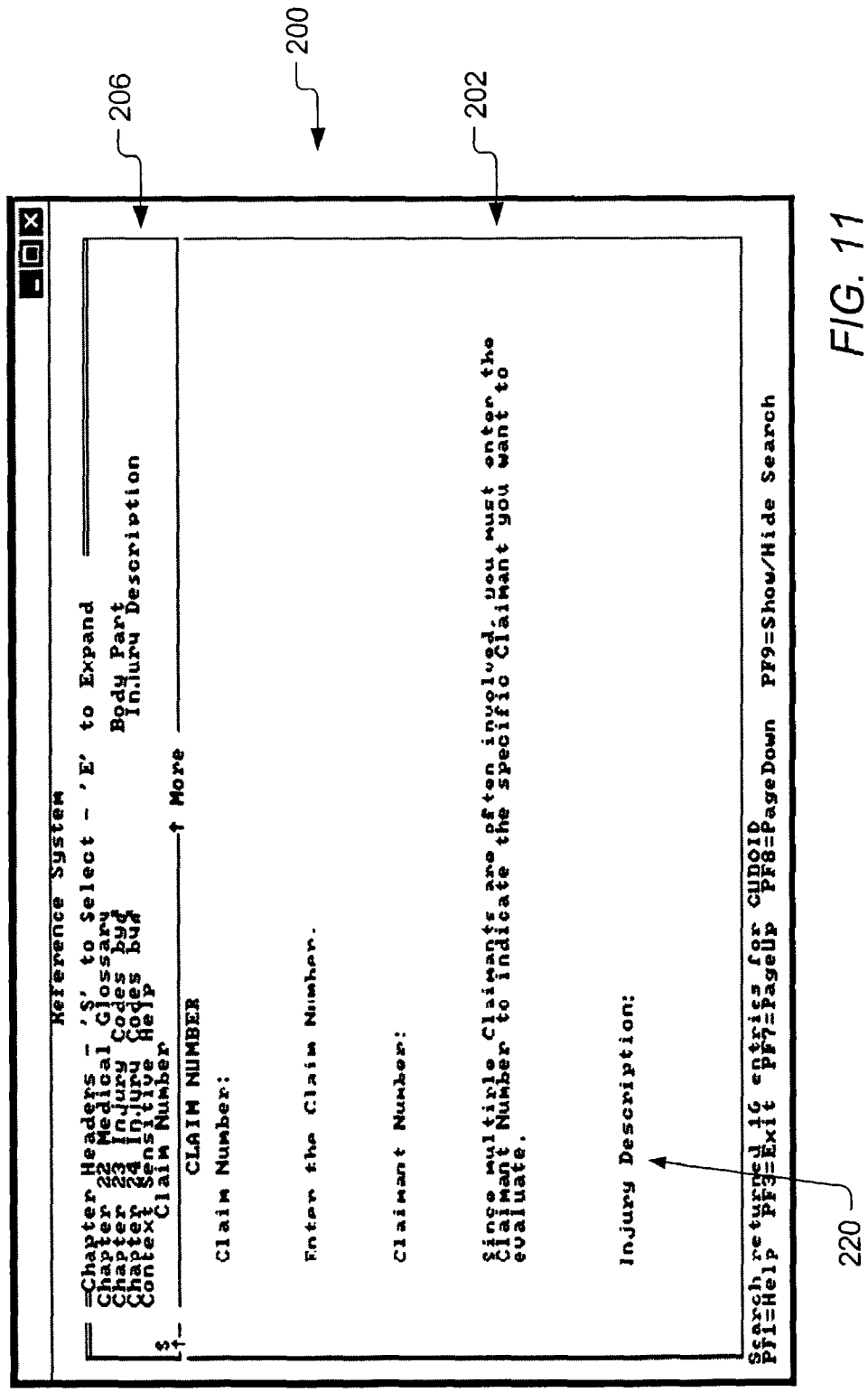
FIG. 11 shows the display screen of FIG. 10, with one of the search results panes hidden to provide more display area for claims processing information, according to one embodiment of an insurance claim processing system.

FIG. 11 shows the display screen 200 of FIG. 10, with one of the search results panes (pane 204) hidden to provide more display area for claims processing information. In this embodiment, pane 206 is moved nearer to the top of the display screen than in the display screen illustrated in FIG. 10. Pane 202 displays the page for a step in the processing of an insurance claim. Pane 202 has been expanded to provide more lines for displaying the elements of the step than in the display screen illustrated in FIG. 10. Thus, in this example, pane 202 of FIG. 11 displays the step element "Injury Description" 220 which was hidden in pane 202 of FIG. 10.

An interface item or items may be provided to the user for hiding or showing one or more panes displaying portions of the search results or context-sensitive help. Interface items may be items displayed graphically on the screen (for example, icons) selectable using input/output devices such as a mouse, joystick, or arrow keys on a keyboard. Interface items may also be keyboard selections such as function keys or key combinations. For example, a function key or key combination may be provided to toggle between hiding and showing pane 204.

The example illustrated in FIG. 11 is of a display with search results. In one embodiment, the hiding and showing of panes as described above may be applied to displays with panes displaying context-sensitive help for a step.

The ability to hide portions of search results or context-sensitive help may be useful in insurance claims processing systems with displays that have a limited amount of display space. For example, displays on some terminals may be limited to 24 lines of text. If the search results are displayed in two panes each using eight lines, hiding one of the panes may double the display space for the step elements from eight to sixteen lines.

Figure 1D:
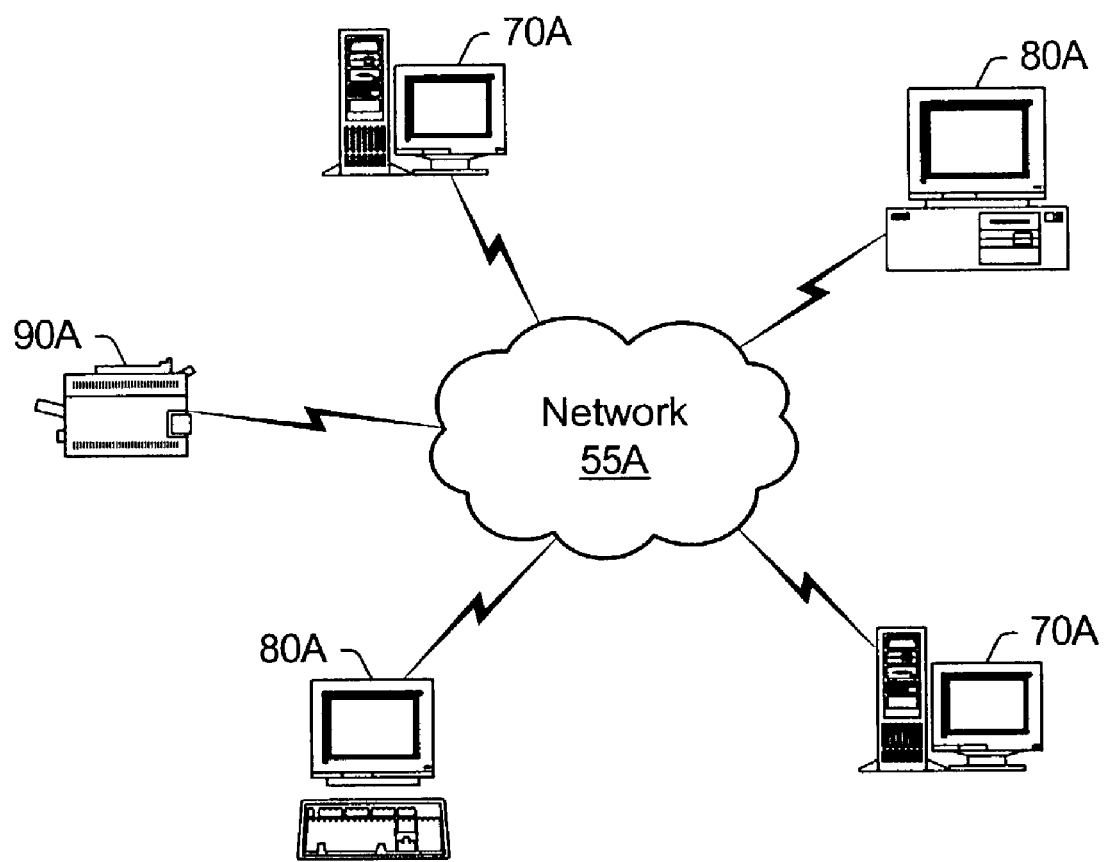
FIG. 1d is a network diagram of an illustrative distributed computing environment which is suitable for implementing various embodiments.

FIG. 1d is a network diagram of an illustrative distributed computing environment which is suitable for implementing various embodiments. The distributed computing environment may include various server systems 70A and client systems 80A connected by a network 55A. Other networkable devices such as printers 90A may also be connected to the network 55A. The servers 70A, clients 80A, and other devices may be geographically dispersed. A single computer system may serve as both a server and client.

The network 55A may be a local area network or wide area network, and may include communications links including, but not limited to: Ethernet, token ring, Internet, satellite, wireless, telephone, cable, DSL, and other suitable pathways. As used herein, "the Internet" includes one or more substantially global networks which are generally accessible by the public (i.e., they are not proprietary or not largely characterized by controlled access). Various sources of data on the Internet may be accessed through protocols such as HTTP (HyperText Transport Protocol), HTTPS (Secure HyperText Transport Protocol), FTP (File Transfer Protocol), Telnet, NNTP (Network News Transport Protocol), SMTP (Simple Mail Transfer Protocol), and other suitable protocols. Transmission of data over the Internet is typically achieved through the use of TCP/IP (Transmission Control Protocol/Internet Protocol) packets.

Figure 2A:
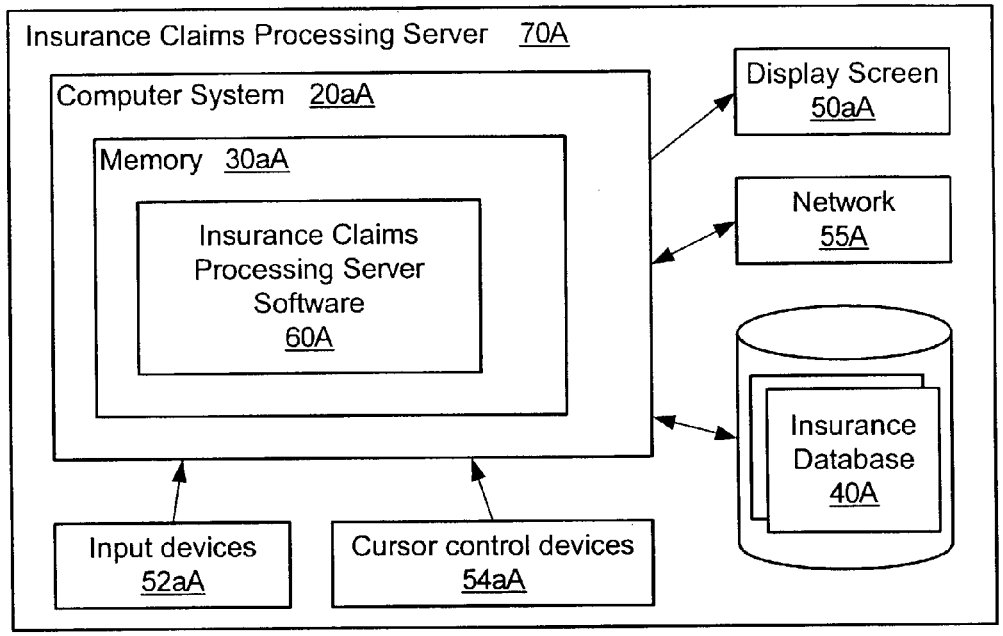
FIG. 2aA is an illustration of an insurance claims processing server computer architecture according to one embodiment.
Figure 2B:
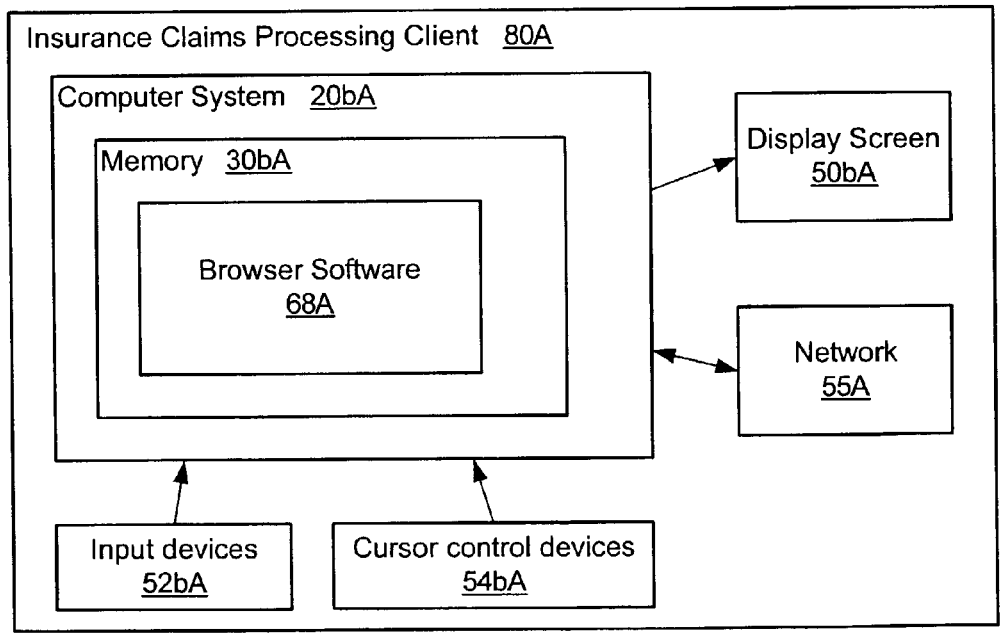
FIG. 2bA is an illustration of an insurance claims processing client computer architecture according to one embodiment.
Figure 2B:
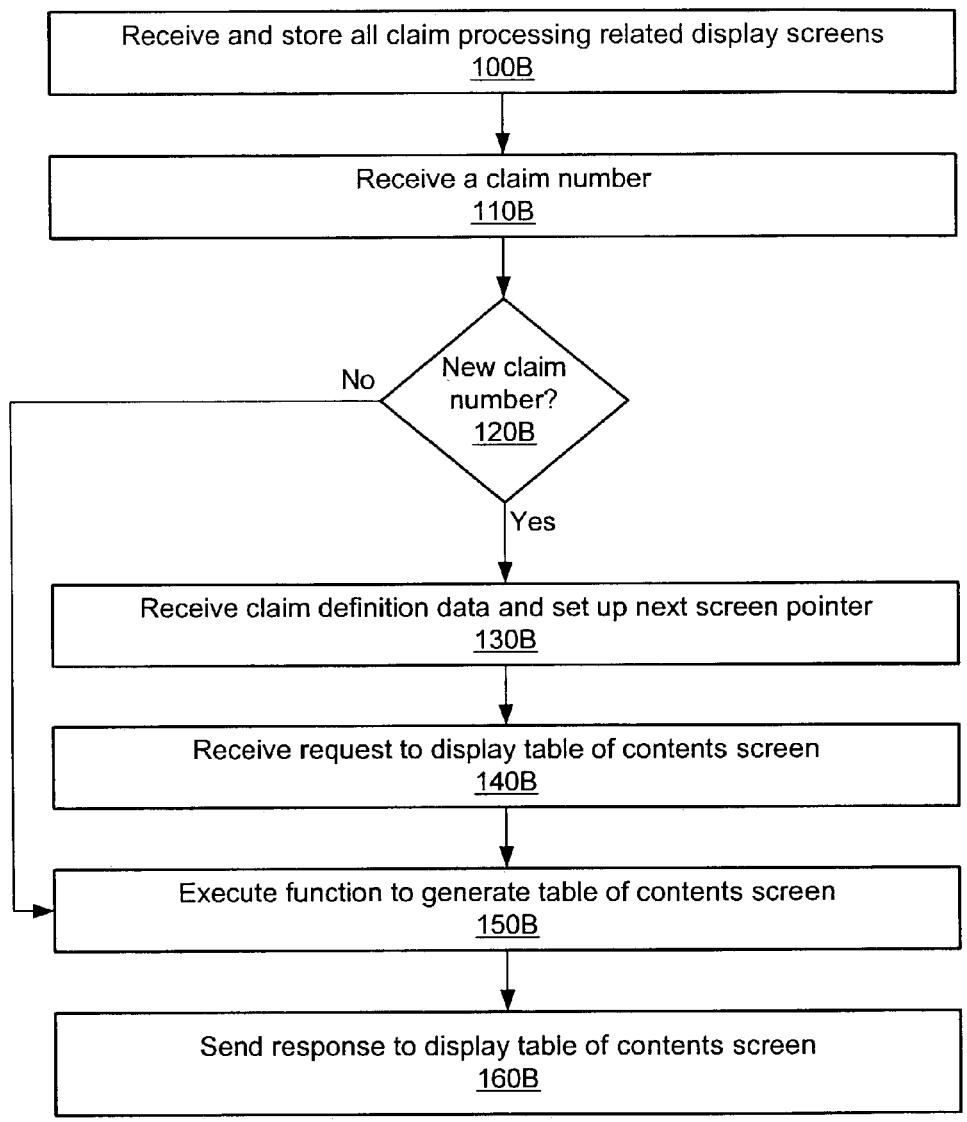

FIG. 2aA is an illustration of an insurance claims processing server computer architecture according to one embodiment. FIG. 2bA is an illustration of an insurance claims processing client computer architecture according to one embodiment. The insurance claims processing server 70A may include a computer system 20aA with a memory 30aA. The insurance claims processing client 80A may include a computer system 20bA with a memory 30bA.

The insurance claims processing server 70A may further include a display device 50aA connected to the computer system 20aA and an insurance database 40A residing on an internal or external storage. Computer system 20aA may include memory 30aA configured to store computer programs for execution on the computer system 20aA and a central processing unit (or CPU, not shown) configured to execute instructions of computer programs residing on the computer system 20aA. Insurance claims processing server software 60A may be stored in the memory 30aA.

The insurance claims processing client 80A may further include a display device 50bA connected to the computer system 20bA. Computer system 20bA includes memory 30bA configured to store computer programs for execution on the computer system 20bA and a central processing unit (or CPU, not shown) configured to execute instructions of computer programs residing on the computer system 20bA. Insurance claims processing client software 68A, such as web browser software, may be stored in the memory 30bA.

The insurance claims processing server 70A may be connected to network 55A. The insurance claims processing server software 60A and insurance database 40A may be distributed among the one or more servers 70A to provide a distributed processing system for insurance claim transactions. In other words, an insurance claim processing transaction being processed by the insurance claim processing system may be routed to any server based upon the workload distribution among servers 70A at the time of the transaction. Insurance claim processing system servers 70A may be located on a local area network or may be geographically dispersed in a wide area network.

One or more clients 80A may also be connected to network 55A. Clients 80A may reside at one or more claim processing units within the insurance company. In a wide area network, clients 80A may be geographically dispersed. Clients 80A may be used to access one or more insurance claim processing system servers 70A and associated insurance databases 40A. An insurance claim processing employee may use a client 80A to access the insurance claim processing system and execute insurance transactions. An employee may also use a client 80A to enter insurance claim inputs into the insurance claim processing system. As shown in FIG. 1*d*, one or more printers 90A may also be connected to network 55A for printing documents associated with insurance claim transactions.

Systems 20*a*A and 20*b*A may also include one or more users input devices 52*a*A and 52*b*A, such as a keyboard, for entering data and commands into the insurance claim program 60A. It may also include one or more cursor control devices 54*a*A and 54*b*A such as a mouse for using a cursor to modify an insurance claim viewed on display screen 50*a*A and/or 50*b*A. In response to the updating of the estimated insurance claim, the insurance claim server software 60A may store the updated insurance claim in the insurance database 40A.

The insurance claims processing server 70A and client 80A may be used by an Insurance Company for various embodiments of a system and method for processing insurance claims.

Figure 3A:
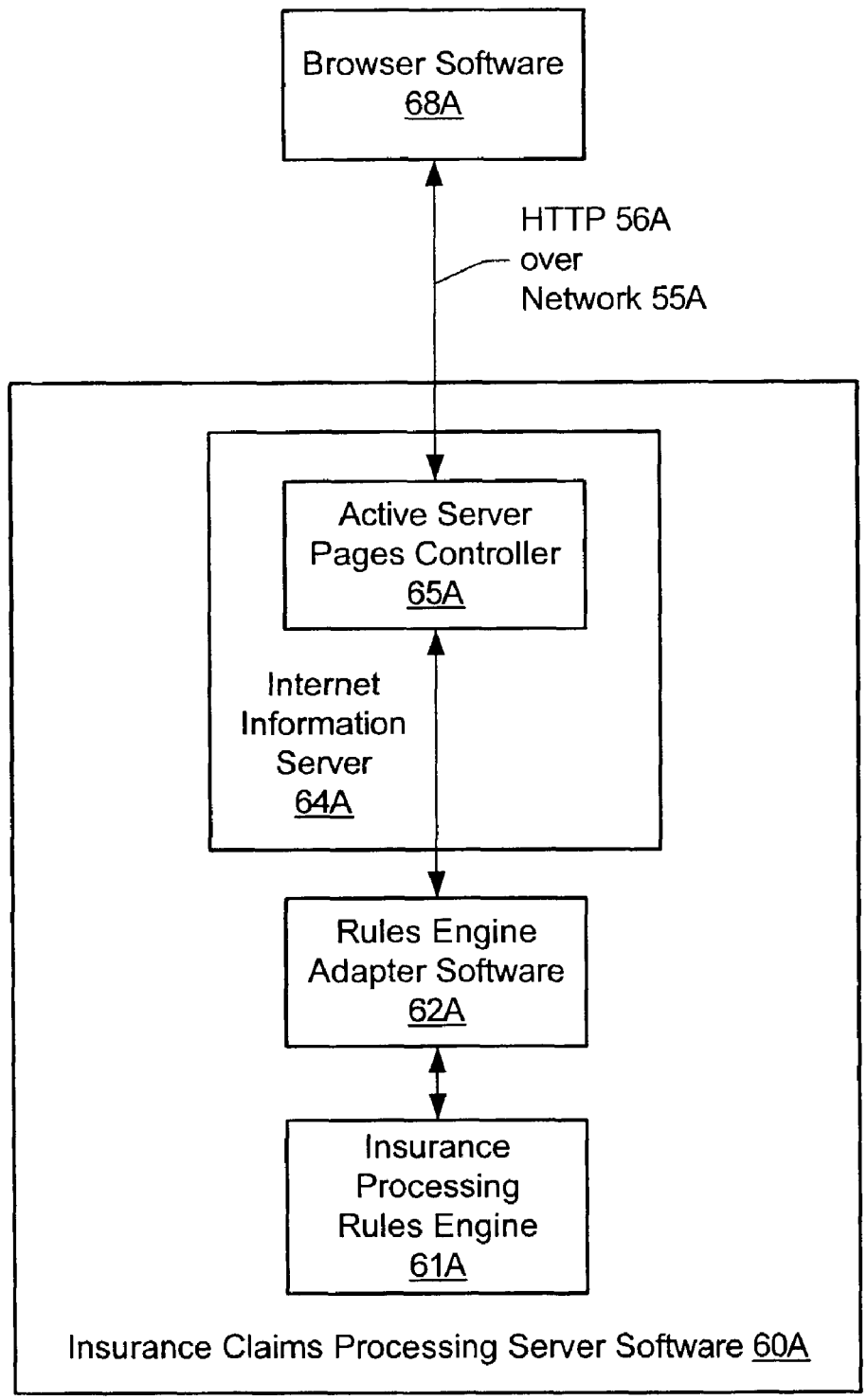
FIG. 3aA is an illustration of an insurance claims processing server software architecture for a single client according to one embodiment.

FIG. 3*a*A is an illustration of an insurance claims processing server software 60A architecture for a single client according to one embodiment. The server software 60A may include an insurance processing rules engine 61A. As used herein, a "rules engine" may include an expert system which is operable to produce an output as a function of a plurality of rules. A rules engine, in one embodiment, may include an expert computer system which utilizes and builds a knowledge base developed in the form of business rules and/or formulas to assist the user in decision-making. In one embodiment, the rules engine 61A is operable to generate insurance claim assessment questions to be displayed to a user during an insurance claim consultation session. The rules engine 61A may also be operable to estimate a value of an insurance claim as a function of insurance claim assessment data entered by a user in response to the insurance claim assessment questions. In one embodiment, the insurance claim may include a bodily injury claim, the insurance claim assessment questions may include bodily injury claim assessment questions, the insurance claim assessment data may include bodily injuries and treatments thereof.

In one embodiment, the rules engine 61A is capable of processing rules associated with assessing bodily injury damages claims. A rules engine 61A, in one embodiment, comprises an expert computer system which utilizes and builds a knowledge base developed in the form of business rules to assist the user in decision-making. It allows insurance companies to capture the knowledge base of their experts by defining business rules. Once created, the expertise may be used in processing many transactions, including assessing bodily injury damages claims. The business rules enable claim-processing professionals to be assisted by industry experts to evaluate legal, medical, insurance conditions before arriving at a valuation of an insurance claim.

In various embodiments, the rules engine 61A may be implemented and executed on various computing platforms such as personal computers and mainframes. The rules engine 61A may comprise a rules engine executable file on these platforms. In various embodiments, the rules engine may be accessed through various user interfaces, such as a graphical user interface for a rules engine 61A which is executable on a Microsoft™ Windows™-based server 70A. In one embodiment, the rules engine 61A may be developed using a commercial rule-based development tool such as PLATINUM Aion™, which is available from Computer Associates International, Inc. In one embodiment, the rules may be customized to meet the requirements of a particular insurance company.

Business rules, often referred to simply as rules, may include executable computer program instructions. The rules include computer commands or logical instructions to achieve a certain function. For example, rules may guide an assessment or estimate of bodily injury general damages. In one embodiment, a rule may include a premise followed by one or more resulting actions. For example, in one embodiment, a business rule may state "If patient requires hospitalization after emergency care treatment then the trauma severity level should be classified as major." In this case, the premise is "patient requires hospitalization after emergency care treatment." The resulting action is "trauma severity level should be classified as major." In one embodiment, the insurance claim processing server 70A may include several thousand business rules. The rules may be executed or fired, under the control of the insurance claim processing software, based on certain events, user inputs, etc. Only pertinent rules, i.e., a subset of all the available rules, are typically selected and executed for processing a specific bodily injury damages claim. On execution of the plurality of rules which are applicable to a specific bodily injury claim consultation session, the insurance claim processing server software 60A may generate a consultation report which summarizes an assessment and/or estimate of the bodily injuries claim.

The rules may be stored in and retrieved from an insurance database 40A. The type of information stored and/or retrieved may include, but not be limited to, business objects, tables, rules, software source code, executable software, etc. In one embodiment, the database may include a relational database. In another embodiment, the database 40 may include an object-oriented database.

In one embodiment, the insurance claims processing server software 60A may include adapter software 62A which may provide access to the rules engine for one or more other computer-based applications or subsystems, such as an internet information server 64A. In one embodiment, the adapter software 62A provides an application programming interface (API) to the rules engine 61A. The adapter software 62A is discussed in greater detail with reference to FIG. 4A.

In one embodiment, the insurance claims processing server software 60A may include a web server such as an internet information server (IIS) 64A. As used herein, a "web server" includes a system for supplying clients with access to web pages, such as by sending the pages to clients via an appropriate protocol. In one embodiment, a web server may also be operable to generate the web pages dynamically. As used herein, a "web page" includes a block of information which is configured to be displayed by a web browser 68A. As used herein, a "web browser" or "browser software" includes software which is configured to receive and display web pages. Examples of web browsers include Internet Explorer™ available from Microsoft™ Corporation and Netscape Navigator™ available from Netscape Communications Corporation. Typically, a web page is configured to be displayed in a single window in a web browser, wherein the window may be scrolled to view off-screen elements of the web page. Web pages may include various combinations of text, graphics, audio content, video content, and other multimedia content. A web page is often encoded in a language such as HTML (HyperText Markup Language). Web pages may be viewed in a browser on the same computer system on which the server 64A or web pages reside. Web pages may also be transmitted to a client computer system over a network 55A, such as via the HyperText Transport Protocol (HTTP) 56. Where the network 55A includes the Internet, the web pages may be transmitted via standard protocols such as TCP/IP.

In one embodiment, the internet information server (IIS) 64A may include a commercial product such as Microsoft™ Internet Information Server available from Microsoft™ Corporation. In one embodiment, the server 64A may include an active server pages (ASP) controller 65A which is operable to generate web pages dynamically. In other words, the web pages delivered by the internet information server 64A may be built in real time by the ASP controller 65A upon a request for a page by a browser 68A. Active server pages may include dynamic web pages which are created, for example, by blending HTML and server-side scripting. Active server pages may be dynamically constructed to include insurance claim assessment questions and other user interface elements by starting from a template.

The web server 64A may be configured to generate a plurality of web pages comprising the insurance claim assessment questions. The web browser 68A may then be configured to display the plurality of web pages comprising the insurance claim assessment questions. The web browser 68A may then be configured to receive insurance claim assessment data entered by a user in response to the insurance claim assessment questions during an insurance claim consultation session and send the insurance claim assessment data to the web server 64A. In one embodiment, the web server 64A is further configured to receive the insurance claim assessment data from the web browser 68A and send the insurance claim assessment data to the rules engine 61A. The rules engine 61A may be further configured to generate and send the estimate of the value of the insurance claim to the web browser 68A through the web server 64A. The web browser 68A may be further configured to display the estimate of the value of the insurance claim received from the rules engine 61A through the web server 68A.

In one embodiment, the web server 64A and web browser 68A may be located on separate computer systems which are communicatively coupled through a network 55A. In another embodiment, the web server 64A and web browser 68A may be located and executed on a single computer system.

HTTP is considered to be a stateless internet access protocol. In other words, each request from a web browser 68A to a web server 64A is essentially a request-response interaction. Therefore, when a web browser 68A requests a web page, for example, the web server 64A may complete the interaction between the two by sending the page to the browser 68A. However, a consultation session conducted by a user through a web browser 68A which communicates with the rules engine 61A may include many successive interactions through the web server 64A. It would tend to be inefficient to start a rules engine executable file for each of the many interactions that may take place during a single consultation session.

Figure 3B:
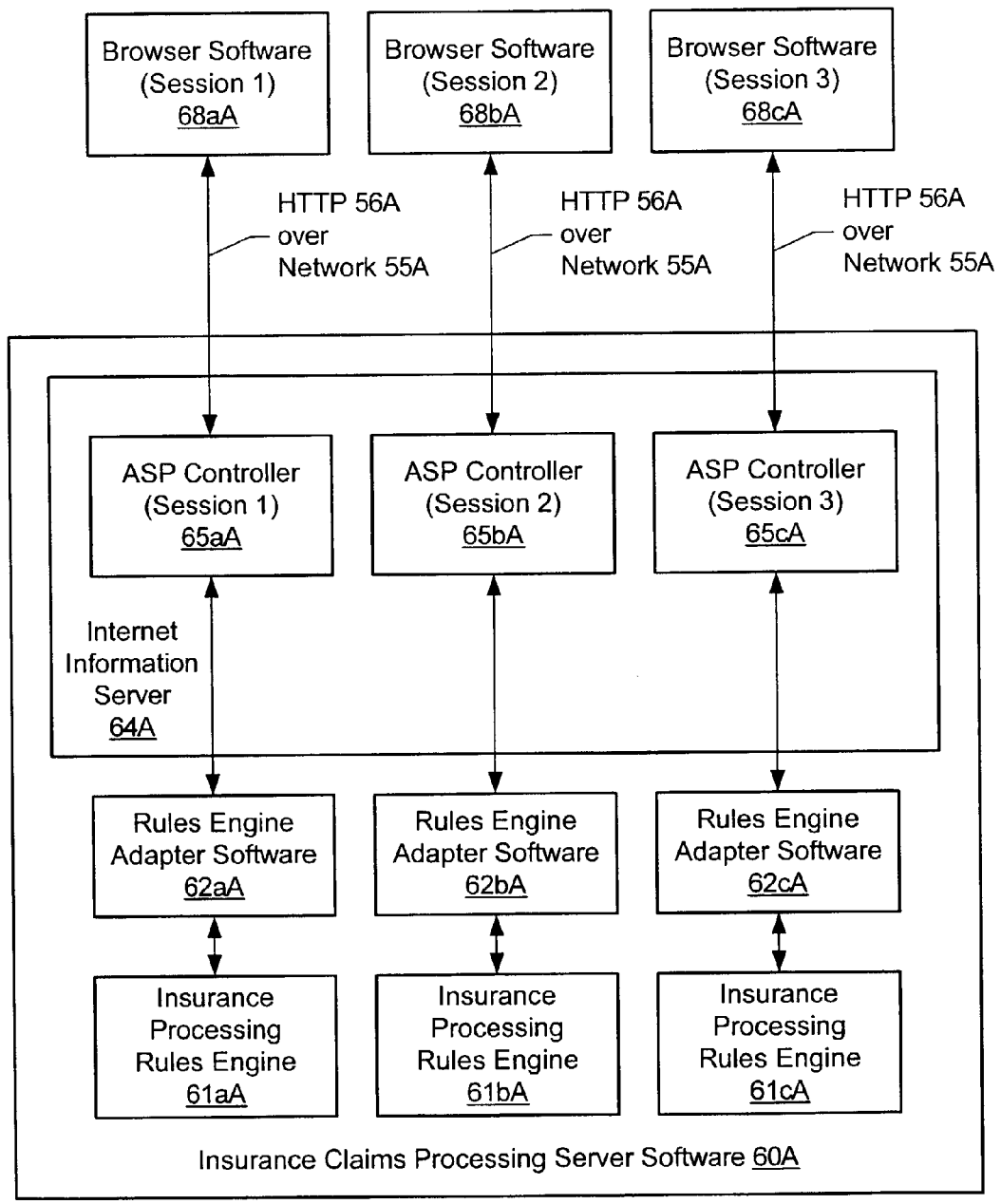
FIG. 3bA is an illustration of an insurance claims processing server software architecture for multiple clients according to one embodiment.
Figure 3B:
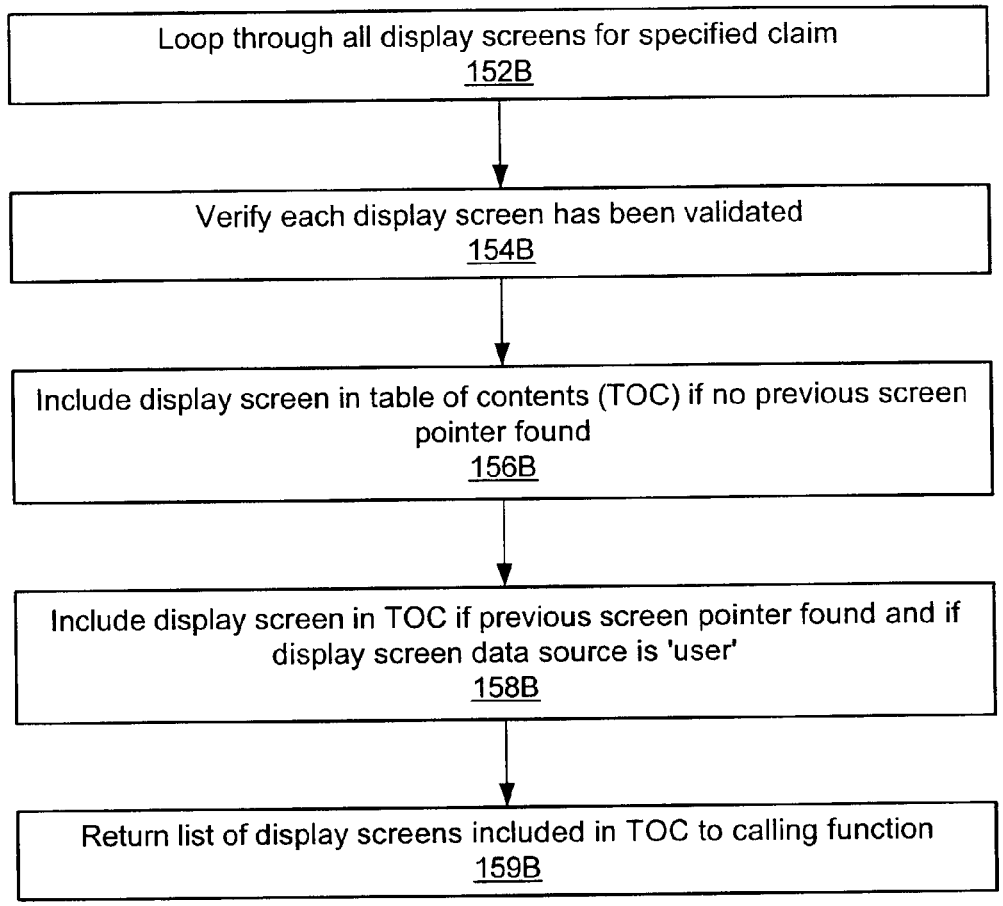

Therefore, IIS sessions may be used to maintain resources and state for each of a plurality of users. FIG. 3bA is an illustration of an insurance claims processing server software architecture for multiple clients 68aA, 68bA, 68cA according to one embodiment. The first time a user connects to a suitable web site provided by the server 64A, a rules engine may be executed or started for that particular user and then "held" in an IIS session for that user. FIG. 3bA illustrates an example including three browsers 68aA, 68bA, 68cA which correspond to and communicate with respective rules engines 61aA, 61bA, 61cA. Each IIS session may include an individual ASP controller 65aA, 65bA, 65cA. Each rules engine 61aA, 61bA, 61cA may therefore be linked to its corresponding ASP controller 65aA, 65bA, 65cA through individual adapter software 62aA, 62bA, 62cA.

Figure 4A:
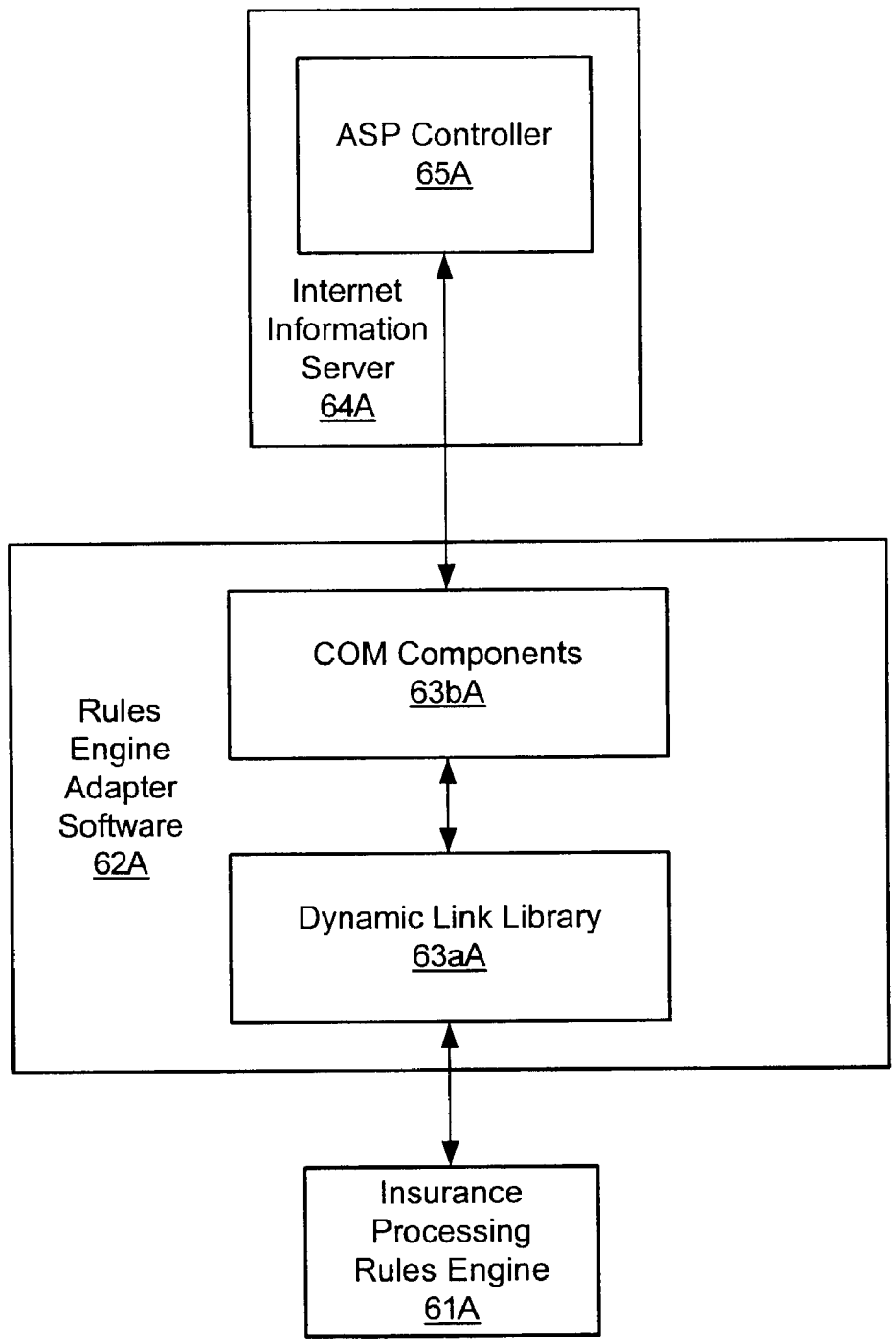
FIG. 4A is an illustration of adapter software between a rules engine and a web server according to one embodiment.

FIG. 4A is an illustration of adapter software between a rules engine and a web server according to one embodiment. The adapter software 62A may include one or more components which permit software such as applications or other components to communicate with the rules engine 61A. For example, the adapter software may provide methods to start and communicate with a rules engine executable file 61A.

As used herein, a component is a software object which includes definitions of method of communication for that software object. Typically, components are implemented according to a component architecture specification such as the Component Object Model (COM) or Distributed Component Object Model (DCOM) promulgated by Microsoft™. The component architecture specification for COM enables applications and components which follow the specification to pass data, commands, and other information back and forth. A COM interface may be said to "wrap" an object, server, or other piece of software if that COM interface defines methods of interaction or communication with that object, server, or piece of software.

In one embodiment, the adapter software 62A may include one or more COM components 63bA and a dynamic link library (DLL) 63aA. As used herein, a DLL may include a library of executable functions or data that can be used by an application such as a Microsoft™ Windows™-based application. Typically, a DLL provides one or more particular functions, and a program may access those functions by creating either a static or dynamic link to the DLL. A static link remains constant during program execution, while a dynamic link is created by the program as needed. In one embodiment, the DLL 63aA may provide a lower-level interface to the functions and methods of the rules engine 61A. For example, the DLL 63aA may take advantage of published protocols for accessing a rules engine implemented with a commercial system such as PLATINUM Aion™. In one embodiment, the DLL 63aA may be provided by the supplier of the commercial system for developing a rules engine.

The COM component(s) 63bA may then provide a higher-level interface to the DLL 63aA, which in turn may provide an interface to the rules engine 61A. In other words, the "business intelligence" may be confined to the rules engine 61A and DLL 63aA, and the COM component(s) 63bA may expose an interface which permits other pieces of software to convert data, requests, and other parameters to function calls provided by the DLL 63aA. In one embodiment, the COM component(s) 63bA may include methods including, but not limited to, the following: setListParameter, setSingleParameter, getNextMessage, lastErrorMessage, sendMessage, terminateSession, transactMessage, getListParameter, getSingleParameter, startServerSession, and startRefsysSession. Appropriate parameters may be defined for each method.

Figure 4B:
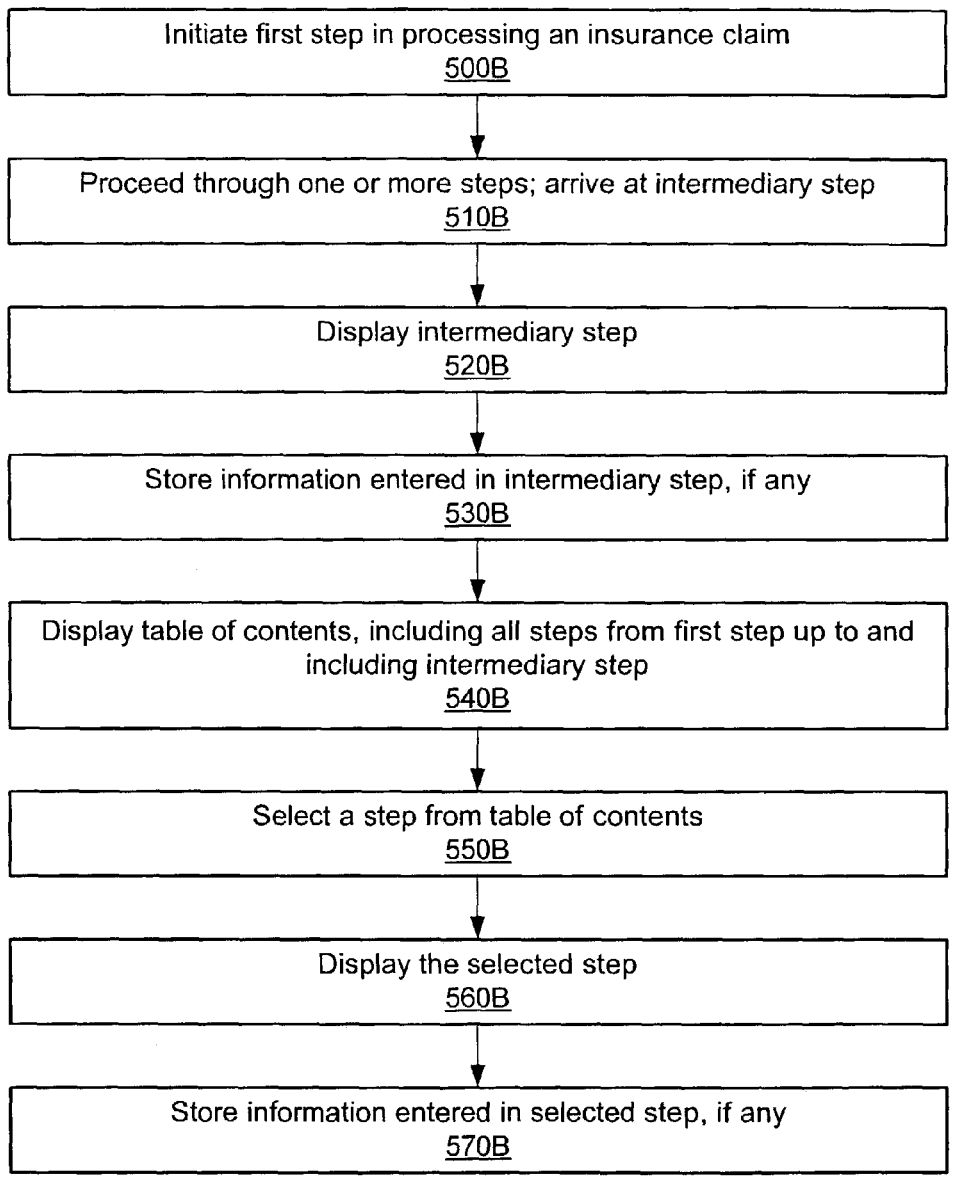
FIG. 4B is a flowchart illustrating the use of a table of contents for processing an insurance claim according to one embodiment.
Figure 5A:
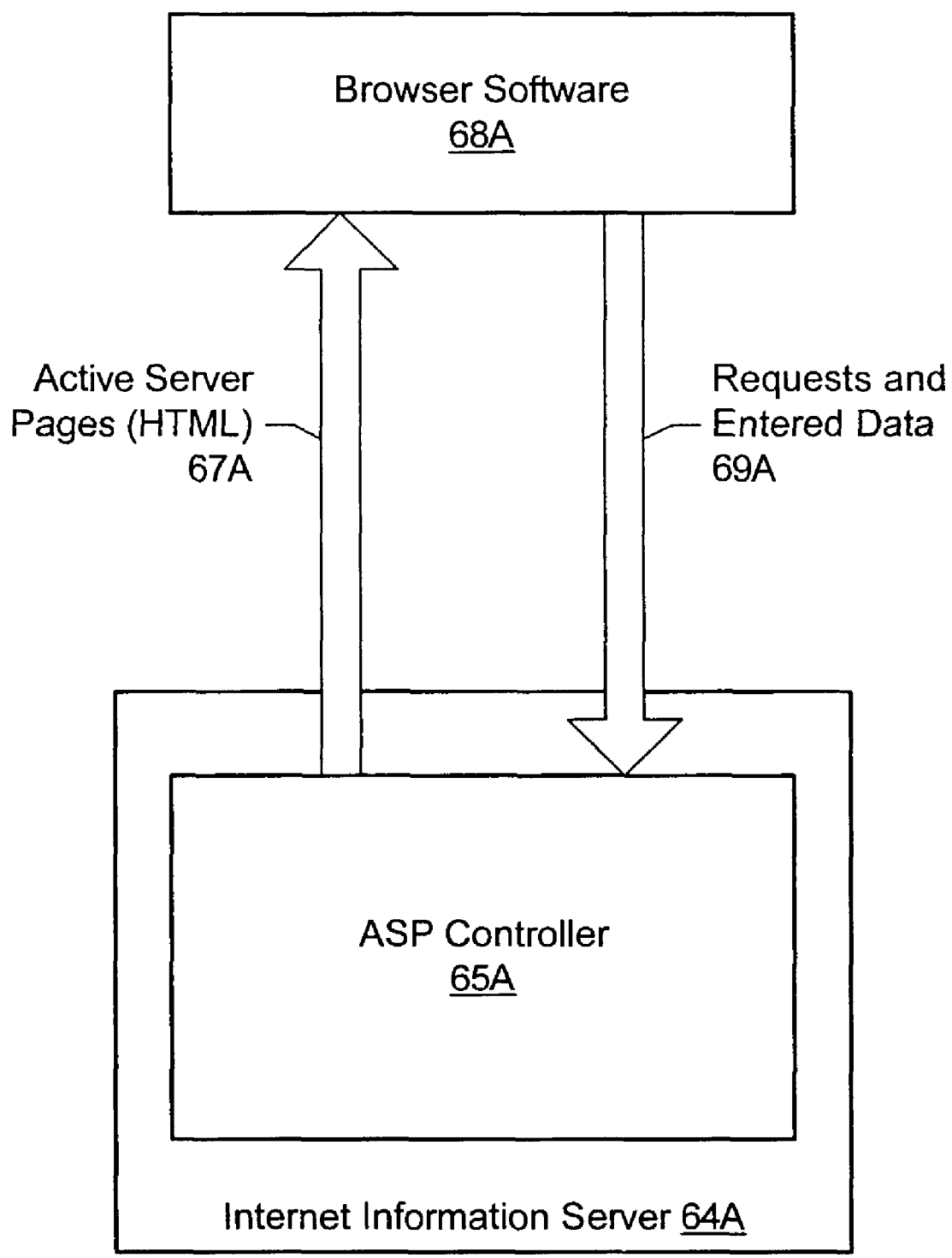
FIG. 5A illustrates the transmission of data between a web server and a web browser according to one embodiment.

FIG. 5A illustrates the transmission of data between a web server and a web browser according to one embodiment. Each ASP controller 65A may be a web-specific COM component or components that may run in a process space associated with the IIS 64A. These components may be operable to start, stop, and send data 69A (such as insurance claim consultation data entered in response to insurance claim consultation questions) to the rules engine 61A. These components may also be operable to receive data (such as insurance claim consultation questions and elements of the user interface) from the rules engine 61A for inclusion in one or more web pages 67A. Generally, these components are configured to translate data between HTML on the IIS 64A side and the interface exposed by COM components 63bA on the other side. These components may include functionality such as data validation (e.g., determining if datatypes of entered data are valid). The components may also ensure that the state of the interactions or "conversation" between a rules engine and a browser is preserved, as discussed in greater detail with respect to FIG. 4bA and FIG. 9A.

In one embodiment, the ASP controller 65A may include at least two COM components: one which handles interactions between a web browser 68 and the rules engine executable file, and another which handles interactions between the web browser 68A and a reference system or help system executable file. The reference system executable file may provide the user with detailed assistance in conducting an insurance claim consultation session.

In one embodiment, the COM component(s) for accessing the reference system may include methods including, but not limited to, the following: addedRefsysID, initializeContentsGraphs, startSessionIfNecessary, MemberOftrueHierarchylds, lastSearchText, lastSelectedChapterObjectId, terminateSession, getFirstMessage, pageHasError, getListParameter, chapterWasSelected, writeRefsysContents, writeContextContents, writeSearchResults, writeHelpTextAsHTML, contextHelpWasSelected, isSessionStarted, searchHitWasSelected, mergeLostBoys, searchWasSelected, and iisSessionId. Appropriate parameters may be defined for each method.

In one embodiment, the COM component(s) for accessing the rules engine 61A may include methods including, but not limited to, the following: terminateSession, startSessionIfNecessary, writePredisplayHtml, handleExitProcessing, getFirstMessage, pageToShow, errorMessage, pageHasError, pageWasPosted, doPageTransaction, getSingleParameter, getListParameter, getListParameterNoTrim, debugIt, formatAdsDate, hasSaveButton, hasBackButton, hasNextButton, hasContentsButton, hasCommentsButton, hasUnknownButton, hasReportButton, claimKeyFormat, statusMessage, iisSessionId, and isSessionStarted. Appropriate parameters may be defined for each method.

FIG. 6A illustrates an example of a browser-based user interface for the insurance claims processing system according to one embodiment. The browser window 100A may be displayed in a display device 50bA coupled to a client computer system. Typically, a web browser includes a set of standard navigation commands. As shown in FIG. 6A, examples of these commands may include "back" 110A to move to the previously visited page, "forward" 112A to move to the page previously visited before selecting "back," "reload" 114A to obtain and redisplay the current page from the server, and "home" 116A to move to a previously designated home page. These standard navigation commands may be made available to the user as menu items and/or as buttons or other GUI elements. A button may be "pushed," often by a mouse click or appropriate keyboard key, to initiate the command supplied by the button.

The browser page 104A may include an active server page or other HTML-encoded page supplied by the web server 64A. The page 104A may include one or more specialized navigation commands. In one embodiment, these specialized navigation commands may be displayed as buttons or other GUI elements. In one embodiment, the specialized navigation commands may include, for example, "save" 120A to save the status of a consultation session, "help" 122A to access a reference system for insurance claim processing, "exit" 124A to safely exit the insurance claim consultation session, "back" 130A to safely move to a previous page of the insurance claim consultation session, and "reset" 132A to reset the proper state of the browser page 104A. The reset command is further described with reference to FIG. 9A.

Insurance claim assessment data and/or insurance claim assessment questions 140A may also be displayed in the browser page 104A. For example, for a given step in the insurance claim consultation session, one or more questions may be asked regarding bodily injuries and/or treatments thereof. A set of acceptable answers (i.e., insurance claim assessment data) may be supplied to the user, such as with a menu or series of check boxes. The user may then select from the possible answers and enter the insurance claim assessment data. The set of acceptable answers may be dynamically generated by the rules engine based upon answers to previous questions.

FIG. 7A is a flowchart illustrating a method of developing a web-based insurance claims processing system according to one embodiment. The steps shown in FIG. 7A may be performed in various orders according to various embodiments. In step 200A, a rules engine may be developed or otherwise provided. As discussed with reference to FIG. 3aA, the rules engine may be configured to estimate a value of an insurance claim as a function of insurance claim assessment data entered by a user in response to insurance claim assessment questions.

In step 202A, the rules engine may be wrapped with a component interface in accordance with a component architecture specification. Component interfaces are discussed in greater detail with reference to FIGS. 4A and 5A. The component interface may include one or more definitions of methods of communication or other access to the rules engine, such as by a web server. The component architecture specification may include a Component Object Model (COM) specification.

In step 204A, a web servers may be provided, wherein the web-server is configured to generate a plurality of web pages which are viewable by a web browser. The methods of communication in the component interfaces may be operable to transmit the insurance claim assessment data from the web server to the rules engine and operable to transmit the insurance claim assessment questions from the rules engine to the web server.

FIG. 8A is a flowchart illustrating a method of hosting a web-based insurance claims processing server with various pricing models according to one embodiment. In step 250A, an insurance claim processing server may be hosted. As used herein, "hosting" may include installing, maintaining, and/or otherwise providing client access to a server. The insurance claim processing server may be configured to estimate a value of an insurance claim as a function of insurance claim assessment data entered by a user during an insurance claim consultation session. In one embodiment, the insurance claim processing server may include a rules engine and a web server, and the client software may include a web browser. The web server may be operable to generate web pages and receive responses and requests from the web browser to enable communication between the rules engine and the web browser.

In step 252A, client software such as a web browser may be provided to a user such as an insurance company. In one embodiment, the client software may include commercial, off-the-shelf web browser software which may already be in use by an insurance company and its employees who seek to access to the insurance claim processing server. The client software may be operable to receive the insurance claim assessment data entered by the user and send the insurance claim assessment data across a network to the insurance claim processing server. The insurance claim processing server may be operable to send the estimate of the value of the insurance claim to the client software across the network. In one embodiment, the network may include the Internet.

In step 254A, the user may be charged for access to the insurance claim processing server through client software according to a pricing model. Various pricing models may be used with various embodiments of the hosting system and method. The pricing model may include a fee for each of a plurality of insurance claim consultation sessions conducted by the user. The pricing model may include a fee for each fixed period of access time of access by the user to the insurance claim processing server through the client software. For example, the fixed period of access time may include an hourly multiple, a weekly multiple, a monthly multiple, a yearly multiple, or a multiple of minutes. The pricing model may include a fee which varies directly with an amount of time spent accessing the insurance claim consultation session through the client software.

The user may include an insurance organization having a particular size, and the pricing model varies according to the size of the user. The size of the user may include a function of a quantity of employees of the user, a function of revenue of the user over a period of time, and/or a function of a quantity of consultation sessions conducted by the user over a period of time. The pricing model may include a pricing discount given to the user after a particular quantity of insurance claim consultation sessions conducted by the user in a particular period of time. The insurance claim consultation session may include one or more insurance claim consultation transactions, and the pricing model may include a fee for each of a plurality of insurance claim consultation transactions conducted by the user during one or more insurance claim consultation sessions.

The method may further include charging additional users for access to the insurance claim processing server through client software according to a same or different pricing model.

Figure 9A:
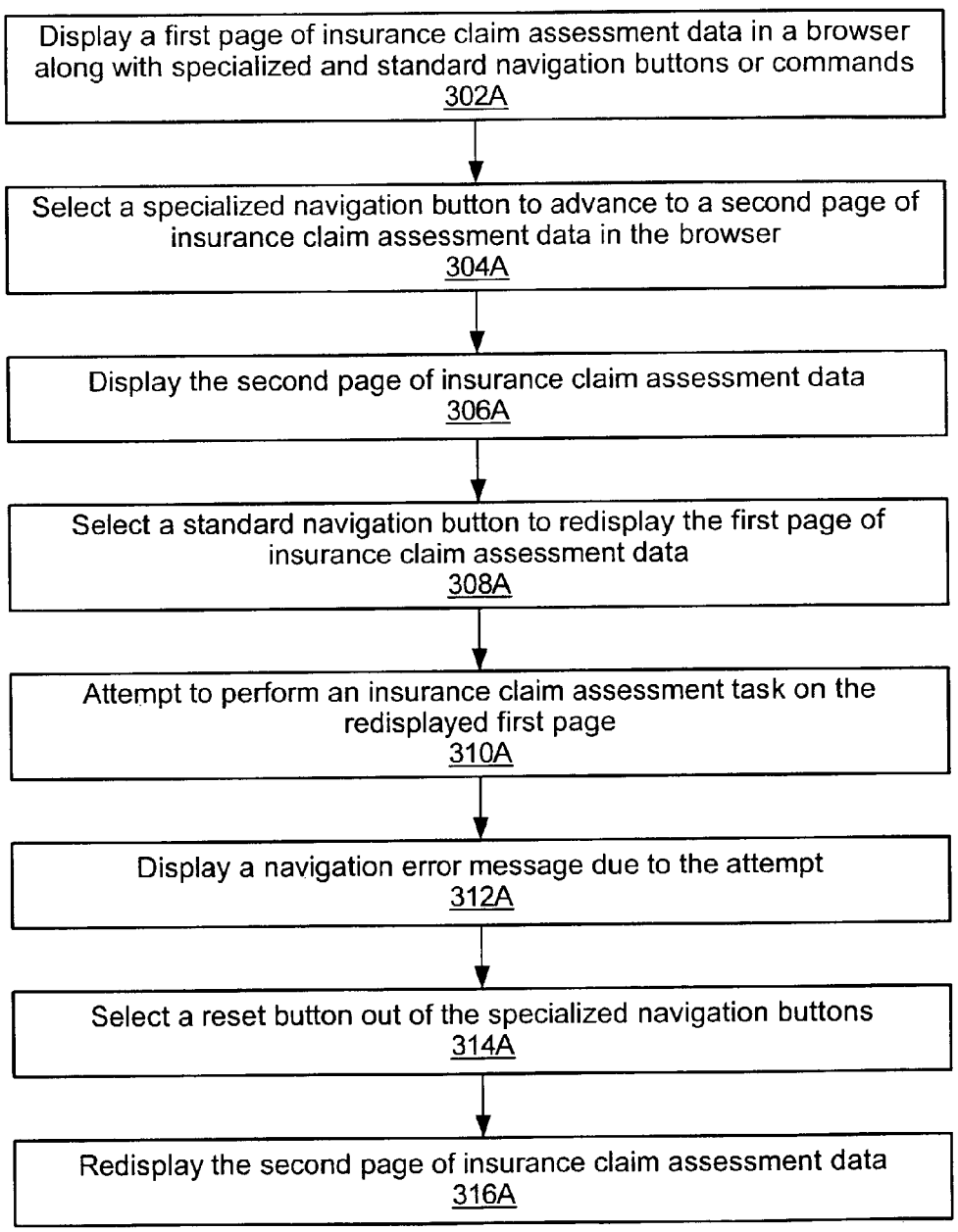
FIG. 9A is a flowchart illustrating a method of using a reset button provided by a web-based interface to a web-based insurance claims processing server according to one embodiment.

FIG. 9A is a flowchart illustrating a method of using a reset button provided by a web-based interface to a web-based insurance claims processing server according to one embodiment. In step 302A, a first page of insurance claim assessment data may be displayed in a browser program executing on a computer system. The browser program may include a web browser program which is operable to read and display web pages. The computer system which executes the browser program may include a client computer system which is communicatively coupled to a server computer system. The server computer system may be operable to generate and send a plurality of pages of insurance claim assessment data to the client computer system.

In one embodiment, in step 304A, one of the specialized navigation commands, such as a forward command, may be selected to advance to a second page of insurance claim assessment data. In another embodiment, the user may advance to the second page by hitting "return" or otherwise instructing the insurance claim processing server to provide a next page in a consultation session. In step 306A, the second page of insurance claim assessment data, including the specialized navigation commands, may be displayed in the browser.

In step 308A, after the second page of insurance claim assessment data is displayed, one of the standard navigation commands, such as the "back" command or button available in a toolbar or menu in a web browser, may be selected to move back to the first page of insurance claim assessment data. The first page of insurance claim assessment data may then be redisplayed.

In step 310A, the user may attempt to perform an insurance claim assessment task on the redisplayed first page of insurance claim assessment data. For example, the user may attempt to save a status of an insurance claim consultation by pressing a "save" button in the specialized buttons. The insurance claim consultation may include an interactive determination of an estimate of a value of an insurance claim through the entry of insurance claim assessment data in response to insurance claim assessment questions. The insurance claim assessment task may include selecting one of the other specialized navigation buttons provided as the user interface by insurance claim processing server. The insurance claim assessment task may also include entering new or modifying existing insurance claim assessment data. Insurance claim assessment data may include information relevant to an estimate of a value of an insurance claim, such as bodily injuries and treatments thereof. The insurance claim assessment data may include bodily injury claim assessment data, and the insurance claim assessment task may include a bodily injury claim assessment task.

In one embodiment, the state of the "conversation" between the browser and the insurance claim processing server may be preserved by a COM component 66A, as discussed with reference to FIG. 5A. In step 312A, therefore, a navigation error may be generated as a result of the attempting to perform an insurance claim assessment task on the first page, when the second page is the "correct" page in the conversation. In one embodiment, a navigation error message may be generated and displayed to the user as a result of the generating the navigation error. The navigation error message may include an instruction to select a reset command, wherein the reset command is one of the specialized navigation commands.

In step 314A, the user may select the reset command after viewing the navigation error message. In one embodiment, the insurance claim processing server may automatically perform a reset function without user intervention as a result of the navigation error.

In step 316A, the second page (i.e., the "correct" page) of insurance claim assessment data may then be redisplayed. The user may then perform a second insurance claim assessment task on the redisplayed second page of insurance claim assessment data.

FIG. 2B is a flow chart illustrating the generation of a table of contents for processing an insurance claim according to one embodiment. In step 100B, the user of an insurance claims processing system 10 may use a client system 80 to initially configure, or set up, all the display screens associated with the insurance claims processing business process. A display screen may be associated with a step included in processing insurance claims. In one embodiment, the business process for processing the insurance claims may utilize an applicable subset of all display screens. The inclusion or exclusion of a display screen in a table of contents display screen may be based on business rules, user inputs, etc. In another embodiment, the business process for processing the insurance claims may utilize all display screens.

In one embodiment, the configuration of each of the display screens involves defining the properties of the display screen object such as previous display screen pointer, next display screen pointer, source for data displayed, etc. Additionally, each display screen configuration may require specifying one or more user input fields, defining business rules associated with the processing of data for the display screen, etc. The configuration of the display screen object may include invocation of methods such as Load_Screen, Display_Screen, Validate_Screen, Save_Screen, Process_Screen, etc. In one embodiment, a registry is maintained for all display screen objects. FIGS. 6B and 6Ba show a few examples of the properties and methods associated with a display screen object according to two different embodiments.

Figure 5B:
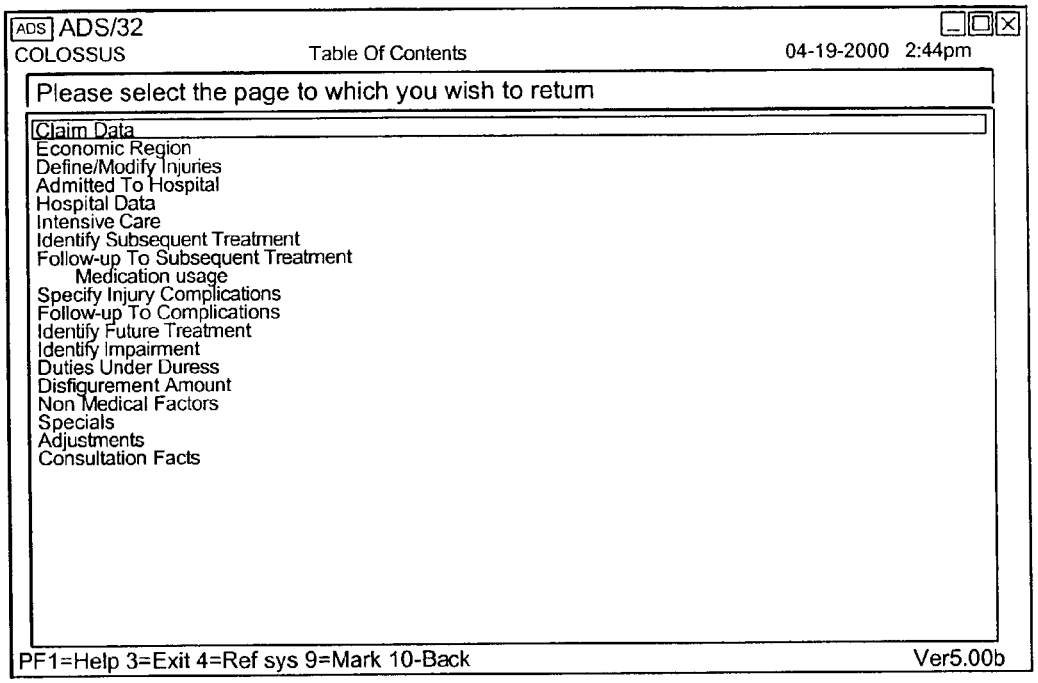
FIG. 5B illustrates a screen shot of a table of contents display screen according to a first embodiment.

In one embodiment, the table of contents (TOC) is a display screen, window, or subset of a screen which shows a roadmap, including one or more applicable steps, for processing an insurance claim. FIGS. 5B and 5Ba depict alternate embodiments of a TOC display screen. The table of contents may include one or more steps required to process insurance claims. Each step has an associated display screen. The table of contents display screen and each step display screen may be configured as an object. The number of steps included in the table of contents may be dynamically and automatically modified in real-time based on business rules, user inputs, etc. The display screen object for the table of contents includes one or more display screen objects, representing intermediary steps, selected from all display screen objects. Each display screen object may include a property, such as Display_In_TOC, which enables the display screen object and corresponding step to be included in the TOC.

In step 110B, the user of the insurance claims processing system 10 may initiate the insurance claim processing by specifying a claim number. The claim number may then be received by the insurance claim processing system 10. In step 120B, a determination may be made as to whether the specified claim number exists in the insurance claims processing system 10, such as in the insurance database 40. If it is determined that the specified claim number is a new claim number, then program control is passed on to step 130B. If a matching record is found in the insurance database 40 for the specified claim number, then program control is passed on to step 150B.

In step 130B, the IC user may set up the claim definition data for a new claim. The setting up of the claim definition data may include providing user inputs through one or more display screens, as defined in the registry for the claim definition data display screen object. Examples of claim definition data provided by the IC user may include, but are not limited to, claimant demographic data such as name, age, address, phone number, etc., injury code information such as neck, spine, arm, etc., and treatment code information such as emergency care, hospital, outpatient, physical therapy, etc. As the IC user steps through one or more display screens to enter claim definition data, the insurance claim processing software 60 may dynamically modify the properties of the display screen objects by using appropriate methods. For example, as an IC user enters and injury code for a neck injury, all relevant and associated display screens will be automatically displayed by using the registry for the display screen object and specific properties such as next display screen and previous display screen of the display screen object. On completing the entry of the relevant inputs associated with the definition of the claim, the IC user may submit a request to display the table of contents screen.

If the claim number is found in step 120B, the insurance claim processing software will generate a request to display the table of contents screen in step 140B. When the IC user has entered the claim definition data for a new claim number in step 130B, a request may be made to display the table of contents screen in step 140B. In step 150B, in response to a request to display the table of contents (TOC) display screen, the insurance claim processing software executes a function or method to generate the TOC display screen. In one embodiment, executing the function to generate the table of contents may include invoking a Create_TOC_Entry method for the TOC display screen object. FIG. 3B describes in further detail a flowchart for a function or method to generate the table of contents. In step 160B, the newly generated TOC display is sent to the display screen 50 for display to the IC user.

FIG. 3B illustrates one embodiment of a program or method to build a table of contents display. In step 152B, the insurance claim processing software, in one embodiment, executes a Create_TOC_Entry method for all display screen objects which have a "True" entry in a Display_In_TOC property field.

In step 154B, the insurance claim processing software 60 verifies that each display screen object has been validated, such as by checking that a Valid_Screen method has been invoked successfully. In one embodiment, the Function Re_Evaluate_All is called prior to displaying the TOC and it validates all pages. This validation process may choose to remove screens from the process because they are no longer appropriate.

In step 156B, a determination is made as to whether the previous screen pointer for the current display screen object is present or is not present. If no previous screen pointer is present, then that display screen object is included in the TOC display screen.

In step 158B, if a previous screen pointer is present and if the source of data property field indicates that the data was entered by a user, then the display screen object is included in the TOC display screen.

In step 159B, the list of display screen objects included with the TOC is returned to the calling function. In one embodiment, the screens are then displayed based on individual logic in their Create_TOC_Entry function. In many cases, this is default behavior. But, in some cases, such as "Conditional Pages," their Create_TOC_Entry logic may choose not to show them because their conditions are not met.

FIG. 4B is a flowchart which further illustrates the use of a table of contents for processing an insurance claim according to one embodiment. In step 500B, the processing of the insurance claim may be initiated by initiating a first step, wherein the processing of the insurance claim includes a plurality of steps. The steps may include screens displayed on the display device 50 coupled to a computer system 10. The insurance claim may include a bodily injury claim, and processing the insurance claim to estimate the value of the insurance claim may include processing the bodily injury claim to estimate a bodily injury general damages value. The steps may include steps for entry of information relevant to the estimate of the value of the insurance claim. The information may include, for example, bodily injury treatment information and/or bodily injury damages information.

In one embodiment, for example, the first step may include the user entering a claim identification number as discussed with reference to FIG. 2B. In another embodiment, entering the claim identification number may already have taken place, and the "first step" may actually include a step such as the entry of an injury code or treatment code during the consultation session.

In step 510B, one or more of the steps in the processing of the insurance claim may be proceeded through to arrive at an intermediary step. For example, the user may enter injury and/or treatment data in response to questions presented in one or more steps. In step 520B, the intermediary step may then be displayed. As used herein, the intermediary step is any step between the first and final steps in the plurality of steps of processing the insurance claim. Proceeding through one or more of the steps in the processing of the insurance claim may include entering information relevant to the estimate of the value of the insurance claim in the one or more of the steps. In step 530B, the entered information may be stored in a memory.

In step 540B, a table of contents may be displayed upon the entry of an appropriate command by the user. For example, the user may select a GUI element such as a button or hit a designated keyboard key to display the table of contents. The table of contents may be generated according to the method discussed with reference to FIG. 3B. The table of contents may include an ordered list of the steps associated with the processing of the insurance claim, and the ordered list of steps may include the first step, the intermediary step, and any steps in between the first step and the intermediary step. Therefore, the table of contents may essentially show a "roadmap" of the business process for processing insurance claims. The ordered list of steps may be dynamically modifiable in response to the entry of information in a step. In other words, steps may be added to or deleted from said dynamically modifiable ordered list of steps in response to the entry of information. In various embodiments, the table of contents may be shown as a display screen, window, or other subset of a screen.

In step 550B, the user may be permitted to select one of the steps from the ordered list of steps associated with the processing of the insurance claim in the table of contents. In step 560B, the selected step may then be displayed in response to the user selecting the selected step in the table of contents. In step 570B, in one embodiment, the entered information in the selected step may be modified and stored after selecting the step in the table of contents.

After displaying the selected step, the intermediary step may be redisplayed upon entry of an appropriate command by the user. In one embodiment, in other words, the user may go back to the previously displayed step, either through the table of contents or through entry of a suitable "back" command. The processing of the insurance claim may be continued after redisplaying the intermediary step by permitting the user to enter additional information relevant to the estimate of the value of the insurance claim.

The ordered list of steps in the table of contents may include a final step. In one embodiment, the final step may be selected at any time from the table of contents. The final step may include a consultation report concerning an estimate of the value of the insurance claim. The consultation report may include information related to the estimate of the value of the insurance claim, wherein the estimate may be calculated based on information entered in the first step and in any steps in between the first step and the intermediary step.

In one embodiment, all or substantially all of the steps associated with using the table of contents may be executed within a single session of an application program executing on a computer system. Therefore, the user of the system need not exit the system and restart from the beginning in order to go back to a previously encountered step.

FIGS. 5B and 5Ba depict screen shots which illustrate an example of a table of contents display screen according to two embodiments.

FIGS. 6B and 6Ba illustrate exemplary properties and methods associated with a display screen object according to two embodiments.

Figure 2C:
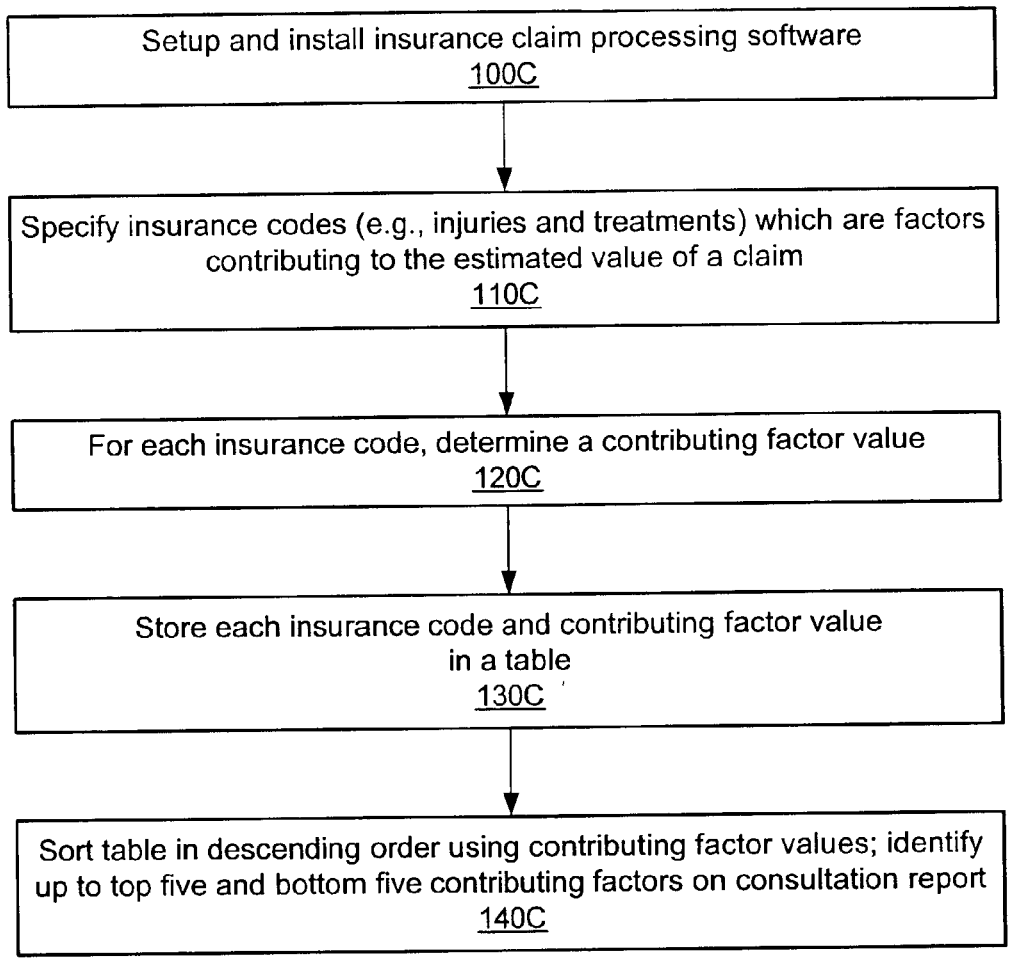
FIG. 2C is a flow chart illustrating the process of identifying critical factors affecting the fair estimate value, included in an insurance claim consultation report, according to one embodiment.

FIG. 2C is a flowchart illustrating a method for identifying one or more contributing factors relevant to an estimate of a value of an insurance claim according to one embodiment. In step 100C, the user of an insurance claims processing system 10 may use a client system 80 to initially configure, define, set up the insurance claim processing system 10. This includes installing and executing the insurance claim processing software or program 60 as well as the insurance database 40. The insurance database 40 may include data for various insurance codes related to injuries and/or treatments. In one embodiment, insurance codes may include injury codes and treatment codes.

In step 110C, one or more insurance codes which are relevant to the value of the insurance claim may be specified in an insurance claims processing program executable on a computer system. Each insurance code may be considered a contributing factor to the estimated value of the insurance claim. These insurance codes may be entered by a user during a consultation session in which a claimant reports his or her injuries and/or treatments for a particular insurance claim. In specifying the one or more insurance codes, a claim number for the insurance claim may be specified, and the one or more insurance codes may be associated with the claim number. The insurance codes may include one or more injury codes, wherein each injury code specifies a bodily injury incurred by the claimant. The insurance codes may include one or more treatment codes, wherein each treatment code specifies a treatment for at least one of the bodily injuries incurred by the claimant.

A consultation report typically includes an estimated value or range of estimated values for each bodily injury claim. In determining the range of fair estimate value, the insurance claims processing system typically uses contributing factor values, along with regional factors such as cost of living, etc. to arrive at a monetary estimate. Contributing factor values due to bodily injury, in one embodiment, are generally directly proportional to the level of trauma experienced during and after the bodily injury. The insurance claims processing system may be operable to calculate a numeric value for an insurance code wherein, for example, the claimant is in a coma and is on life support system because of a bodily injury. Treatment received for the bodily injury, such as hospitalization, surgery, physical therapy, etc. may contribute to decrease the trauma and hence may result in a decrease of the estimated value. In one embodiment, the contributing factors associated with the treatment code may therefore have a negative value.

In step 120C, one or more contributing factor values may be determined. Each of the contributing factor values corresponds to one of the insurance codes, and each of the contributing factor values measures an estimated impact of the corresponding insurance code on the value of the insurance claim. The insurance claim may include a bodily injury claim, and the contributing factor values may be relevant to an estimate of a bodily injury general damages value of the bodily injury claim. Each of the one or more contributing factor values may include a numeric value. In one embodiment, determining the one or more contributing factor values may include calculating the one or more contributing factor values as a function of one or more business rules. In other words, a rules engine or other expert system may be configured to calculate dynamically the amount that each insurance code adds to or subtracts from the estimate of the value of the insurance claim. This amount contributed by one insurance code may be dependent on the amounts contributed by other specified insurance codes. In one embodiment, the expert system may be developed using the PLATINUM Aion™ rule-based development environment available from Computer Associates International, Inc. In one embodiment, this determination of the contributing factor values may take place after substantially all of the insurance codes have been entered and when a consultation report is desired to be displayed.

In step 130C, each of the one or more insurance codes and the corresponding contributing factor values may be stored in a table. An example of such a table is illustrated in FIG. 3C. FIG. 3C shows a table with a column for the insurance codes (e.g., injury codes and treatment codes) 330C and a column for contributing factor values 350. The values shown are for purposes of example only and are not intended to be limiting. The table may include one or more rows, wherein each row of the table includes one of the insurance codes and the corresponding contributing factor value. In one embodiment, the table may be implemented as a table in a relational database. In one embodiment, the table may be implemented in accordance with object-oriented techniques of software design.

In step 140C, the table may be sorted by the contributing factor values to generate a sorted table of contributing factor values 350C and corresponding insurance codes 330C. The table may be sorted by contributing factor value 350C in ascending or descending order. A set of contributing factors (i.e., insurance codes) from the sorted table which meet one or more selection criteria may be identified and reported. The set of contributing factors may be included in a consultation report which may be printed and/or displayed on a display device. The selection criteria may include a selection of the largest positive of the one or more contributing factor values up to a certain quantity, such as five. Therefore, identifying and reporting the set of contributing factors from the sorted table may include identifying and reporting a sorted set of the largest contributing factor values up to the certain quantity. In one embodiment, each contributing factor value in the sorted set of the largest positive contributing factor values adds to the estimate of the value of the insurance claim. The selection criteria may include the largest negative of the one or more contributing factor values up to a certain quantity, such as five. Therefore, identifying and reporting the set of contributing factors from the sorted table may include identifying and reporting a sorted set of the largest negative contributing factor values up to the certain quantity. Each contributing factor value in the sorted set of the largest negative contributing factor values subtracts from the estimate of the value of the insurance claim.

Figure 2D:
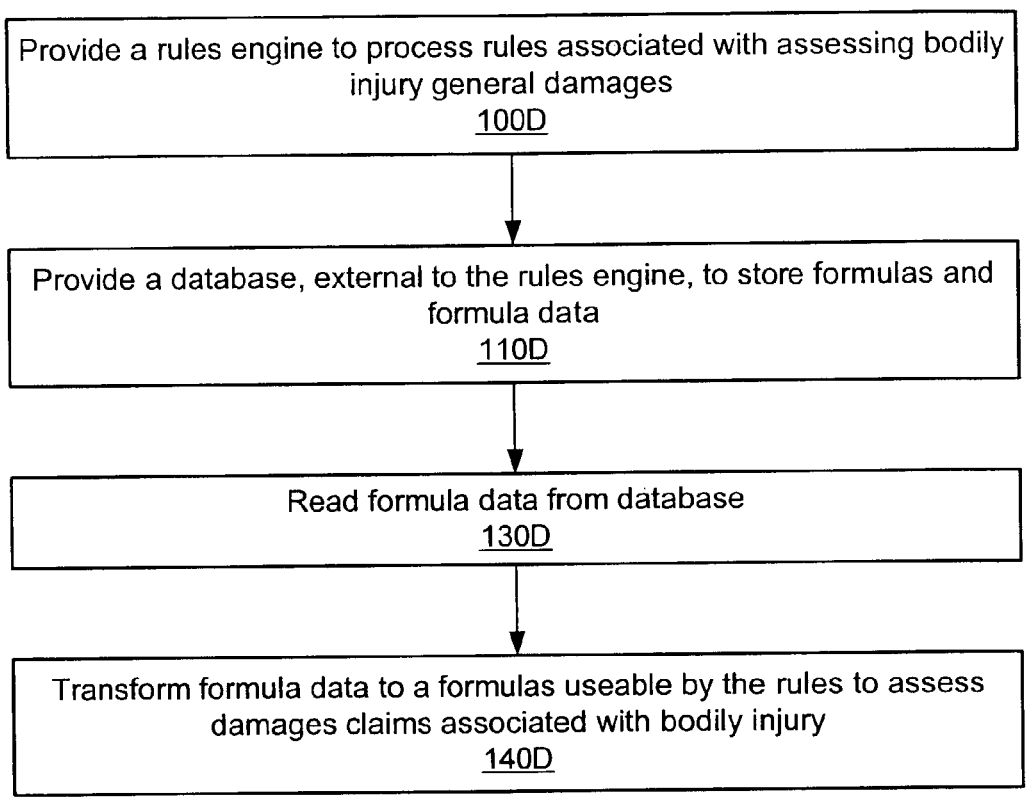
FIG. 2D illustrates a flow chart to transform formula data to formulas for assessing bodily injury damages claims according to one embodiment.

FIG. 2D illustrates one embodiment of a method to transform formula data to formulas for assessing bodily injury damages claims according to one embodiment. In step 100D, the user or the administrator of the insurance claim processing system 20 provides a rules engine, which is capable of processing rules and operating on formulas associated with assessing bodily injury damages claims.

Business rules, often referred to simply as rules, may include executable computer program instructions. The business rules may invoke, operate or execute formulas to calculate trauma severity values associated with personal bodily injury claims. In one embodiment, the formulas include computer commands or logical instructions to achieve a certain mathematical function, e.g., assess trauma severity value for a spinal injury. Each formula, in one embodiment, may include a function operating on one or more inputs to compute one or more outputs. In another embodiment, the formulas may include a plurality of functions operating on one or more inputs to compute one or more outputs. In one embodiment, the function may be mathematical such as add, subtract, divide, etc. In another embodiment, the function may be based on custom algorithms, for example an algorithm to calculate phantom pain associated with bodily injuries. In one embodiment, the insurance claim processing system may include several formula types, wherein each formula may be specified by a unique function. The formulas may be invoked, operated, executed or fired, under the control of the business rules. Only the pertinent formulas, e.g., a subset of all the available formulas, are typically be selected and executed for processing a specific bodily injury damages claim.

In step 110D, the user or the administrator of the insurance claim processing system 20 provides a database 40, which is external to the rules engine, and is capable of storing and/or retrieving information associated with insurance claim processing. As used herein, the term "external" means that the database is separate from the rules engine. The type of information stored and/or retrieved may include, but not be limited to, business objects, tables, formulas, software source code, executable software, etc. In one embodiment, the database may be relational. In another embodiment, the database 40 may be an object-oriented database.

In one embodiment, the database 40 may include a plurality of tables, which may be accessed by a translator program, also referred to as an application program, to transform, create, generate, or instantiate the data stored in the tables into formulas. In one embodiment, the database may include a plurality of knowledge bases often storing knowledge data in the form of tables. Knowledge-bases may include, but not be limited to, data, tables, program instructions, business rules, objects, etc. The data stored in the knowledge bases may also be in the form of objects. In another embodiment, the translator program may transform data stored in tables into static instances of an object class. In one embodiment, for example, the formula data table shown by way of example in FIG. 3D includes data structured in a tabular format, i.e., a table with several rows and columns. In one embodiment, the Formulas class of objects may include static instances wherein each static instance is a direct representation of a row of data in the formula data table. Thus, the formula data table may include all the relevant information necessary to transform each row of the formula data table into a static instance of the Formula object class.

In one embodiment, the entire set of business formulas may be grouped or classified into a plurality of formula types. Each formula may have a common construction style, e.g., a function operating on one or more inputs to compute one or more outputs. In one embodiment, there may be several hundred pre-defined formula types. New formula types to meet user requirement may also be created and added to the existing formula type list or table. Data included in the example formulas data table shown in FIG. 3D may typically include information necessary to create a static instance of the Formula object class. The formula data may include a plurality of entries in a table in a database, and the formula data may include a formula identifier 300D, a sequence number 310D, a section description, a page identifier, a prompt identifier, an answer identifier, a mathematical function or operation 320D, a numeric value 330D, and other suitable elements.

In step 130D, the translator program initiates the transformation of data stored in the formula data table to formulas i.e. the creation of static instances of the Formula object class, by reading the formula data. In one embodiment, methods such as KBOpen and ControlLoad may be used to open and load the formulas data table. Every knowledge base table has a corresponding object class name in the insurance claim-processing program 60. For example, the formula data knowledge base table may have a corresponding formula object class. The contents of each row are read one row at a time.

In step 140D, data entry in each column of the formulas data table is used to transform, or create an instance of the formula class object in the formulas knowledge base. The ControlLoad function determines which set of instances of the Formula class must first be deleted using DeleteInstances ('Formulas') and recreated via Class(Formulas).Load function.

Once created, the instance of the formulas class in the formulas knowledge-base may be invoked, operated, or executed by the business rules by using the calculate method with FormulaID and the sequence number as the parameters. In one embodiment, the calculate method gathers all of the static instances with a specified FormulaID along with a sequence number. The calculate method then interprets the operations and controls how the formula is executed. The resulting output value is used to calculate the trauma severity value.

Although not explicitly shown, Steps 130D and 140D may be repeated, in one embodiment, to read all rows of the formulas data table and transform the data to as many instances of the formulas class. On invocation or execution of the static instance, the insurance claim processing software 60 may compute a trauma severity value applicable to a specific bodily injury claim consultation transaction, and print a consultation report, which summarizes an assessment or estimate of the bodily injury general damages claim.

In one embodiment, the task of updating, modifying, or revising the formulas may be simplified. To update a formula, the user or the administrator of the insurance claim processing system 20 may update the data entries stored in the formulas data table. By executing steps 130D and 140D, the instances of the formulas class may be automatically updated to reflect the changes.

In another embodiment, the task of customizing of formulas to meet specific user requirements may also be simplified. The customizing of formula data in response to business requirements results in customized formulas. To add a new formula type, the user or the administrator of the insurance claim processing system 20 may add a new instance of the formulas class and update the database 40. By executing steps 130D and 140D, the formulas may be automatically customized to reflect the new changes.

FIG. 3D illustrate the tabular structure of the formula data table according to one embodiment. For purposes of example, four columns are illustrated for the table. In one embodiment, the table may comprise fewer or more columns. In one embodiment, the formula data table may be implemented in any number of ways, such as a relational database, in a variety of commercially available database management systems. The formula data table may have as many rows as may be supported by the database management system in which it is implemented. The formula data table may be accessed (e.g., searched, written to, read from, etc.) through a programming interface or standard access mechanism (e.g., SQL) which is supported by the database management system in which the formula data table is implemented.

Figure 2E:
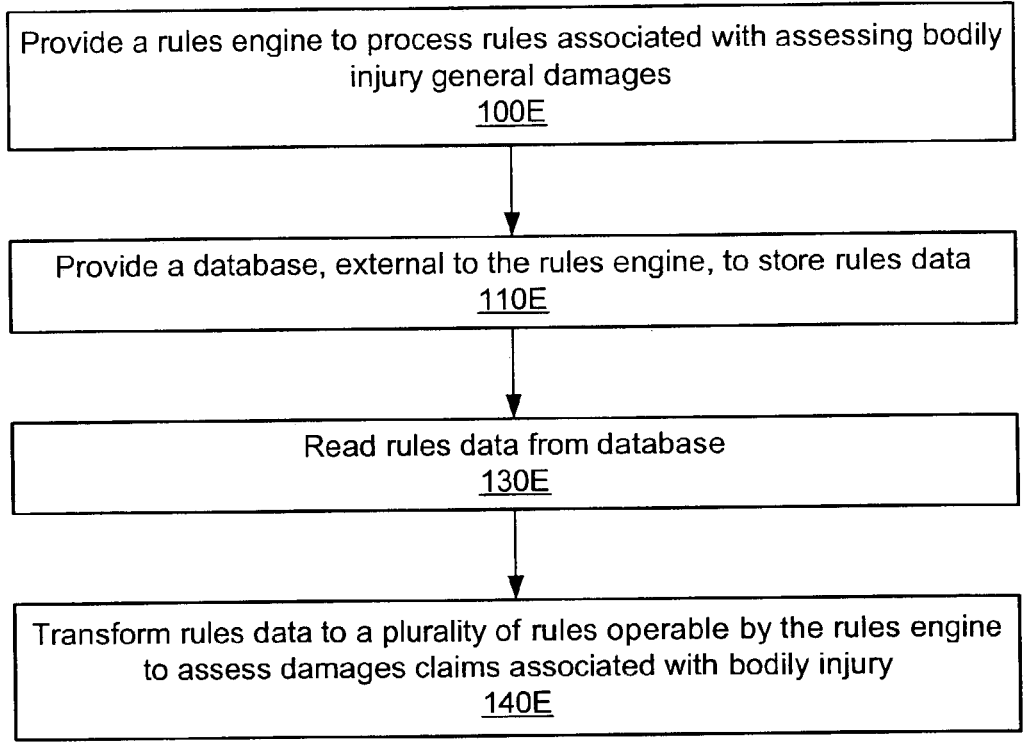
FIG. 2E illustrates a flow chart to transform rules data to rules for assessing bodily injury damages claims according to one embodiment.

FIG. 2E illustrates one embodiment of a method to transform rules data to rules for assessing bodily injury damages claims according to one embodiment. In step 100E, the user or the administrator of the insurance claim processing system 20 provides a rules engine, which is capable of processing rules associated with assessing bodily injury damages claims. The rules engine may be included as part of the insurance claims processing system 10, such as the insurance claims processing program 60, as shown in FIG. 1*a*.

In step 110E, the user or the administrator of the insurance claim processing system 20 provides a database 40, which is external to the rules engine, and is capable of storing and/or retrieving information associated with insurance claim processing. The type of information stored and/or retrieved may include, but not be limited to, business objects, tables, rules, software source code, executable software, etc. In one embodiment, the database may be relational. In another embodiment, the database 40 may be an object-oriented database.

In one embodiment, the database 40 may include a plurality of tables, often referred to as knowledge-bases, which may be accessed by a translator program or other application program to transform, create or generate the data stored in the tables into rules. In another embodiment, the application program may transform data stored in tables into static instances of an object class. In one embodiment, for example, the rules data table as shown by way of example in FIG. 3*a*E includes data structured in a tabular format, i.e., a table with several rows and columns. The rules data table includes all the relevant information necessary to transform each row of the rules data table into an equivalent business rule.

The entire set of business rules may be grouped or classified into a plurality of rule styles. Each rule style may have a common construction style, i.e., the syntax for the rule premise and the resulting rule action may be common. In one embodiment, there may be several hundred pre-defined rules styles. New rule styles to meet user requirement may also be created and added to the existing rule style list or table. Data included in the rules data table shown in FIG. 3*a*E may typically include information necessary to construct the rule premise and the resulting one or more rule actions. In one embodiment, the rules data table shown in FIG. 3*a*E may include, but not be limited to, columns such as an injury code 300E, an adjustment type, an adjustment amount 310E, a rule style 330E, a rule name 320E, etc.

Other types of tables stored in the database 40, in one embodiment, may include a LineText table as shown by way of example in FIG. 3*c*E and a Template table as shown by way of example in FIG. 3*b*E. The LineText table may store lines or other elements of text which may be used to generate the rules. The Template table may include information which may be used by the application program to read each row of data from the rules data table and transform, create or generate the rules data into a rule. In one embodiment, every rule style may have an entry in the Template table. The location to store the transformed rule, the name of the rules data table, the name of the rule style, an identifier for the line text, etc. may also be included in the Template table, in one embodiment.

In step 130E of FIG. 2E, the application program initiates the transformation of data stored in the rules data table to rules by reading the rules data. In one embodiment, the KBOpen and the ControlLoad methods may be used to open and load the rules data knowledge base table. In one embodiment, every knowledge base table has a corresponding object class name in the insurance claim-processing program 60. The contents of each row are read one at a time.

In step 140E, data entries in each column of the rules data table are used to transform, create, or construct the rules. Entries for columns like rules style and rules name in the rules data table may be used as a key to find a matching record in the Template table. Other data stored in the columns of the rules data may be used to build the rule premise and/or the resulting one or more rules action.

The specific syntax used to construct the rule is specified in the Template for a given rule style 330E and a rule name 320E. For example, in one embodiment, rule style RS000 and rule name RN000 may specify:

IFMATCH Col#1 WITH Col#2=Col #3 THEN Col#4=Col#5 where Col#1 through Col#5 entries may be read from data stored in columns 1 through 5 of the rules data table shown in FIG. 3aE and where rule style=RS000 and rule name=RN000. The text string corresponding to the above transformed rule may be stored in the Line_Text 370E field of the LineText table shown in FIG. 3cE using Line_TextID 360E as a location reference obtained from the Template table shown in FIG. 3bE.

Although not explicitly shown, Steps 130E and 140E may be repeated, in one embodiment, to read all rows of the rules data knowledge base table and transform the data to a plurality of rules. On execution of the plurality of rules, applicable to a specific bodily injury claim consultation transaction, the insurance claim processing software 60 may print a consultation report, which summarizes an assessment for the bodily injuries claim.

In one embodiment, the task of updating, modifying or revising of rules may be simplified. To update a business rule, the user or the administrator of the insurance claim processing system 20 may update the data entries stored in the rules data table. By executing steps 130E and 140E, the rules may be automatically updated to reflect the changes.

In another embodiment, the task of customizing of rules to meet specific user requirements may also be simplified. To add a new business rule or structurally modify an existing rule, the user or the administrator of the insurance claim processing system 20 may add a new entry to the rule style and rule name table and update the database 40. By executing steps 130E and 140E, the rules may be automatically customized to reflect the new changes.

FIGS. 3aE, 3bE and 3 cE illustrate the tabular structure of the Rules data Table, Template Table and Line Text Table according to one embodiment. Only four columns are illustrated for each of the table. In one embodiment, each of the tables may comprise more or fewer columns. In one embodiment, the tables may be implemented in any number of ways, such as a relational database, in a variety of commercially available database management systems. The tables may have as many rows as may be supported by the database management system in which they are implemented. The tables may be accessed (e.g., searched, written to, read from, etc.) through a programming interface or standard access mechanism (e.g., SQL) which is supported by the database management system in which the tables are implemented. The data shown in the various tables in FIGS. 3aE, 3 bE, and 3 cE are for purposes of example only and are not intended to be limiting.

Figure 4E:
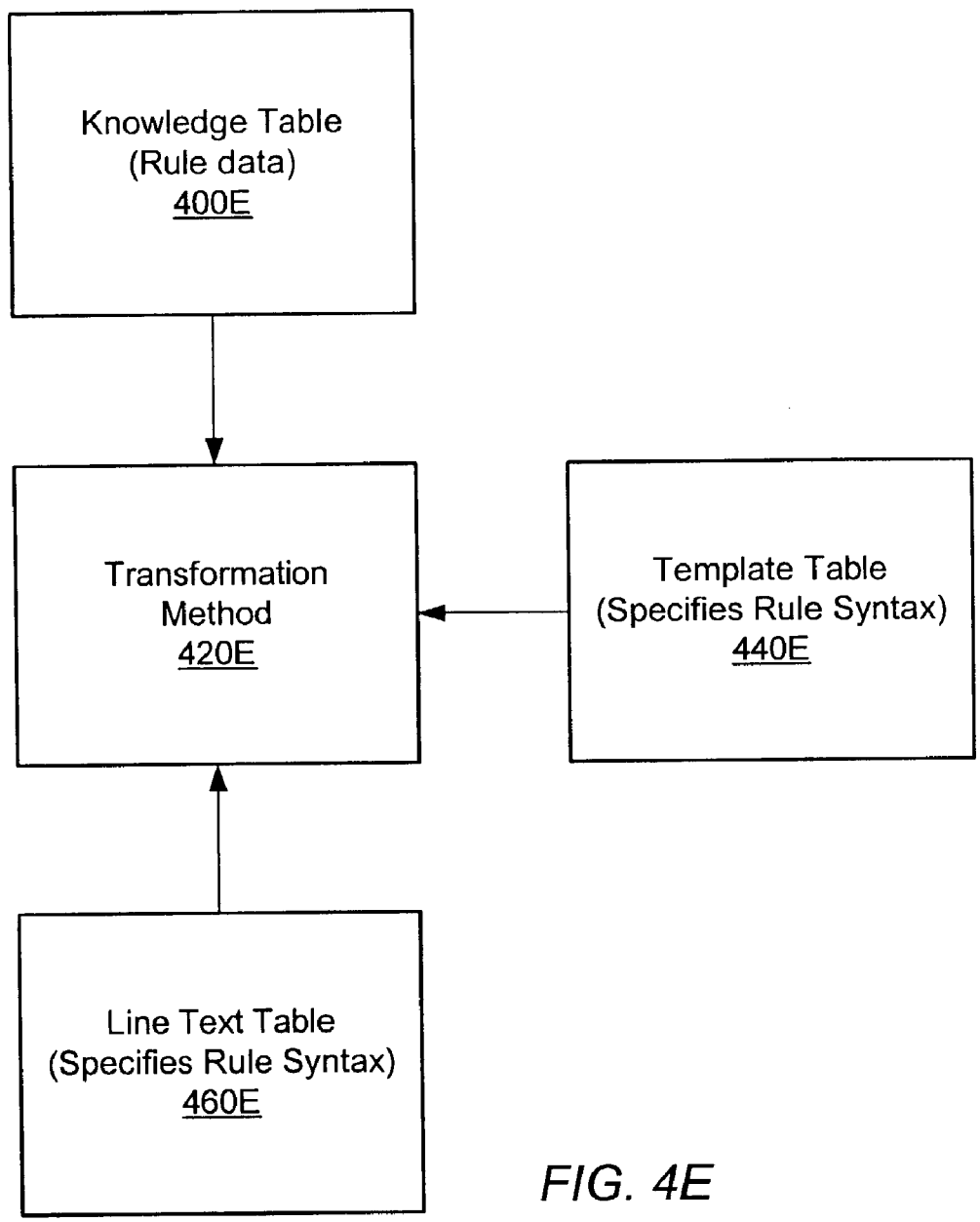
FIG. 4E illustrates a block diagram of the transformation of rules data to rules for assessing bodily injury damages according to one embodiment.

In FIG. 4E, an embodiment of the transformation of rules data to rules may include a knowledge table 400E. In one embodiment, the knowledge table may be a rules data table as shown in FIG. 3aE. In one embodiment, the knowledge table 400E includes data necessary to transform, build, create, define, or generate rules based on a specified rule structure. The transformation method 420E (as discussed in greater detail with reference to FIG. 2E) orchestrates the combining of the data from the knowledge table 400E and the rule syntax specified in the Template table 440E. The transformation method 420E may save the rule as text in an associated knowledge base or insurance database.

Figure 2F:
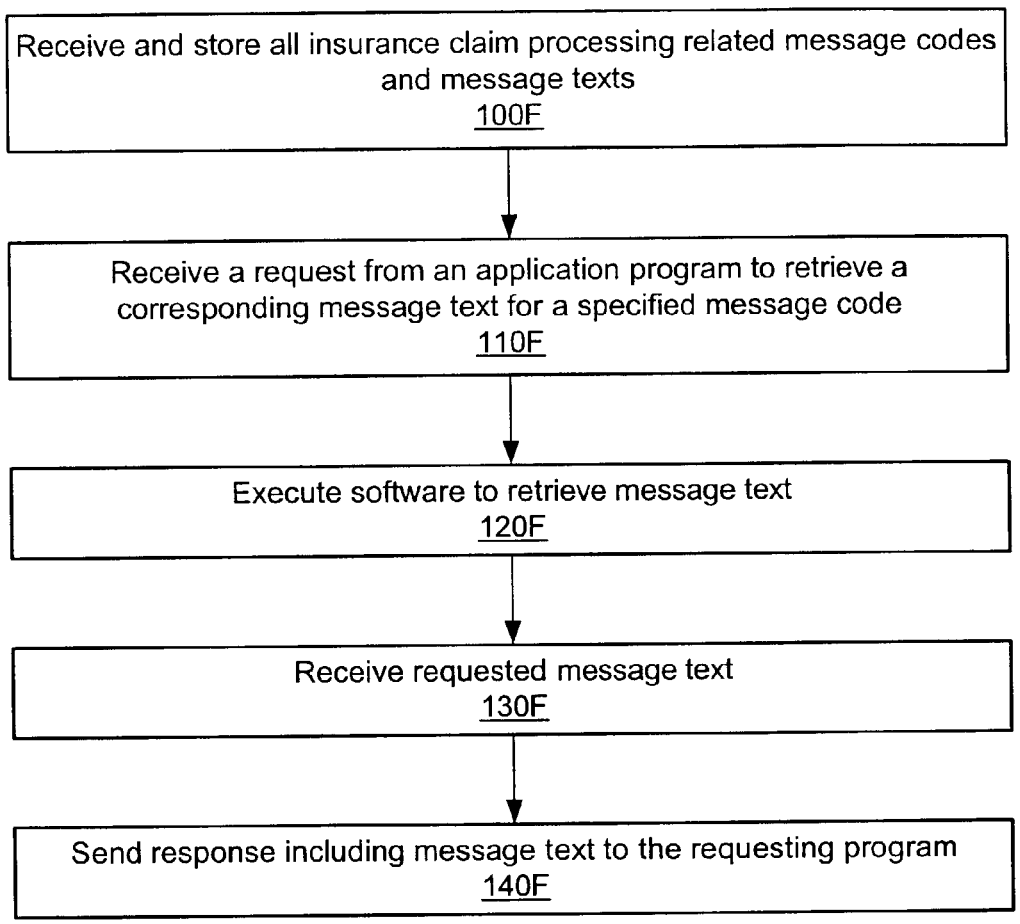
FIG. 2F is a flowchart illustrating a method of generating messages associated with processing an insurance claim according to one embodiment.

FIG. 2F is a flowchart illustrating the generation of a message for processing an insurance claim by an insurance claim processing system, according to one embodiment. In step 100F, the user of insurance claims processing system 10 may use a client system 80 to initially configure, set up, install and store the software associated with the insurance claims processing system, including all the messages.

In one embodiment, a message may be defined by a message code and a corresponding message text and, both the message code as well as the message text stored in a message table. In another embodiment, as shown in FIG. 4F, the message code may further include a message section 300F and a message code identifier 310F. The combination of a specific message section and a specific message code identifier uniquely specifies or selects the message text 320F from the message table.

The initial configuration may include specifying or selecting a country and/or a language for the installation. In one embodiment, the selection of a language and/or a country may automatically select a corresponding message text stored in a database. In another embodiment, the user may modify the message text during the installation process.

In step 110F, the application program software executing in the insurance claims processing system 10 may initiate a request to display a message. This may be in response to the execution of code in another portion of the application program software, in response to a previous user input and/or in response to the execution of a business rule.

In step 120F, the request to retrieve message text is processed further. In one embodiment, the request may be further processed by another portion of the application program software by invoking the GetMessageText method of the Message object, and including values for MsgSectionIn and MsgCodeIn arguments associated with the GetMessageText method. In another embodiment, the processing of the request may include executing software of a subroutine function to retrieve a corresponding message text for a given message code passed along by the requesting program as an input. The message text may be retrieved from a database, in one embodiment or from an object repository in another embodiment.

In step 130F, the message text corresponding to a specified message code is received from step 120F. In step 140F, the requested message text is sent to the requesting program for display.

Figure 3F:
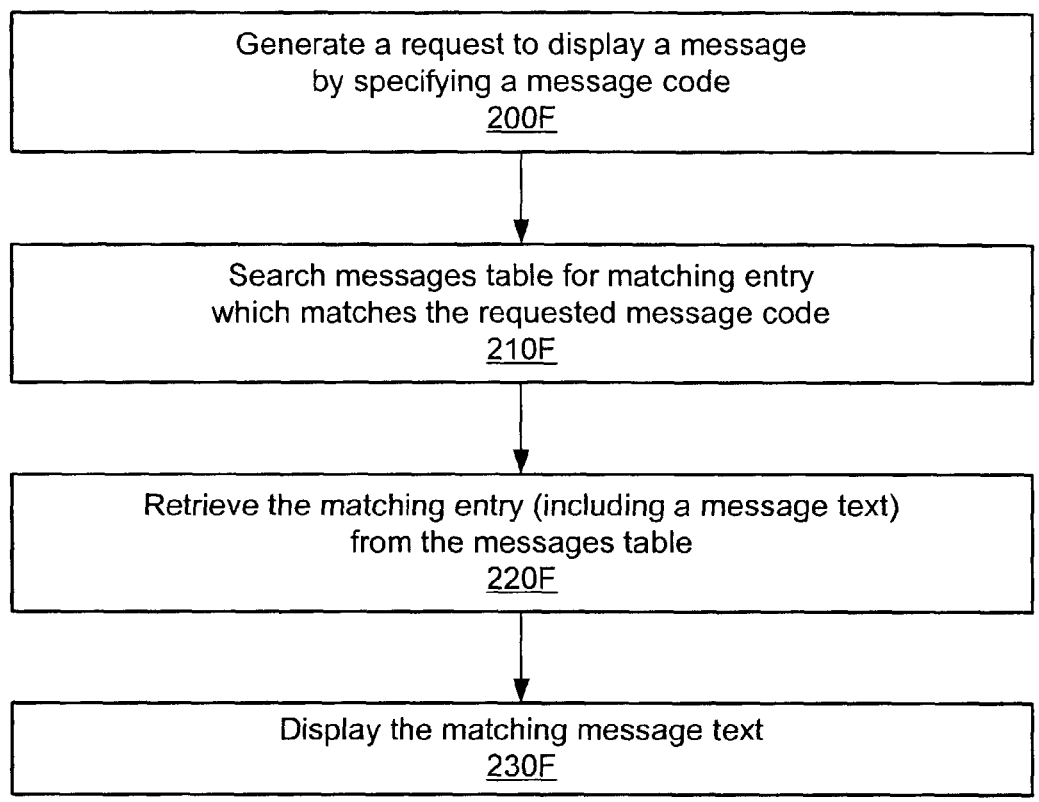
FIG. 3F is a flowchart illustrating a method of using a messages table associated with processing an insurance claim according to one embodiment.

FIG. 3F is a flowchart illustrating a method of using a messages table associated with processing an insurance claim according to one embodiment. In step 200F, an insurance claims processing program may generate a request to display a message, wherein the request may include a requested message code. Each message code may include a sequence of alphanumeric values, wherein each sequence is unique relative to the other sequences. In one embodiment, each message code may include a message section and a message code identifier, as further illustrated in FIG. 4F.

In step 210F, a messages table in a database may be searched for a matching entry which matches the requested message code. The table may store a plurality of entries including the matching entry, wherein each entry in the table may include a message code and a corresponding message text. The database may be implemented, for example, as a relational database or an object-oriented database.

In step 220F, the matching entry may be retrieved from the table in response to said searching the table for the matching entry which matches the requested message code, wherein the matching entry comprises a matching message text.

In step 230F, the matching message text corresponding to the requested message code may be displayed by the insurance claims processing program on a display device coupled to a computer system. The message text may be configured to assist a user in processing an insurance claim using the insurance claims processing program.

In various embodiments, the message text of each entry in the table may be specified during an installation of the insurance claims processing program, on a computer system and/or during an installation of the table on a computer system. The message text of each entry in the table in the database may be updated by re-installing the table on the computer system without re-installing the insurance claims processing program on the computer system. The message text of one or more entries in the table may be customized for a particular insurance organization during an installation of the insurance claims processing program on a computer system. Additionally, the message text of one or more entries in the table may be localized for use in a particular geographical location.

In one embodiment, the insurance claim may include a bodily injury claim, and processing the insurance claim may include processing the bodily injury claim to estimate a bodily injury general damages value. The requested message text may include information relevant to an estimate of a value of the insurance claim. The requested message code may include an injury code which identifies a specific bodily injury, and the requested message text may include a name of the specific bodily injury. The requested message code may include a treatment code which identifies a specific injury treatment, and the requested message text may include a name of the specific injury treatment.

FIG. 4F is an exemplary diagram of a messages table in a database according to one embodiment. In one embodiment, the messages table may include columns such as message section 300F, message code identifier 310F, and message text 320F. In one embodiment, the messages table may be implemented in any number of ways, such as a relational database, in a variety of commercially available database management systems. The messages table may have as many rows as may be supported by the database management system in which it is implemented. The messages table may be accessed (e.g., searched, written to, read from, etc.) through a programming interface or standard access mechanism (e.g., SQL) which is supported by the database management system in which the messages table is implemented.

Additional Improvements

In an embodiment, executable program code used to form at least portions of an insurance claim processing system may be generated from a plurality of business rule components. As used herein, a "business rule component" may refer to a portion of a business rule. In general, business rule components may include templates, program instructions, variables and/or parameters. The business rule components may be stored in one or more database tables (such as are described with reference to FIGS. 3aE, 3bE, 3cE, and 4F). For example, program code defining one or more business rules used in the system may be formed from at least two business rule components. Each business rule component may be an entry in a database table. In such an embodiment, two or more entries in at least one database table may be combined to form source code for the one or more business rules. The source code may be compiled to form executable code. As used herein, "compiling" refers to transforming from source code (e.g., program instructions, data, etc. provided by a programmer) into computer-executable code. In other embodiments, the source code may include one or more executable script program instructions. As used herein, a "script" refers to a computer-executable program code that does not require a compiling step to be executable on a computer system.

In an embodiment, one or more database tables used to form business rules may include at least one table having entries that correspond to business rule templates. As used herein, a "business rule template" may refer to a business rule component that includes business rule structure information.

As used herein, "business rule structure information" may refer to data specifying a general outline or arrangement of one or more business rules. Business rule structure information may include references to one or more other business rule components. For example, business rule structure information may refer one or more program instructions, one or more business rule variables, and/or one or more business rule parameters. In embodiments described herein, one or more business rule components may be contained in one or more database tables. As used herein, a first business rule component may be said to "refer" to a second business rule component if either the first business rule component or the second business rule component may be used to determine (e.g., access, identify, find the value of, etc.) the other business rule component. Additionally, a first business rule component may be said to "refer" to a second business rule component if either the first business rule component or the second business rule component is associated with data (e.g., a database key) that may be used to determine (e.g., access, identify, find the value of, etc.) the other business rule component.

In an embodiment, one or more database tables used to form business rules may include at least one table having entries that correspond to business rule program instructions (as described with reference to FIG. 3aE). As used herein, a "program instruction" may refer to a computer-executable command. As used herein, one or more program instructions may be combined to form a "program code." A business rule program instruction may include references to one or more other database table entries. For example, a business rule program instruction may refer to one or more other program instructions, one or more business rule variables, and/or one or more business rule parameters.

In an embodiment, one or more database tables used to form business rules may include at least one table having entries that correspond to business rule variables. As used herein, a "business rule variable" may refer to a business rule component that represents a variable in the business rule program code. A business rule variable may include references to one or more other business rule components. For example, a business rule variable may refer to one or more other business rule variables and/or one or more business rule parameters.

In an embodiment, one or more database tables used to form business rules may include at least one table having entries that correspond to business rule parameters. As used herein, a "business rule parameter" may refer to a business rule component that represents a fixed value in the business rule source code. The value represented by a business rule parameter may be specific to a given business rule, business rule variable, business rule program instruction and/or business rule template. For example, two or more business rules may be formed using the same business rule template, the same program instructions, the same business rule variables, and one or more different business rule parameters.

Figure 12:
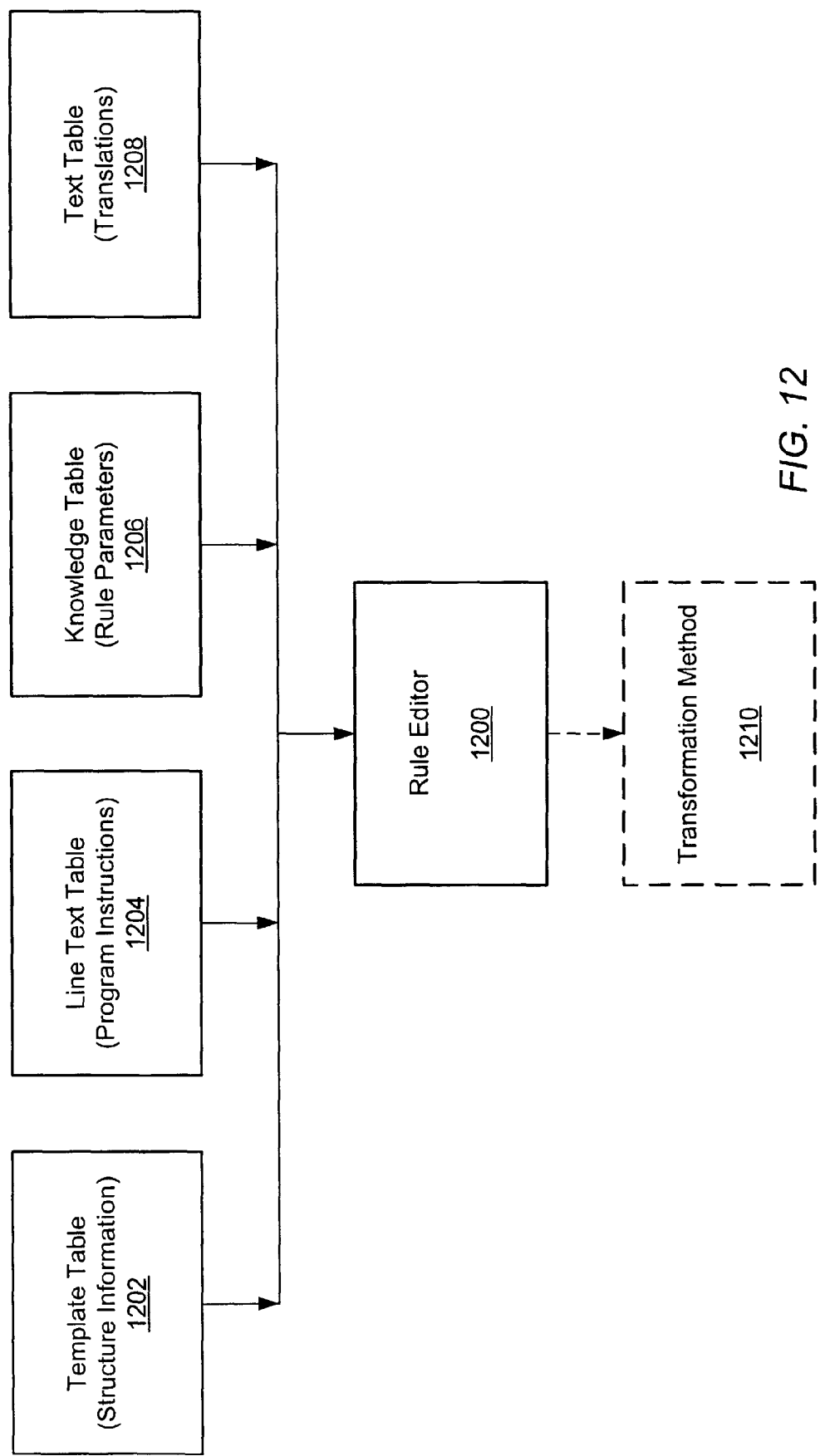
FIG. 12 illustrates an embodiment of a block diagram of a rule editor and associated database tables.
Figure 16:
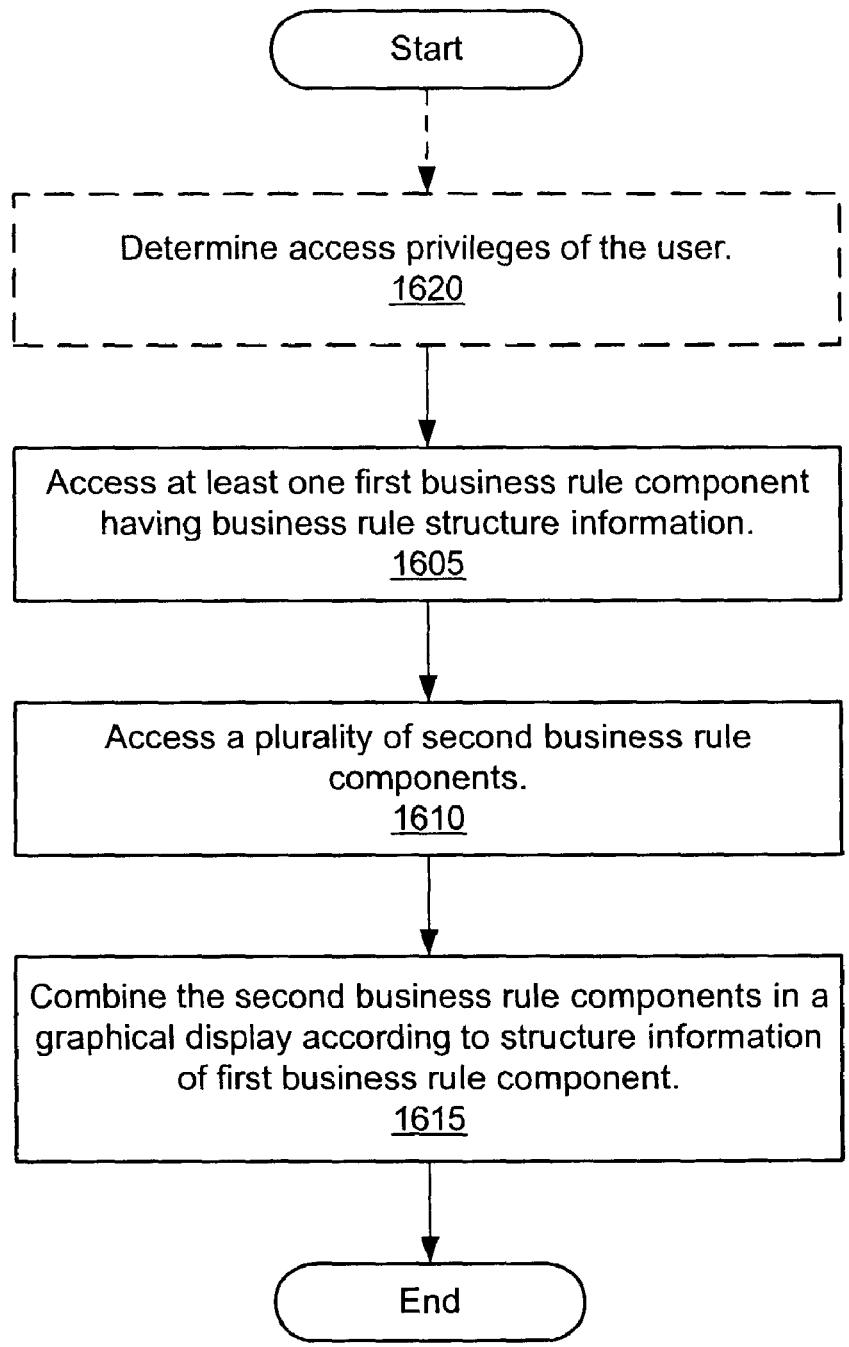
FIG. 16 depicts an exemplary embodiment of a method of providing a graphical interface of an insurance claim processing business rule.

In an embodiment, business components may be combined in a transformation method, as described with reference to FIG. 2E. In another embodiment, two or more business rule components may be combined in a rule editor, generally referenced by numeral 1200 in FIG. 12. As used herein, a "rule editor" may refer to a computer-executable program that combines business rule components to form a graphical display of at least a portion of at least one business rule. For example, in the embodiment depicted in FIG. 12, rule editor 1200 may combine business rules stored in one or more template tables 1202, one or more line text tables 1204, one or more knowledge tables 1206 and/or one or more text tables 1208 to form a display of at least a portion of at least one business rule. In such an embodiment, template table 1202 may include one or more business rule templates. Line text table 1204 may include one or more program instructions. Knowledge table 1206 may include one or more values for one or more business rule parameters. Text table 1208 may include one or more human language translations of one or more other business rule components. An advantage of such embodiments may be that viewing source code may be simplified as compared to embodiments where a user views individual component entries in one or more database tables. FIG. 16 depicts an embodiment of a method of generating a graphical display of at least a portion of at least one business rule in a rule editor. In certain embodiments, rule editor 1200 may combine the business rule components and a transformation method 1210 may compile the source code. Alternately, a transformation method may be incorporated into rule editor 1200.

In step 1605 of FIG. 16, at least one first business rule component may be accessed. At least one first business rule accessed may include business rule structure information. For example, at least one first business rule accessed may include a business rule template. At step 1610, a plurality of second business rule components may be accessed. For example, the second business rule components may include program instructions, business rule variables and/or business rule parameters. In certain embodiments, the first and/or second business rule components may be stored as entries in one or more database tables. At step 1615, a number of the second business rule components accessed may be arranged in the graphical display as directed by the structure information. For example, if the structure information includes an equation listing several variables in a given order, the variables may be displayed in the rule editor as directed by the equation. In another example, the plurality of second business rule components may include two or more program instructions. Step 1615 may include arranging the program instructions as specified in the business rule structure information, as described with reference to FIGS. 3aE, 3bE and 3cE. In certain embodiments, a method of generating a graphical display of at least a portion of at least one business rule in a rule editor may also include determining access privileges of the user, as depicted in step 1620. Based on the user's access privileges some information may be inhibited from being displayed.

Figure 13:
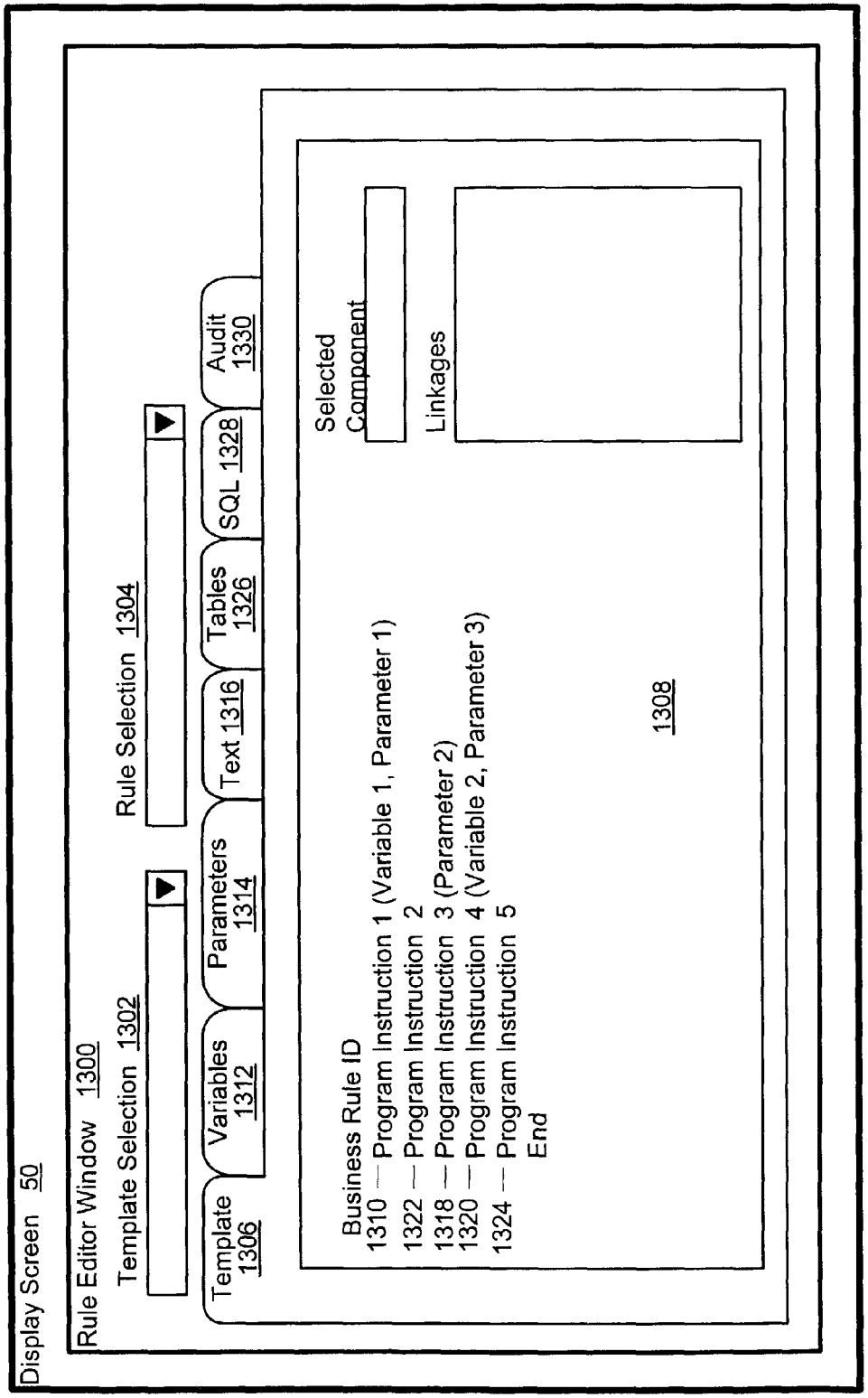
FIG. 13 depicts an exemplary embodiment of a rule editor display screen showing a template tab.

A graphical display of a rule editor may include multiple views of at least a portion of at least one business rule. In an embodiment, a plurality of views may be displayed as tabs in a display window. For example, an exemplary embodiment of a graphical display of a rule editor is depicted in FIG. 13 and generally referenced by numeral 1300. Each tab of rule editor display 1300 may correspond to a business rule component and/or a level of access privileges. In such embodiments, only users having appropriate access privileges may view and/or modify information in certain tabs. For example, the rule editor may be configured to allow users to view information on all of the tabs. However, only users having special access privileges may be permitted to modify the information. Alternately, a user's access privileges may also be used to inhibit display of certain information or tabs. In another example, users having a first level of access privileges may modify business rule parameters in the rule editor, but may not change other data. In such cases, users having a second level of access privileges may be allowed to modify business rule variables, templates and/or program instructions, but may not be allowed to modify values of business rule parameters. Users having a third level of access privileges may be allowed to modify any business rule component. In each of the example cases, modifications to database tables based on user modifications in the graphical display may be made immediately or stored in memory until approved.

Figure 14:
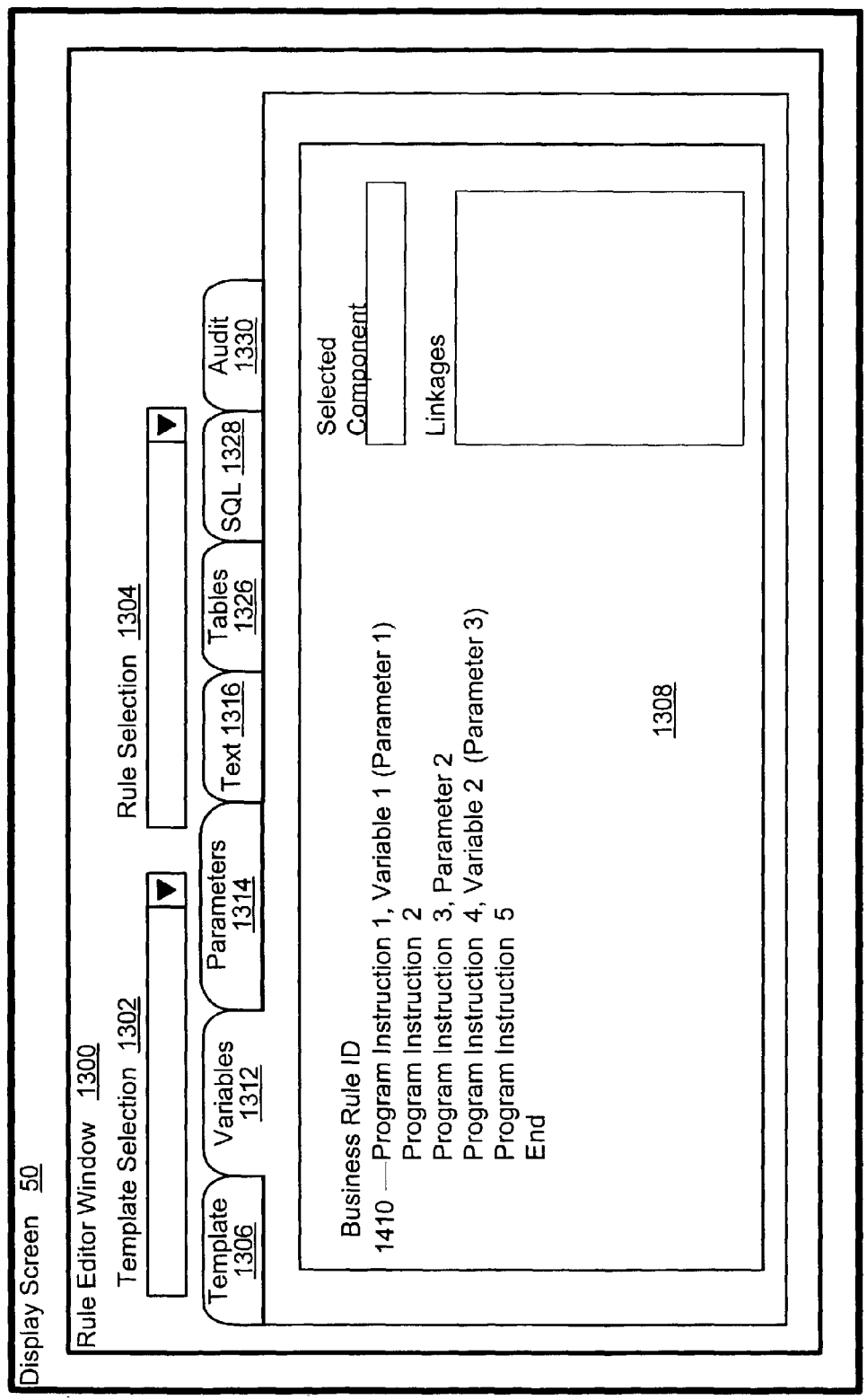
FIG. 14 depicts an exemplary embodiment of a rule editor display screen showing a variable tab.
Figure 15:
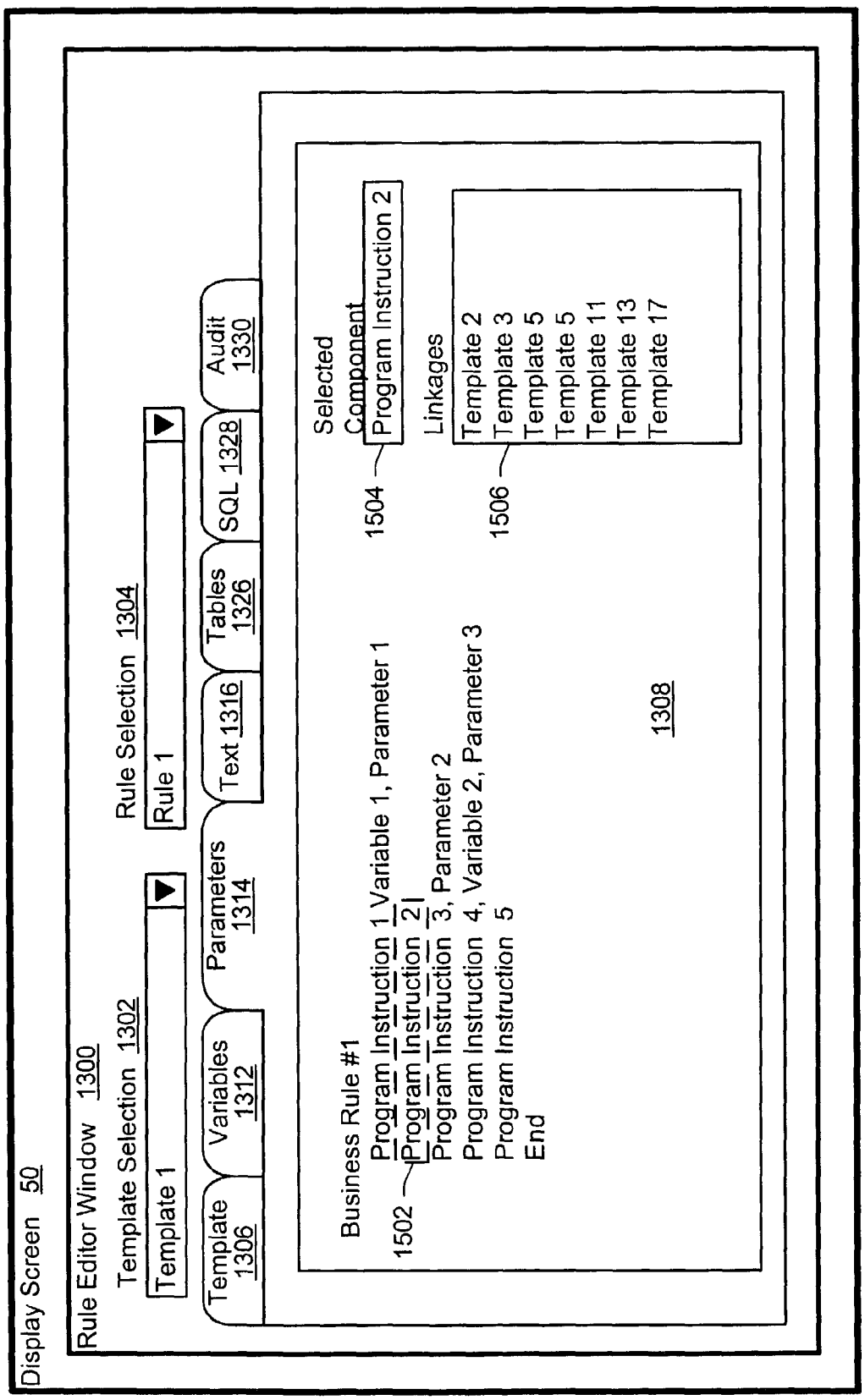
FIG. 15 depicts an exemplary embodiment of a rule editor display screen showing a parameter tab.

In an embodiment, a user may access a display of a business rule template by selecting Template tab 1306. In such an embodiment, the user may specify a template to be displayed by selecting a template from template selection field 1302. The user may specify a particular business rule to display by selecting the business rule in business rule field 1304. The specified business rule may be displayed in rule display 1308. Rule display 1308 may include a display of a plurality of program instructions (e.g., "program instruction 1", "program instruction 2", etc.). The program instructions may be arranged sequentially in the order of execution of the instructions, as is common to computer program code. A program instruction may refer to one or more business rule variables and/or one or more business rule parameters. For example, program instruction 1 (referenced by numeral 1310) is depicted as being a function of "variable 1" and "parameter 1". Likewise, program instruction 3 (1318) is depicted a being a function of "parameter 2". In addition, program instruction 4 (1320) is depicted as being a function of "variable 2" and "parameter 3". In various embodiments, rule display 1308 under template tab 1306 may include data specific to the selected business rule. For example, a value of a business rule parameter may be specific to an individual business rule. The value of the parameter may be displayed in rule display 1308. In some embodiments, a template may be used to form a number of different business rules. In such embodiments, rule display 1308 may not include data particular to an individual business rule. Rather, rule display 1308 may include information pertaining to all business rules formed using the template. For example, an identifying descriptor may be displayed for "parameter 1" and/or "variable 1" rather than a particular value. In an embodiment, information specific to a selected business rule may be displayed by selecting the appropriate tab. For example, if the user selects variables tab 1312, variables specific to the selected business rule may be filled into the program instructions, as depicted in FIG. 14. If the user selects parameters tab 1314, parameters specific to the selected business rule may also be filled in to the program instructions, as depicted in FIG. 15.

In addition to allowing the user to view business rule source code, rule editor 1200 may allow the user to modify business rule components. In certain embodiments, modifications made in the rule editor may modify one or more database table entries. For example, in FIG. 14 program instruction 1410 refers to a "variable 1". The user may modify program instruction 1410 in the rule editor to refer to a "variable 2". In such embodiments, a database table entry corresponding to program instruction 1410 may be changed to include a reference to the variable 2. In other embodiments, changes made by the user may be stored in a memory without being made to a database table. An advantage of such embodiments may be that the changes stored in memory may be verified and/or approved by another user before changes are made to a database table. In certain embodiments, a rule editor may determine a user's access privileges before or during display of a business rule. The user's access privileges may be used to determine portions of the business rule that the user may change. In addition, the user's access privileges may be used to determine whether changes made by the user are made in one or more database tables or stored in memory for verification by another user. An advantage of such embodiments may be that business rules may be modified by users without substantial programming experience without fear of contaminating the one or more business rule database tables, since experienced programmers may be used to verify entries and/or changes.

Figure 17:
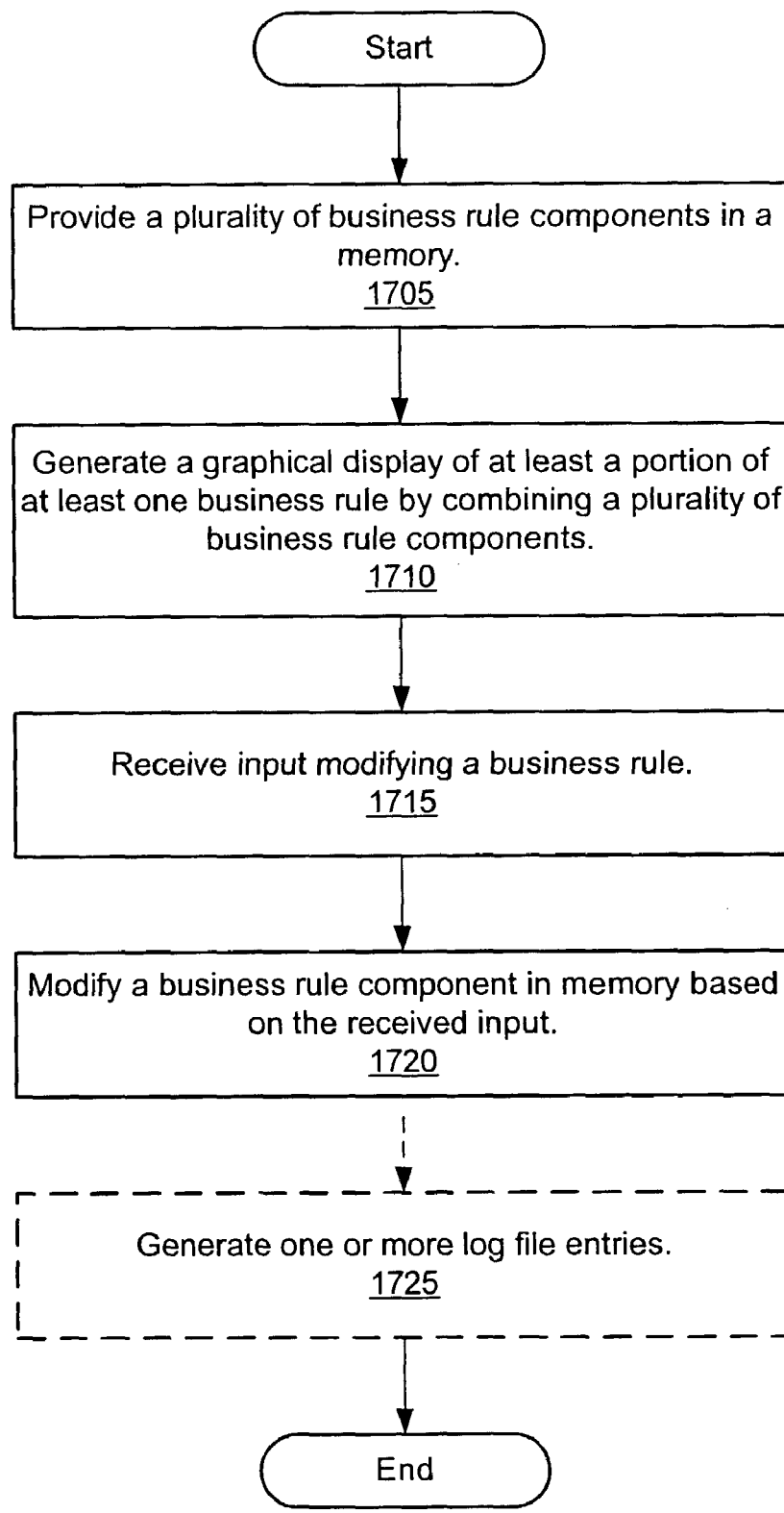
FIG. 17 depicts an exemplary embodiment of a method of providing an interactive graphical interface of an insurance claim processing business rule.

FIG. 17 depicts an embodiment of a method of modifying a business rule in a rule editor. Step 1705 states that a plurality of business rule components may be provided in a memory of a computer. For example, business rule components may be provided as entries in one or more database tables. The business rule components may include, but are not limited to: business rule templates, program instructions, business rule variables and/or business rule parameters. A plurality of business rule components may be combined in a graphical display to form a display of at least a portion of at least one business rule in step 1710. At step 1715, input may be received including one or more modifications to at least the displayed business rule. For example, the input may be received from a user or another computer. At least one business rule component may be modified in the memory of the computer based on the one or more modifications input at step 1720. For example, one or more SQL commands may be generated to modify one or more database entries. As used herein, "SQL" is a generic term that refers to a programming interface or standard access mechanism usable to access, modify and/or otherwise interact with a database table. The term is not intended to refer exclusively to query languages that meet certain established standards for structured query languages. Rather, the term is intended to refer broadly to any computer executable method usable to access and/or modify database tables. As used herein, an "SQL command" refers to an individual program instruction that is executable to access, modify and/or otherwise interact with a database table. Additionally, in certain embodiments, one or more log file entries may be generated and stored in memory, as shown in step 1725 (depicted in dotted lines to indicate that this step may not always be present).

Figure 18:
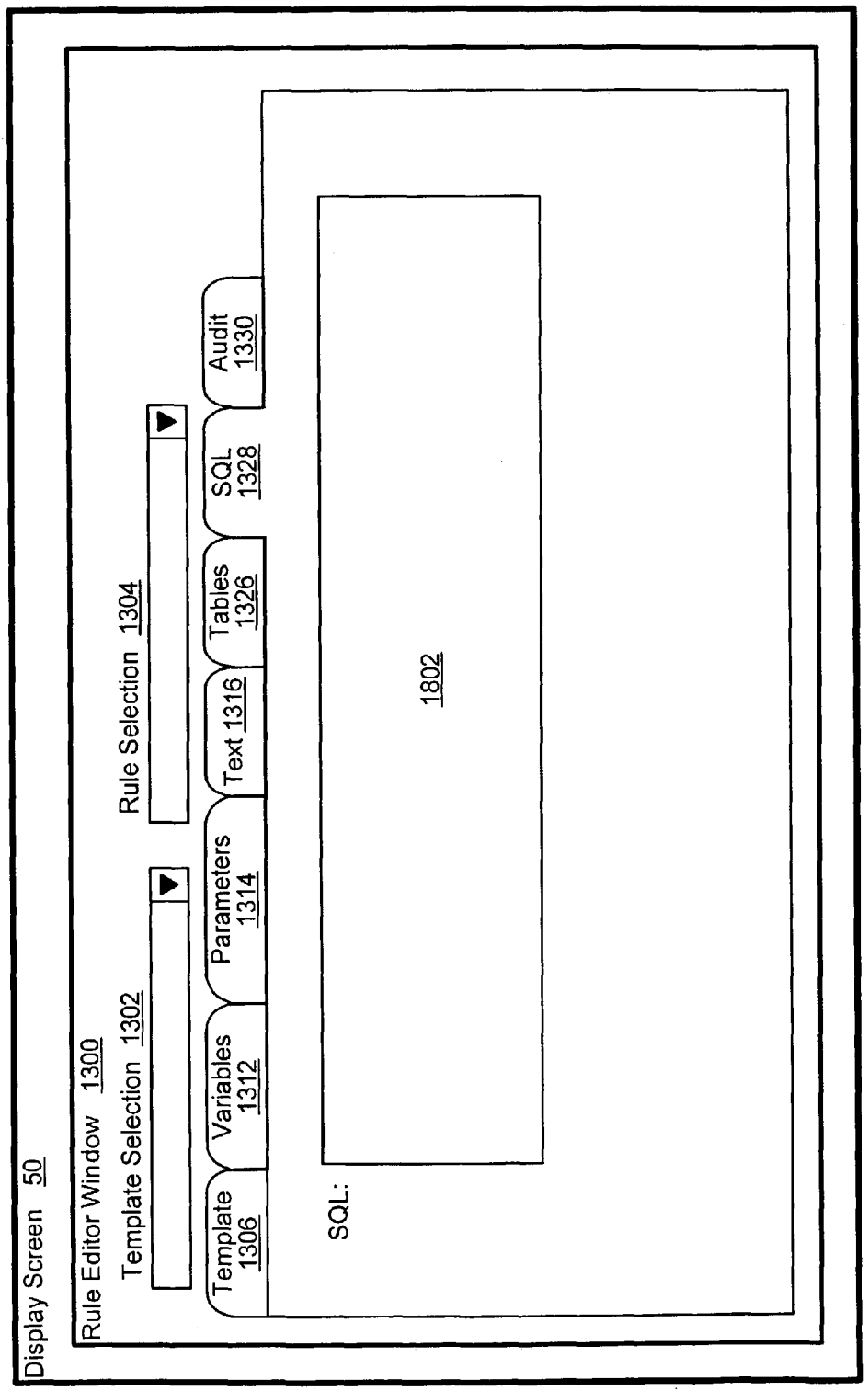
FIG. 18 depicts an exemplary embodiment of a rule editor display screen showing an SQL tab.

In an embodiment, a rule editor display may allow a user to interact with one or more database tables directly using SQL commands. For example, by selecting SQL tab 1328, the user may be presented with an SQL command entry field 1802, as depicted in FIG. 18. SQL command entry field 1802 may allow the user to execute a full range of SQL commands supported by the database management system in which the database tables are implemented. Alternately, SQL command entry field 1802 may allow the user to execute only a restricted set of SQL commands. In some embodiments, SQL commands that may be executed from SQL command field 1802 may be restricted based on the access privileges of the user.

In certain embodiments, a method of modifying a business rule in a rule editor may include determining what changes a user has input. For example, the user may make changes to a business rule in a graphical display of at least a portion of the business rule. The rule editor may compare the content of the graphical display to components of the business rule stored in memory to determine what changes the user has made. For example, the rule editor may determine what changes the user has input if one or more trigger events occur. Trigger events may include making a new selection (e.g. selecting a new business rule component, business rule, tab, etc.). Trigger events may also include closing the rule editor, activating a "save changes" feature or another keystroke or mouse movement. Trigger events may also include passing of a determined period of time (e.g., 5 minutes).

In an embodiment, a rule editor may provide a user with a listing of business rule components contained in one or more database tables. In such embodiments, the user may select two or more of the business rule components and combine the two or more components in the graphical display to form a new business rule. Alternately, the user may create one or more new business rule components in the graphical display. For example, the user may enter one or more new lines of program instruction. In another example, a new business rule template may be created by specifying an order of program instructions, business rule variables and/or business rule parameters in a business rule. The one or more new business rule components may be saved in one or more database tables. The one or more new business rule components may be combined with one another and/or with previously existing business rule components to form a new business rule.

Figure 19:
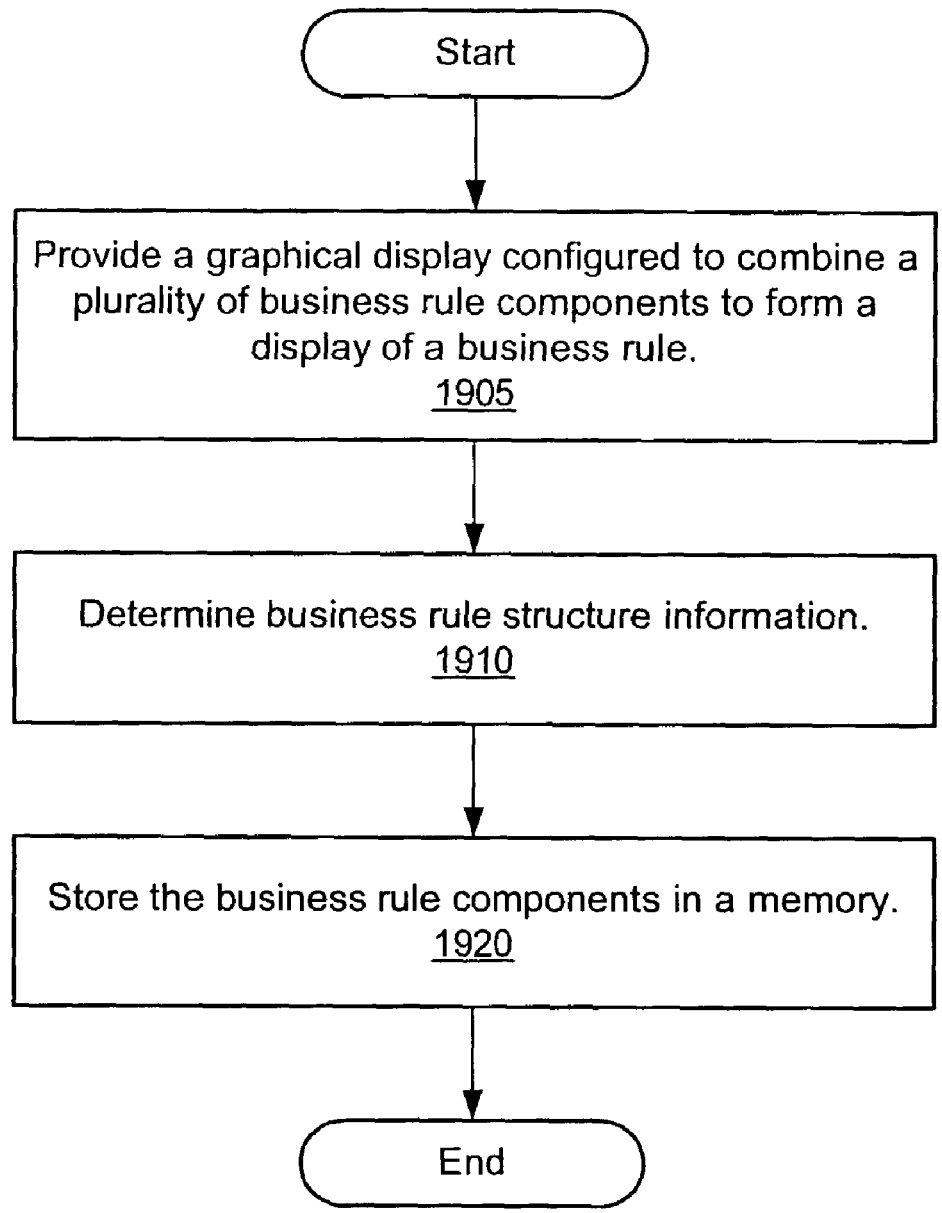
FIG. 19 depicts an exemplary embodiment of a method of generating new insurance claim processing business rule using a rule editor.

FIG. 19 depicts an exemplary embodiment of a method of creating a new business rule in a rule editor. At step 1905, a graphical display may be provided. The graphical display may be configured to combine a plurality of business rule components to create a display of at least a portion of a business rule. At step 1910, business rule structure information may be determined. For example, a user may select a predefined business rule template. In another example, the user may input (e.g., type) business rule structure information into the rule editor. The rule editor may determine structure information based on the input received. In yet another embodiment, business rule structure information may be determined based on other input. For example, a user may select and arrange one or more business rule components in the graphical display. Business rule structure information may be determined based on the selection and arrangement of the business rule components. For example, the user may specify one or more program instructions. The user may further specify one or more parameters. The user may specify other information as well, such as, but not limited to one or more business rule variables to be included in a specified relationship to one or more program instructions. The new business rule may be stored in a memory associated with a computer system at step 1920. For example, the business rule structure information may be stored in the memory with one or more references to business rule program instructions, business rule variables, business rule parameters and/or business rule translations. In an embodiment, the business rule components may be stored as entries in one or more database tables. In embodiments where the business rule structure information and/or program instructions have been selected from a list of predefined business rule components, one or more of the business rule components may be saved as references to the predefined business rule component.

In some embodiments, a rule component may be used by more than one business rule. For example, a business rule template may define the structure of a business rule. The business rule template may be used with different combinations of business rule program instructions, business rule variables and/or business rule parameters to form different business rules. In another example, a business rule program instruction may be used with different combinations of business rule templates, business rule variables and/or business rule parameters to form different business rules. In such embodiments, a rule editor may display a listing of business rules and/or business rule components that may be affected by changes to one or more selected business rule components.

Figure 21:
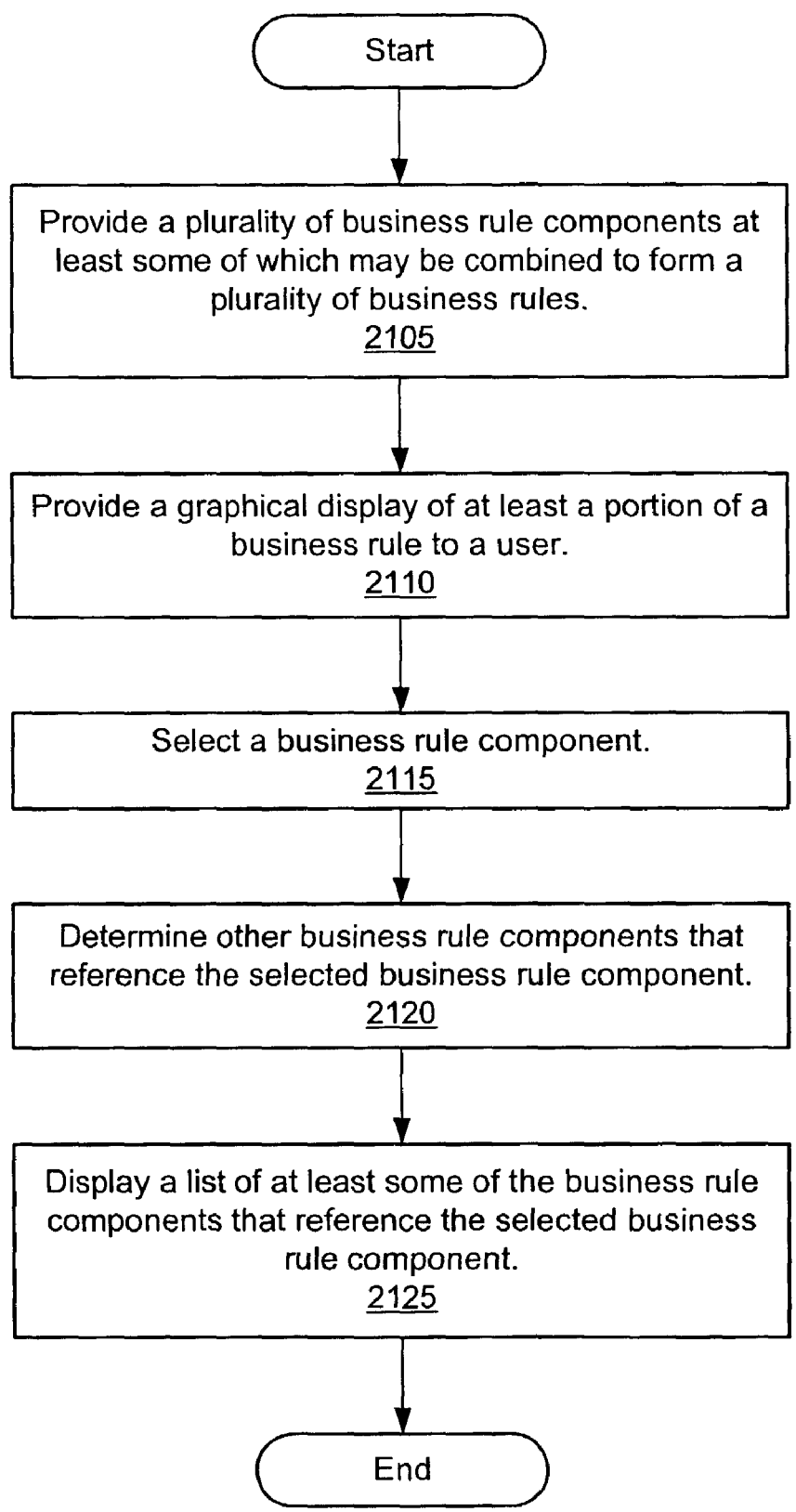
FIG. 21 depicts a first exemplary embodiment of a method of providing a display of business rule components that are related using a rule editor.

FIG. 21 depicts an embodiment of a method of displaying a listing of business rule components related to a selected business rule component. The business rule components may be related in such a manner that a change made to the selected business rule component may affect the listed business rule components. At step 2105, a plurality of business rule components may be provided. The business rule components may include business rule templates, program instructions, business rule variables and/or business-rule parameters. A plurality of business rules may be formed by combining a number of the business rule components. At least a portion of at least one business rule may be display to a user at step 2110. At least one business rule component may be selected in the graphical display in step 2115. One or more business rule components that reference the selected business rule component may be determined in step 2120. The one or more business rule components determined to reference the selected business rule may be In displayed to the user at step 2125.

Figure 22:
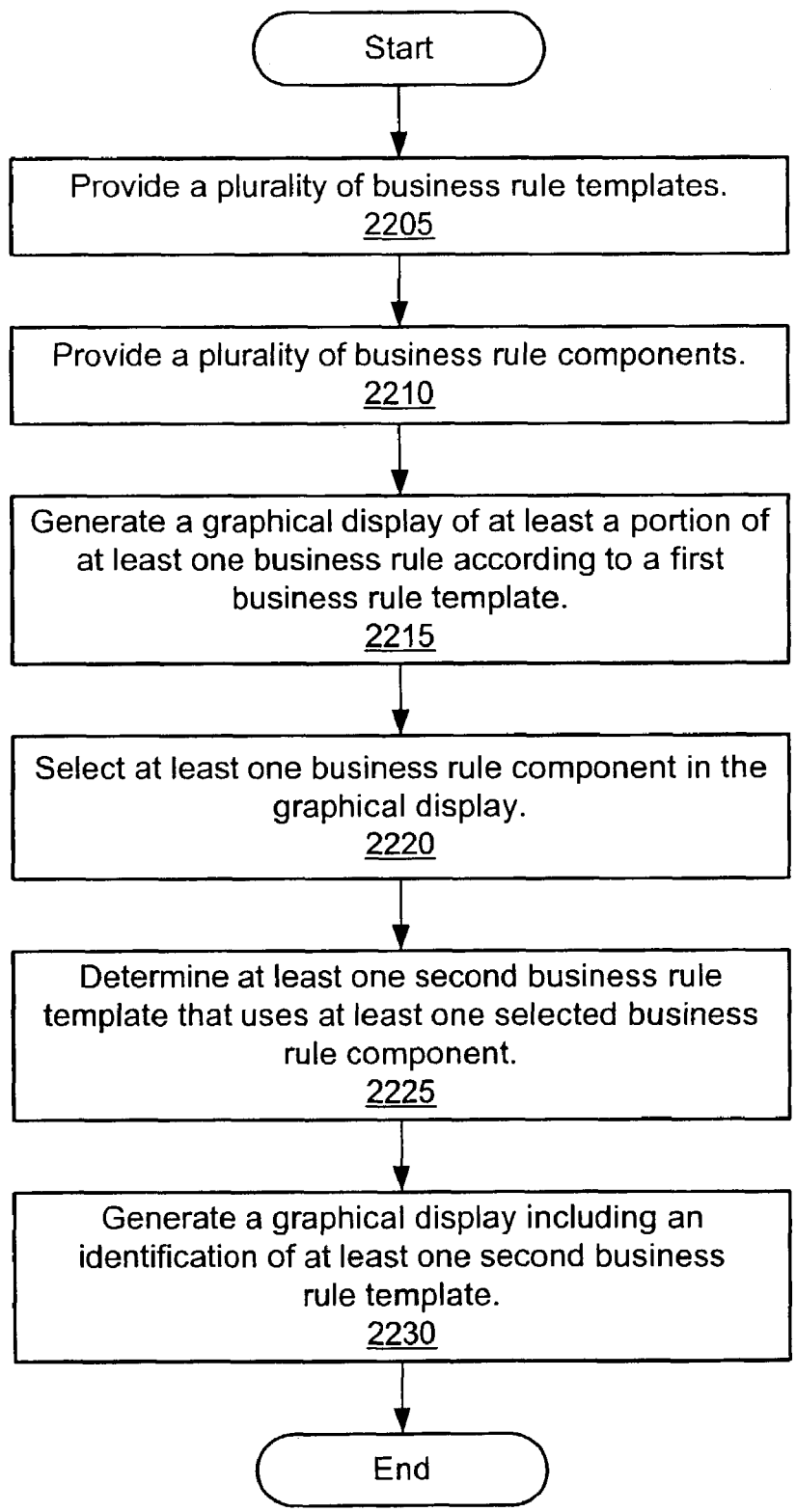
FIG. 22 depicts a second exemplary embodiment of a method of providing a display of business rule components that are related using a rule editor.

FIG. 22 depicts an embodiment of a method of generating a graphical display including at least one business rule template that is related to a selected business rule component. At step 2205, a plurality of business rule templates may be provided. At step 2210, a plurality of business rule components may be provided. A first business rule template may be used to generate a graphical display of at least a portion of at least one business rule in step 2215. At step 2220, one or more business rule components may be selected in the graphical display. One or more second business rule templates that use the selected business rule component may be determined at step 2225. A graphical display that identifies at least one of the second business rule templates may be generated at step 2230.

Referring back to FIG. 15, an embodiment of a display screen including a list of business rule components related to a selected business rule component is depicted. In FIG. 15, "template 1" has been selected in template selection field 1302. Additionally, "rule 1" has been specified in rule selection field 1304. Thus, the business rule displayed in rule display 1308 is business rule #1. Within rule display field 1308, program instruction 2 (1502) has been selected as indicated by the dotted line surrounding program instruction 2. Thus, program instruction 2 is shown to be the selected business rule component in selected component field 1504. Linkages field 1506 displays a list of all of the business rule templates that use or refer to program instruction 2.

Figure 20:
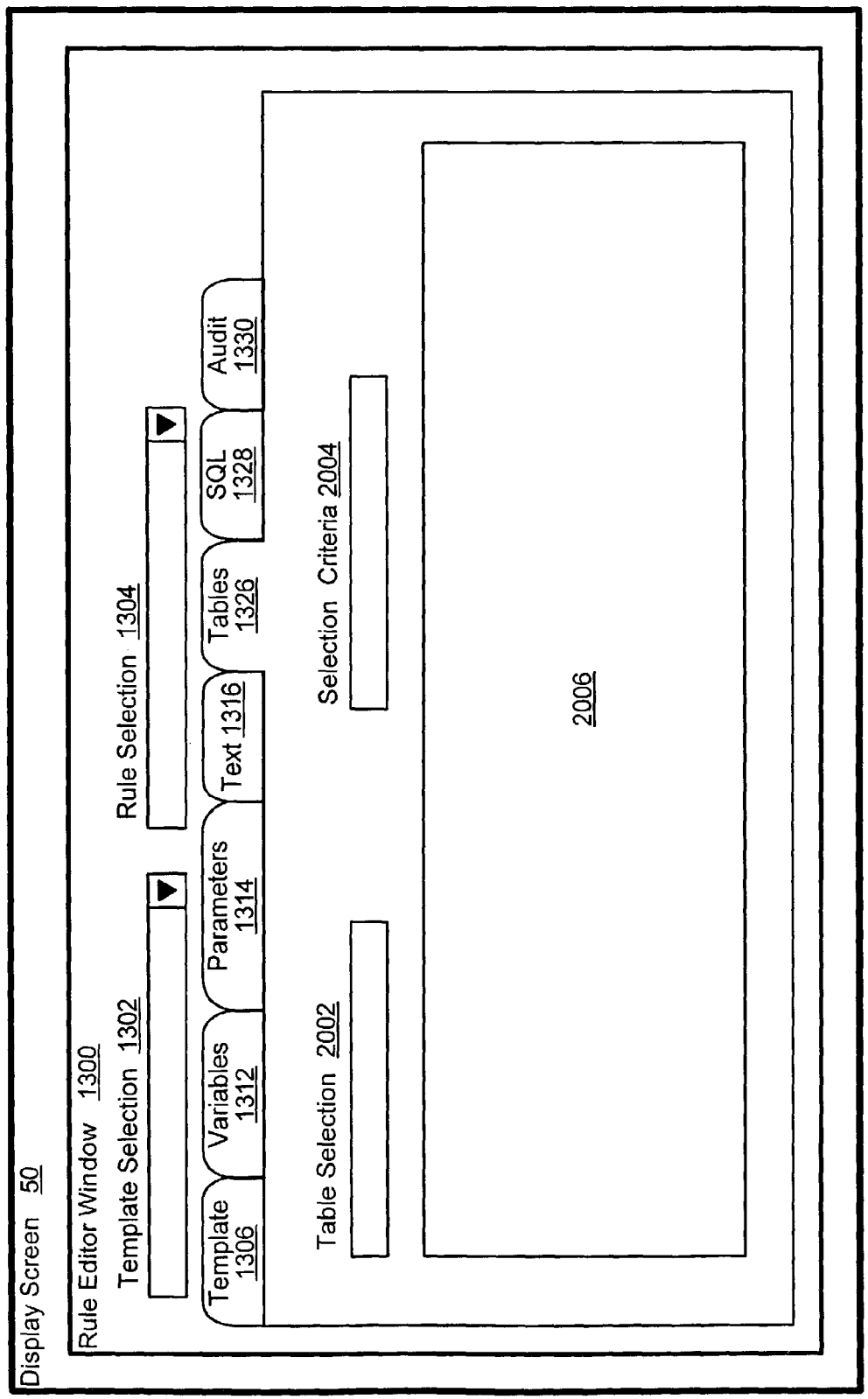
FIG. 20 depicts an exemplary embodiment of a rule editor display screen showing a tables tab.

In an embodiment, the relationships between various business rule components may also be viewed in a database table view. For example, FIG. 20 depicts an embodiment of a Tables tab 1326 view. Tables tab 1326 may include table selection field 2002. Table selection field 2002 may allow a user to specify a database table to be viewed in display field 2006. Additionally, tables tab 1326 may include a selection criteria field 2004. Selection criteria field 2004 may allow the user to specify one or more criteria which may be used to constrain the table display. For example, selection criteria field 2004 may be used to specify one or more search criteria. In such a case, only those database records including specified search criteria may be displayed in display field 2006. In another example, selection criteria field 2004 may be used to specify a sort order in which to display the database table. During use, display field 2006 may display at least a portion of the contents of a database table. An advantage of displaying database table contents to a user may be that viewing the database table information without modification by the rule editor may allow for increased flexibility in troubleshooting.

In certain embodiments, a rule editor may save at least one log file of changes made. In various embodiments, a log file may include but is not limited to a listing or description of at least one change made; an identification of a user that made the change; if appropriate, an identification of a user that verified or approved the change; and a time and/or date stamp.

Figure 23:
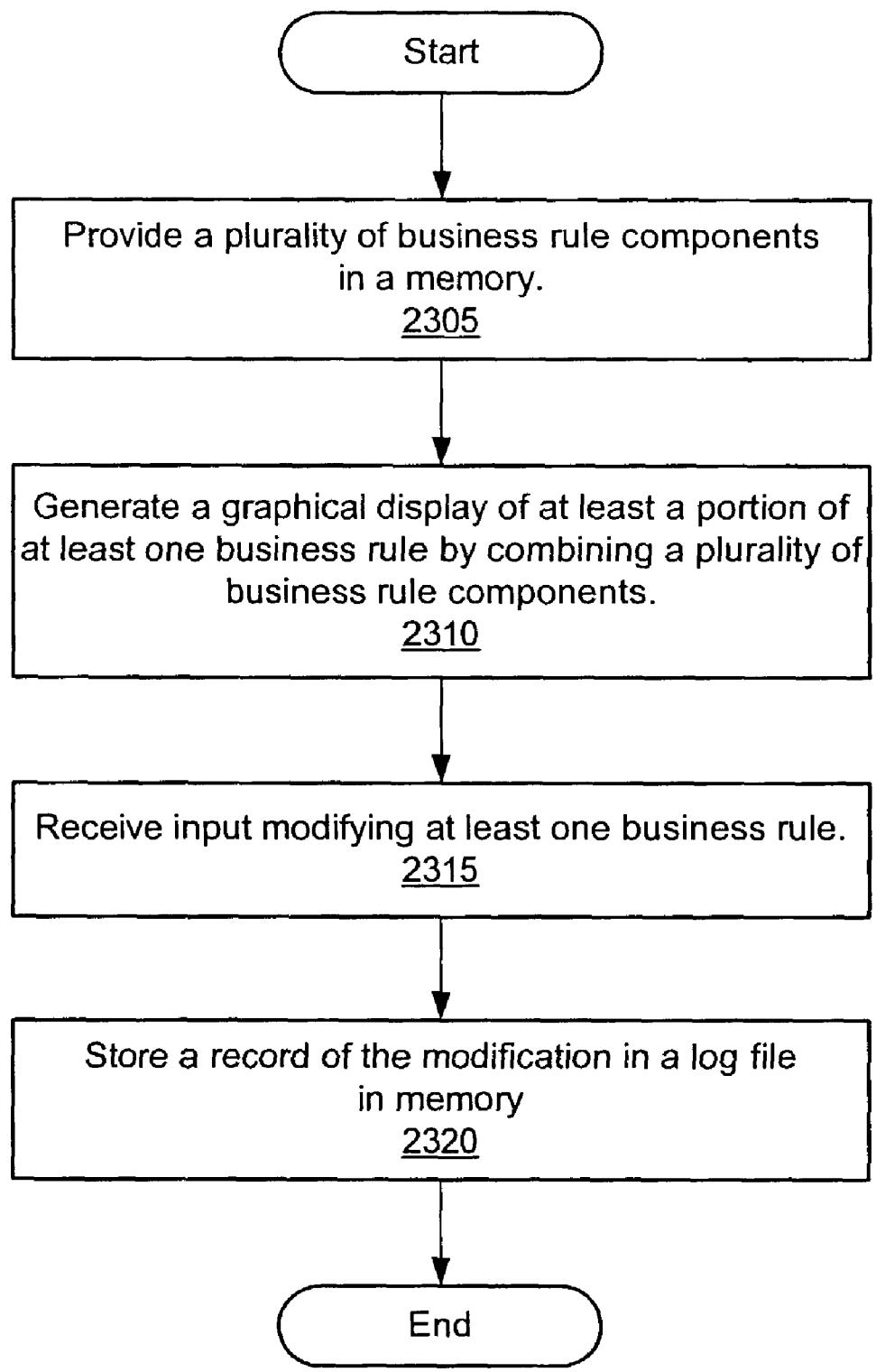
FIG. 23 depicts an exemplary embodiment of a method of tracking modifications to a business rule in a rule editor.

FIG. 23 depicts an embodiment of a method of tracking changes made to one or more business rule components. In step 2305, a plurality of business rule components may be provided in a memory. At step 2310, a graphical display of at least a portion of at least one business rule may be generated by combining a plurality of the provided business rule components. The graphical display may be viewed by a user. The user may determine one or more changes to be made to at least the displayed business rule. Input may be received specifying one or more modifications to at least a portion of at least one business rule at step 2315. A record of one or more modifications input may be stored in a log file in a memory at step 2320. In an embodiment, one or more modifications may be made to one or more business rule components in memory based on the input. Alternately, in some embodiments, the modifications may be stored in memory pending approval by a user having appropriate access privileges.

Figure 24:
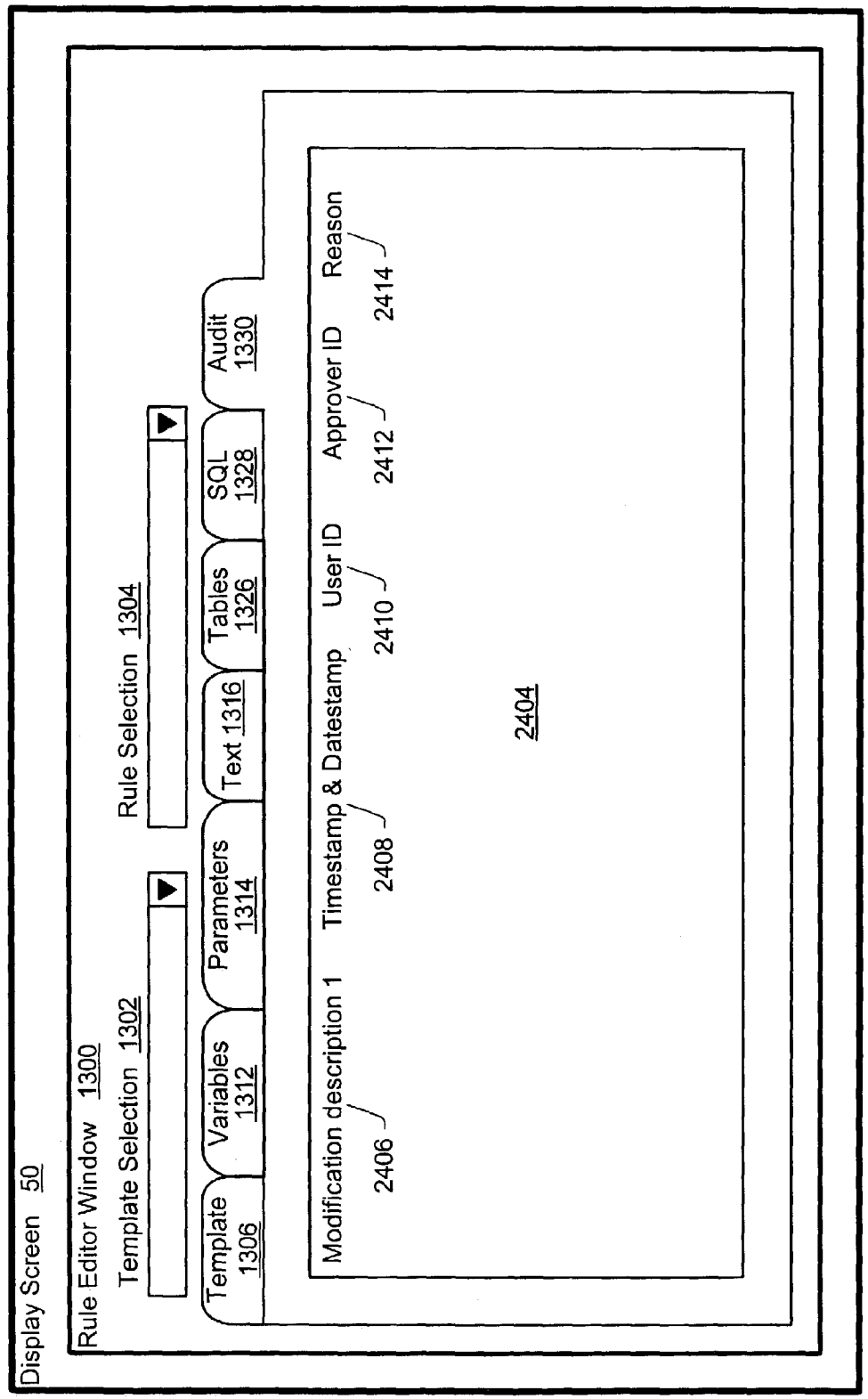
FIG. 24 depicts an exemplary embodiment of a rule editor display screen showing an audit tab.

An exemplary embodiment of a rule editor window that includes information related to changes made to one or more business rules is depicted in FIG. 24. A user may specify a business rule template and/or a business rule using selection fields 1302 and 1304, as previously described. The user may select audit tab 1330 to view log file entries related to changes made to the selected business rule template or business rule. For example, a log file entry 2404 may include a description of a modification made 2406. The description may include a user input description of the modification or a computer generated description of the modification. For example, the description may include a copy of one or more business rule components before the modification and a corresponding copy of the one or more business rules including the modification. Log file entry 2404 may also include a time and/or date stamp 2408 indicating when the modification was input, stored in memory and/or approved. Log file entry 2404 may also include an identification of the user that input the modification 2410 and/or a user that approved the modification 2412. Log file entry 2404 may also include a description of the reason a change was made 2414. Additionally, log file entry 2404 may include an identification of one or more business rule components changed and/or one or more database tables changed.

Figure 25:
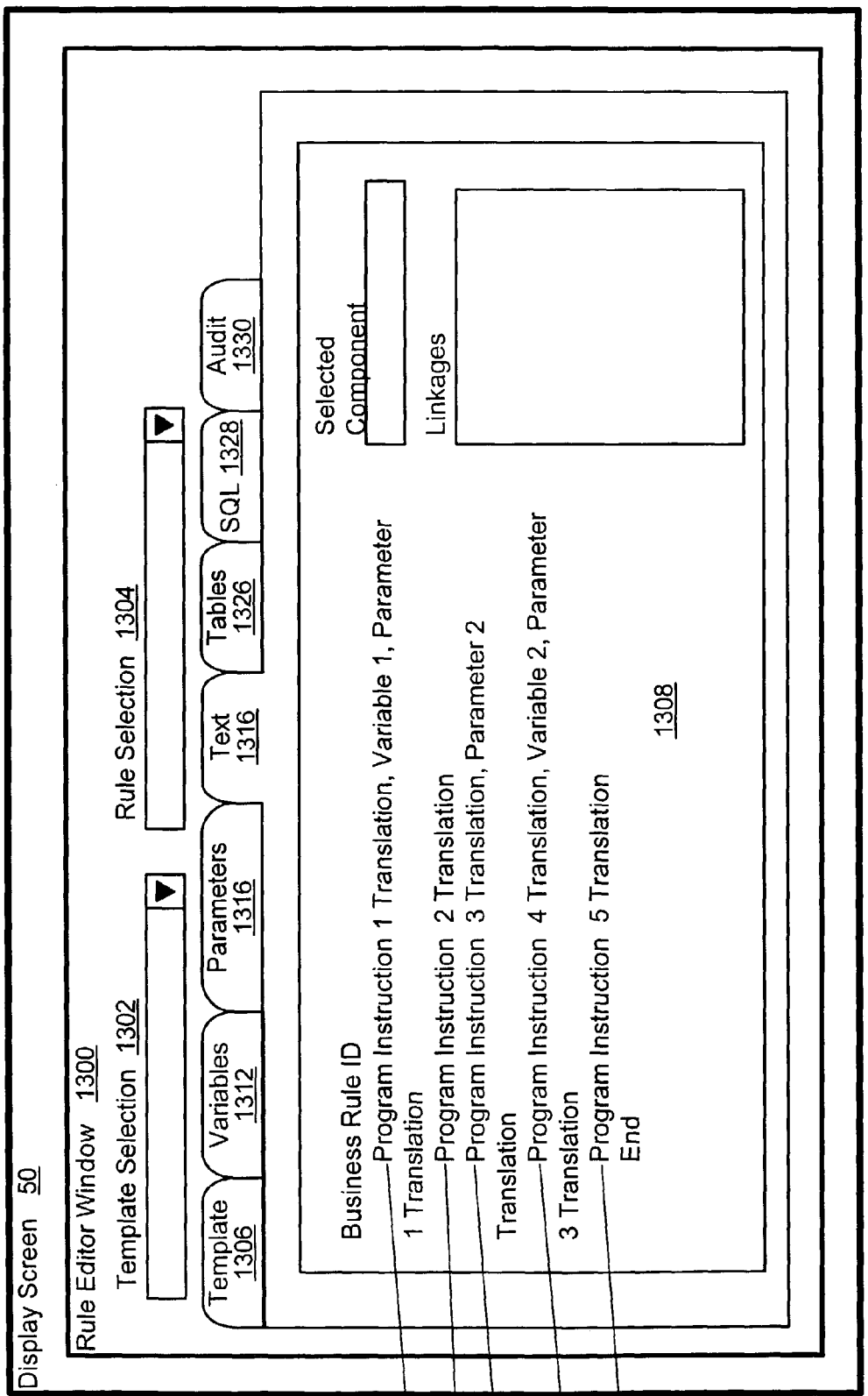
FIG. 25 depicts an exemplary embodiment of a rule editor display screen showing a text tab.

In certain embodiments, one or more database tables may include at least one human language translation of at least one business rule component. As used herein, a "human language translation" may refer to an approximate interpretation, explanation, and/or paraphrasing into a human language of the purpose, meaning and/or effect of a business rule component. For example, the human language may be English. For example, the translation may be a simplified description of the effect of the business rule component. In such embodiments, a rule editor may be configured to access at least one human language translation of a business rule component. The rule editor may access and display at least one human language translation in response to a request by the user. In some embodiments, the rule editor may be configured to display at least a portion of a business rule with one or more human language translations substituted into the business rule in place of one or more corresponding business rule components. For example, FIG. 25 depicts a display screen with text tab 1316 selected. If a user selects text tab 1316 one or more business rule components may be replaced by one or more corresponding human language translations. Thus, lines 2510, 2622, 2518, 2520, and 2524 may be related to lines 1310, 1322, 1318, 1320, and 1324 of FIG. 13. For example, line 2510 may be the same as line 1310 except that program instruction 1 and parameter 1 have been replaced in the display with human language translations. Similarly, program instruction 2 of line 1322, program instruction 3 and parameter 2 of line 1318, program instruction 4 and parameter 3 of line 1320, and program instruction 5 of line 1324 have been replaced by human language translations in lines 2522, 2518, 2520, and 2524, respectively. In other embodiments, human language translations may be substituted for different business rule components. For example, only program instructions may be translated. In another example, only business rule parameters may be translated. An advantage of providing at least one human language translation of a business rule component may be that a user may be better able to understand a business rule or business rule component based on a human language translation than based on one or more lines of source code. For example, such embodiments may be advantageous if users that create, modify and/or approve business rules are not experienced programmers. In an embodiment, a plurality of human language translations of one or more business rule components may be provided. An advantage of providing multiple languages may be that two or more users that prefer different languages may view, create, modify and/or approve business rules.

Figure 26:
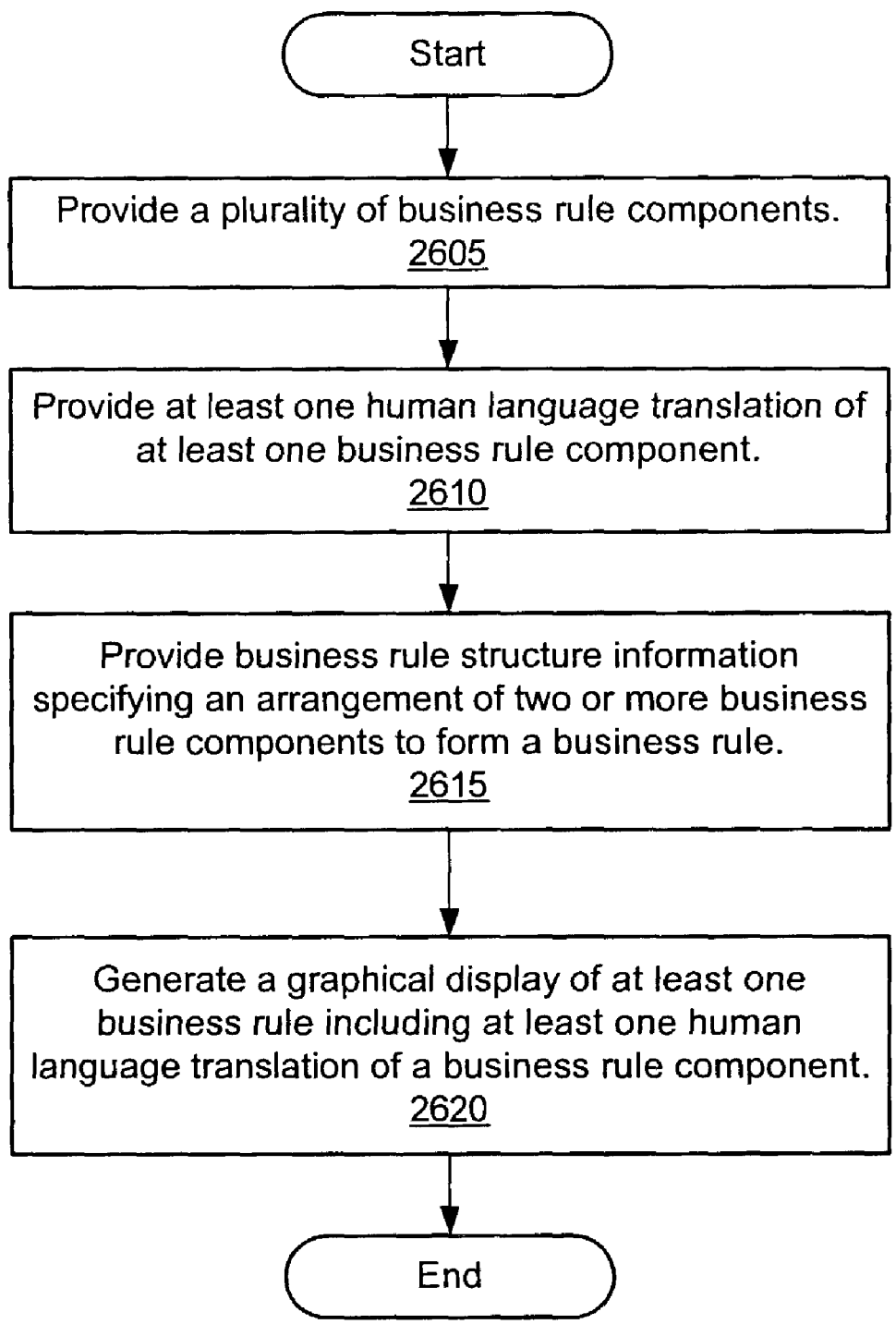
FIG. 26 depicts an exemplary embodiment of a method of providing a human language translation of at least one business rule component in a rule editor.

FIG. 26 depicts an embodiment of a method of providing a graphical display including at least one human language translation. At step 2605, a plurality of business rule components may be provided. For example, the business rule components may include business rule templates, program instructions, business rule variables and/or business rule parameters. At least one human language translation of at least one business rule component may be provided at step 2610. Business rule structure information that specifies an arrangement of two or more business rule components to form a business rule may be provided at step 2615. For example, a business rule template may be provided. The business rule template may include references to two or more business rule components and an arrangement of the referenced components to form a business rule. At step 2620, a graphical display of at least a portion of at least one business rule may be generated. The graphical display may include at least one human language translation of at least one business rule component. For example, in generating the graphical display a human language translations of a business rule components may be displayed in place of the business rule components.

Further Improvements

Figure 32:
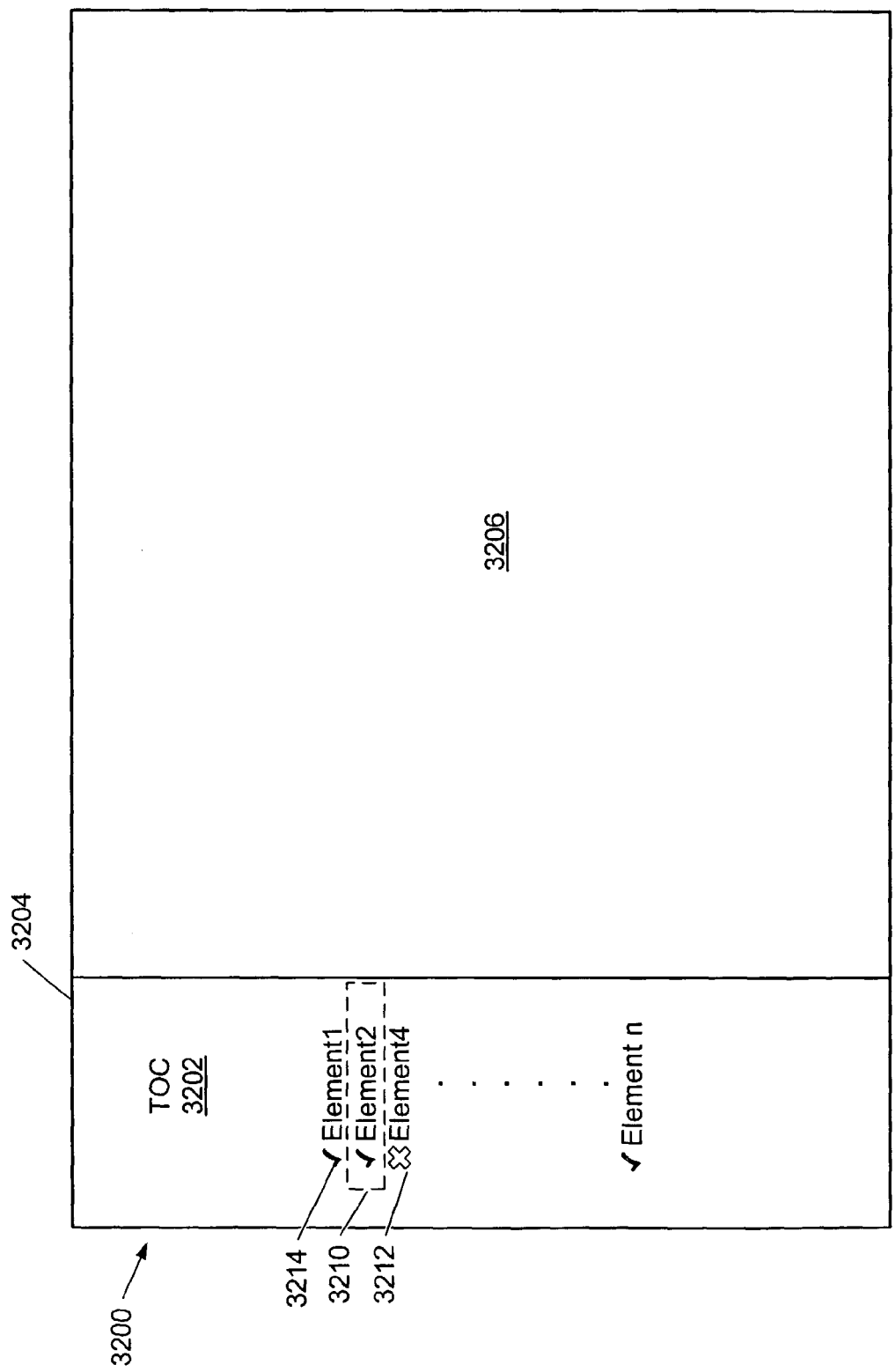
FIG. 32 depicts an embodiment of a graphical display in an insurance transaction processing program including a persistent frame including a table of contents.

In an embodiment, a table of contents (TOC) display 3202 may be provided in a persistent frame 3204 along an edge of an insurance claim processing system display 3200, as depicted in FIG. 32. For example, if the insurance claim processing system is accessible via a browser application, a frame on a side (e.g., the left side, right side, top or bottom) of the display may include the TOC. One or more other frames 3206 displayed simultaneously with the TOC frame may include a current page of the insurance claim processing system. A user may have the option of hiding and/or resizing the TOC frame to change the amount of the display area available for the insurance claim processing system. The TOC display 3202 may provide an indication of which page from the TOC is the current page. For example, information displayed in frame 3206 may correspond to TOC Element 2 3210, as indicated by highlighting of Element 2 3210. Similarly, the TOC display 3202 may provide an indication of whether certain pages or elements of the TOC are complete and/or incomplete. For example, indicator symbol 3212 associated with TOC Element 4 may indicate that Element 4 is incomplete. Indicator symbol 3214 associated with TOC Element 1 may indicate that Element 1 is complete. In an embodiment, indicators may be provided for each TOC page or element that the user is required to complete.

In an embodiment, only pages that have been displayed to the user will appear in the TOC. In another embodiment, pages may be displayed in the TOC if they are required (or desired) to complete a claim assessment. In an embodiment, if a user returns to a page previously completed and changes an answer which causes one or more pages to no longer be utilized, the pages may be removed from the TOC. Similarly, if the user changes the answer to a question which causes one or more new pages to be required (or desired) the new pages may be included in the TOC display. In yet another embodiment, a predetermined set of pages may be displayed in the TOC. For example, all available pages may be displayed or a subset of the available page may be displayed.

Figure 27:
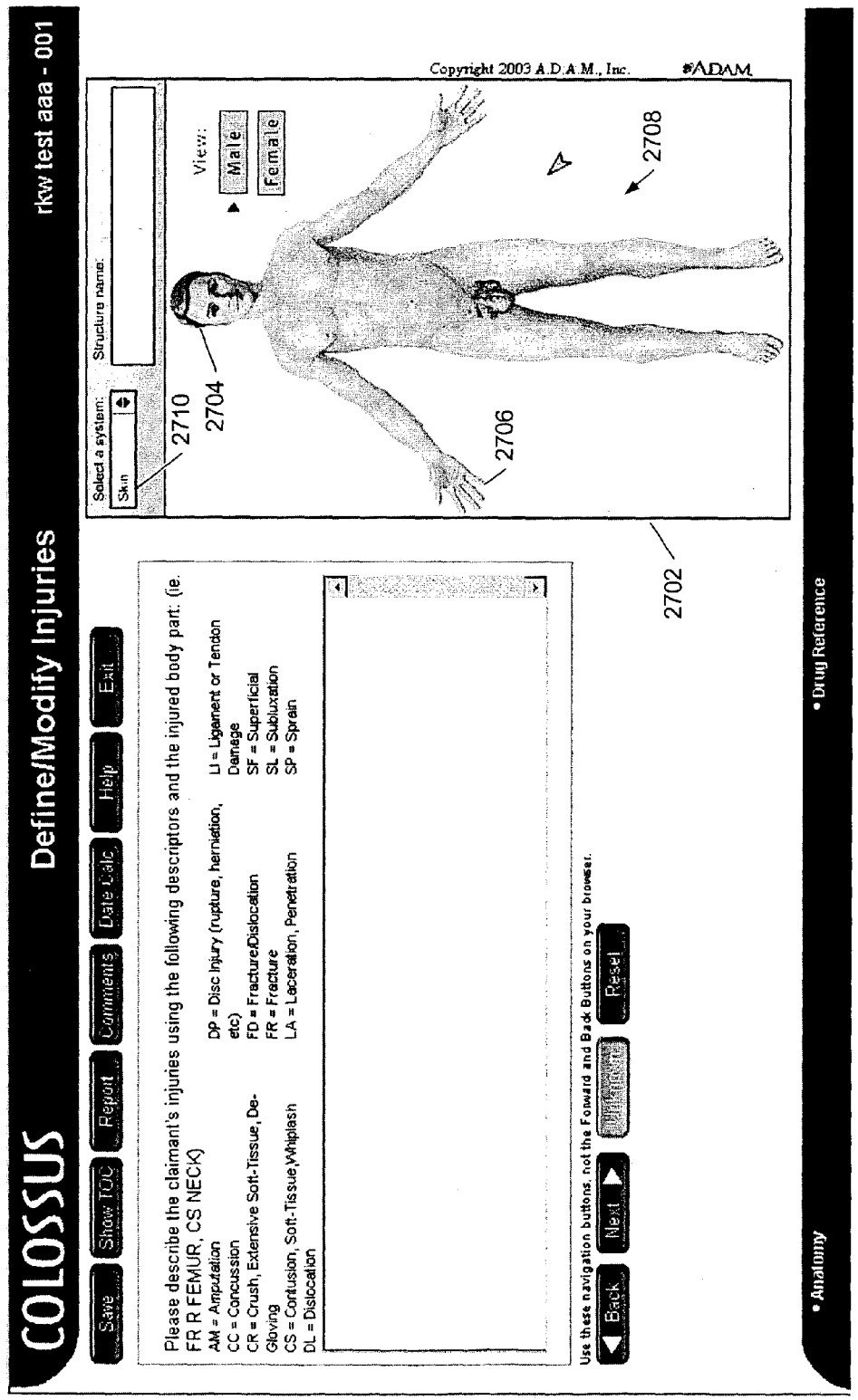
FIG. 27 depicts an embodiment of a graphical display in an insurance transaction processing program including a first representation of the human body.
Figure 28:
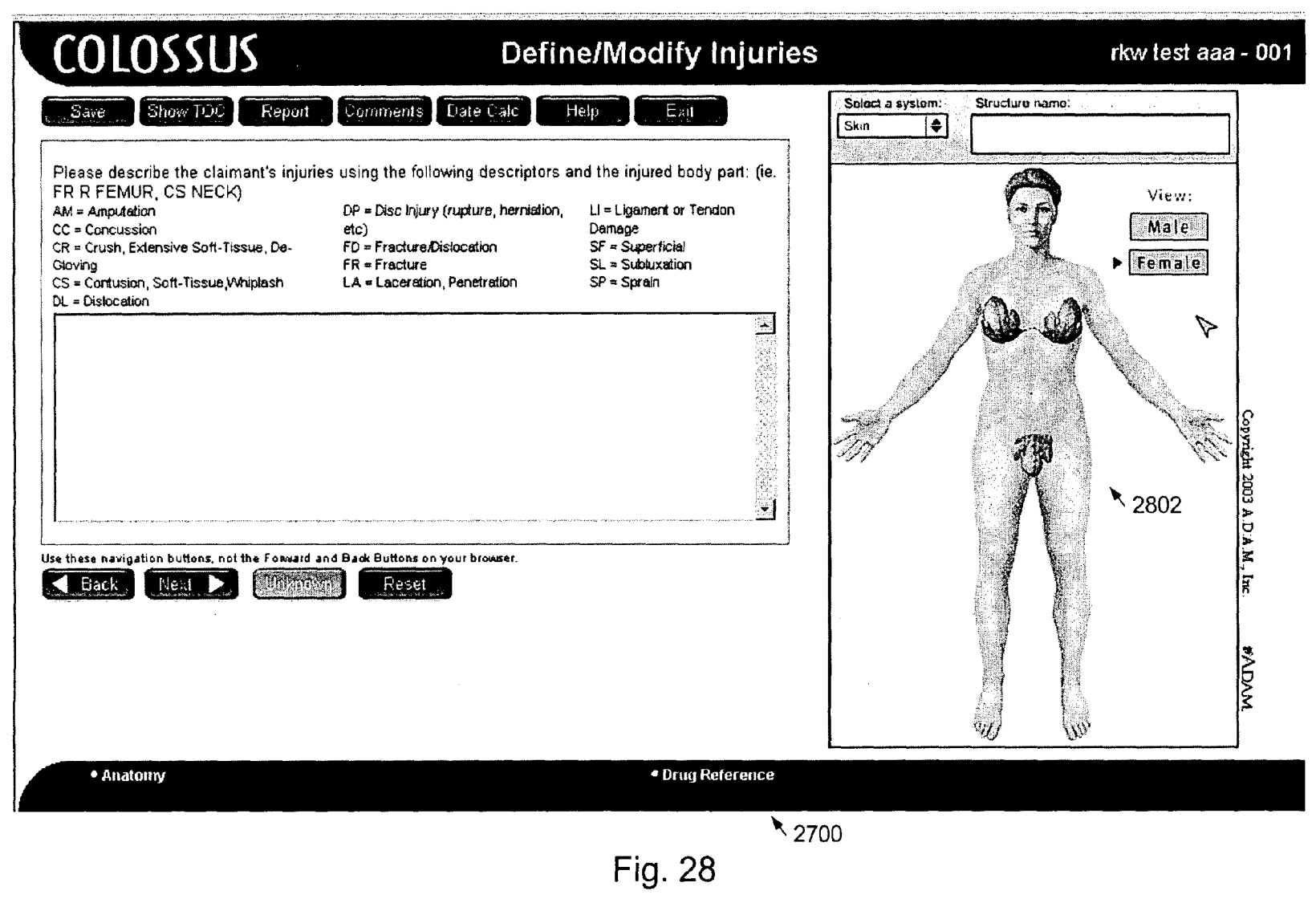
Figure 29:
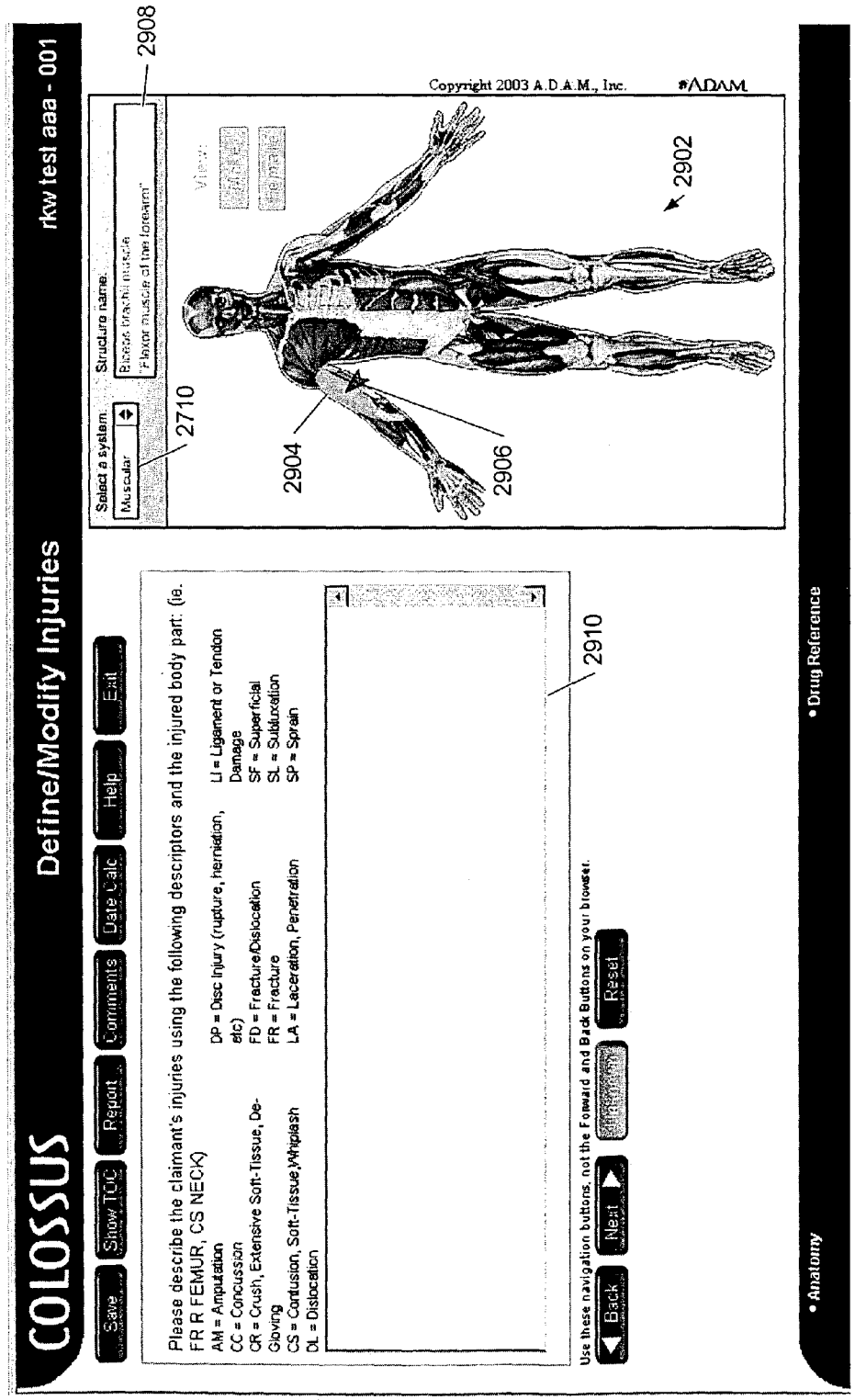
FIG. 29 depicts an embodiment of a graphical display in an insurance transaction processing program including a third representation of the human body.
Figure 30:
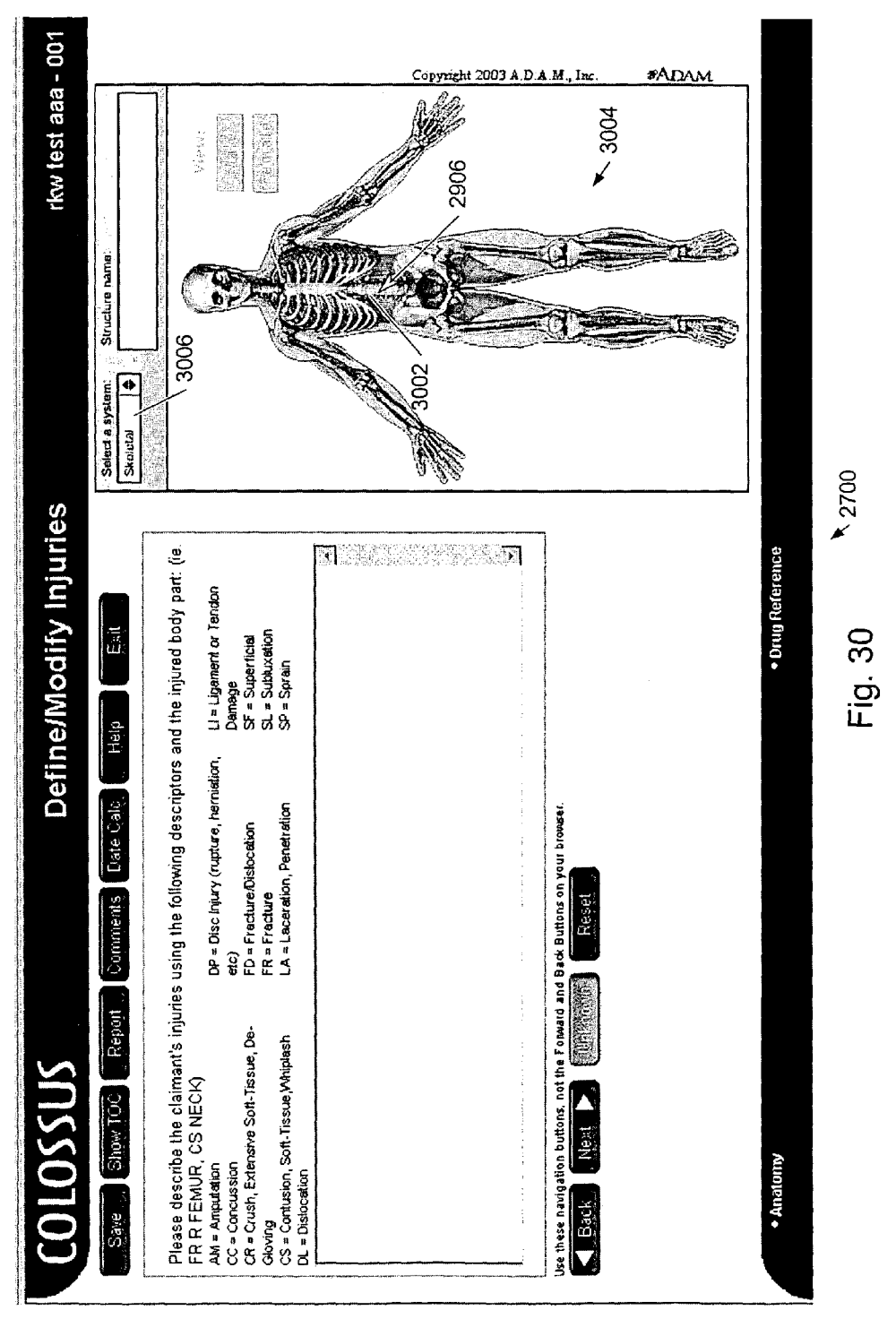
Figure 31:
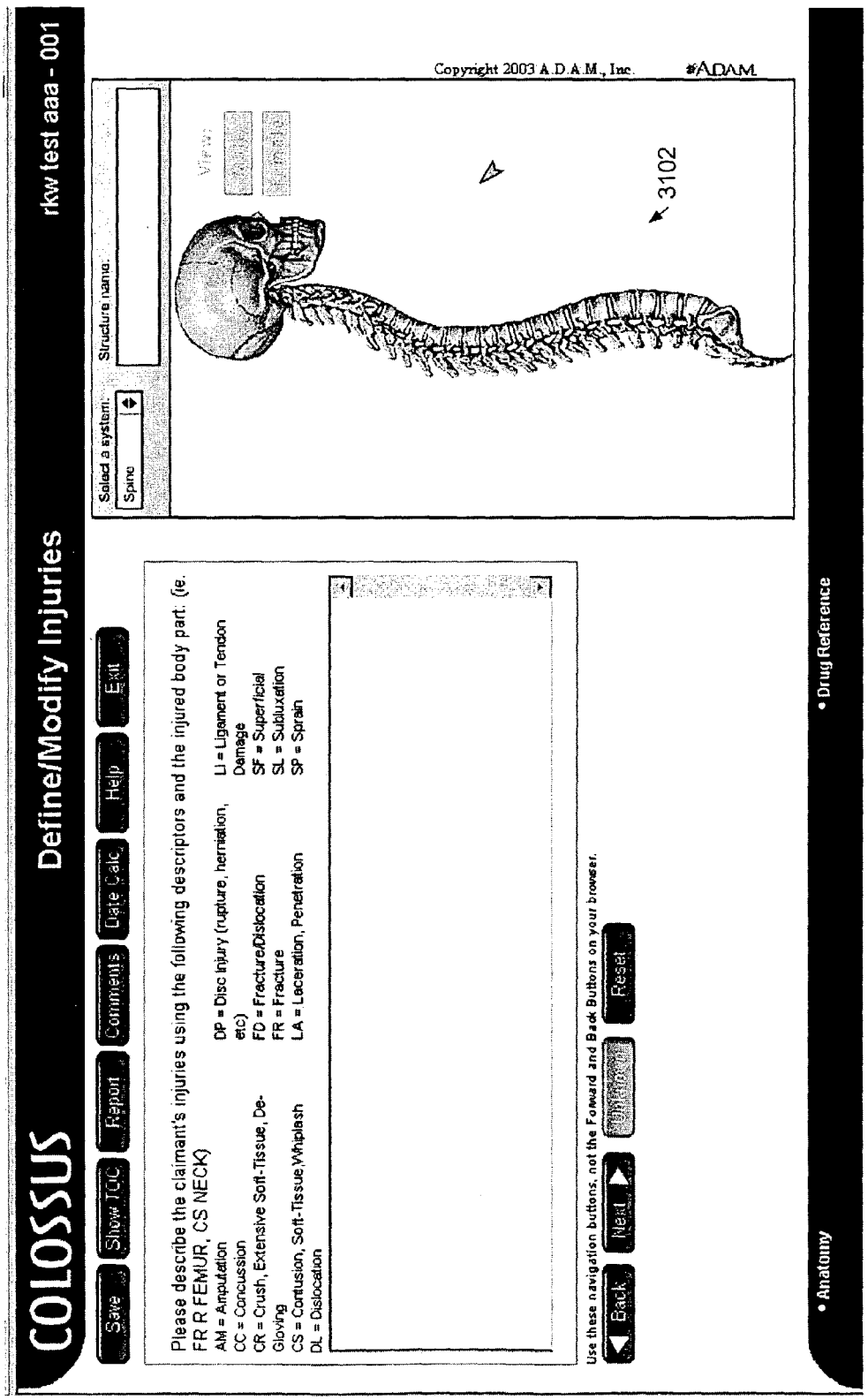
FIG. 31 depicts an embodiment of a graphical display in an insurance transaction processing program including a representation of a portion of the human body.

In certain embodiments, an insurance claim processing system may include a graphical display 2700 for input and display of information as depicted in FIG. 27. In such embodiments, graphical display 2700 may include a representation of a human body 2702. For example, representation of the human body 2702 may include a photograph, graphic image and/or a silhouette of a human body. Representation 2702 may depict at least a number of major body parts 2704 (e.g., torso, head, arms and legs). In certain embodiments, representation 2702 may further include minor body parts 2706 (e.g., neck, fingers, toes, etc.) and/or portions of specific anatomical systems (e.g., bones of the skeletal system as depicted in FIGS. 30 and 31). Representation of the human body 2702 may include a number of different views which may be displayed simultaneously, individually or in groups. For example, FIG. 27 includes a depiction of a skin layer of a male 2708, FIG. 28 includes a depiction of a skin layer of a female 2802, FIG. 29 includes a depiction of a muscular layer 2902 and FIG. 30 includes a depiction of a skeletal layer 3004. Each view (or layer) may include at least one anatomical system. Additionally, individual organs associated with an anatomical system may be depicted. If all of the available layers are not depicted simultaneously, the user may be able to select a layer to view. For example, a layer selection mechanism 2710 may be provided.

In an embodiment, a representation of the human body may provide a user with descriptive information about various body parts. For example, referring to FIG. 29, when the user selects a body part 2904 the graphic display may present information describing the body part (e.g., name, major functions, components, etc.) in a description field 2908. In certain embodiments, insurance related information may be provided in description field 2908 or in another description field (e.g., input field 2910) when a body part is selected. For example, injuries common to selected body part 2904 may be displayed. In such a case, the injury information may include one or more injury codes associated with selected body part 2904. In another example, the insurance related information may include one or more common medical treatments associated with the selected body part. An example of a representation of a human body including a number of layers is available from A.D.A.M. Inc. of Atlanta, Ga.

In various embodiments, the body part or body parts of interest may be selected using various selection methods. For example, a "hover" method may allow a user to select a body part using a cursor-positioning device. Similarly, a user may position a pointer 2906 over a body part of interest using a cursor-positioning device (e.g., a mouse, joystick, trackball, etc.) and depress a select button to select a body part. The user may also be provided with one or more input fields 2910. In such a case, the user may provide input via one or more input fields 2910 to select a body part of interest. Additionally, in embodiments where the user is provided with one or more input fields 2910, input fields 2910 may be populated with data as the user makes selections in graphical display 2700. For example, if a user selects a fracture to the upper arm in graphical display 2700, one or more input fields 2910 may be populated with data reflecting the selected information. Populating the input fields may provide a double check to reduce the likelihood of input errors. Additionally, populating the input fields may assist in familiarizing users with various insurance related codes (e.g., injury codes, treatment codes, etc.). In any of these cases, the selected body part may be highlighted in graphical display 2700. As used herein, "highlighting" refers to modifying the display to provide a visual indication that an area has been selected. For example, highlighting may include, but is not limited to: changing the color, changing the brightness, changing the location and/or outlining the selected body part.

In an embodiment, upon selection of a body part(s) the user may be provided with a menu including one or more input selections related to the selected body part. For example, the menu may provide a selection of subparts of the selected body part. A "subpart" of a body part may refer to a body part or system within the selected body part. For example, as depicted in FIG. 30, the user may select spine 3002 from a skeletal layer 3004. Menu 3006 may be changed to include relatively broad selections associated with spine 3002, such as central nervous system or spinal column. Alternately, the menu may include more detailed selections such as individual bones of the spine, individual bones of the skull and/or individual portions of the central nervous system. In another example, menu 3006 provided when a body part is selected may include a selection of input data related to the selected body part such as common injuries, injury codes, common medical treatments and/or treatment codes associated with the selected body part. In such a case, the user may select one or more menu selections to provide input to the insurance claim processing system regarding injuries suffered and/or treatments provided. In an embodiment, a number of menu lists may be presented to the user in series to allow selection of both a subpart and insurance information (e.g., injury codes, treatment codes, etc.). Such menu lists may be arranged to minimize the number of menus that a user must go through in order to provide desired input.

In an embodiment, additional graphical elements may be provided in graphical display 2700 when a body part is selected. For example, when the user selects spine 3002 (as shown in FIG. 30), graphical display 2700 may be changed to show a detailed view 3102 of the spine (as depicted in FIG. 31). The additional graphical elements may replace or supplement one or more representations of the human body in the display screen. In certain embodiments, a photograph including a selected body part may be included in the graphical display. In certain embodiments, a more detailed graphic depiction of the selected body part may be provided. For example, the display may zoom in on the selected body part as depicted in FIG. 31. Additionally, one or more additional graphical elements may include alternate views of the selected body part. For example, the body part may be rotated in one or more additional graphical elements. If the user has provided information identifying an injury or injury code, a graphic element may depict an example of the injury. For example, a photograph of a patient having the identified injury may be displayed. If the injury is relatively localized, the graphical element depicting the injury may depict the injury as it may affect the selected body part. Similarly, if a treatment is identified and related to a particular body part, a graphical element depicting the treatment as it applies to the particular body part may be displayed.

In an embodiment, after generating a consultation report, the report may be saved in a persistent format. For example, the consultation report may be save to a text file, an HTML file, a data file or other file format. In another example, the consultation report may be saved in a format that inhibits alteration, such as a postscript file or portable document format (pdf) file. The insurance claim processing system may save the consultation report in the persistent format at various times. For example, the consultation report may be saved each time the insurance claim processing system database is updated, at the request of the user of the insurance claim processing system, upon completion of a consultation, or at other times.

In an embodiment, an insurance claim processing system may save a log file including certain historical information regarding a particular claim or set of claims. The log file may be implemented in a number of ways. For example, a log file entry may include all information updated since the last log file entry was saved. Alternately, a specified subset of data in the insurance claim processing system may be saved in the log file. For example, the log file may include information identifying a claim to which the log file entry pertains (e.g., a claim number, client identification, etc.), a date and/or time stamp of when the changes were made, an identification of a user that implemented the change. Additionally, the log file entry may include conclusions reached by the insurance claim processing system (e.g., % of bodily impairment, estimated trauma severity values, estimated monetary amounts, etc.). Other data that may be saved to the log file may include, but is not limited to: Disfigurement Amount, Duties Under Duress (DUDs) (Yes|No), LOEL (Yes|No), Negligence %, Net Medical Specials, and/or Net Wage Specials. Some or all of the information in a log file entry may be available for a user to view. The user may view log file information after entering new information or changing information in the insurance claim processing system. Thus, the user may be able to see how the added or changed information affected the analysis of the claim by the insurance claim processing system. Additionally, in certain embodiments, some or all of the log file information may be available via one or more reports.

As used herein, "tuning" refers to determining a relationship between two or more variables to prepare a customized relationship. For example, tuning may include relating impairment amounts to monetary amounts and/or relating trauma severity values to monetary amounts. A tuning process may be implemented by a new user of an insurance claim processing system or by an established user of an insurance claim processing system that desires to modify a relationship between severity of an insurance claim and monetary amounts. For example, a user may include an insurance company (IC). A tuning process may use past settlements from an IC's closed claims to get an accurate representation of the IC's settlement history. In an embodiment, a tuning process may relate to a specific portion of an IC (e.g., an economic region or line of business).

Figure 33:
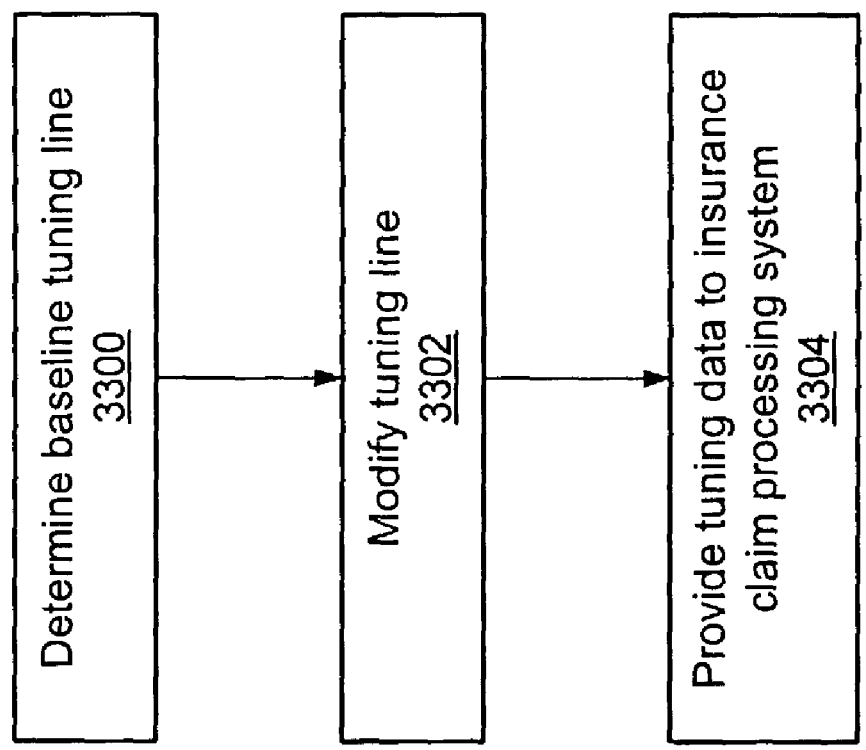
FIG. 33 depicts an embodiment of a flow chart of a method of tuning an insurance claim processing program.

FIG. 33 depicts a flow chart of an embodiment of a method of tuning an insurance claim processing system. As depicted in FIG. 33, a method of tuning an insurance claim processing system may include determining a baseline tuning line 3300. As used herein, a "tuning line" may refer to a representation of a relationship between two or more variables. Typically, a tuning line may represent the relationship between a claim variable (e.g., trauma severity value and/or impairment amount) and a monetary amount. The initial position of the tuning line may be referred to as the baseline tuning line. In an embodiment, a tuning line may initially be determined and positioned in a graphical display. The graphical display may be configured to receive input from a user to modify the position of the tuning line 3302. For example, the user may select and drag (or otherwise indicate to move) a portion of the tuning line. The tuning line may be moved in the graphical display as indicated by the user. In an embodiment, a baseline tuning line may remain in the initial position of the tuning line so that the user may distinguish the differences between the tuning line as originally determined and the tuning line after modifications have been made.

In various embodiments, a tuning line may be initially determined based on one or more data points. The number of data points utilized may vary, since embodiments provided herein allow a user to customize the tuning line after it is initially determined. In an embodiment, suitable data points may be determined based on one or more closed claims. If closed claims are used, they may be reviewed for errors and/or inappropriate results before the tuning line is determined. In an embodiment, suitable data points may be determined based on one or more baseline claims prepared specifically for gathering tuning data points (e.g., specifically selected claims and/or made up claims). In such an embodiment, one or more claims adjusters may be provided with information regarding the baseline claims and asked to determine tuning information (i.e., information relevant to tuning) based on the claims. In an embodiment, suitable data points may be determined based on one or more existing tuning relationships (e.g., an existing relationship between monetary amount and TSV and/or impairment amount).

In various embodiments, a tuning line may be determined from one or more data points by a variety of known methods. Examples of methods of determining an initial placement of a tuning line may include, but are not limited to, statistical techniques (e.g., regression analysis), existing relationships between TSV and monetary amounts or between impairment amounts and monetary amounts (e.g., based on old tuning methods), and/or determining a line to connect two or more data points.

In an embodiment, one or more closed claims may be used in forming an initial tuning line. Closed claims may be provided to give an accurate view of the IC's settlement history. In an embodiment, an established user of the insurance claim processing system may start with the current tuning of the insurance claim processing system. Additional tuning of the insurance claim processing system may be performed based on claims closed while utilizing the insurance claim processing system. Once a tuning line has been determined, data describing the tuning line may be exported to an insurance claim processing system 3304.

In an embodiment, a tuning process may be implemented using a spreadsheet program, such as Microsoft Excel, commercially available from Microsoft Corp. of Redmond, Wash. An appropriate program interface may be used to communicate directly between the spreadsheet program and the insurance claim processing system.

In an embodiment, a tuning process may be implemented to tune a bodily injury claim processing system. For example, a suitable claim processing system may include COLOSSUS™, commercially available from Computer Sciences Corp. of El Segundo, Calif. The insurance claim processing system may evaluate the general damages portion of a bodily injury claim. When a user runs a claim consultation through the insurance claim processing system, a recommended settlement range may be determined by the system. In an embodiment, an insurance claim processing system may determine a trauma severity value and/or a bodily impairment amount. In such embodiments, the system may further determine a monetary amount associated with the determined trauma severity value or bodily impairment amount. In an embodiment, an insurance claim processing system may evaluate the seriousness of a bodily injury by assigning trauma severity points based on the trauma sustained, treatment given, duties performed under duress and/or any loss of enjoyment of life. In an embodiment, the insurance claim processing system may assign the same amount of trauma severity points to different claims if those claims have the same details.

In an embodiment, the user of the tuning application may begin from at least three different situations. For example, the user may create a new tuning region. In another example, the user may re-tune a region previously created and tuned using the tuning application. In a third example, the user may re-tune a region previously tuned using a different tuning process. In an embodiment, a tuning application may support tuning in each of these situations. In an embodiment, the tuning application may include functionality to translate tuning from other tuning methods into a baseline tuning.

In an embodiment, a tuning process may include two phases. First, an initial or baseline tuning may be determined. For example, for creating a new tuning region, an insurance company's claims experts may evaluate a set of baseline cases for which injury severity and/or impairment is predetermined. For re-tuning, a baseline tuning may be established by using values from the existing tuning for the region.

A second phase of the tuning process may include fine-tuning. During fine-tuning, the user may compare the baseline tuning values with actual past settlements. The user may elect to make changes to the tuning of the insurance claim processing program, which may change the relationship of monetary amounts to claim severity used for future claims. Fine-tuning may involve adjusting the baseline tuning. For example, for a user re-tuning a region, the fine-tuning phase is a re-calibration to reflect any changes in a region. The tuning application may allow the user to view settlement history and decide whether to make changes to the monetary amounts associated with future claims.

In an embodiment, fine-tuning may be sub-divided into two categories: trauma fine-tuning and impairment fine-tuning. In such embodiments, trauma fine-tuning may deal with injuries, treatments, duties under duress, loss of enjoyment of life, etc. Trauma tuning may associate monetary amounts to different levels of trauma severity, as described above. Impairment tuning may associate monetary amounts to percentages of whole-person bodily impairment. In an embodiment, whole-person bodily impairment may be determined by a qualified medical professional, for example, using the American Medical Association's *Guides to the Evaluation of Permanent Impairment*.

In an embodiment, tuning a new region may include performing a closed claim study, in which settled claims are pulled and entered into the tuning application (or insurance claim processing system) by one or more claims experts. For retuning an established region, a report may be generated by the insurance claim processing system to identify settlements in the region being tuned. The reported claims and their settlements may be used for closed claim data.

In an embodiment, tuning application steps may be presented in a series of input screens. In such embodiments, the input screens may be presented sequentially. In an embodiment, the tuning application input screens may be navigable by the user. Following is a description of tuning using a tuning application according to an embodiment.

Figure 34:
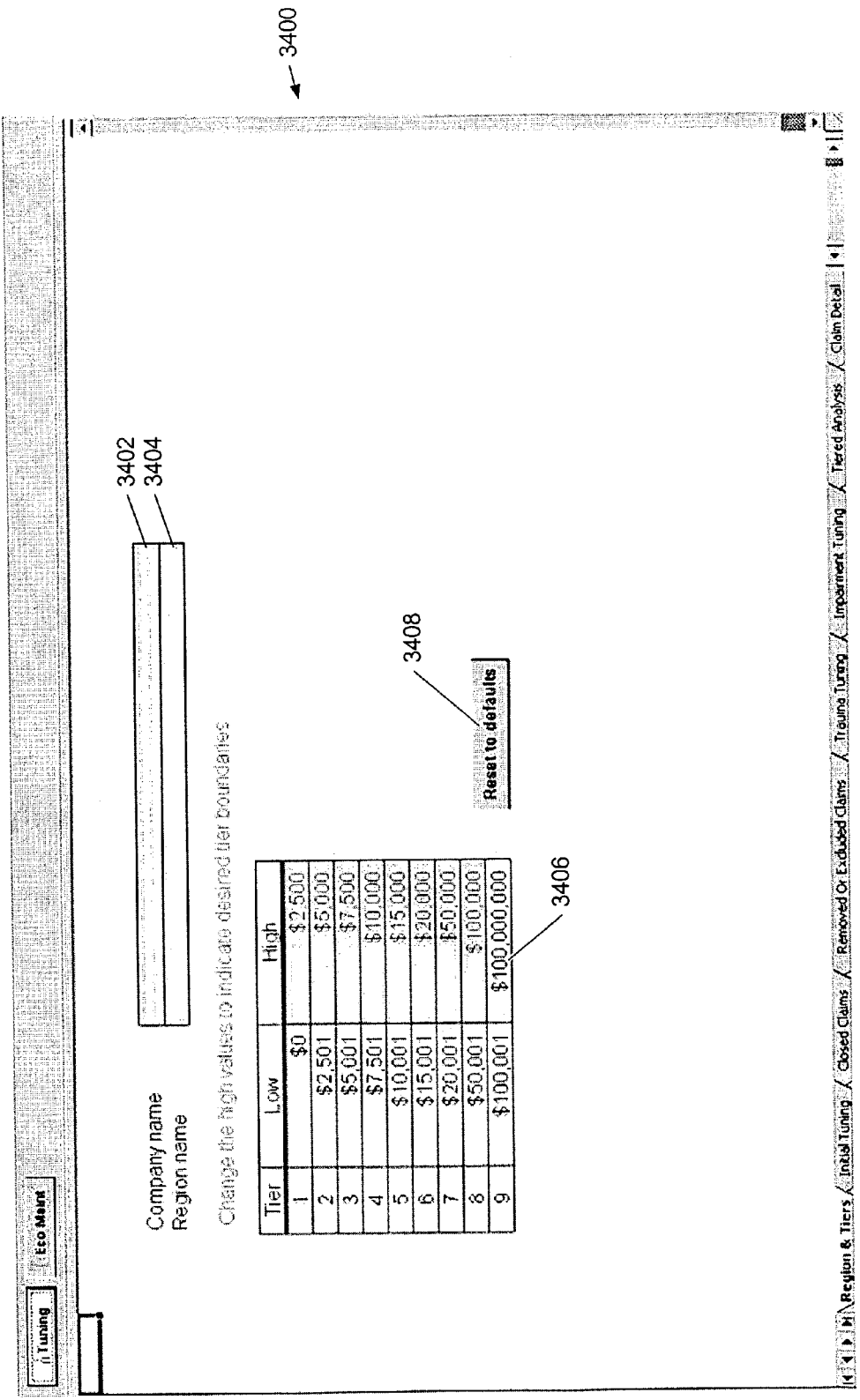
FIG. 34 depicts an embodiment of a basic information screen of a tuning application.

FIG. 34 depicts an embodiment of a basic information page 3400. Basic information page 3400 may allow the user to input basic information regarding the tuning. For example, the basic information may include, but is not limited to the name of the insurance company 3402 and the region (or line of business) being tuned 3404, etc. In an embodiment, "regions" may be characterized by about a 20% or greater variance in settlement values. In an embodiment, boundaries of tiers 3406 may also be input as basic information. As used herein, a "tier" refers to a range of monetary values into which tuning may be divided. In an embodiment, tier boundaries may be adjusted by the user but should generally remain sequential and contiguous. A tuning application may provide default ranges for tiers. After adjusting one or more tiers, the user may return the tier ranges to the default values by selecting a "Reset Values" button 3408.

Figure 35B:
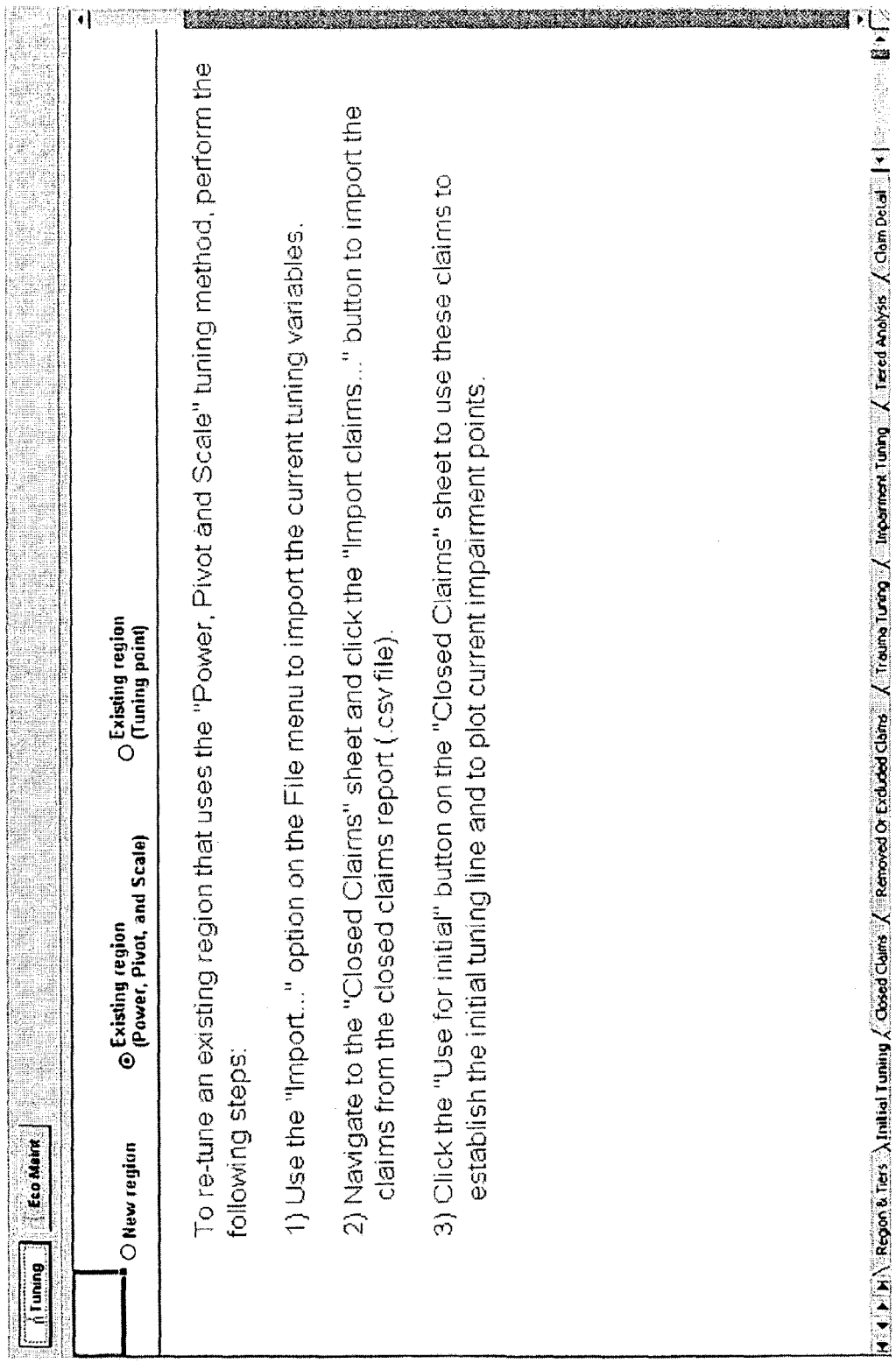
FIG. 35B depicts a second embodiment of an initial tuning screen of a tuning application.
Figure 35C:
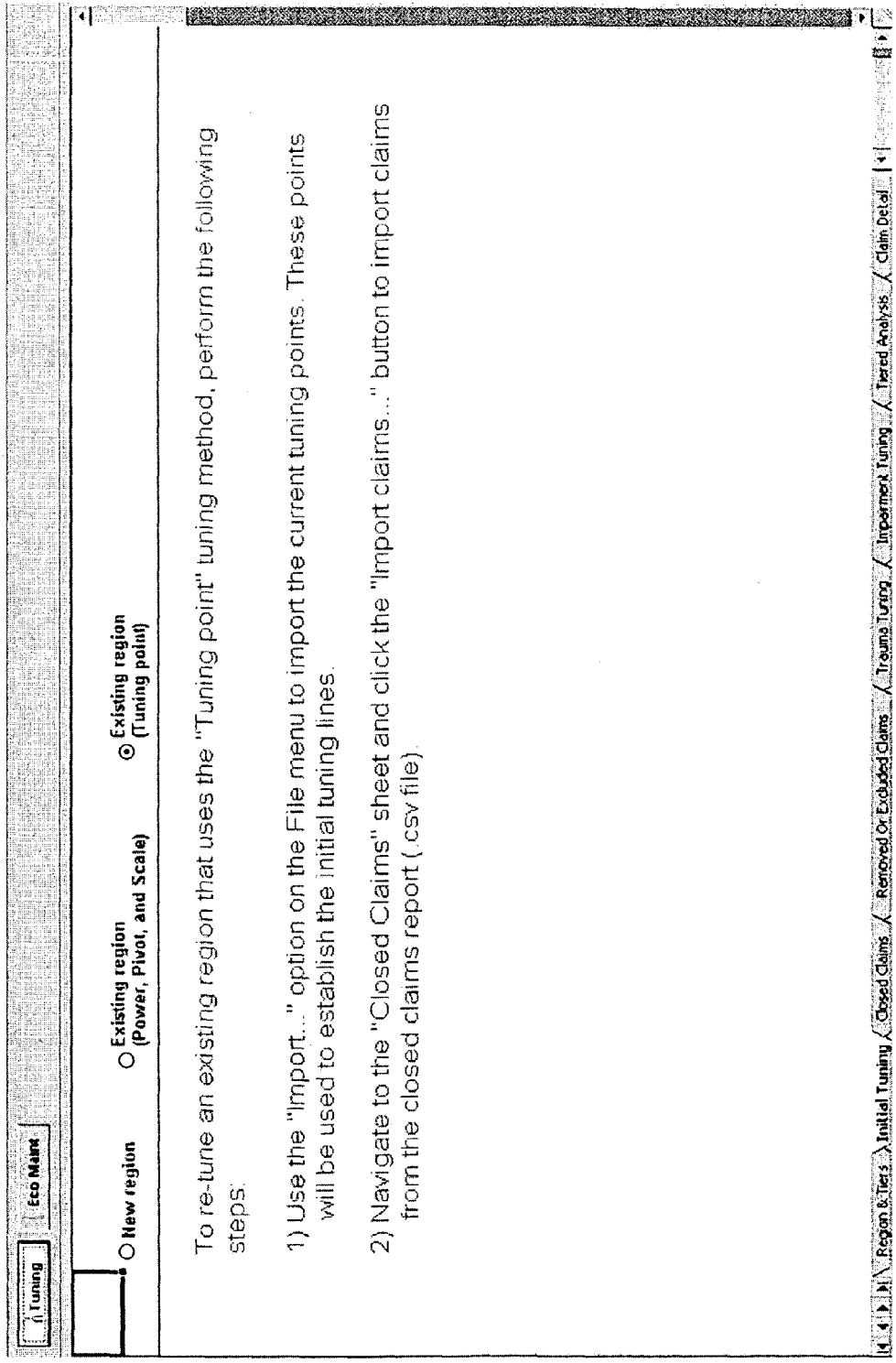
FIG. 35C depicts a third embodiment of an initial tuning screen of a tuning application.

FIGS. 35A, 35B and 35C depict embodiments of an initial tuning data sheet 3500. Initial tuning data sheet 3500 may allow the user to specify whether a new region is to be tuned or an existing region is to be re-tuned. For example, the user may be presented with options buttons 3504, 3506 and/or 3508. In such a case, each option button may select a different method of forming initial tuning. For example, selecting new region option button 3504 may cause a new region initial tuning data sheet to be displayed, as depicted in FIG. 35A. As shown in FIG. 35A, initial tuning data sheet 3500 may include one or more data input fields for gathering initial tuning data. For example, initial tuning data sheet 3500 may include a trauma tuning table 3510 and/or an impairment tuning table 3520. Trauma tuning table 3510 may include a number of monetary amount input fields 3514 corresponding to a number of baseline cases 3518. One or more experts may evaluate one or more of the baseline cases and determine a monetary amount appropriate for a settlement of a claim as described by the baseline case. As used herein, an "expert" generally refers to an experienced claim adjuster familiar with monetary settlement norms for a given region. A trauma severity value 3516 corresponding to each baseline case 3518 may have already been determined (as shown in FIG. 35A). Alternately, a trauma severity value for each baseline case may be determined after expert evaluations take place. Each trauma severity value 3516 and corresponding monetary amount 3514 may form a data point for a baseline tuning line. Similarly, an impairment tuning table 3520 may be included in an initial tuning data sheet 3502. Impairment tuning table 3520 may include a number of baseline cases 3522 to be evaluated by one or more experts. Based on the expert evaluations, a monetary amount 3524 may be associated with one or more bodily impairment amounts 3526. Each bodily impairment amount 3526 and monetary amount 3524 may form a data point for a baseline impairment tuning line. After the user has input one or more monetary amounts in trauma tuning table 3510 and/or impairment tuning table 3520, use for initial tuning button 3530 may be selected. Use for initial tuning button 3530 may cause an initial tuning line(s) to be determined based on data points provided in tables 3510 and/or 3520.

In another example, selecting existing region old tuning option button 3506 or existing region new tuning option button 3508 may cause an existing region initial tuning data sheet to be displayed, as depicted in FIGS. 35B and 35C, respectively. An existing region tuning data sheet may include directions and/or controls for importing claim data and/or existing tuning data into the tuning application and generating an initial tuning based on the imported data.

FIGS. 36A, 36B, 36C and 36D depict an embodiment of a closed claim data sheet 3600. In an embodiment, closed claim data sheet 3600 may receive imported closed claim data. In certain embodiments, closed claim data sheet 3600 may also display projected claim data for the closed claims based on fine-tuning changes made by the user. Closed claim data imported into closed claim data sheet 3600 may come from a closed claim study for a new region, or from a closed claim report for an existing region that is being re-tuned. In an embodiment, closed claims may be exported from a database and/or insurance claims processing program. In certain embodiments, a reporting interface such as BusinessObjects™ or WebIntelligence™, both commercially available from Business Objects America, Inc. of San Jose, Calif., may be used. The number of closed claims imported may vary depending on the history and/or desires of the insurance company or region of the insurance company. Generally, about 50 or more closed claims may be imported to ensure that acceptable statistical values may be determined during analysis of the closed claims.

In an embodiment, a closed claim data sheet 3600 may include a controls portion 3602 and a claim display portion 3603. Control portion 3602 may include one or more input mechanisms (e.g., buttons) for executing one or more method steps. For example, an import claims button 3604 may allow the user to select one or more closed claims to import into the tuning application. A sort data button 3605 may be provided to allow one or more claims in claims display portion 3603 to be organized in a desired manner. If the user selects sort data button 3605, a dialog box may appear asking the user to select the sort field and/or sort order (e.g., ascending or descending). A remove claim button 3606 may be provided to remove one or more selected claims from claim display portion 3603. In an embodiment, one or more claims removed from claims display portion 3603 may be placed in a removed/excluded claims screen 3700, as described with reference to FIG. 37. For example, the user may select a cell in a row of a claim to be removed and select remove claim button 3606. In an embodiment, when the user selects remove claim button 3606, a dialog box may appear asking for an explanation of why the claim is being removed. The reason a claim was removed may also be shown in removed/excluded claims screen 3700. A clear claims button 3607 may allow all of the claims to be removed from claim display portion 3603. An initial tuning line button 3608 may allow the user to generate an initial tuning line based on one or more closed claims displayed in claim display portion 3603. In an embodiment, a selection mechanism 3609 may also be provided to allow the user to select between forming a new tuning line or modifying an existing tuning line.

In an embodiment, initial tuning line button 3608 may be used to create an initial tuning line from values generated by other tuning applications. In such embodiments, initial tuning line button 3608 may only be active when the existing region old tuning option 3506 is selected in initial tuning data sheet 3500. After selecting initial tuning line button 3608 a trauma tuning points dialog box may appear. The trauma tuning points dialog box may allow the user to select the number of trauma tuning points the tuning application should select from the closed claims. In an embodiment, the tuning application may approximately evenly distribute the tuning points on the tuning line. In certain embodiments, the user may add tuning points on trauma tuning sheet 3800.

Figure 36A:
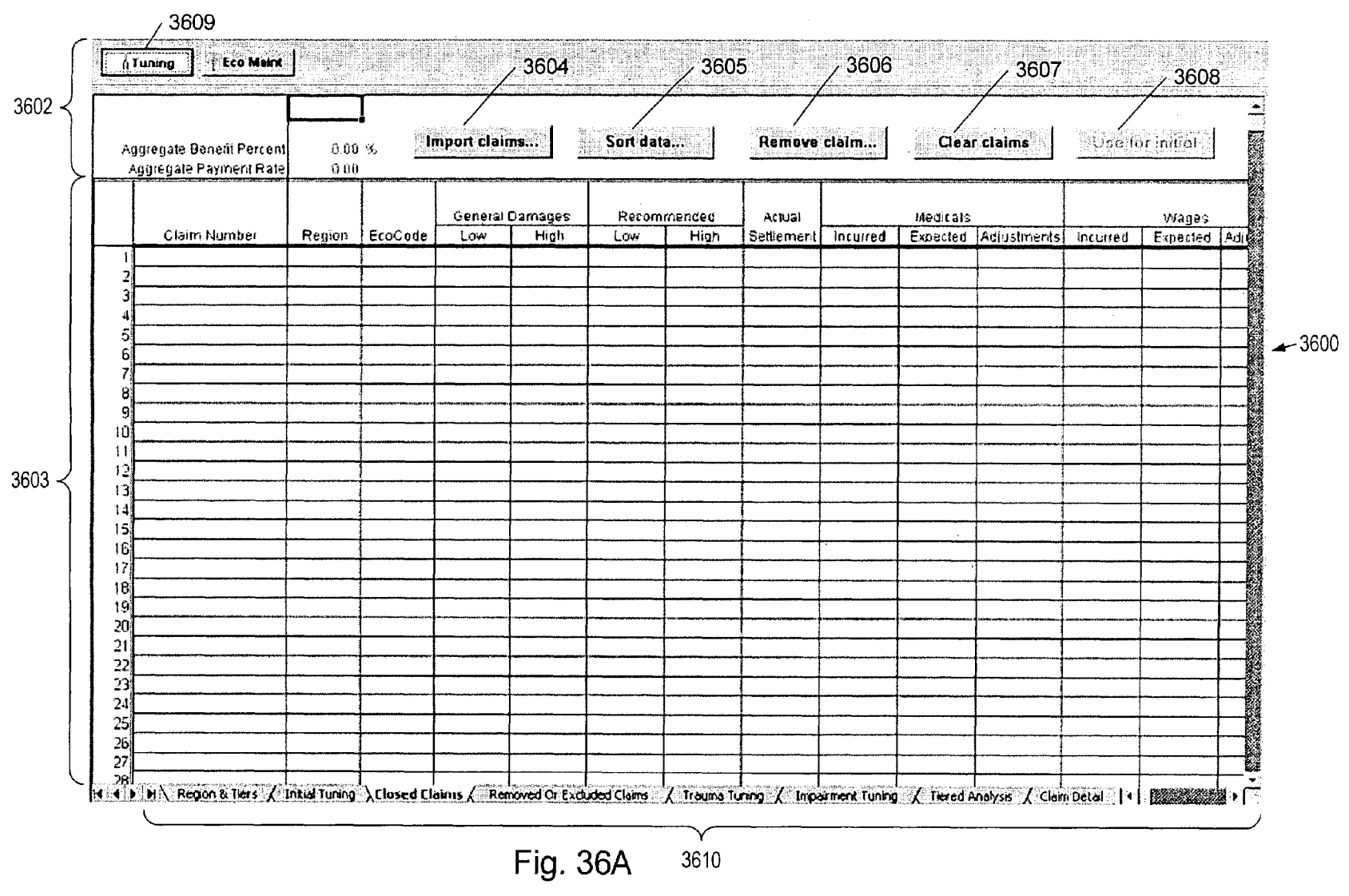
Figure 36B:
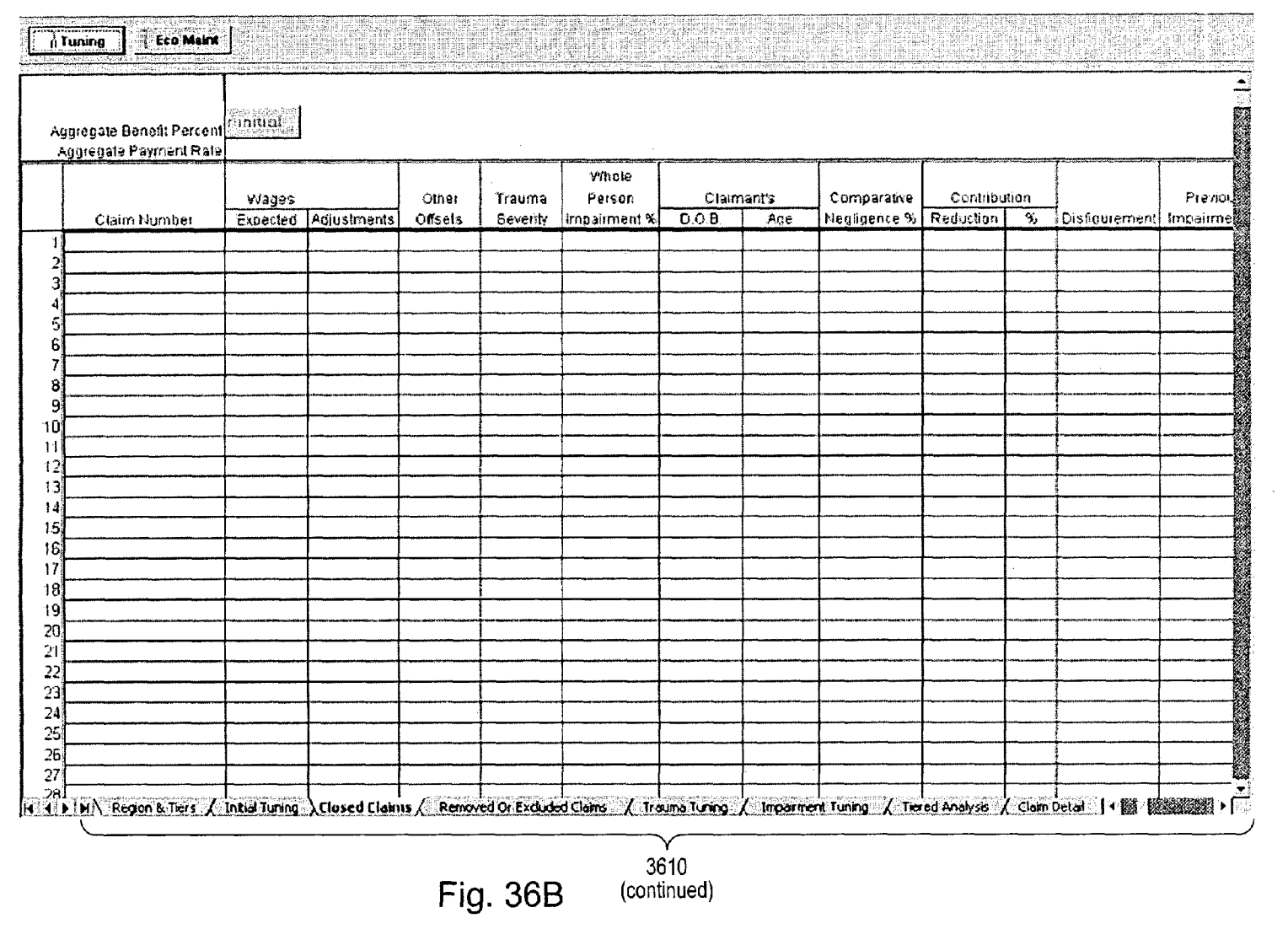
Figure 36D:
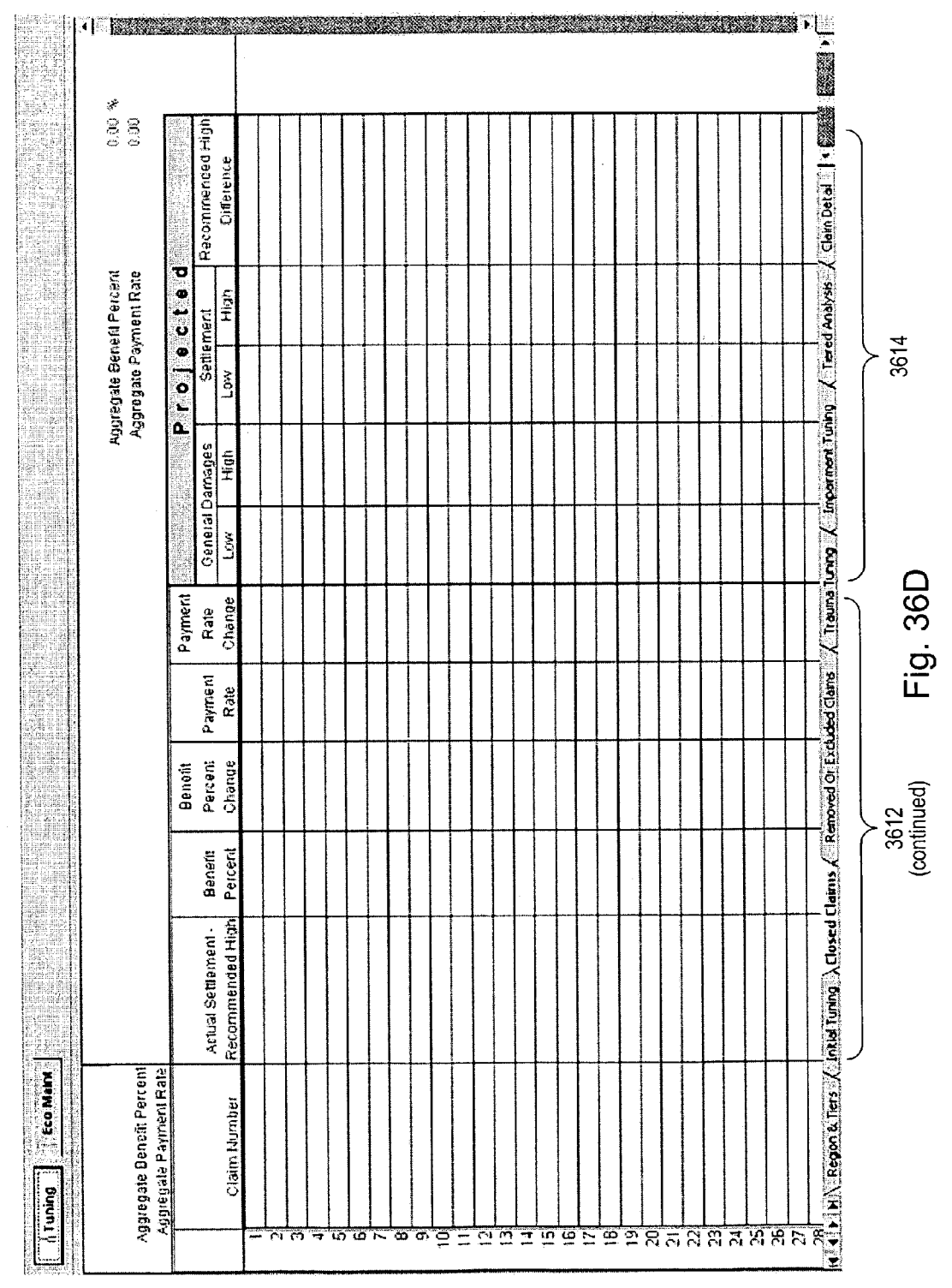

A claim display portion 3603 of a closed claim data sheet 3600 may include but is not limited to a closed claim data section 3610, a calculated data section 3612 (see FIG. 36C), and a projected data section 3614 (see FIG. 36D). Calculated data section 3612 may include values derived from mathematical formulas acting on the closed claim data. Calculated data section 3612 may help a user to identify anomalous claims data. For example, the user may sort the entire sheet on "Actual Settlement—Recommended High" and identify claims with relatively large differences between the recommended settlement and the actual settlement.

Projected data section 3614 may show values that would be recommended for each claim if the current fine-tuning option were implemented. For example, a "Recommended high difference" column may allow the user to see the change in recommended amounts from the baseline tuning to the current fine tuning option.

Other closed claim data that may be imported and/or displayed may include, but is not limited to:

Actual general damages. "Actual general damages" may refer to an amount paid to compensate a claimant for pain and suffering. Actual general damages typically does not include expenses related to specials or adjustments, but typically does include amounts paid out for disfigurement and/or impairment.

Actual Trauma Dollars. "Actual trauma dollars" may refer to an amount paid to compensate a claimant for an injury based purely on trauma severity. Actual trauma dollars does not typically include amounts paid out for disfigurement, impairment, specials, or adjustments.

Benefit Percent. "Benefit percent" may represent a percentage of the actual settlement dollars that would have been saved had the claims settled at the recommended high amounts. Benefit percent may be calculated by:

((Actual Settlement−Recommended High)/Actual Settlement).

Benefit Percent Change. "Benefit percent change" may refer to the effect a particular claim has on the over all benefit percent.

Payment Rate. "Payment rate" may refer to the number of actual settlement dollars paid for every recommended dollar. Payment rate may be calculated by:

(Actual Settlement/Recommended High).

Payment Rate Change. "Payment rate change" may refer to the effect a particular claim has on the overall benefit percent.

Recommended Trauma Dollars. "Recommended trauma dollars" may refer to recommended injury compensation based purely on trauma severity. Recommended trauma dollars does not typically include recommended compensation based on disfigurement, impairment, specials, or adjustments.

Trauma Severity Points (TSP) or Trauma Severity Values TSV). "TSP" or "TSV" refer to units that may be used to measure the seriousness of an injury. An insurance claim processing system may determine a TSV or TSPs associated with a claim based on information provide to the insurance claim processing system regarding the claim.

Recommended High. "Recommended high" may refer to the high end of a recommended settlement range for final settlement value of a claim. The recommended high may include all aspects of the claim including, but not limited to specials, adjustments, disfigurement, impairment, and/or trauma.

Recommended High Difference. "Recommended high difference" may refer to a projected difference between the original or baseline recommended high and a projected recommended high.

Recommended Low. "Recommended low" may refer to the low end of a recommended settlement range for final settlement value of a claim. The recommended low may include all aspects of the claim including, but not limited to specials, adjustments, disfigurement, impairment, and/or trauma.

Trauma Benefit Percent. "Trauma benefit percent" may refer to a percentage of actual trauma dollars that would have been saved had the closed claims been settled using the recommended trauma dollar amounts. Trauma benefit percent may be calculated by:

((Actual Trauma Dollars−Recommended Trauma Dollars)/Actual Trauma Dollars).

Trauma Payment Rate. "Trauma payment rate" may refer to the number of actual trauma dollars paid for every recommended trauma dollar. Trauma payment rate may be calculated by:

(Actual Trauma Dollars/Recommended Trauma Dollars).

Figure 37:
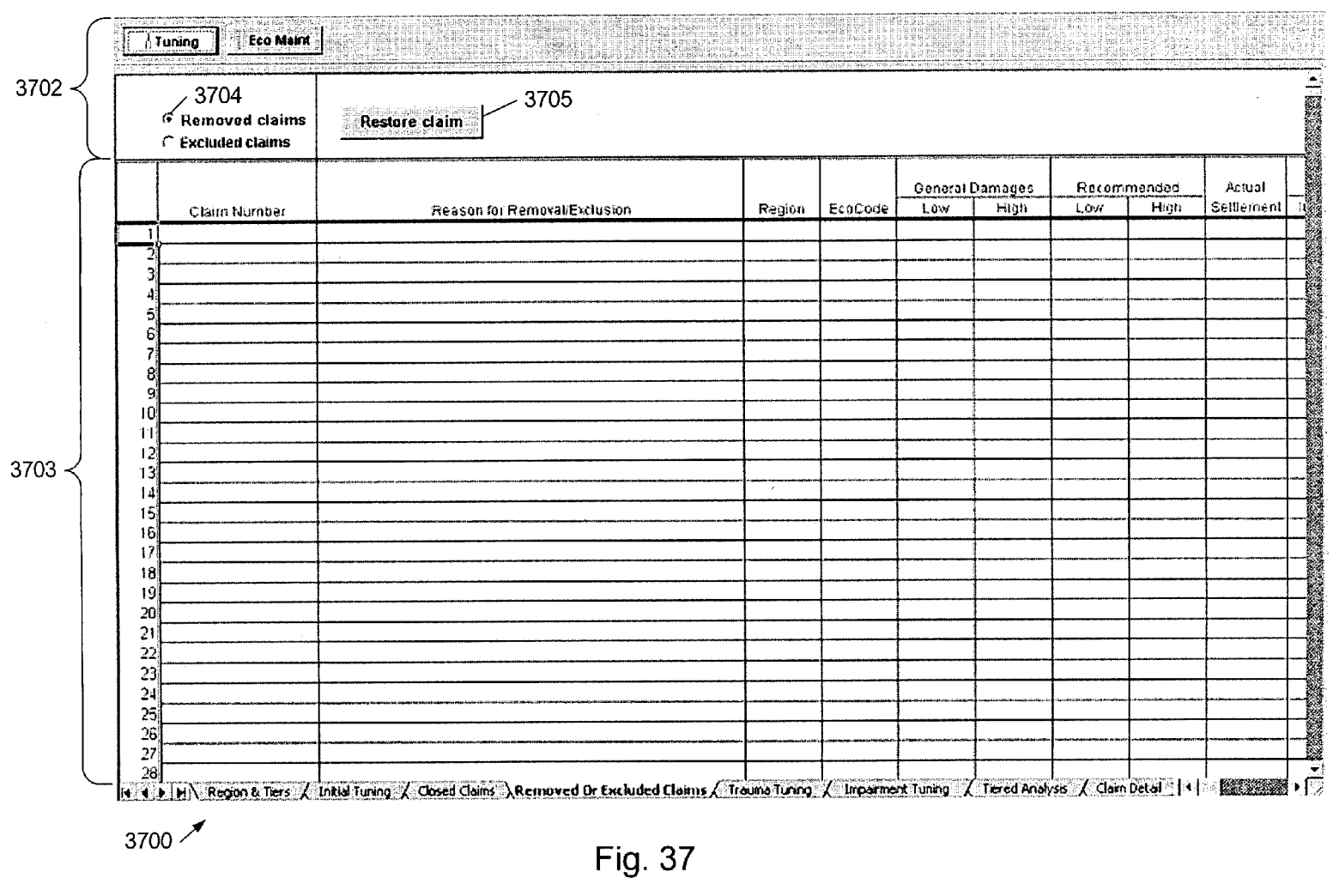

In an embodiment, a tuning application may include a removed/excluded claims screen 3700 as shown in FIG. 37. Removed/excluded claims screen 3700 may provide a display of claims that have been selected to be removed from or excluded from a set of closed claims used to form a tuning line. A claim display portion 3703 of removed/excluded claims screen 3700 may include data columns as previously described with regard to closed claim screen 3600. Additionally, removed/excluded claims screen 3700 may include a controls portion 3702. Controls portion 3702 may include a restore claim button 3705. Selecting restore claim button 3705 may cause a selected claim or claims to be move to closed claim screen 3600 as part of a set of claims to be used in forming a tuning line. A removed/excluded claims selection mechanism 3704 may be provided to allow the user to select between viewing claims that have been removed and claims that have been excluded. In an embodiment, removed/excluded claim screen 3700 may include all or portions of the data described with regard to close claim screen 3600. In certain embodiments, closed claim screen may include a field for describing the reason a claim was removed or excluded.

Figure 38:
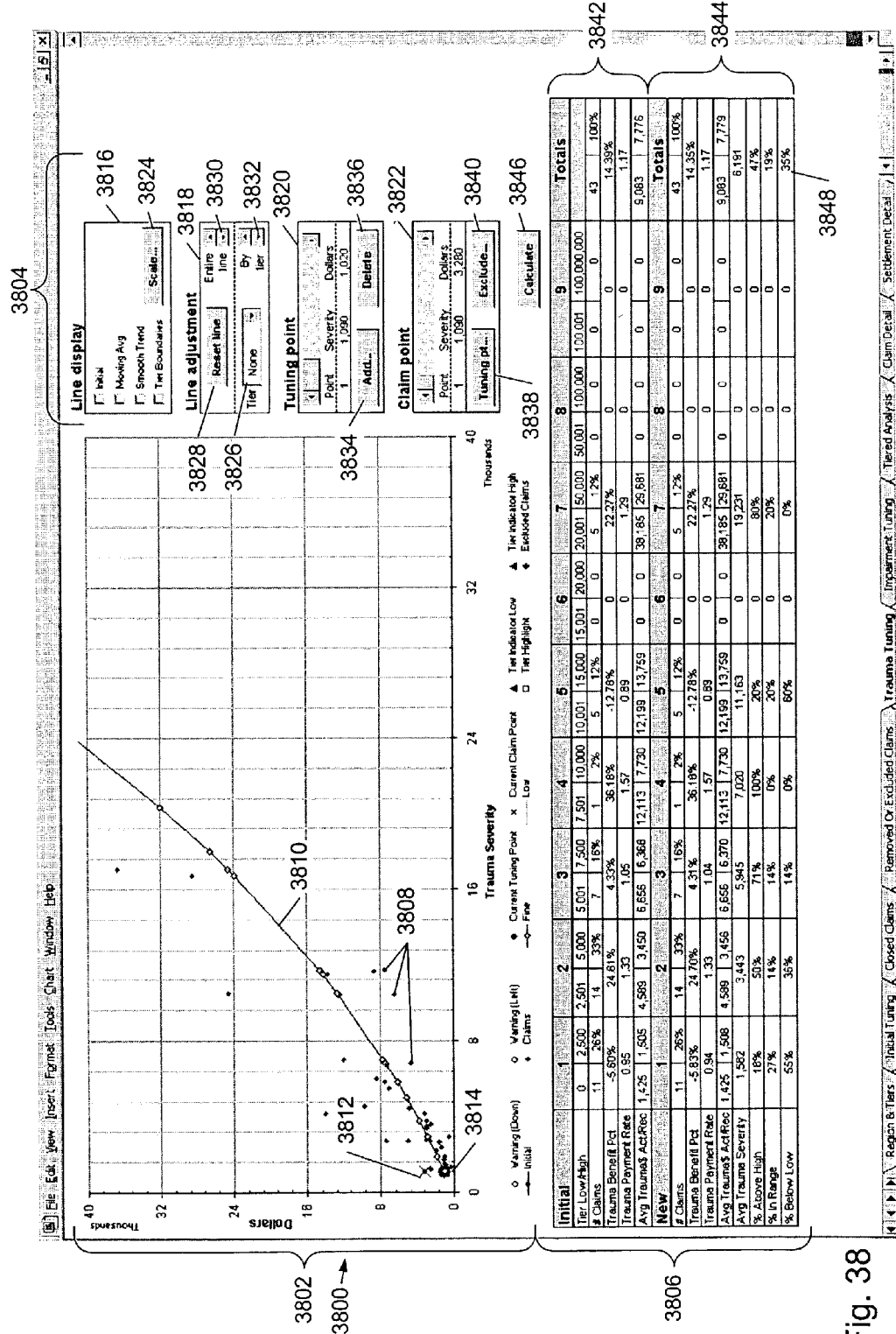
FIG. 38 depicts an embodiment of a trauma tuning screen of a tuning application.

FIG. 38 depicts an embodiment of a trauma fine-tuning screen 3800. Trauma fine-tuning screen 3800 may include a trauma fine-tuning graph 3802, a controls portion 3804 and an analysis portion 3806. In an embodiment, a user may interact with trauma fine-tuning graph 3802 to adjust the relationship between trauma severity values and monetary amounts. Trauma tuning graph 3802 may visually represent the relationship between trauma severity values and monetary amounts. In an embodiment, trauma fine-tuning graph 3802 may include an X-axis representing trauma severity values and a Y-axis representing monetary amounts. In certain embodiments, trauma tuning graph 3802 may depict the relationship between trauma severity values and actual monetary amounts and the relationship between trauma severity values and recommended monetary amounts. Thus, the user may be able to view the difference between recommended amounts and corresponding actual amounts.

In an embodiment, trauma fine-tuning graph 3802 may display data points 3808 corresponding to actual monetary amounts from closed claims relative to trauma severity values. Additionally, trauma fine-tuning graph 3802 may include a fine-tuning line 3810. Trauma fine-tuning graph 3802 may also include a claim point selector 3812 and a tuning point selector 3814.

In addition to graphically representing the trauma tuning of a region, trauma fine-tuning graph 3802 may allow the user to modify tuning line 3810. For example, the user may "drag and drop" a tuning point to modify fine-tuning line 3810. That is, the user may select a point to be repositioned using a cursor-positioning device. The selected tuning point may be indicated by tuning point selector 3814. The selected point may be moved to another location. In an embodiment, the user may have the ability to move the selected point to a location that might not be desirable (e.g., a location where trauma dollars decrease with increasing trauma severity). In some such embodiments, a red warning marker may be drawn around a tuning point that is placed in an undesirable location.

In some embodiments, the user may be inhibited from positioning a selected tuning point in an undesirable location.

In certain embodiments, controls to adjust the fine-tuning may be found in controls portion 3804. For example, controls portion 3804 may include a display control box 3816, a line adjustment control box 3818, a tuning point control box 3820, and/or a claim point control box 3822.

In an embodiment, display control box 3816 may allow the user to select elements to display in trauma fine-tuning display 3802. Elements that may be displayed include but are not limited to initial tuning line 3810, a moving average line, a smooth trend line and/or tier boundary lines.

When trauma fine-tuning display 3802 is initially activated, the initial tuning line and fine-tuning line may by substantially the same. However, after the user has modified the fine-tuning line, the initial tuning line may be displayed to show how much the tuning has changed.

In an embodiment, a moving average trend line may be displayed. A moving average trend line may show the average values of the actual trauma dollar values displayed on the graph. In an embodiment, a smooth trend line may be displayed. For example, a smooth trend line may include a polynomial best-fit line (e.g., a $6^{th}$ order polynomial trend line). In an embodiment, tier boundary lines may be depicted in trauma fine-tuning display 3802. Tier boundary lines in fine-tuning display 3802 may show the location of tiers established on basic information page 3400.

In an embodiment, a scale control button 3824 may allow a user to modify the scale of trauma fine tuning display 3802. In such embodiments, if the user selects scale control button 3824 a scale control dialog box may be displayed. The scale control dialog box may include a control to set the scale of fine-tuning display 3802 in terms of trauma severity or monetary amount. The scale may establish the maximum values of the X or Y-axes.

Line adjustment control box 3818 may include controls for adjusting fine-tuning line 3810. For example, line adjustment control box 3818 may include a tier selection menu 3826. Tier selection menu 3826 may allow a user to select a tier to be tuned. For example, when a tier is selected using tier selection menu 3826 data points that fall within that tier may be highlighted. Additionally, in some embodiments, tier boundaries may be displayed along the X-axis at the trauma severity values that correspond to the tier boundary monetary amounts. That is, the tier boundaries may represent the trauma severity values at which the current fine-tuning line crosses the tier boundaries. Points between two, tier boundaries may be considered in the calculations related to the selected tier and in tuning of the selected tier. In an embodiment, a selected tier may be tuned independently of other tiers by using "by tier" controls 3832. By tiers controls 3832 may allow the user to modify the position of tuning points with a selected tier boundary. Alternately, the entire line may be tuned by using "entire line" controls 3830. For example, the user may adjust the fine-tuning line as a percentage of the initial tuning line using entire line controls 3830. Line adjustment control box 3818 may also include a reset button 3828. Reset button 3828 may allow a user to return fine-tuning line 3810 to the initial tuning position.

In an embodiment, controls portion 3804 may also include a tuning point control box 3820. Tuning point control box 3820 may include controls that allow the user to select, add and/or delete tuning points. In an embodiment, a tuning point may be selected by scrolling through one or more points. As a tuning point is selected, information may be displayed regarding the point (e.g., the trauma severity value and monetary amount associated with the point).

The user may add a tuning point, by selecting add button 3834. Selecting add button 3834 may cause a dialog box to be displayed. The dialog box may allow the user to specify a trauma severity value and a monetary amount for the added tuning point. The tuning point may be added to the graph. In an embodiment, fine-tuning line 3810 may be modified to pass through the added tuning point. Similarly, to delete a tuning point the user may select the tuning point as previously described and select delete button 3836. The selected tuning point may be deleted and fine-tuning line 3810 may be modified to omit the deleted tuning point. For example, fine-tuning line 3810 may be modified to form a straight line between the nearest neighboring tuning points of the deleted tuning point.

In an embodiment, controls portion 3804 may include a claim point control box 3822. Claim point control box 3822 may include controls that allow the user to select a claim point, use a claim point as a tuning point and/or exclude a claim point from trauma fine-tuning display graph 3802. In an embodiment, a claim point may be selected by scrolling through one or more points. As a claim point is selected, information may be displayed regarding the data point (e.g., the trauma severity value and monetary amount associated with the point).

In an embodiment, the user may use a selected claim point as a tuning point, by selecting tuning button 3838. Tuning button 3838 may cause fine-tuning line 3810 to be modified to pass through the new tuning point. To exclude a claim point from trauma fine-tuning display graph 3802 the user may select the claim point and select exclude button 3840. The selected claim point may be removed from the graph. In an embodiment, the excluded claim point may be added to removed/excluded claim display 3700. The excluded claim point may be excluded from calculations based on claim data. In an embodiment, the user may be prompted to provide a reason for excluding the claim point.

In an embodiment, an analysis portion 3806 of trauma fine-tuning screen 3800 may include a numeric representation of the fine-tuning as it applies to the closed claims. Analysis portion 3806 may be divided into tiers as previously described.

Analysis portion 3806 may include two sections. A baseline section 3842 may include calculations based on the initial or baseline tuning. Numbers in baseline section 3842 may not change when fine-tuning line 3810 is altered. A fine-tuning section 3844 may be determined based on the current fine-tuning line. Fine-tuning section 3844 may be updated when a "Calculate" button 3846 is selected. An error message may be generated if the calculation cannot be completed (e.g., if a claim is outside the range of the tuning points).

Analysis portion 3806 may also include a totals column 3848. Totals column 3848 may pertain to the tuning data as a whole rather than from a tier-by-tier perspective.

Figure 39:
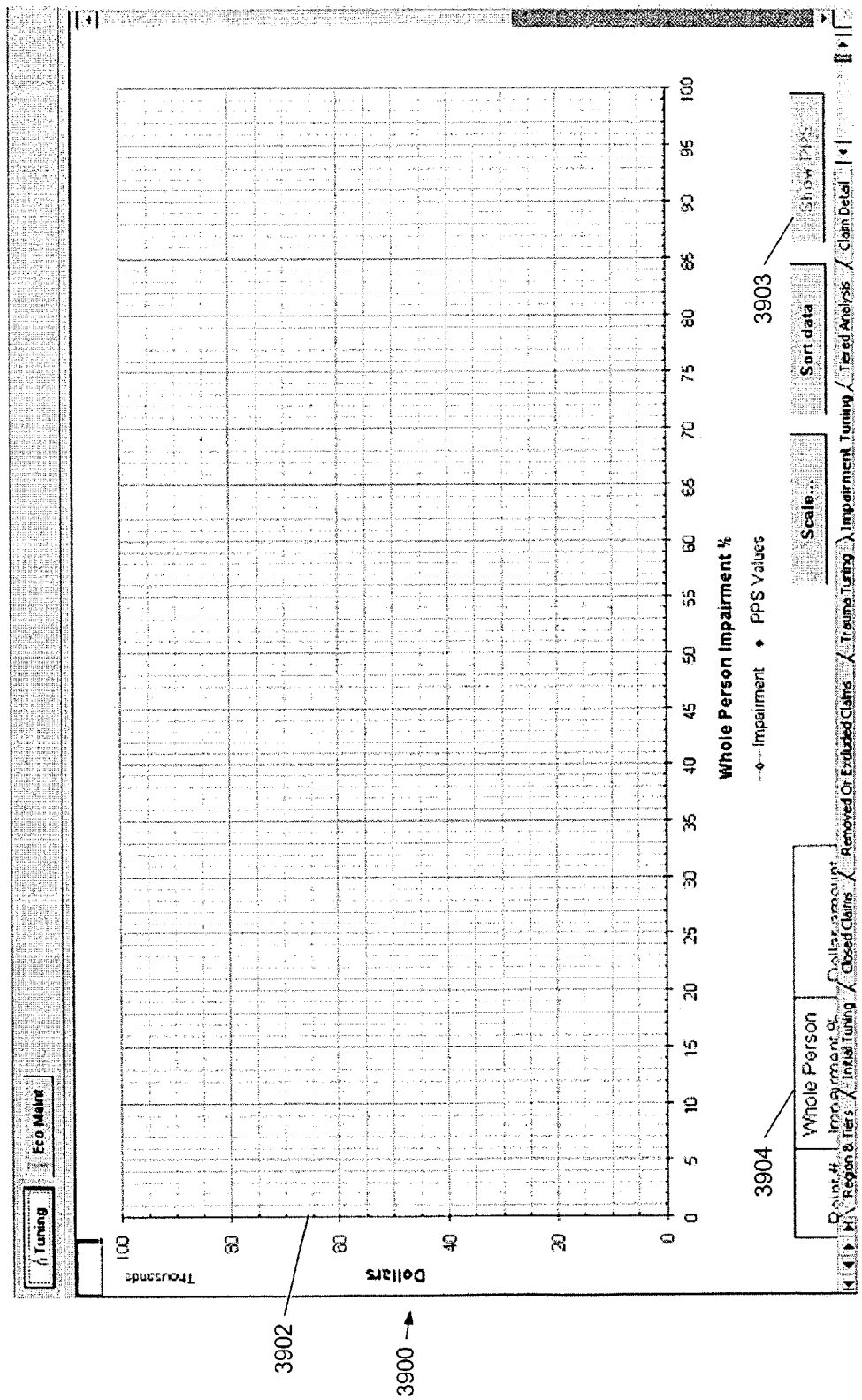
FIG. 39 depicts an embodiment of an impairment tuning screen of a tuning application.

In an embodiment, a tuning application may include an impairment fine-tuning sheet 3900, as depicted in FIG. 39. Impairment fine-tuning sheet 3900 may include an impairment fine-tuning graph 3902. Impairment fine-tuning sheet 3900 may also include an impairment fine-tuning data table 3904. Impairment fine-tuning data table 3904 may include impairment fine-tuning data points. The use of impairment fine-tuning sheet 3900 may vary depending on which option button is selected on initial tuning data sheet 3500. For a user tuning a new region (e.g., new region option button 3504 is selected on initial tuning data sheet 3500), impairment fine-tuning graph 3902 and impairment fine-tuning data table 3904 may be pre-populated with the baseline figures entered in impairment tuning table 3520 on initial tuning data sheet 3500. For a user retuning a region previously tuned using another tuning method (e.g., existing region old tuning option button 3506 is selected on initial tuning data sheet 3500), impairment fine-tuning graph 3902 and impairment fine-tuning data table 3904 may be blank. Additionally, Show PPS button 3903 may be enabled. For a user retuning a region previously tuned by the present method (e.g., existing region new tuning option button 3508 is selected on initial tuning data sheet 3500), impairment fine-tuning graph 3902 and impairment fine-tuning data table 3904 may display the previous impairment tuning.

In an embodiment, the user may interact with impairment fine-tuning graph 3902 and/or impairment fine-tuning data table 3904 to establish a desired impairment fine-tuning line. For example, the user may drag and drop impairment-tuning points on impairment fine-tuning graph 3902. In another example, the user may add, modify and/or delete impairment-tuning points in impairment fine-tuning data table 3904.

In an embodiment, if a region previously tuned using a different tuning method is being re-tuned, the user may select show pps button 3903 to display impairment data points from previous tuning in impairment fine-tuning graph 3902. In an embodiment, the user may use one or more of the displayed impairment data points as impairment tuning points. For example, in an embodiment, the user may select a data point and select a control (e.g., a right-click pull down menu) to make the data point a tuning point. In certain embodiments, the user may determine the position of a data point on the graph and enter the position in impairment fine-tuning data table 3904, as an impairment tuning point.

Figure 40:
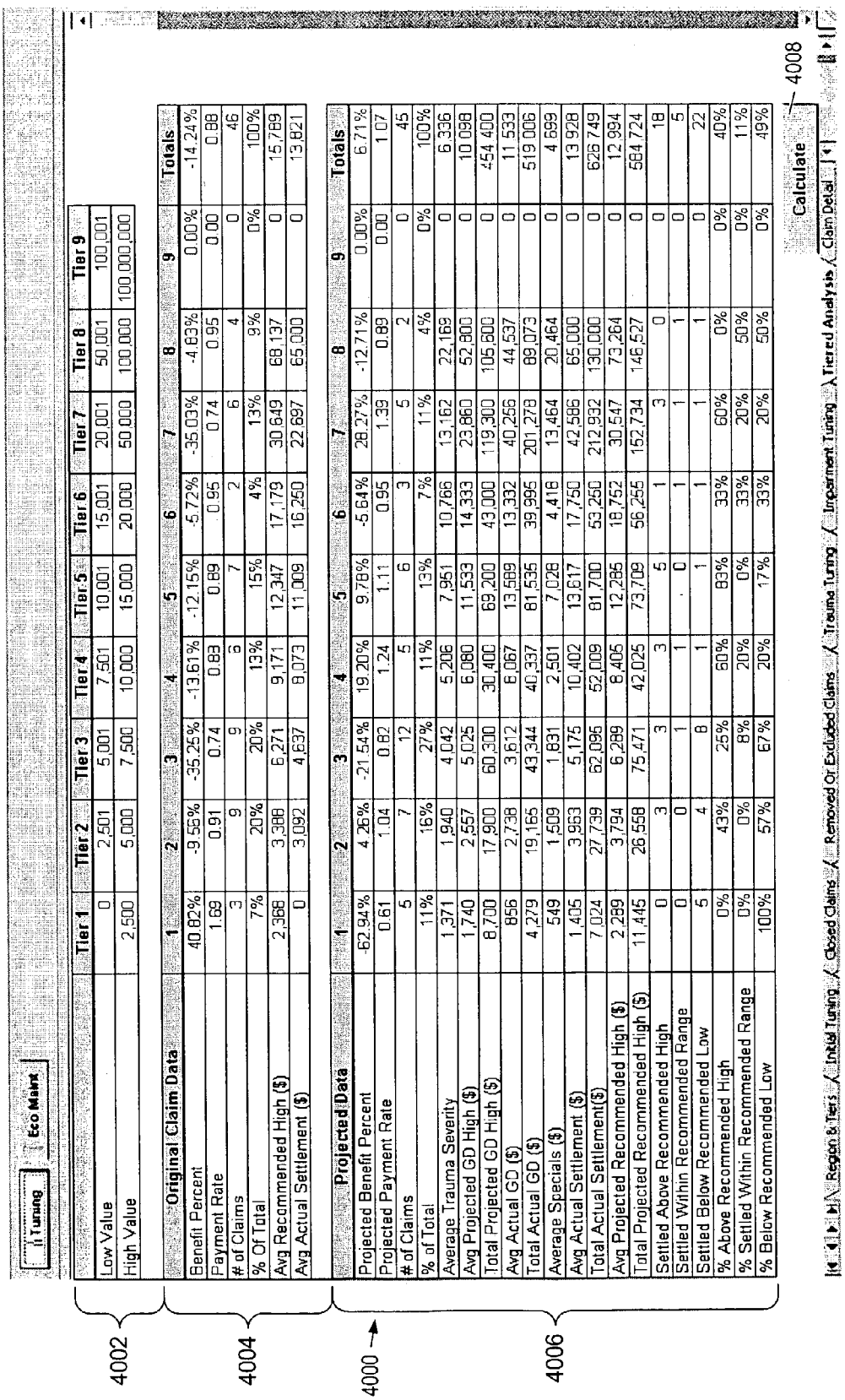
FIG. 40 depicts an embodiment of a tiered analysis screen of a tuning application.

FIG. 40 depicts an embodiment of a tiered analysis sheet 4000. Tiered analysis sheet 4000 may provide an analysis of the effect of trauma and impairment tuning on the closed claims listed on closed claim data sheet 3600. In certain embodiments, the analysis displayed in tiered analysis sheet 4000 may differ from the analysis in analysis portion 3806 of trauma fine-tuning sheet 3800 in that the calculations presented in tiered analysis sheet 4000 may include both trauma and impairment.

Tiered analysis sheet 4000 may include several sections. A tier boundaries section 4002 may identify the tier boundaries as established in basic information page 3400. An initial claim data section 4004 may display claim data and/or calculated values based on the closed claims listed on closed claim data sheet 3600. A projected claims data section 4006 may display claim data based on the closed claims modified to reflect the current trauma fine-tuning and impairment fine-tuning. That is, projected claims data section 4006 may provide an estimate of how values associated with the closed claim might be different if the current tuning had been in place when the closed claims were processed. In an embodiment, the user may select calculate button 4008 to update values on tiered analysis sheet 4000.

Figure 41:
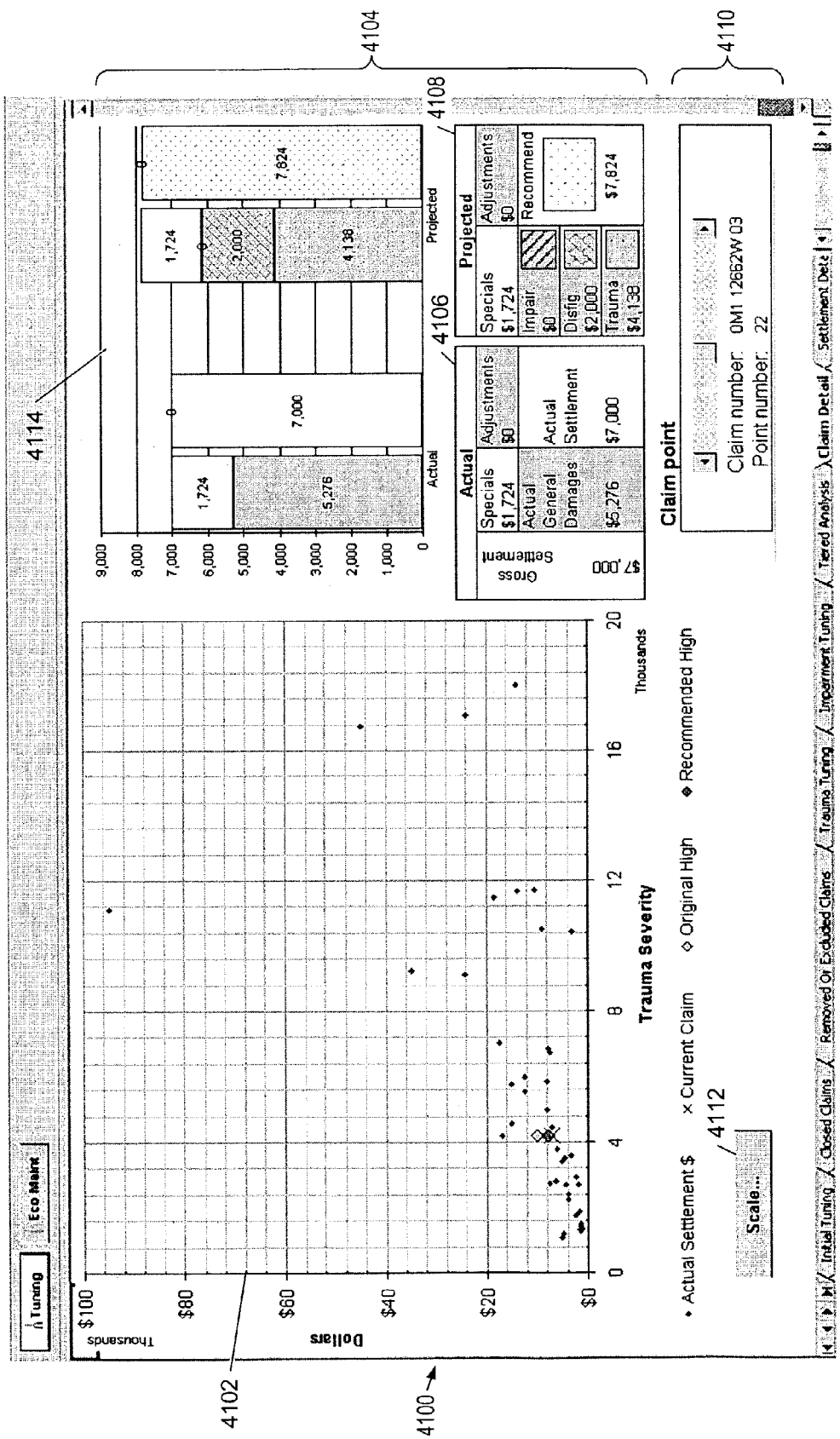
FIG. 41 depicts an embodiment of a claim detail screen of a tuning application.

FIG. 41 depicts an embodiment of a claim detail sheet 4100. Claim detail sheet 4100 may allow the user to see details about how the current tuning would effect individual closed claims. Such details may be useful to help the user identify one or more claims that are effected more dramatically than others or that appear to have anomalous values. Claim detail sheet 4100 may include an overview claim graph portion 4102, a detail claim graph portion 4104 and a controls portion 4110. Together overview claim graph portion 4102 and detail claim graph portion 4104 may provide the user with details about a selected closed claim along with details about future recommendations for similar claims based on the current tuning.

Overview claim graph portion 4102 may include an X/Y graph of the closed claims, with trauma severity values along one axis and monetary amounts along the other axis. Actual settlement values for one or more closed claims may be shown by a first indicator (e.g., a red diamond). When a particular close claim is selected (e.g., using controls portion 4110), a second indicator may show the original recommended high settlement value for the selected claim. Additionally, a third indicator may show the recommend high settlement value for the selected claim based on the current tuning. The user may zoom in or out on the graph using scale button 4112.

Detail claim graph portion 4104 may include two main components, an actual values component and a projected values component. For example, detail claim graph portion 4104 may provide details about the settlement of a selected claim in an actual values detail graph 4106. Similarly, details about the recommended settlement for that claim, based on the fine-tuning may be provided in a projected values graph 4108. Detail claim graph portion 4104 may also provide a side-by-side comparison of the actual and projected values in a stacked bar graph 4114.

Figure 42:
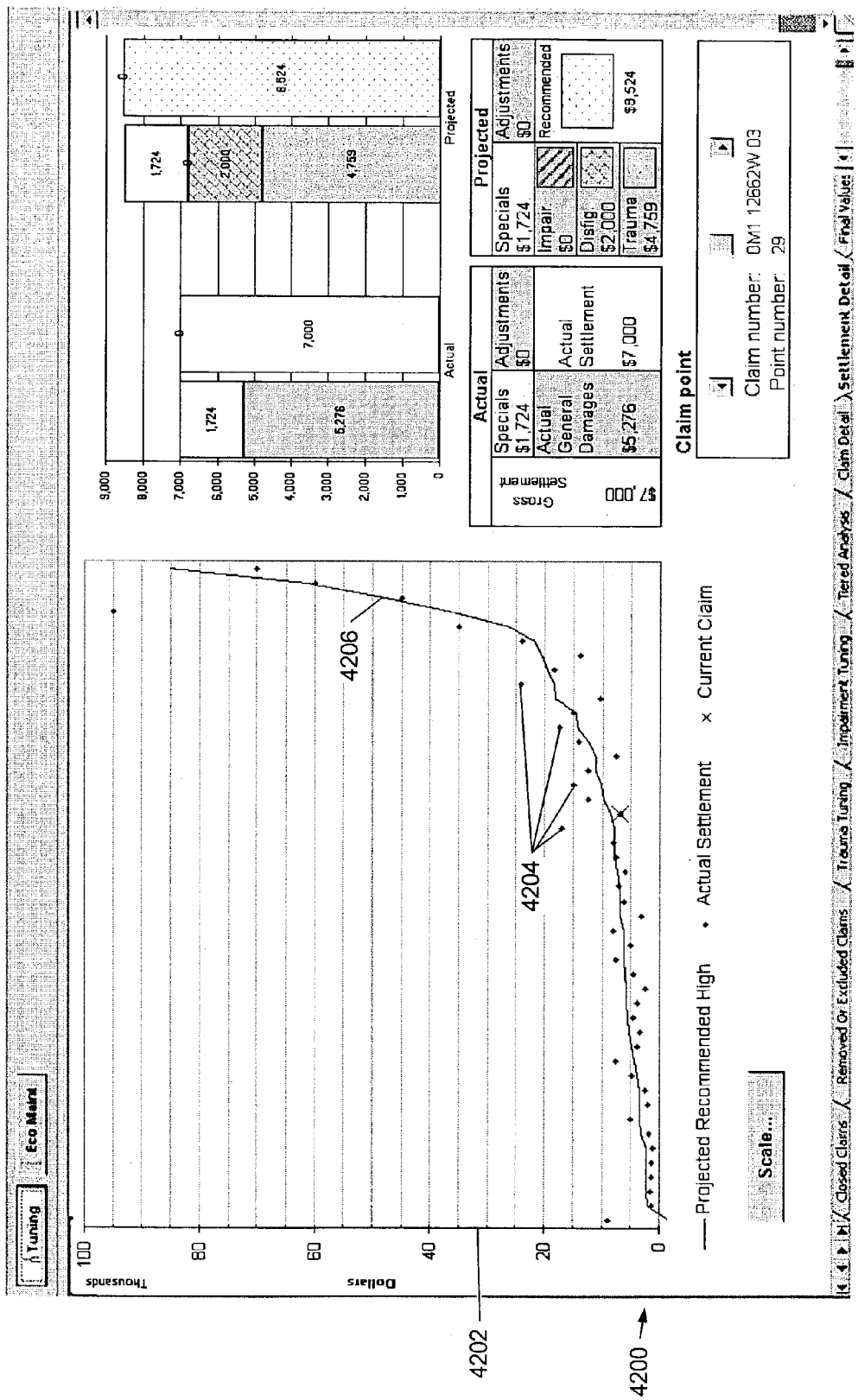
FIG. 42 depicts an embodiment of a settlement detail screen of a tuning application.

FIG. 42 depicts an embodiment of a settlement detail display 4200. Settlement detail display 4200 may have an appearance similar to claim detail sheet 4100. Rather than plotting claims in an X/Y graph with trauma severity values and monetary amounts as the graph axes, settlement claim display 4200 may include a relative projected high graph 4202. Relative projected high graph 4202 may include actual settlement values 4204 and a projected recommended high-line 4206. Actual settlement values 4204 may be approximately evenly distributed along the X-axis in increasing order of projected recommended high. Relative projected high graph 4202 may allow the user to see how the actual settlements fall in relation to the projected recommended settlement range (e.g., the projected recommended high settlement value).

FIG. 43 depicts an embodiment of a tuning points display sheet 4300. Tuning points display sheet 4300 may include tables for the current trauma tuning points (e.g., trauma tuning points table 4302) and impairment tuning points (e.g., impairment tuning points table 4304). The values in tuning points display sheet 4300 may be updated as the user makes changes to the other sheets. The user may export the tuning points from tuning points display sheet 4300. In an embodiment, the tuning points may be saved in an export file in a format accessible to the insurance claim processing system.

In an embodiment, a tuning application as described above may be used to analyze the effect of applying a first region's tuning to a second region's claims. For example, the user may prepare a tuning line or a set of tuning points for the first region. In certain instances, the first region may already be appropriately tuned. The tuning information for the first region may be accessed by the tuning application. If closed claim data for the first region exists in the closed claim data sheet, the first regions closed claim data may be cleared from the tuning application. Closed claim data for the second region may be imported into the tuning application. The user may select calculate button 3846 on trauma tuning sheet 3800 to see the effect of the first region's tuning on the closed claims from the second region. Similarly, the user may select calculate button 4008 on tiered analysis sheet 4800 to view the effect of the trauma and impairment tuning on the closed claims from the second region.

After a tuning line has been determined and adjusted as desired, the tuning line or data describing the tuning line (e.g., a plurality of data points) may be provided to an insurance claim processing system. The insurance claim processing system may be configured to receive the data describing the tuning line, and to estimate a monetary amount associated with an insurance claim. In an embodiment, the insurance claim processing system may be configured to utilize more than one tuning line. For example, a first tuning line may be used to relate TSV to monetary amounts and a second tuning line may be used to related impairment amounts to monetary amounts. In another example, the insurance claim processing system may utilize different tuning lines for different geographic regions and/or different types of insurance coverage. Thus, a tuning line may be prepared for each of a number of geographic regions and the insurance claim processing system may select a tuning line to use based on a geographic region associated with the claim.

In an embodiment, an insurance claim processing system may determine a TSV of a claim. The insurance claim processing system may utilize a defined relationship between TSV and monetary amounts (e.g., the data describing the tuning line) to estimate a monetary amount associated with an insurance claim. In an embodiment, the insurance claim processing system may determine whether a data point of the data describing the tuning line matches the determined TSV. If no data point is an exact match, the insurance claim processing system may interpolate between two or more data points of the data describing the tuning line. Alternatively, if the determined TSV lies outside a range of data points covered by the data describing the tuning line, the insurance claim processing system may extrapolate a monetary value based on the data describing the tuning line. If a monetary amount is determined by extrapolation, a message may be sent to the user informing the user that the determined monetary amount was determined by extrapolation. The interpolation or extrapolation, as appropriate, may utilize a linear or nonlinear method. An example of a linear interpolation method is described below.

Figure 44:
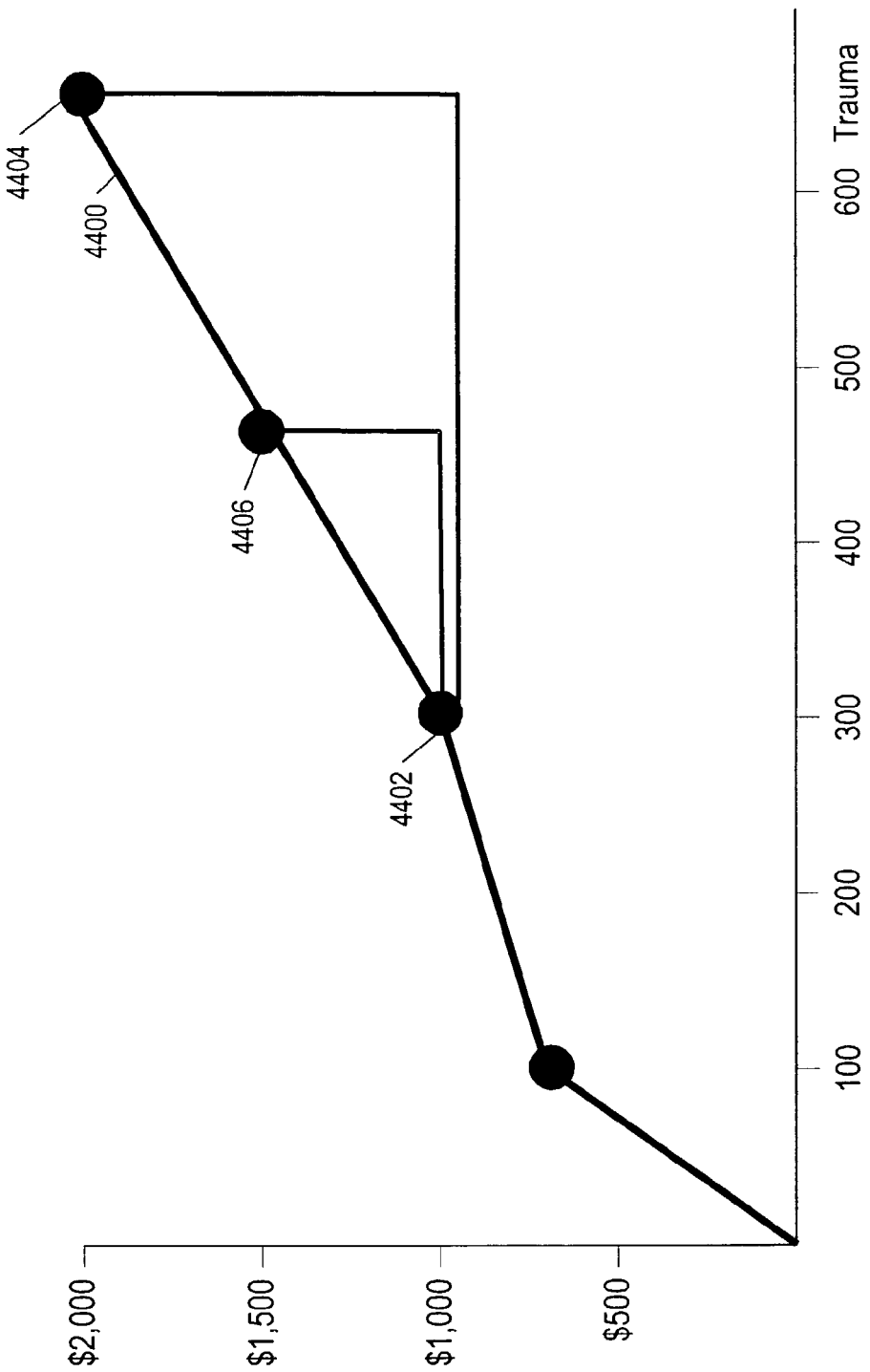
FIG. 44 depicts an embodiment of determining a monetary amount associated with a trauma severity value based on a tuning line.

FIG. 44 depicts an example of a tuning line 4400 that may be used by an insurance claim processing system. The specific amounts depicted in FIG. 44 and the shape of tuning line 4400 are for explanatory purposes only, and are not intended to be limiting in any way. According to tuning line 4400, a trauma severity value of 300 corresponds to a monetary amount of $1000 (see data point 4402). According to tuning line 4400, a trauma severity value of 625 corresponds to a monetary amount of $2000 (see data point 4404). Thus, if the insurance claim processing system determines a trauma severity value of 460, the system may interpolate along tuning line 4400 between data point 4402 and data point 4404 to determine a monetary amount corresponding to a TSV of 460. The monetary amount associated with a TSV of 460 (e.g., data point 4406) may be determined by assuming that the slope of tuning line 4400 between data point 4402 and data point 4404 is continuous, and determining the coordinates of data point 4406 based on the slope of the tuning line 4400 over that region. Thus, letting x equal the monetary amount corresponding to a trauma severity value of 460 and rounding to the nearest dollar:

$$\frac{(\$2000 - \$1000)}{(625 - 300)} = \frac{\$x - \$1000}{(460 - 300)}$$

$$x = ((\$2000 - \$1000) * (460 - 300))/(625 - 300) + \$1000$$

$$x = \$1492$$

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method comprising:
a computer system providing a graphical display comprising an X/Y trauma fine-tuning graph including a trauma fine-tuning line, wherein the trauma fine-tuning line represents a plurality of trauma data points relating trauma severity values to monetary amounts, wherein the trauma fine-tuning line reflects baseline data based on cases for which the severity data is predetermined;
the computer system receiving, via the graphical display, a selection of at least one point on the X/Y trauma fine-tuning graph, the computer system modifying, the trauma fine-tuning, line on the X/Y trauma fine-tuning graph of the graphical display based on the received selection of the at least one point on the trauma fine-tuning graph, wherein the modified trauma fine-tuning line comprises a modification from the baseline data;
the computer system providing a plurality of impairment data points relating bodily impairment amounts to monetary amounts;
the computer system providing a graphical display comprising an X/Y impairment fine-tuning graph including an impairment fine-tuning line, wherein the impairment fine-tuning line relates bodily impairment amounts to monetary amounts based on at least two of the impairment data points based on cases for which the impairment data is predetermined;
the computer system receiving, via the graphical display, an input;
the computer system modifying the impairment fine-tuning line on the X/Y impairment fine-tuning graph of the graphical display based on the input;
determining a monetary amount associated with a trauma severity value based on the modified trauma fine-tuning line;
determining a monetary amount associated with bodily impairment based on the modified impairment fine-tuning line; and
estimating a monetary value of one or more insurance claims using the modified trauma tuning line based on the monetary amount associated with the trauma severity value and the monetary amount associated with bodily impairment.

2. The method of claim 1, further comprising:
determining at least one new impairment data point relating at least one bodily impairment amount to at least one monetary amount based on modifications to the impairment fine-tuning line in the graphical display.

3. The method of claim 2, further comprising sending a plurality of data points to an insurance claims processing system, wherein the plurality of data points sent include at least one new trauma data point and at least one new impairment data point, and wherein the plurality of data points are usable by the insurance claim processing system to relate one or more trauma severity values and one or more bodily impairment amounts to one or more monetary amounts.

4. The method of claim 2, further comprising sending data describing the modified trauma fine-tuning line and the modified impairment fine-tuning line to an insurance claim processing system, wherein the data describing the trauma fine-tuning line and the impairment fine-tuning line is usable by the insurance claim processing system to relate one or more trauma severity values and one or more bodily impairment amounts to one or more monetary amounts.

5. The method of claim 1, wherein the trauma fine-tuning line is defined by at least one function relating trauma severity values to monetary amounts.

6. The method of claim 1, wherein determining the monetary amount associated with a trauma severity value comprises determining at least one new trauma data point from the modified trauma fine-tuning line.

7. The method of claim 1, wherein the graphical display further comprises one or more data fields comprising information describing the relationship between trauma severity values and monetary amounts.

8. The method of claim 1, further comprising the computer system displaying a baseline trauma fine-tuning line in the graphical display at the same time as the modified trauma fine-tuning line, wherein the baseline trauma fine-tuning line depicts the trauma fine-tuning line before modifications, and wherein the baseline trauma fine-tuning line is not affected by modifying the trauma fine-tuning line.

9. The method of claim 1, wherein the monetary amounts comprise an estimate of the cost of the trauma associated with an insurance claim.

10. The method of claim 1, wherein the method further comprises determining a monetary amount associated with trauma before providing the graphical display of the trauma tuning line.

11. The method of claim 1, wherein the trauma fine-tuning line comprises at least one straight line segment joining two or more trauma data points.

12. The method of claim 1, wherein the trauma fine-tuning line comprises a line fit through two or more of the trauma data points using a line fitting technique.

13. The method of claim 1, wherein providing the plurality of trauma data points relating trauma severity values to monetary amounts comprises determining one or more relationships between trauma severity values and monetary amounts based on expert evaluation of one or more insurance claims.

14. The method of claim 1, wherein providing the plurality of trauma data points relating trauma severity values to monetary amounts comprises determining one or more relationships between trauma severity values and monetary amounts based on one or more closed insurance claims.

15. The method of claim 1, further comprising:
providing a warning to a user if the estimated trauma severity value is outside a range of trauma severity values used to determine the modified trauma fine-tuning line.

16. The method of claim 1, further comprising:
estimating a monetary value of the estimated trauma severity value by interpolating between two or more trauma data points.

17. The method of claim 1, wherein the trauma severity values include bodily impairment amounts.

18. The method of claim 1, wherein the computer system receiving the selection of at least one point on the X/Y trauma fine-tuning graph comprises a user dragging and dropping a point on the X/Y trauma tuning graph from one location on the X/Y trauma fine-tuning graph to another location on the X/Y trauma fine-tuning graph.

19. The method of claim 1, wherein the trauma fine-tuning line at least partially passes through a plurality of tiers, each tier corresponding to a range of monetary values, the method further comprising displaying at least one tier boundary along an X-axis of the X/Y trauma fine-tuning graph.

20. The method of claim 1, wherein the trauma fine-tuning line at least partially passes through a plurality of tiers, each tier corresponding to a range of monetary values, the method further comprising:
modifying the trauma fine-tuning line for at least one of the tiers independently from at least one other of the tiers; and
estimating a monetary value of one or more insurance claims using the modified trauma fine-tuning line.

21. The method of claim 1, wherein the trauma fine-tuning line at least partially passes through a plurality of tiers, each tier corresponding to a range of monetary values, the method further comprising:
modifying the trauma fine-tuning line for at least two of the plurality of tiers at one time; and
estimating a monetary value of one or more insurance claims using the modified trauma fine-tuning line.

22. The method of claim 1, further comprising displaying a projected claims data section, wherein the projected claims data section comprises claim data based on at least one claim modified to reflect at least one of the modified trauma fine-tuning line or the modified impairment fine-tuning line.

23. The method of claim 1, further comprising displaying an X/Y graph of one or more closed claims, wherein the X/Y graph reflects trauma severity values along one axis and monetary amounts along the other axis.

24. The method of claim 1, further comprising displaying an X/Y graph of one or more closed claims, wherein the X/Y graph reflects trauma severity values along one axis and monetary amounts along the other axis, further comprising:
receiving a selection of a particular closed claim;
graphically displaying an indicator showing the original recommended high settlement value for the selected closed claim; and
graphically displaying an indicator showing a recommended high settlement value for the selected closed claim based on a current tuning.

25. The method of claim 1, further comprising displaying an X/Y graph portion including at least one actual values component and at least one projected values component.

26. The method of claim 1, further comprising displaying an X/Y graph portion including at least one actual values component and at least one projected values component.

27. The method of claim 1, further comprising displaying an X/Y graph including a projected recommended high line.

28. The method of claim 1, wherein the modified trauma fine-tuning line and the modified impairment fine-tuning line correspond to a first region, the method further comprising:
importing data relating to closed claims from a second region into the computer system, the second region being different from the first region; and
calculating the effect on the closed claims from the second region of at least one of the modified trauma fine-tuning line or the modified impairment fine-tuning line.

29. A computer-readable storage medium comprising program instructions stored thereon, wherein the program instructions are executable to implement a method of:
providing a graphical display comprising an X/Y trauma fine-tuning graph including a trauma fine-tuning line, wherein the trauma fine-tuning line represents a plurality of trauma data points relating trauma severity values to monetary amounts, wherein the trauma fine-tuning line reflects baseline data based on cases for which the severity data is predetermined;

receiving, via the graphical display, a selection of at least one point on the X/Y trauma fine-tuning graph;

modifying the trauma fine-tuning line on the X/Y trauma fine-tuning graph of the graphical display based on the received selection of the at least one point on the trauma fine-tuning graph, wherein the modified trauma fine-tuning line comprises a modification from the baseline data;

providing a plurality of impairment data points relating bodily impairment amounts to monetary mounts;

providing a graphical display comprising an X/Y impairment fine-tuning graph including an impairment fine-tuning line, wherein the impairment fine-tuning line relates bodily impairment amounts to monetary amounts based on at least two of the impairment data points based on cases for which the impairment data is predetermined;

receiving, via the graphical display, an input;

modifying the impairment fine-tuning line on the X/Y impairment fine-tuning graph of the graphical display based on the input;

determining a monetary amount associated with a trauma severity value based on the modified trauma fine-tuning line;

determining a monetary amount associated with bodily impairment based on the modified impairment fine-tuning line; and estimating a monetary value of one or more insurance claims using the modified trauma tuning line based on the monetary amount associated with the trauma severity value and the monetary amount associated with bodily impairment.

30. The computer-readable storage medium of claim 29, wherein the program instructions are further executable to implement a method of:

determining at least one new impairment data point relating at least one bodily impairment amount to at least one monetary amount based on modifications to the impairment fine-tuning line in the graphical display.

31. The computer-readable storage medium of claim 30, wherein the program instructions are further executable to implement a method of sending a plurality of data points to an insurance claims processing system, wherein the plurality of data points sent include at least one new trauma data point and at least one new impairment data point, and wherein the plurality of data points are usable by the insurance claim processing system to relate one or more trauma severity values and one or more bodily impairment amounts to one or more monetary amounts.

32. The computer-readable storage medium of claim 30, wherein the program instructions are further executable to implement a method of sending data describing the modified trauma fine-tuning line and the modified impairment fine-tuning line to an insurance claim processing system, wherein the data describing the trauma fine-tuning line and the impairment fine-tuning line is usable by the insurance claim processing system to relate one or more trauma severity values and one or more bodily impairment amounts to one or more monetary amounts.

33. The computer-readable storage medium of claim 29, wherein the trauma fine-tuning line is defined by at least one function relating trauma severity values to monetary amounts.

34. The computer-readable storage medium of claim 29, wherein determining the monetary amount associated with a trauma severity value comprises determining at least one new trauma data point from the modified trauma fine-tuning line.

35. The computer-readable storage medium of claim 29, wherein the graphical display further comprises one or more data fields comprising information describing the relationship between trauma severity values and monetary amounts.

36. The computer-readable storage medium of claim 29, wherein the program instructions are further executable to implement a method of displaying a baseline trauma fine-tuning line in the graphical display at the same time as the modified trauma fine-tuning line, wherein the baseline trauma fine-tuning line depicts the trauma tuning line before modifications, and wherein the baseline trauma fine-tuning line is not affected by modifying the trauma fine-tuning line.

37. The computer-readable storage medium of claim 29, wherein the monetary amounts comprise an estimate of the cost of the trauma associated with an insurance claim.

38. The computer-readable storage medium of claim 29, wherein the method further comprises determining a monetary amount associated with trauma before providing the graphical display of the trauma tuning line.

39. The computer-readable storage medium of claim 29, wherein the trauma fine-tuning line comprises at least one straight line segment joining two or more trauma data points.

40. The computer-readable storage medium of claim 29, wherein the trauma fine-tuning line comprises a line fit through two or more of the trauma data points using a line fitting technique.

41. The computer-readable storage medium of claim 29, wherein providing the plurality of trauma data points relating trauma severity values to monetary amounts comprises determining one or more relationships between trauma severity values and monetary amounts based on expert evaluation of one or more insurance claims.

42. The computer-readable storage medium of claim 29, wherein providing the plurality of trauma data points relating trauma severity values to monetary amounts comprises determining one or more relationships between trauma severity values and monetary amounts based on one or more closed insurance claims.

43. The computer-readable storage medium of claim 29, wherein the program instructions are further executable to implement a method of:

providing a warning to a user if the estimated trauma severity value is outside a range of trauma severity values used to determine the modified trauma tuning line.

44. The computer-readable storage medium of claim 29, wherein the program instructions are further executable to implement a method of:

estimating a monetary value of the estimated trauma severity value by interpolating between two or more trauma data points.

45. The computer-readable storage medium of claim 29, wherein the trauma severity values include bodily impairment amounts.

46. A system, comprising:

a CPU;

a memory coupled to the CPU, wherein the memory comprises program instructions executable to:

provide a graphical display comprising an X/Y trauma fine-tuning graph including a trauma fine-tuning line, wherein the trauma tuning line represents a plurality of trauma data points relating trauma severity values to monetary amounts, wherein the trauma fine-tuning line reflects baseline data based on cases for which the severity data is predetermined;

receive, via the graphical display, a selection of at least one point on the X/Y trauma fine-tuning graph;

modify trauma fine-tuning line on the X/Y trauma fine-tuning graph of the graphical display based on the received selection of the at least one point on the trauma fine-tuning graph, wherein the modified trauma fine-tuning line comprises a modification from the baseline data;

provide a plurality of impairment data points relating bodily impairment amounts to monetary amounts;

provide a graphical display comprising an X/Y impairment fine-tuning graph including an impairment fine-tuning line, wherein the impairment fine-tuning line relates bodily impairment amounts to monetary amounts based on at least two of the impairment data points based on cases for which the impairment data is predetermined;

receive, via the graphical display, an input;

modify the impairment fine-tuning line on the X/Y impairment fine-tuning graph of the graphical display based on the input;

determine a monetary amount associated with a trauma severity value based on the modified trauma fine-tuning line;

determine a monetary amount associated with bodily impairment based on the modified impairment fine-tuning line; and estimate a monetary value of one or more insurance claims using the modified trauma tuning line based on the monetary amount associated with the trauma severity value and the monetary amount associated with bodily impairment.

47. The system of claim 46, wherein the program instructions are further executable to:

determine at least one new impairment data point relating at least one bodily impairment amount to at least one monetary amount based on modifications to the impairment fine-tuning line in the graphical display.

48. The system of claim 47, wherein the program instructions are further executable to send a plurality of data points to an insurance claims processing system, wherein the plurality of data points sent include at least one new trauma data point and at least one new impairment data point, and wherein the plurality of data points are usable by the insurance claim processing system to relate one or more trauma severity values and one or more bodily impairment amounts to one or more monetary amounts.

49. The system of claim 47, wherein the program instructions are further executable to implement a method of sending data describing the modified trauma fine-tuning line and the modified impairment fine-tuning line to an insurance claim processing system, wherein the data describing the trauma fine-tuning line and the impairment fine-tuning line is usable by the insurance claim processing system to relate one or more trauma severity values and one or more bodily impairment amounts to one or more monetary amounts.

50. The system of claim 46, wherein the trauma fine-tuning line is defined by at least one function relating trauma severity values to monetary amounts.

51. The system of claim 46, wherein determining the monetary amount associated with a trauma severity value comprises determining at least one new trauma data point from the modified trauma fine-tuning line.

52. The system of claim 46, wherein the graphical display further comprises one or more data fields comprising information describing the relationship between trauma severity values and monetary amounts.

53. The system of claim 46, wherein the program instructions are further executable to display a baseline trauma fine-tuning line in the graphical display at the same time as the modified trauma fine-tuning line, wherein the baseline trauma fine-tuning line depicts the trauma fine-tuning line before modifications, and wherein the baseline trauma fine-tuning line is not affected by modifying the trauma fine-tuning line.

54. The system of claim 46, wherein the monetary amounts comprise an estimate of the cost of the trauma associated with an insurance claim.

55. The system of claim 46, wherein the method further comprises determining a monetary amount associated with trauma before providing the graphical display of the trauma tuning line.

56. The system of claim 46, wherein the trauma fine-tuning line comprises at least one straight line segment joining two or more trauma data points.

57. The system of claim 46, wherein the trauma fine-tuning line comprises a line fit through two or more of the trauma data points using a line fitting technique.

58. The system of claim 46, wherein providing the plurality of trauma data points relating trauma severity values to monetary amounts comprises determining one or more relationships between trauma severity values and monetary amounts based on expert evaluation of one or more insurance claims.

59. The system of claim 46, wherein providing the plurality of trauma data points relating trauma severity values to monetary amounts comprises determining one or more relationships between trauma severity values and monetary amounts based on one or more closed insurance claims.

60. The system of claim 46, wherein the program instructions are further executable to:

provide a warning to a user if the estimated trauma severity value is outside a range of trauma severity values used to determine the modified trauma fine-tuning line.

61. The system of claim 46, wherein the program instructions are further executable to:

estimate a monetary value of the estimated trauma severity value by interpolating between two or more trauma data points.

62. The system of claim 46, wherein the trauma severity values include bodily impairment amounts.

\* \* \* \* \*